US009530150B2

(12) United States Patent
Goldberg et al.

(10) Patent No.: US 9,530,150 B2
(45) Date of Patent: Dec. 27, 2016

(54) COMPENSATION MODEL FOR NETWORK SERVICES

(75) Inventors: Sheldon F. Goldberg, Las Vegas, NV (US); Dennis J. Dupray, Golden, CO (US); John Van Antwerp, Normal, IL (US)

(73) Assignee: ADCENSION, LLC, Dallas, TX (US)

( * ) Notice: Subject to any disclaimer, the term of this patent is extended or adjusted under 35 U.S.C. 154(b) by 56 days.

(21) Appl. No.: 12/357,623

(22) Filed: Jan. 22, 2009

(65) Prior Publication Data

US 2009/0132440 A1    May 21, 2009

Related U.S. Application Data

(63) Continuation-in-part of application No. 12/167,244, filed on Jul. 2, 2008, and a continuation-in-part of
(Continued)

(51) Int. Cl.
*G06Q 30/02* (2012.01)
*G06Q 99/00* (2006.01)
*G06F 17/30* (2006.01)

(52) U.S. Cl.
CPC .......... *G06Q 30/0255* (2013.01); *G06Q 30/02* (2013.01); *G06Q 30/0212* (2013.01);
(Continued)

(58) Field of Classification Search
CPC .... G06Q 30/02; G06Q 10/02; G06Q 30/0255; G06Q 30/0269; G06Q 30/0241; G06Q 30/0251; G06Q 30/0242; G06Q 30/0252; G06Q 30/0272; G06Q 10/101; G06Q 30/0277; G06F 17/30017; G06F 17/30902; G06F 121/33; G06F 2221/2141; G06F 17/30457; G06F 17/30528; G06F 17/30876
(Continued)

(56) References Cited

U.S. PATENT DOCUMENTS 3,796,433 A   3/1974   Fraley et al.
3,848,193 A   11/1974  Martin et al.
(Continued)

FOREIGN PATENT DOCUMENTS

DE   733983    4/1943
DE   2918846   11/1980
(Continued)

OTHER PUBLICATIONS

Jump on interactive bandwagon now. (1993). Electronic Media, , 22. Retrieved from http://dialog.proquest.com/professional/docview/673614914?accountid=142257 on Oct. 5, 2016.*
(Continued)

*Primary Examiner* — Kito R Robinson

(57) ABSTRACT

A compensation model is disclosed for compensating a network service provider. A networked system is also disclosed for presenting advertising during on-line interactions between a user and a service of a network (e.g., the Internet, interactive cable, and/or a LAN). Advertisements (ads) are presented to a networked user unrequestedly during user interactions with the service. The user can activate the ads (via hyperlinks) for receiving additional advertising. The system gathers user data and/or develops user profiles for selectively presenting ads, promotionals, discounts, etc. targeted to receptive users. In exchange for viewing such selective presentations, on-line access to the service is provided, the service including, e.g., (a) playing on-line interactive games (e.g., blackjack and poker), (b) providing access to the network itself (e.g., an Internet service provider), and/or (c) providing access to substantially any interactive service accessible via (b). The system can provide free/reduced cost network services to the user for viewing unrequested advertising. The system can be provided for a casino.

25 Claims, 15 Drawing Sheets

Related U.S. Application Data application No. 09/502,285, filed on Feb. 11, 2000, now Pat. No. 7,496,943, which is a continuation of application No. 09/105,401, filed on Jun. 26, 1998, now Pat. No. 6,183,366, which is a continuation of application No. 08/759,895, filed on Dec. 3, 1996, now Pat. No. 5,823,879.

(60) Provisional application No. 60/947,598, filed on Jul. 2, 2007, provisional application No. 60/010,361, filed on Jan. 19, 1996, provisional application No. 60/010,703, filed on Jan. 26, 1996.

(52) U.S. Cl.
CPC ......... *G06Q 30/0273* (2013.01); *G06Q 99/00* (2013.01); *G06F 17/30457* (2013.01); *G06F 17/30528* (2013.01); *G06F 17/30902* (2013.01)

(58) Field of Classification Search
USPC ...................................................... 705/42, 14
See application file for complete search history.

(56) References Cited

U.S. PATENT DOCUMENTS

| | | |
|---|---|---|
| 3,987,398 A | 10/1976 | Fung |
| 4,170,782 A | 10/1979 | Miller |
| 4,186,413 A | 1/1980 | Mortimer |
| 4,224,644 A | 9/1980 | Lewis et al. |
| 4,283,709 A | 8/1981 | Lucero et al. |
| 4,287,592 A | 9/1981 | Paulish et al. |
| 4,288,809 A | 9/1981 | Yabe |
| 4,305,101 A | 12/1981 | Yarbrough et al. |
| 4,307,446 A | 12/1981 | Barton et al. |
| 4,338,644 A | 7/1982 | Staar |
| 4,339,798 A | 7/1982 | Hedges et al. |
| 4,347,498 A | 8/1982 | Lee et al. |
| 4,355,806 A | 10/1982 | Buck et al. |
| 4,381,522 A | 4/1983 | Lambert |
| 4,405,946 A | 9/1983 | Knight |
| 4,429,385 A | 1/1984 | Cichelli et al. |
| 4,455,025 A | 6/1984 | Itkis |
| 4,467,424 A | 8/1984 | Hedges et al. |
| 4,476,488 A | 10/1984 | Merrell |
| 4,488,179 A | 12/1984 | Kruger et al. |
| 4,494,197 A | 1/1985 | Troy et al. |
| 4,528,643 A | 7/1985 | Freeny, Jr. |
| 4,531,187 A | 7/1985 | Uhland |
| 4,536,791 A | 8/1985 | Campbell et al. |
| 4,575,579 A | 3/1986 | Simon et al. |
| 4,602,279 A | 7/1986 | Freeman |
| 4,614,342 A | 9/1986 | Takashima |
| 4,636,951 A | 1/1987 | Harlick |
| 4,641,205 A | 2/1987 | Beyers, Jr. |
| 4,677,466 A | 6/1987 | Lert, Jr. et al. |
| 4,691,351 A | 9/1987 | Hayashi et al. |
| 4,691,354 A | 9/1987 | Palminteri |
| 4,701,794 A | 10/1987 | Froling et al. |
| 4,706,121 A | 11/1987 | Young |
| 4,745,468 A | 5/1988 | Von Kohorn |
| 4,751,578 A | 6/1988 | Reiter et al. |
| 4,751,669 A | 6/1988 | Sturgis et al. |
| 4,760,527 A | 7/1988 | Sidley |
| 4,768,110 A | 8/1988 | Dunlap et al. |
| 4,775,935 A | 10/1988 | Yourick |
| 4,815,030 A | 3/1989 | Cross et al. |
| 4,821,102 A | 4/1989 | Ichikawa et al. |
| 4,823,122 A | 4/1989 | Mann et al. |
| 4,829,569 A | 5/1989 | Seth-Smith et al. |
| 4,842,275 A | 6/1989 | Tsatskin |
| 4,845,739 A | 7/1989 | Katz |
| 4,856,787 A | 8/1989 | Itkis |
| 4,866,700 A | 9/1989 | Berry et al. |
| 4,868,866 A | 9/1989 | Williams, Jr. |
| 4,873,662 A | 10/1989 | Sargent |
| 4,875,164 A | 10/1989 | Monfort |
| 4,876,592 A | 10/1989 | Von Kohorn |
| 4,890,321 A | 12/1989 | Seth-Smith et al. |
| 4,902,020 A | 2/1990 | Auxier |
| 4,908,707 A | 3/1990 | Kinghorn |
| 4,908,713 A | 3/1990 | Levine |
| 4,926,255 A | 5/1990 | Von Kohorn |
| 4,926,327 A | 5/1990 | Sidley |
| 4,974,149 A | 11/1990 | Valenti |
| 4,975,904 A | 12/1990 | Mann et al. |
| 4,975,905 A | 12/1990 | Mann et al. |
| 4,977,455 A | 12/1990 | Young |
| 4,987,486 A | 1/1991 | Johnson et al. |
| 4,991,011 A | 2/1991 | Johnson et al. |
| 4,992,940 A | 2/1991 | Dworkin |
| 4,994,908 A | 2/1991 | Kuban et al. |
| 5,001,554 A | 3/1991 | Johnson et al. |
| 5,008,853 A | 4/1991 | Bly et al. |
| 5,009,429 A | 4/1991 | Auxier |
| 5,034,807 A | 7/1991 | Von Kohorn |
| 5,038,022 A | 8/1991 | Lucero |
| 5,053,889 A | 10/1991 | Nakano et al. |
| 5,057,915 A | 10/1991 | Von Kohorn |
| 5,058,108 A | 10/1991 | Mann et al. |
| 5,073,931 A | 12/1991 | Audebert et al. |
| 5,075,771 A | 12/1991 | Hashimoto |
| 5,077,607 A | 12/1991 | Johnson et al. |
| 5,083,271 A | 1/1992 | Thacher et al. |
| 5,093,918 A | 3/1992 | Heyen et al. |
| 5,099,319 A | 3/1992 | Esch et al. |
| 5,105,184 A | 4/1992 | Pirani et al. |
| 5,133,075 A | 7/1992 | Risch |
| 5,141,234 A | 8/1992 | Boylan et al. |
| 5,151,789 A | 9/1992 | Young |
| 5,159,549 A | 10/1992 | Hallman, Jr. et al. |
| 5,177,680 A | 1/1993 | Tsukino et al. |
| 5,182,640 A | 1/1993 | Takano |
| 5,187,787 A | 2/1993 | Skeen et al. |
| 5,200,823 A | 4/1993 | Yoneda et al. |
| 5,220,420 A | 6/1993 | Hoarty et al. |
| 5,220,501 A | 6/1993 | Lawlor et al. |
| 5,220,657 A | 6/1993 | Bly et al. |
| 5,224,706 A | 7/1993 | Bridgeman et al. |
| 5,227,874 A | 7/1993 | Von Kohorn |
| 5,230,048 A | 7/1993 | Moy |
| 5,231,493 A | 7/1993 | Apitz |
| 5,231,568 A | 7/1993 | Cohen et al. |
| 5,233,533 A | 8/1993 | Edstrom et al. |
| 5,235,509 A | 8/1993 | Mueller et al. |
| 5,241,465 A | 8/1993 | Oba et al. |
| 5,257,789 A | 11/1993 | LeVasseur |
| 5,257,810 A | 11/1993 | Schorr et al. |
| 5,261,042 A | 11/1993 | Brandt |
| 5,265,033 A | 11/1993 | Vajk et al. |
| 5,283,639 A | 2/1994 | Esch et al. |
| 5,283,731 A | 2/1994 | Lalonde et al. |
| 5,283,734 A | 2/1994 | Von Kohorn |
| 5,283,856 A | 2/1994 | Gross et al. |
| 5,285,272 A | 2/1994 | Bradley et al. |
| 5,301,028 A | 4/1994 | Banker et al. |
| 5,305,195 A | 4/1994 | Murphy |
| 5,319,455 A | 6/1994 | Hoarty et al. |
| 5,319,707 A | 6/1994 | Wasilewski et al. |
| 5,320,356 A | 6/1994 | Cauda |
| 5,321,241 A | 6/1994 | Craine |
| 5,326,104 A | 7/1994 | Pease et al. |
| 5,337,155 A | 8/1994 | Cornelis |
| 5,339,239 A | 8/1994 | Manabe et al. |
| 5,343,239 A | 8/1994 | Lappington et al. |
| 5,343,300 A | 8/1994 | Hennig |
| 5,345,594 A | 9/1994 | Tsuda |
| 5,347,632 A | 9/1994 | Filepp et al. |
| 5,351,970 A | 10/1994 | Fioretti |
| 5,353,218 A | 10/1994 | De Lapa et al. |
| 5,355,480 A | 10/1994 | Smith et al. |
| 5,357,276 A | 10/1994 | Banker et al. |
| 5,361,393 A | 11/1994 | Rossillo |
| 5,377,354 A | 12/1994 | Scannell et al. |

(56) References Cited

U.S. PATENT DOCUMENTS

| | | |
|---|---|---|
| 5,393,067 A | 2/1995 | Paulsen et al. |
| 5,398,932 A | 3/1995 | Eberhardt et al. |
| 5,401,946 A | 3/1995 | Weinblatt |
| 5,403,015 A | 4/1995 | Forte et al. |
| 5,404,505 A | 4/1995 | Levinson |
| 5,414,773 A | 5/1995 | Handelman |
| 5,426,594 A | 6/1995 | Wright et al. |
| 5,428,606 A | 6/1995 | Moskowitz |
| 5,429,361 A | 7/1995 | Raven et al. |
| 5,431,407 A | 7/1995 | Hofberg et al. |
| 5,434,978 A | 7/1995 | Dockter et al. |
| 5,437,462 A | 8/1995 | Breeding |
| 5,440,262 A | 8/1995 | Lum et al. |
| 5,442,771 A | 8/1995 | Filepp et al. |
| 5,446,919 A | 8/1995 | Wilkins |
| 5,469,371 A | 11/1995 | Bass |
| 5,471,629 A | 11/1995 | Risch |
| 5,483,466 A | 1/1996 | Kawahara et al. |
| 5,491,517 A | 2/1996 | Kreitman et al. |
| 5,498,003 A | 3/1996 | Gechter |
| 5,504,675 A | 4/1996 | Cragun et al. |
| 5,505,449 A | 4/1996 | Eberhardt et al. |
| 5,507,491 A | 4/1996 | Gatto et al. |
| 5,508,731 A | 4/1996 | Kohorn |
| 5,511,160 A | 4/1996 | Robson |
| 5,513,254 A | 4/1996 | Markowitz |
| 5,515,098 A | 5/1996 | Carles |
| 5,526,035 A | 6/1996 | Lappington et al. |
| 5,526,427 A | 6/1996 | Thomas et al. |
| 5,528,490 A | 6/1996 | Hill |
| 5,532,923 A | 7/1996 | Sone |
| 5,537,586 A | 7/1996 | Amram et al. |
| 5,539,450 A | 7/1996 | Handelman |
| 5,539,822 A | 7/1996 | Lett |
| 5,544,892 A | 8/1996 | Breeding |
| 5,549,300 A | 8/1996 | Sardarian |
| 5,557,658 A | 9/1996 | Gregorek et al. |
| 5,557,721 A | 9/1996 | Fite et al. |
| 5,559,312 A | 9/1996 | Lucero |
| 5,561,707 A | 10/1996 | Katz |
| 5,569,082 A | 10/1996 | Kaye |
| 5,572,643 A | 11/1996 | Judson |
| 5,576,951 A | 11/1996 | Lockwood |
| 5,577,266 A | 11/1996 | Takahisa et al. |
| 5,579,537 A | 11/1996 | Takahisa |
| 5,581,479 A | 12/1996 | McLaughlin et al. |
| 5,583,563 A | 12/1996 | Wanderscheid et al. |
| 5,585,866 A | 12/1996 | Miller et al. |
| 5,586,257 A | 12/1996 | Perlman |
| 5,586,766 A | 12/1996 | Forte et al. |
| 5,586,936 A | 12/1996 | Bennett et al. |
| 5,586,937 A | 12/1996 | Menashe |
| 5,588,650 A | 12/1996 | Eman et al. |
| 5,589,892 A | 12/1996 | Knee et al. |
| 5,592,212 A | 1/1997 | Handelman |
| 5,593,349 A | 1/1997 | Miguel et al. |
| 5,597,162 A | 1/1997 | Franklin |
| 5,597,307 A | 1/1997 | Redford et al. |
| 5,600,364 A | 2/1997 | Hendricks et al. |
| 5,600,366 A | 2/1997 | Schulman |
| 5,603,502 A | 2/1997 | Nakagawa |
| 5,605,334 A | 2/1997 | McCrea, Jr. |
| 5,610,653 A | 3/1997 | Abecassis |
| 5,611,730 A | 3/1997 | Weiss |
| 5,613,190 A | 3/1997 | Hylton |
| 5,613,191 A | 3/1997 | Hylton et al. |
| 5,613,912 A | 3/1997 | Slater |
| 5,617,565 A | 4/1997 | Augenbraun et al. |
| 5,624,265 A | 4/1997 | Redford et al. |
| 5,624,316 A | 4/1997 | Roskowski et al. |
| 5,630,204 A | 5/1997 | Hylton et al. |
| 5,634,051 A | 5/1997 | Thomson |
| 5,635,979 A | 6/1997 | Kostreski et al. |
| 5,638,426 A | 6/1997 | Lewis |
| 5,640,193 A | 6/1997 | Wellner |
| 5,643,088 A | 7/1997 | Vaughn et al. |
| 5,655,966 A | 8/1997 | Werdin, Jr. et al. |
| 5,659,350 A | 8/1997 | Hendricks et al. |
| 5,659,793 A | 8/1997 | Escobar et al. |
| 5,660,391 A | 8/1997 | Klasee |
| 5,664,948 A | 9/1997 | Dimitriadis et al. |
| 5,669,817 A | 9/1997 | Tarantino |
| 5,675,507 A | 10/1997 | Bobo, II |
| 5,675,752 A | 10/1997 | Scott et al. |
| 5,679,077 A | 10/1997 | Pocock et al. |
| 5,683,082 A | 11/1997 | Takemoto et al. |
| 5,684,863 A | 11/1997 | Katz |
| 5,684,918 A | 11/1997 | Abecassis |
| 5,687,331 A | 11/1997 | Volk et al. |
| 5,687,971 A | 11/1997 | Khaladkar |
| 5,688,174 A | 11/1997 | Kennedy |
| 5,689,431 A | 11/1997 | Rudow et al. |
| 5,689,648 A | 11/1997 | Diaz et al. |
| 5,696,965 A | 12/1997 | Dedrick |
| 5,697,844 A | 12/1997 | Von Kohorn |
| 5,702,104 A | 12/1997 | Malek et al. |
| 5,702,305 A | 12/1997 | Norman et al. |
| 5,707,287 A | 1/1998 | McCrea, Jr. |
| 5,708,780 A | 1/1998 | Levergood et al. |
| 5,708,845 A | 1/1998 | Wistendahl et al. |
| 5,709,603 A | 1/1998 | Kaye |
| 5,710,918 A | 1/1998 | Lagarde et al. |
| 5,711,715 A | 1/1998 | Ringo et al. |
| 5,713,574 A | 2/1998 | Hughes |
| 5,713,795 A | 2/1998 | Kohorn |
| 5,717,860 A | 2/1998 | Graber et al. |
| 5,718,431 A | 2/1998 | Ornstein |
| 5,722,418 A | 3/1998 | Bro |
| 5,724,091 A | 3/1998 | Freeman et al. |
| 5,724,106 A | 3/1998 | Autry et al. |
| 5,724,424 A | 3/1998 | Gifford |
| 5,724,425 A | 3/1998 | Chang et al. |
| 5,729,212 A | 3/1998 | Martin |
| 5,729,279 A | 3/1998 | Fuller |
| 5,732,338 A | 3/1998 | Schwob |
| 5,732,949 A | 3/1998 | Josephs |
| 5,734,589 A | 3/1998 | Kostreski et al. |
| 5,734,853 A | 3/1998 | Hendricks et al. |
| 5,735,525 A | 4/1998 | McCrea, Jr. |
| 5,735,742 A | 4/1998 | French |
| 5,737,533 A | 4/1998 | de Hond |
| 5,737,619 A | 4/1998 | Judson |
| 5,740,252 A | 4/1998 | Minor et al. |
| 5,740,369 A | 4/1998 | Yokozawa et al. |
| 5,740,549 A | 4/1998 | Reilly et al. |
| 5,742,762 A | 4/1998 | Scholl et al. |
| 5,746,656 A | 5/1998 | Bezick et al. |
| 5,748,742 A | 5/1998 | Tisdale et al. |
| 5,749,075 A | 5/1998 | Toader et al. |
| 5,749,735 A | 5/1998 | Redford et al. |
| 5,749,785 A | 5/1998 | Rossides |
| 5,751,338 A | 5/1998 | Ludwig, Jr. |
| 5,752,160 A | 5/1998 | Dunn |
| 5,754,938 A | 5/1998 | Herz et al. |
| 5,754,939 A | 5/1998 | Herz et al. |
| 5,755,621 A | 5/1998 | Marks et al. |
| 5,758,257 A | 5/1998 | Herz et al. |
| 5,759,101 A | 6/1998 | Von Kohorn |
| 5,767,894 A | 6/1998 | Fuller et al. |
| 5,768,382 A | 6/1998 | Schneier et al. |
| 5,770,533 A | 6/1998 | Franchi |
| 5,774,591 A | 6/1998 | Black et al. |
| 5,774,664 A | 6/1998 | Hidary et al. |
| 5,774,670 A | 6/1998 | Montulli |
| 5,774,869 A | 6/1998 | Toader |
| 5,779,242 A | 7/1998 | Kaufmann |
| 5,779,549 A | 7/1998 | Walker et al. |
| 5,781,245 A | 7/1998 | Van Der Weij et al. |
| 5,781,246 A | 7/1998 | Alten et al. |
| 5,787,156 A | 7/1998 | Katz |
| 5,788,507 A | 8/1998 | Redford et al. |
| 5,788,574 A | 8/1998 | Ornstein et al. |
| 5,789,892 A | 8/1998 | Takei |
| 5,791,991 A | 8/1998 | Small |

(56) References Cited

U.S. PATENT DOCUMENTS

| | | | |
|---|---|---|---|
| 5,793,413 A | 8/1998 | Hylton et al. |
| 5,794,210 A | 8/1998 | Goldhaber et al. |
| 5,795,156 A | 8/1998 | Redford et al. |
| 5,796,945 A | 8/1998 | Tarabella |
| 5,798,785 A | 8/1998 | Hendricks et al. |
| 5,799,267 A | 8/1998 | Siegel |
| 5,800,268 A | 9/1998 | Molnick |
| 5,802,220 A | 9/1998 | Black et al. |
| 5,805,154 A | 9/1998 | Brown |
| 5,805,815 A | 9/1998 | Hill |
| 5,809,481 A | 9/1998 | Baron et al. |
| 5,809,482 A | 9/1998 | Strisower |
| 5,812,769 A | 9/1998 | Graber et al. |
| 5,812,776 A | 9/1998 | Gifford |
| 5,815,551 A | 9/1998 | Katz |
| 5,816,918 A | 10/1998 | Kelly et al. |
| 5,818,438 A | 10/1998 | Howe et al. |
| 5,823,879 A | 10/1998 | Goldberg et al. |
| 5,828,734 A | 10/1998 | Katz |
| 5,830,067 A | 11/1998 | Graves et al. |
| 5,830,068 A | 11/1998 | Brenner et al. |
| 5,831,527 A | 11/1998 | Jones, II et al. |
| 5,835,126 A | 11/1998 | Lewis |
| 5,836,817 A | 11/1998 | Acres et al. |
| 5,839,725 A | 11/1998 | Conway |
| 5,839,905 A | 11/1998 | Redford et al. |
| 5,848,396 A | 12/1998 | Gerace |
| 5,848,397 A | 12/1998 | Marsh et al. |
| 5,851,149 A | 12/1998 | Xidos et al. |
| 5,855,007 A | 12/1998 | Jovicic et al. |
| 5,857,911 A | 1/1999 | Fioretti |
| 5,871,398 A | 2/1999 | Schneier et al. |
| 5,875,108 A | 2/1999 | Hoffberg et al. |
| 5,879,233 A | 3/1999 | Stupero |
| 5,880,769 A | 3/1999 | Nemirofsky et al. |
| 5,885,158 A | 3/1999 | Torango et al. |
| 5,898,762 A | 4/1999 | Katz |
| 5,901,246 A | 5/1999 | Hoffberg et al. |
| 5,901,287 A | 5/1999 | Bull et al. |
| 5,903,317 A | 5/1999 | Sharir et al. |
| 5,911,582 A | 6/1999 | Redford et al. |
| 5,913,040 A | 6/1999 | Rakavy et al. |
| 5,916,024 A * | 6/1999 | Von Kohorn ........ H04N 7/0884 348/E7.024 |
| 5,917,725 A | 6/1999 | Thacher et al. |
| 5,917,893 A | 6/1999 | Katz |
| 5,918,014 A | 6/1999 | Robinson |
| 5,918,213 A | 6/1999 | Bernard et al. |
| 5,929,850 A | 7/1999 | Broadwin et al. |
| 5,933,811 A | 8/1999 | Angles et al. |
| 5,935,004 A | 8/1999 | Tarr et al. |
| 5,937,163 A | 8/1999 | Lee et al. |
| 5,937,392 A | 8/1999 | Alberts |
| 5,946,664 A | 8/1999 | Ebisawa |
| 5,948,061 A | 9/1999 | Merriman et al. |
| 5,957,695 A | 9/1999 | Redford et al. |
| 5,959,623 A | 9/1999 | van Hoff et al. |
| 5,960,409 A | 9/1999 | Wexler |
| 5,964,463 A | 10/1999 | Moore, Jr. |
| 5,971,397 A | 10/1999 | Miguel et al. |
| 5,987,498 A | 11/1999 | Athing et al. |
| 5,990,927 A | 11/1999 | Hendricks et al. |
| 5,996,006 A | 11/1999 | Speicher |
| 5,999,808 A | 12/1999 | LaDue |
| 6,002,393 A | 12/1999 | Hite et al. |
| 6,005,561 A | 12/1999 | Hawkins et al. |
| 6,006,257 A | 12/1999 | Slezak |
| 6,025,837 A | 2/2000 | Matthews, III et al. |
| 6,035,021 A | 3/2000 | Katz |
| 6,038,554 A | 3/2000 | Vig |
| 6,047,310 A * | 4/2000 | Kamakura .......... G06Q 10/107 709/201 |
| 6,081,750 A | 6/2000 | Hoffberg et al. |
| 6,085,256 A | 7/2000 | Kitano et al. |
| 6,154,207 A | 11/2000 | Farris et al. |
| 6,183,366 B1 | 2/2001 | Goldberg et al. |
| 6,185,586 B1 | 2/2001 | Judson |
| 6,208,805 B1 | 3/2001 | Abecassis |
| 6,236,360 B1 | 5/2001 | Rudow et al. |
| 6,240,555 B1 | 5/2001 | Shoff et al. |
| 6,263,501 B1 | 7/2001 | Schein et al. |
| 6,264,560 B1 | 7/2001 | Goldberg et al. |
| 6,287,201 B1 | 9/2001 | Hightower |
| 6,289,319 B1 | 9/2001 | Lockwood |
| 6,295,530 B1 | 9/2001 | Ritchie et al. |
| 6,323,894 B1 | 11/2001 | Katz |
| 6,330,021 B1 | 12/2001 | Devaux |
| 6,335,965 B1 | 1/2002 | Katz |
| 6,349,134 B1 | 2/2002 | Katz |
| 6,425,828 B2 | 7/2002 | Walker et al. |
| 6,457,025 B2 | 9/2002 | Judson |
| 6,553,178 B2 | 4/2003 | Abecassis |
| 6,625,578 B2 | 9/2003 | Spaur et al. |
| 6,684,250 B2 | 1/2004 | Anderson et al. |
| 6,712,702 B2 * | 3/2004 | Goldberg ............ G06Q 20/387 348/E7.071 |
| 7,024,552 B1 | 4/2006 | Caswell et al. |
| 7,072,849 B1 | 7/2006 | Filepp et al. |
| 7,072,963 B2 | 7/2006 | Anderson et al. |
| 7,162,433 B1 * | 1/2007 | Foroutan ......................... 705/11 |
| 7,181,488 B2 | 2/2007 | Martin et al. |
| 7,191,447 B1 | 3/2007 | Ellis et al. |
| 7,496,943 B1 | 2/2009 | Goldberg et al. |
| 2001/0003099 A1 * | 6/2001 | Von Kohorn .................. 463/40 |
| 2002/0113815 A1 | 8/2002 | DeGross |
| 2002/0128057 A1 * | 9/2002 | Walker .................... A63F 13/12 463/20 |
| 2003/0032476 A1 | 2/2003 | Walker et al. |
| 2004/0220858 A1 | 11/2004 | Maggio |
| 2005/0148375 A1 | 7/2005 | Goldberg et al. |
| 2006/0080702 A1 * | 4/2006 | Diez ....................... A63F 13/12 725/30 |
| 2006/0085408 A1 | 4/2006 | Morsa |
| 2006/0111970 A1 | 5/2006 | Hill et al. |
| 2007/0043616 A1 * | 2/2007 | Kutaragi ................. A63F 13/77 705/14.68 |
| 2007/0167226 A1 | 7/2007 | Kelly et al. |
| 2007/0220575 A1 * | 9/2007 | Cooper ................ H04N 7/1675 725/118 |
| 2008/0091528 A1 | 4/2008 | Rampell et al. |
| 2008/0153564 A1 * | 6/2008 | Baerlocher ............. G07F 17/32 463/16 |
| 2009/0068991 A1 * | 3/2009 | Aaltonen ............... G06Q 30/02 455/412.1 |
| 2009/0300670 A1 * | 12/2009 | Barish .................... G06Q 30/02 725/13 |
| 2010/0145763 A1 * | 6/2010 | Swanson, Sr. ......... G06Q 30/02 705/14.41 |
| 2010/0228619 A1 | 9/2010 | Goldberg et al. |
| 2010/0228620 A1 | 9/2010 | Goldberg et al. |
| 2010/0235233 A1 | 9/2010 | Goldberg et al. |

FOREIGN PATENT DOCUMENTS

| | | |
|---|---|---|
| DE | 3325810 | 11/1984 |
| DE | 3621263 | 1/1988 |
| EP | 0113022 | 7/1984 |
| EP | 279297 | 8/1988 |
| EP | 290207 | 11/1988 |
| EP | 307925 | 3/1989 |
| EP | 370146 | 5/1990 |
| EP | 566454 | 10/1993 |
| EP | 680173 | 11/1995 |
| EP | 680179 | 11/1995 |
| EP | 680235 | 11/1995 |
| EP | 688489 | 12/1995 |
| EP | 697613 | 2/1996 |
| EP | 0747843 | 12/1996 |
| EP | 0747844 | 12/1996 |
| EP | 0814419 | 12/1997 |
| EP | 843272 | 5/1998 |
| EP | 871132 | 10/1998 |
| EP | 0875843 | 11/1998 |

(56) References Cited

FOREIGN PATENT DOCUMENTS

| | | |
|---|---|---|
| EP | 1126715 | 8/2001 |
| GB | 2034995 | 6/1980 |
| GB | 2121569 | 12/1983 |
| GB | 2141907 | 1/1985 |
| GB | 2183882 | 6/1987 |
| GB | 2185670 | 7/1987 |
| GB | 2205188 | 11/1988 |
| GB | 2207314 | 1/1989 |
| GB | 2256549 | 12/1992 |
| GB | 2281434 | 3/1995 |
| JP | 64018380 | 1/1989 |
| JP | 3204259 | 9/1991 |
| JP | 6314184 | 11/1994 |
| WO | WO 88/04507 | 6/1988 |
| WO | WO 90/07844 | 7/1990 |
| WO | WO 92/12488 | 7/1992 |
| WO | WO 93/09631 | 5/1993 |
| WO | WO 93/15466 | 8/1993 |
| WO | WO 93/19427 | 9/1993 |
| WO | WO 94/14281 | 6/1994 |
| WO | WO 95/31069 | 11/1995 |
| WO | WO 96/24213 | 8/1996 |
| WO | WO 96/30846 | 10/1996 |
| WO | WO 96/30864 | 10/1996 |
| WO | WO 96/34466 | 10/1996 |
| WO | WO 96/36141 | 11/1996 |
| WO | WO 97/07656 | 3/1997 |
| WO | WO 97/21183 | 6/1997 |
| WO | WO 97/26061 | 7/1997 |
| WO | WO 99/23568 | 5/1999 |
| WO | WO 99/39281 | 8/1999 |
| WO | WO 00/24484 | 5/2000 |
| WO | WO 2007/079395 | 7/2007 |

OTHER PUBLICATIONS

Herrmann, M., & Yanowitz, J.Capturing advertising requests from a user Retrieved from http://dialog.proquest.com/professional/docview/1742086266?accountid=142257 on Oct. 5, 2016.*

Chu, V. (1004). Online game advertising system Retrieved from http://dialog.proquest.com/professional/docview/1744392389?accountid=142257 on Oct. 5, 2016.*

Kanevsky, D., Ramabhadran, B., Sicconi, R., & Viswanathan, M. (0904). Collaborative and situationally aware active billboards Retrieved from http://dialog.proquest.com/professional/docview/1742773743?accountid=142257 on Oct. 5, 2016.*

"EveryWare and WebGenesis join forces with tools for the Web," Business Wire, Dec. 6, 1995.

"MovieFone announces MovieLink," Business Wire, Jul. 25, 1995, 2 pages.

"Personalized Marketing and Selling on the Internet Unleashed by BroadVision; One-to-One Application System Helps Marketers Build Long-Term Relationships Through Personalized Content, Services and Promotions," Business Wire, Jan. 22, 1996, 3 pages.

"Web-Based Search Services," Online & CDRom Review, 1995, vol. 19, No. 4, pp. 223-227.

Advertising page for "Tracker-Plus TP-700 Player Tracking Equipment for Table Games", by Open Technologies, 6520 Platt Ave., Suite 672, West Hill, CA 91307.

Affidavit of Michael D. Dahlin Regarding Claim Construction of U.S. Pat. No. 6,183,366 and U.S. Pat. No. 6,712,702, dated Sep. 25, 2009, 125 pages.

Arcadehistory, [Video Game] Lunar Lander © Atari, Inc. [Sunnyvale, CA, USA] (1979), Description, Last Edition Apr. 4, 2008, 8 pages.

Google Groups, Posting of hotwired-info to Alt.wired available at http://groups.google.com/group/alt.wired/msg/f851950bd8cc0d15 (Oct. 29, 1994, 13:05:19 EST), 4 pages.

Green, T., "Newspage: The Web Way to Pay for News," Database, Dec. 1995, pp. 42-45.

Hayes, M., "Customized Web Marketing—BroadVision's One-to-One software allows personalized sales pitches," Information Week, Dec. 18, 1995, 1 page.

Internet Week, "Net Ad Revenues May Top $37 Million," Phillips Business Information, Inc., vol. I, No. 18, Aug. 7, 1995, pp. 1-3.

Kamba et al., "The Krakatoa Chronicle—An Interactive Personalized Newspaper on the Web," World Wide Web Journal, Issue One: Conf. Proceedings, 4th Annual WWW Conf., Nov. 1995, p. 159-169.

Kohda et al., "Ubiquitous Advertising on the WWW: Merging Advertisement on the Browser," Fifth International World Wide Web Conference, May 6-10, 1996, Paris France, 8 pages.

Lemay, Laura, Teach Yourself Web Publishing in HTML in a Week, 1st Ed., Howard W. Sams & Company, Dec. 28, 1994.

Lester, "Yahoo! Profile of a Web Database," Database, Dec. 1995, pp. 46-50.

Posting of Joel Klecker to comp.sys.mac.comm available at http://groups.google.com/group/comp.sys.mac.comm/msg/dd88bf29992d3c84, Jul. 12, 1996.

Putz, "Interactive Information Services Using World-Wide Web Hypertext," Computer Networks and ISDN Systems 27, (1994), pp. 273-280.

United States District Court for the Eastern District of Texas, Marshall Division, Case Nos. 2-07-CV-263, New York Time Company's Amended Invalidity Contentions with Exhibits A-F, filed May 3, 2010.

United States District Court for the Eastern District of Texas, Marshall Division, Case Nos. 2-07-CV-555 (TJW/CE) and 2-07-CV-263 (TJW/CE), Defendants' Invalidity Contentions with Exhibits A-F, filed Oct. 20, 2008, 1577 pages.

Winograd, T., "The Proxy is where it's at!" Stanford Digital Library Project Working Project, Jun. 24, 1995, 6 pages.

Wood, B., "C/Net's New Banner Ad Tool," Newsbytes, Dec. 6, 1995, 1 page.

U.S. Appl. No. 13/391,199, filed Feb. 23, 2009, Goldberg, et al.

"CoolWebSearch", Wikipedia Website, as early as May 9, 2004, available at http://en.wikipedia.org/wiki/CoolWebSearch, pp. 1-4.

"Spyware", Wikipedia website, as early as Jan. 27, 2004, available at http://en.wikipedia.org/wiki/Spyware, pp. 1-20.

Edelman, "Where does Spyware Come From? 'Why' Spyware Revenue Resources", May 2006, available at http://www.benedelman.org/presentations/asc-2006.pdf, pp. 1-16.

Flynn, "In Search of Nielsens for the Internet", The New York Times website, May 29, 1995, available at http://www.nytimes.com/1995/05/29/business/in-search-of-nielsens-for-the-internet.html, pp. 1-3, printed on Mar. 18, 2009.

Sandberg et al., "Design and Implementation or the Sun Network Filesystem," USENIX Conference Proceedings, Summer 1985, pp. 119-131.

Bouvier, "The State of HTML," ACM SIGICE Bulletin, Oct. 1995, vol. 21(2), pp. 8-13.

Frook, J., "Search Engine Advertising: Web Marketing Push," Communications Week, Oct. 9, 1995, pp. IA11, IA15 (4 pages).

Stevens, UNIX Network Programming, Copyright 1990 by Prentice Hall, Inc., pp. 1-5, 171.

Kurose et al., Computer Networking: A Top-Down Approach Featuring the Internet, Copyright 2001 by Addison Wesley Longman, Inc., pp. 467-471.

ANSI/IEEE Standard 802.1G, 1998 Edition, p. 4.

The American College Dictionary, Third Edition, 1993, p. 1535.

Beneficial Innovations, Inc., Electronic Arts, Inc., and POGO Corporation's Stipulation and Proposed Order Regarding Claim Construction, filed in the U.S. District Court, Central District of California, Western Division, Case No. CV 05-5803, Apr. 24, 2006, 4 pages.

Defendants' Responsive Claim Construction Brief Pursuant to Patent Rule 4-5(b), filed in the United States District Court, Eastern District of Texas, Marshall Division, Case Nos. 2-07-CV-555 (TJW/CE) and 2-07-CV-263 (TJW-CE), on Nov. 20, 2009, 40 pages.

Memorandum Opinion and Order for U.S. District Court for the Eastern District of Texas, Marshall Division, Case Nos. 2:07-CV-263-TJW-CE and 2:07-CV-555-TJW-CE, dated Apr. 12, 2010, 31 pages.

(56) References Cited

OTHER PUBLICATIONS

Memorandum Opinion and Order for U.S. District Court for the Eastern District of Texas, Marshall Division, Case Nos. 2:07-CV-263-TJW-CE and 2:07-CV-555-TJW-CE, dated Jun. 3, 2010, 7 pages.
United States District Court for the Eastern District of Texas, Marshall Division, Case No. 2-07-CV-555 (TJW/CE), Defendants' First Supplemental Invalidity Contentions, filed Jun. 1, 2010, 79 pages.
Deposition of Michael Dahlin, Ph.D., Oct. 7, 2009, pp. 334-337, 340-342.
Deposition of Kevin C. Almeroth, Ph.D., Nov. 4, 2009, pp. 65-67, 74-84, 86-88, 90-92, 106-108, 124-133, 154-156, 158-165, 197-208, 240-242, 253-256, 260-262, 275-277.
Deposition of Sheldon F. Goldberg, Aug. 4, 2009, pp. 315-318, 414-416, 432-434.
Deposition of John van Antwerp, Sep. 9, 2009, pp. 28-31, 63-68, 80-87, 103-105, 141-144.
Deposition of Dan Reifsnyder, Aug. 27, 2009, pp. 81-83.
The Dallas Morning News, Inc.'s Answer and Counterclaims to Beneficial Innovations, Inc.'s Complaint for Patent Infringement filed in United States District Court, Eastern District of Texas Marshall Division, Case No. 2:07-CV-00555-TJW-CE, on Feb. 8, 2008.
Defendants Google Inc.'s and YouTube, LLC's Answer and Counterclaims filed in United States District Court, Eastern District of Texas Marshall Division, Case No. 2:07-CV-00555, on Feb. 11, 2008.
Defendant Morris Communications Company, LLC's Answer and Counterclaims to Plaintiff Beneficial Innovations, Inc.'s Complaint filed in United States District Court, Eastern District of Texas Marshall Division, Case No. 2:07-CV-00555, on Mar. 3, 2008.
Defendant Tribune Interactive, Inc.'s Answer, Affirmative Defenses, and Counterclaims filed in United States District Court, Eastern District of Texas Marshall Division, Case No. 2:07-CV-00555, on Mar. 12, 2008.
The Dallas Morning News, Inc.' First Amended Answer and Counterclaims to Beneficial Innovations, Inc.'s Complaint for Patent Infringement filed in United States District Court, Eastern District of Texas Marshall Division, Case No. 2:07-CV-00555, on Oct. 8, 2008.
Defendant Yahoo!'s Answer and Counterclaims to Plaintiff's Complaint for Patent Infringement filed in United States District Court, Eastern District of Texas Marshall Division, Case No. 2:07-CV-00555, on Dec. 1, 2008.
Answer and Affirmative Defenses of Defendant Blockdot, Inc. to Plaintiff's First Amended Complaint filed in United States District Court, Eastern District of Texas Marshall Division, Case No. 2:07-CV-263, on Jul. 25, 2007.
Answer and Affirmative Defenses of Defendant E'Baums World, Inc. to Plaintiff's First Amended Complaint filed in United States District Court, Eastern District of Texas Marshall Division, Case No. 2:07-CV-263, on Aug. 13, 2007.
Digg Inc.'s Answer and Counterclaims to Beneficial Innovation, Inc.'s First Amended Complaint for Patent Infringement filed in United States District Court, Eastern District of Texas Marshall Division, Case No. 2:07-CV-263, on Aug. 31, 2007.
CNet Networks, Inc.'s Original Answer and Counterclaims to Plaintiff's First Amended Complaint for Patent Infringement filed in United States District Court, Eastern District of Texas Marshall Division, Case No. 2:07-CV-263, on Sep. 4, 2007.
CNet Networks, Inc.'s Rule 7.1 Statement titled "Original Answer and Counterclaims to Plaintiff's First Amended Complaint for Patent Infringement," filed in United States District Court, Eastern District of Texas Marshall Division, Case No. 2:07-CV-263, on Sep. 4, 2007.
Jabez Networks, Inc.'s Original Answer and Counterclaims to Plaintiff's First Amended Complaint for Patent Infringement filed in United States District Court, Eastern District of Texas Marshall Division, Case No. 2:07-CV-263, on Sep. 4, 2007.

Careerbuilder, LLC's Answer, Affirmative Defenses, and Demand for Jury Trial filed in United States District Court, Eastern District of Texas Marshall Division, Case No. 2:07-CV-263, on Sep. 25, 2007.
Defendant Washingtonpost.Newsweek Interactive Company's Answer to Second Amended Complaint filed in United States District Court, Eastern District of Texas Marshall Division, Case No. 2:07-CV-263, on Sep. 25, 2007.
CNet Networks, Inc.'s Original Answer and Counterclaims to Plaintiff's Second Amended Complaint for Patent Infringement filed in United States District Court, Eastern District of Texas Marshall Division, Case No. 2:07-CV-263, on Sep. 25, 2007.
Jabez Networks, Inc.'s Original Answer and Counterclaims to Plaintiff's Second Amended Complaint for Patent Infringement filed in United States District Court, Eastern District of Texas Marshall Division, Case No. 2:07-CV-263, on Sep. 25, 2007.
Digg Inc.'s Answer and Counterclaims to Beneficial Innovation, Inc.'s Second Amended Complaint for Patent Infringement filed in United States District Court, Eastern District of Texas Marshall Division, Case No. 2:07-CV-263, on Sep. 25, 2007.
Answer and Affirmative Defenses of Defendant E'Baums World, Inc. to Plaintiff's Second Amended Complaint filed in United States District Court, Eastern District of Texas Marshall Division, Case No. 2:07-CV-263, on Sep. 26, 2007.
Answer and Counterclaims of the New York Times Company to the Second Amended Complaint of Beneficial Innovations, Inc. filed in United States District Court, Eastern District of Texas Marshall Division, Case No. 2:07-CV-263, on Sep. 28, 2007.
Defendant The Weather Channel Interactive, Inc.'s Answer to the Second Amended Complaint filed in United States District Court, Eastern District of Texas Marshall Division, Case No. 2:07-CV-263, on Sep. 28, 2007.
Amended Answer and Affirmative Defenses of Defendant E'Baums World, Inc. to Plaintiff's Second Amended Complaint filed in United States District Court, Eastern District of Texas Marshall Division, Case No. 2:07-CV-263, on Oct. 9, 2007.
The Dallas Morning News, Inc.'s Answer and Counterclaims to Beneficial Innovations, Inc.'s Amended Complaint for Patent Infringement filed in United States District Court, Eastern District of Texas Marshall Division, Case No. 2:09-CV-00175, on Oct. 5, 2009.
Defendant Morris Communications Company, LLC's Answer and Counterclaims to Plaintiff Beneficial Innovations, Inc.'s Amended Complaint filed in United States District Court, Eastern District of Texas Marshall Division, Case No. 2:09-CV-175, on Oct. 5, 2009.
The New York Times Company's Answer and Counterclaims to Beneficial Innovations, Inc.'s Amended Complaint filed in United States District Court, Eastern District of Texas Marshall Division, Case No. 2:09-CV-175, on Nov. 4, 2009.
Defendants Google Inc.'s and Youtube, LLC's Answer and Counterclaims to Beneficial Innovations, Inc.'s Amended Complaint for Patent Infringement filed in United States District Court, Eastern District of Texas Marshall Division, Case No. 2:09-CV-175, on Nov. 4, 2009.
Disney Online's Answer to Beneficial Innovations, Inc.'s Amended Complaint for Patent Infringement, Affirmative Defenses, and Counterclaims filed in United States District Court, Eastern District of Texas Marshall Division, Case No. 2:09-CV-175, on Dec. 4, 2009.
NBC Universal, Inc.'s Answer to Beneficial Innovations, Inc.'s Amended Complaint for Patent Infringement, Affirmative Defenses, and Counterclaims filed in United States District Court, Eastern District of Texas Marshall Division, Case No. 2:09-CV-175, on Dec. 4, 2009.
IAC Search & Media Inc.'s Answer to Beneficial Innovations, Inc.'s Amended Complaint for Patent Infringement, Affirmative Defenses, and Counterclaims filed in United States District Court, Eastern District of Texas Marshall Division, Case No. 2:09-CV-175, on Dec. 4, 2009.
Facebook, Inc.'s Answer and Counterclaims to Beneficial Innovations, Inc.'s Amended Complaint for Patent Infringement filed in United States District Court, Eastern District of Texas Marshall Division, Case No. 2:09-CV-175, on Dec. 4, 2009.

(56) References Cited

OTHER PUBLICATIONS

Comcast's Answer and Counterclaims to Beneficial Innovations, Inc.'s Amended Complaint filed in United States District Court, Eastern District of Texas Marshall Division, Case No. 2:09-CV-175, on Dec. 4, 2009.
Expert Report of Dr. Michael D. Dahlin Regarding Invalidity of U.S. Pat. No. 6,183,366 and U.S. Pat. No. 6,712,702, including Exhibits 1-31, dated Sep. 1, 2010.
Official Action for U.S. Appl. No. 12/167,244, mailed Sep. 12, 2011.
International Preliminary Examination Report for International (PCT) Patent Application No. PCT/US99/25131, dated Jan. 25, 2001.
Written Opinion for International (PCT) Patent Application No. PCT/US99/25131, dated Aug. 16, 2000.
International Search Report for International (PCT) Patent Application No. PCT/US99/25131, dated Jan. 31, 2000.
International Preliminary Examination Report for International (PCT) Patent Application No. PCT/US97/00872, dated Jan. 12, 1998.
International Search Report for International (PCT) Patent Application No. PCT/US97/00872, dated May 12, 1997.
Request for Ex Parte Reexam for U.S. Ex Parte Reexamination Control No. 90/009593, dated Oct. 6, 2009, with Appendixes A-G.
Official Action for Ex Parte Reexamination Control No. 90/009593, mailed Dec. 1, 2009.
Official Action for U.S. Ex Parte Reexamination Control No. 90/009593, mailed Feb. 5, 2010.
Official Action for U.S. Ex Parte Reexamination Control No. 90/009593, mailed May 14, 2010.
Request for Ex Parte Reexamination for Reexamination Control No. 90/011,117, filed Jul. 27, 2010.
Official Action for U.S. Ex Parte Reexamination Control No. 90/011,117, mailed Aug. 31, 2010.
Official Action for U.S. Appl. No. 12/754,573 and U.S. Appl. No. 90/011,117, mailed Sep. 1, 2011.
Official Action for U.S. Appl. No. 12/754,573 and U.S. Appl. No. 90/011,117, mailed Sep. 14, 2011.
Official Action for U.S. Appl. No. 12/016,123, mailed Mar. 24, 2009.
Official Action for U.S. Appl. No. 12/016,123, mailed Feb. 3, 2010.
Official Action for U.S. Appl. No. 12/391,199, mailed Dec. 8, 2010.
Notice of Allowance for U.S. Appl. No. 12/391,199, mailed Aug. 4, 2011.
Official Action for U.S. Appl. No. 12/785,389, mailed Aug. 18, 2010.
Official Action for U.S. Appl. No. 10/994,054, mailed Oct. 5, 2009.
Official Action for U.S. Appl. No. 10/994,054, mailed May 14, 2010.
Official Action for U.S. Appl. No. 10/994,054, mailed Dec. 2, 2010.
Official Action for U.S. Appl. No. 12/785,209, mailed Sep. 9, 2010.
Official Action for U.S. Appl. No. 12/138,357 and U.S. Appl. No. 90/010,093, mailed Sep. 17, 2010.
Official Action for U.S. Appl. No. 12/138,357 and U.S. Appl. No. 90/010,093, mailed Sep. 6, 2011.
Official Action for U.S. Appl. No. 12/167,244, mailed Dec. 22, 2010.
U.S. Appl. No. 60/009,286, filed Dec. 27, 1995, Robinson.
U.S. Appl. No. 60/012,517, filed Feb. 29, 1996, Robinson.
U.S. Appl. No. 08/569,639, filed Jun. 12, 1997, Naqvi.
U.S. Appl. No. 13/707,561, filed Dec. 6, 2012, Goldberg et al.
"Accipiter Announces Accipiter AdManager, a Breakthrough in Internet Advertising and Marketing," Business Wire, Sep. 9, 1996, 2 pages.
"Accipiter Launches AdManager 2.0, the Most Powerful Ad Management System Available," Business Wire, Jun. 2, 1997, 3 pages.
"Bellcore Licenses Advertiser Software to Visual Radio; Visual Radio to Support Network of Radio Station Web Sites," Business Wire, Oct. 29, 1997, 2 pages.
"Digital Planet Announces Creation of 'NetCount'," Jun. 1, 1995, 2 pages.
"First Advertising Server Launched on Internet," Business Wire, Feb. 5, 1996, 3 pages.
"Focalink Launches New Web Site Evaluation Tool for Advertisers," Business Wire, May 20, 1996, 2 pages.
"Free e-mail available if you don't mind the ads," Knight-Ridder/Tribune News Service, Sep. 6, 1995, 2 pages.
"Juno Offers Free E-mail With Advertising," Newsbytes PM, Jul. 18, 1995, 2 pages.
"NetGravity AdServer Software Dominates the Market, Powering More than 100 Web Sites," May 12, 1997, available at http://web.archive.org/web/19980526002038/www.netgravity.com/news/pressrel/dominate.html, 2 pages.
"NetGravity Announces AdServer 2.0, Raises the Standard in Online Advertising Management Software," Oct. 14, 1996, available at http://web.archive.org/web/19961112042934/www3.netgravity.com/news/pressrel/as20launch.html, 3 pages.
"NetGravity Launches AdServer 3.0, Significant Enhancements Focused on Agency Reporting, Open Targeting Architecture, Inventory Forecasting, and Robust System Architecture," Mar. 11, 1997, 5 pages.
"NetGravity Launches AdServer, the Premier Advertising Management System Software for World Wide Web Publishers," Jan. 31, 1996, available at http://web.archive.org/web/19961112043013/www3.netgravity.com/news/pressrel/launch.html, 2 pages.
"NetGravity, Leader in Online Advertising Management Software, Launches Ad Management Solution for Networks," Jan. 22, 1997 (available at http://web.archive.org/web/19980525232959/www.netgravity.com/news/pressrel/network.html), 2 pages.
"Netscape and Bellcore team to deliver interactive advertising management system," M2 Presswire, Jan. 24, 1997, 2 pages.
"New software solution for the web delivers profitable, measurable, truly interactive advertising," Business Wire, Jun. 11, 1996, 2 pages.
"Online Advertising," Jupiter Communications, May 1, 1996, 5 pages.
"Prodigy System Architecture," Prodigy, dated Sep. 18, 1989; Mar. 19, 1990; Jan. 17, 1991; Mar. 4, 1991, 17 pages.
"Prodigy's 'Access Atlanta' a Success," Prodigy, Aug. 15, 1994, 2 pages.
"Web Advertising/Tracking Comes of Age," Interactive Content, Jan. 1, 1996, Issue 21, 4 pages.
Berners-Lee et al., "Hypertext Transfer Protocol—HTTP/1.0 RFC," Request for Comments 1945, May 1996, available at http://www.ietf.org/rfc/rfc1945.txt, 55 pages.
Borup, C., Posting of Christian Borup to comp.infosystems.www.servers.unix available at http://groups.google.com/group/comp.infosystems.www.servers.unix/msg/da65c193474c6f28, Jul. 16, 1995, 1 page.
Bray, H., "Firm Offers Free E-mail with Ads Juno Online Systems to Start Service Monday," Boston Globe, Apr. 19, 1996, 2 pages.
Burkowski et al., Delivery of Electronic News: A Broadband Application, Proceedings of the 1994 Conference of the Centre for Advanced Studies on Collaborative Research, Toronto, Ontario, CA, Oct. 31-Nov. 3, 1994, 3 pages.
C/Net: The Computer Network Unveils Revolutionary Internet Advertising Tools that Allow Custom Banner Ad Delivery Based on Demographic Information; Internet Shopping Network, Insight and MicroXperts First to Use Proprietary Software to Deliver Custom Ad Banners to Specific Target Audiences, PR Newswire, Dec. 6, 1995, 3 pages.
Cailliau, R., First International World-Wide Conference, Advance Proceedings, Geneva, May 1994, 469 pages.
Carter et al., eds., "Novel Approach boosts author's Internet profile," Hamilton Spectator, Jan. 18, 1996, Thursday Final Edition, 2 pages.
CDNow, Inc., RTB Team Project, Executive Summary, Apr. 1998, 15 pages.
Chesnais, P., "The Fishwrap Personalized News System," Proceedings of the 1995 2nd International Workshop on Community Networking, Princeton, NJ, Jun. 1995, pp. 275-282.
Cleland, K., "Hotwired Gets Gold Star from Nielsen," Advertising Age, Jun. 19, 1995, 2 pages.
Cortese, A., "This E-mail is brought to you by . . . " BusinessWeek, Jul. 31, 1995, 2 pages.

(56) References Cited

OTHER PUBLICATIONS

Dedrick, "Interactive Electronic Advertising," IEEE, 1994, pp. 55-56.
Duberman, D., "NetGravity Launches AdServer Web Advertising Management System," Daily Spectrum: Interactive Media & Online Developer News, Feb. 2, 1996, available at http://web.archive.org/web/19961112042732/www3.netgravity.com/news/dailyspectrum/dailyspectrum020296.html, 2 pages.
Eager, B., "Using the World Wide Web and Mosaic (Special Edition)," Que Corp., Mar. 24, 1995, 51 pages.
Elliott, "The Media Business: Advertising; Juno would be delighted to handle your E-mail free, but she would like something in return," N.Y. Times, Apr. 22, 1996, 3 pages.
Franks et al., "An Extension to HTTP : Digest Access Authentication," Request for Comments 2069, Jan. 1997, available at http://www.ietf.org/rfc/rfc2069.txt, 17 pages.
Freeman-Benson, B., Using the Web to Provide Private Information—or—A short paper about password protection without client modifications, First International Conference on the World-Wide Web, Geneva, Switzerland, pp. 63-67.
Fromartz, S., "Firms are offering ads for free E-mail service," St. Louis Post-Dispatch, May 6, 1996, 3 pages.
Google Newsgroup, Newsgroup Thread posted to comp.infosystems.www.misc, entitled "Best Way to retain State in WWW session," Mar. 12, 1995-Apr. 1, 1995, available at http://groups.google.com/group/comp.infosystems.www.misc/browse_thread/thread/1195f209692cda24/bd5d0b46fd091c79, Mar. 12, 1995-Apr. 1, 1995, 8 pages.
Herring, Accipiter Client Library (LIBAAM) (unpublished Accipiter, Inc. Technical Specifications document on file with CNET), Dec. 14, 1996, revised Aug. 14, 1997, 20 pages.
Hodges, J., "C/Net Offers Web Traffic Tracking; Custom Software Trial Free to Cable, 'Net Charter Advertisers," Advertising Age, Sep. 4, 1995, 2 pages.
InfoSeek Service, 1995, 9 pages.
InfoSeek Service, 1996, 19 pages.
Jones, R., "Digital's world-wide web server: a case study," Digital Equipment Corp., First International Conference on the World-Wide Web, Geneva, Switzerland, May 1994, pp. 413-422.
Kamba et al., "Anatagonomy: A Personalized Newspaper on the World Wide Web," Int. J. Human-Computer Studies, 1997, vol. 47, pp. 789-803.
Kim, J., "E-mail soon to become free-mail," USA Today, Apr. 22, 1996, 2 pages.
Koen, D., "Automated Restructuring of an Electronic Newspaper," S.B. thesis, electrical engineering and computer science, MIT, Cambridge, MA, May 1994, 34 pages.
Liss, K., Posting of Kenneth Liss to bit.listserv.buslib-1, Nov. 22, 1994, 6 pages.
Little, T., "Commerce on the Internet," IEEE MultiMedia, Dec. 1994, vol. 1(4), pp. 74-78.
Maddox et al., "Making Money on the Web," InformationWeek, Sep. 4, 1995, vol. 543, p. 31 (with correction of Jan. 8, 1996, 6 pages).
Mandese, J., "'Clickstreams' in Cyberspace," Advertising Age, Mar. 20, 1995, 2 pages.
Mannes, "E-Mail Delivered Free & E-Asy 20M Internet Gamble," New York Daily News, May 8, 1996, 3 pages.
Marshall, M., "Company Extends App Testing Tools to Web," InternetWeek, Jan. 15, 1996, 1 page.
McManus, N., "Down Home Online: Access Atlanta More Than an Online Newspaper," Atlanta Journal-Constitution's Online Edition on Prodigy, Nov. 7, 1994, 3 pages.
Mogensen, C. (mogens@CS.Stanford.EDU), Re: Automatic Page Updates, Jan. 10, 1995, Message posted to www-talk electronic mailing list archived at http://1997.webhistory.org/www.lists/www-talk.1995q1/0105.html, 1 page.
Mossberg, W., "Some Companies Offer Free E-Mail—At a Price," Contra Costa Times, Aug. 6, 1996, 3 pages.
Neelakantan, S., "Freemail," Forbes, Aug. 12, 1996, 3 pages.

NetCloak User's Guide, 1995, 32 pages.
NetGravity AdServer AdMaster's Guide—Getting Started, version 2.0, Understanding AdServer, 1 page.
NetGravity AdServer System Help Manual, Version 2.0, 1996, 203 pages.
Netscape Cookies, Persistent Client State HTTP Cookies available at http://curl.haxx.se/rfc/cookie_spec.html, 1995, 5 pages.
O'Connell, "A New Pitch—Advertising on the World-Wide Web is a whole new ball game," Internet World, May 1995, pp. 54-59.
On-Line Recommender, Product Rationale, Apr. 7, 1997, 10 pages.
Pike, M., "Using the Internet (second edition)," Que, Jan. 15, 1995, 948 pages.
Posting of Jiri Muselik to comp.infosystems.www.providers available at http://groups.google.com/group/comp.infosystems.www.providers/msg/0167 4bf01146dd86, Feb. 5, 1995, 1 page.
Press Release, "Bellcore Delivers Enhanced Ad Management Software: Adapt/X Advertiser™ 3.0 Features," Business Wire, Aug. 12, 1997, 3 pages.
Press Release, "Bellcore Launches Adapt/X Advertiser 2.0; New Features Improve Ad Campaign Management, Inventory Control and Real-Time Reporting," May 21, 1997, 4 pages.
Quint, B., "An Internet "virtual library" builder: Steve Kirsch, president, CEO Infoseek Corporation (Interview)," Searcher, Jul.-Aug. 1995, vol. 3(7) p. 46.
Rasmussen, B., "WDB—A Web Interface to Sybase," Astronomical Data Analysis Software and Systems IV ASP Conference Series, vol. 77, 1995, 4 pages.
Reuter Rafter, M., "What would you do to get free electronic mail?" Denver Rocky Mountain News, Jul. 23, 1995, 2 pages.
Rich, L., "AdServer Aims for Web Efficiency Manages and expands site capacity for advertiser," Feb. 21, 1996, available at http://web.archive.org/web/19990219084212/www.mediacentral.com/Magazines/InsideMedia/960221/news19.htm/745629, 1 page.
Savage, S., "Free E-mail if you don't mind the ads," Bradenton Herald, Aug. 24, 1995, 3 pages.
Schwabach, B., "Advertising subsidizes new 'free' e-mail services," Kansas City Star, Aug. 1, 1995, 4 pages.
Schwartz, E., "Advertising Webonomics 101," Wired, Feb. 1996, pp. 74-82.
Silverman, E., "New Route to E-mail? Two companies planning to offer free software," Newsday, Jul. 6, 1995, 2 pages.
Sponsorship Opportunities, C|Net, 1995, 3 pages.
Stambler, S., "Free E-Mail with Advertising," Techprose, Inc., Aug. 25, 1995, 2 pages.
Sterne, J., World Wide Web Marketing: Integrating the Internet into Your Marketing Strategy, John Wiley & Sons, Oct. 1995, 343 pages.
Swett, C., "Technology Talk Column," Sacramento Bee, Jun. 12, 1996, 4 pages.
Tadjer, R., "Two services change E-mail to free mail; ex-Delphi exec's ad-based E-mail debuts," Computer Shopper, Sep. 1995, 3 pages.
Tittel, E., "Foundations of World Wide Web Programming with HTML & CGI," IDG Books Worldwide, Inc., Aug. 1995.
Various HotWired source code and screen shots, 1995, 43 pages.
Various HotWired source code and screen shots, 1996, 44 pages.
Various HotWired source code and screen shots, 1997, 44 pages.
Viescas, J., The Official Guide to the Prodigy Service, Prodigyy Interactive Personal Service, 1991, 396 pages.
Williamson, D., "Digital Planet's Plan to Track Eyeballs," Advertising Age, Apr. 24, 1995, 2 pages.
Wylie, M., "Free Email! Marketers trade online time for captive audiences," Digital Media, May 14, 1996, 5 pages.
Zeff et al., Advertising on the Internet, John Wiley & Sons, 1997, 302 pages.
First Amended Complaint filed in United States District Court, Eastern District of Texas Marshall Division, Case No. 2:07-CV-263, on Jun. 27, 2007, 8 pages.
Complaint filed in United States District Court, Eastern District of Texas Marshall Division, Case No. 2:11-CV-229, on Apr. 20, 2011, 111 pages.
Civil Cover Sheet filed in United States District Court, Eastern District of Texas Marshall Division, Case No. 2:11-CV-229, on Apr. 20, 2011, 1 page.

(56) References Cited

OTHER PUBLICATIONS

Corporate Disclosure Statement filed in United States District Court, Eastern District of Texas Marshall Division, Case No. 2:11-CV-229, on Apr. 20, 2011, 2 pages.
Report on the Filing or Determination of an Action Regarding Patent or Trademark filed in United States District Court, Eastern District of Texas Marshall Division, Case No. 2:11-CV-229, on Apr. 20, 2011, 1 page.
First Amended Complaint for Infringement filed in the United States District Court, Eastern District of Texas Marshall Division, Case No. 2:11-CV-229, on Apr. 21, 2011, 11 pages.
Notice of Appearance for Julien Adams filed in the United States District Court, Eastern District of Texas Marshall Division, Case No. 2:11-CV-229, on Apr. 22, 2011, 3 pages.
Motion to Dismiss filed in the United States District Court, Eastern District of Texas Marshall Division, Case No. 2:11-CV-229, on Apr. 25, 2011, 4 pages.
Additional Attachment to Motion to Dismiss filed in the United States District Court, Eastern District of Texas Marshall Division, Case No. 2:11-CV-229, on Apr. 26, 2011, 3 pages.
Order Granting Motion to Dismiss filed in the United States District Court, Eastern District of Texas Marshall Division, Case No. 2:11-CV-229, on Apr. 26, 2011, 2 pages.
Notice of Attorney Appearance filed in the United States District Court, Eastern District of Texas Marshall Division, Case No. 2:11-CV-229, on May 3, 2011, 3 pages.
Amazon.com, Inc.'s Unopposed Application for Extension of Time to Answer Complaint filed in the United States District Court, Eastern District of Texas Marshall Division, Case No. 2:11-CV-229, on May 5, 2011, 1 page.
Dell Inc.'s Unopposed Application for Extension of Time to Answer Complaint filed in the United States District Court, Eastern District of Texas Marshall Division, Case No. 2:11-CV-229, on May 5, 2011, 1 page.
Expedia, Inc.'s Unopposed Application for Extension of Time to Answer Complaint filed in the United States District Court, Eastern District of Texas Marshall Division, Case No. 2:11-CV-229, on May 5, 2011, 1 page.
Scripps Networks, LLC's Unopposed Application for Extension of Time to Answer Complaint filed in the United States District Court, Eastern District of Texas Marshall Division, Case No. 2:11-CV-229, on May 5, 2011, 1 page.
Viacom, Inc.'s Unopposed Application for Extension of Time to Answer Complaint filed in the United States District Court, Eastern District of Texas Marshall Division, Case No. 2:11-CV-229, on May 5, 2011, 1 page.
Rodale, Inc.'s Unopposed Application for Extension of Time to Answer Complaint filed in the United States District Court, Eastern District of Texas Marshall Division, Case No. 2:11-CV-229, on May 10, 2011, 1 page.
Autotrader.com's Unopposed Application for Extension of Time to Answer Complaint filed in the United States District Court, Eastern District of Texas Marshall Division, Case No. 2:11-CV-229, on May 17, 2011, 1 page.
Advance Publications, Inc.'s Unopposed Application for Extension of Time to Answer Complaint filed in the United States District Court, Eastern District of Texas Marshall Division, Case No. 2:11-CV-229, on May 17, 2011, 1 page.
ALM Media Properties, LLC's Unopposed Application for Extension of Time to Answer Complaint filed in the United States District Court, Eastern District of Texas Marshall Division, Case No. 2:11-CV-229, on May 17, 2011, 1 page.
Village Voice Media Holdings, LLC's Unopposed Application for Extension of Time to Answer Complaint filed in the United States District Court, Eastern District of Texas Marshall Division, Case No. 2:11-CV-229, on May 17, 2011, 1 page.
Demand Media, Inc.'s Answer, Defenses, and Counterclaims to Beneficial Innovations, Inc.'s First Amended Complaint for Patent Infringement filed in the United States District Court, Eastern District of Texas Marshall Division, Case No. 2:11-CV-229, on May 19, 2011, 14 pages.
Application to Appear Pro Hac Vice filed in the United States District Court, Eastern District of Texas Marshall Division, Case No. 2:11-CV-229, on Jun. 2, 2011, 3 pages.
Application to Appear Pro Hac Vice filed in the United States District Court, Eastern District of Texas Marshall Division, Case No. 2:11-CV-229, on Jun. 9, 2011, 4 pages.
Advance Publications, Inc. Unopposed Application for Extension of Time to Answer Complaint filed in the United States District Court, Eastern District of Texas Marshall Division, Case No. 2:11-CV-229, on Jun. 9, 2011, 1 page.
Autotrader.com's Unopposed Application for Extension of Time to Answer Complaint filed in the United States District Court, Eastern District of Texas Marshall Division, Case No. 2:11-CV-229, on Jun. 9, 2011, 1 page.
ALM Media's Unopposed Application for Extension of Time to Answer Complaint filed in the United States District Court, Eastern District of Texas Marshall Division, Case No. 2:11-CV-229, on Jun. 9, 2011, 1 page.
Plaintiff and Counterdefendant Beneficial Innovations, Inc's Reply to Counterclaims of Demand Media, Inc. filed in the United States District Court, Eastern District of Texas Marshall Division, Case No. 2:11-CV-229, on Jun. 13, 2011, 7 pages.
Rodale, Inc.'s Answer and Counterclaims to First Amended Complaint filed in the United States District Court, Eastern District of Texas Marshall Division, Case No. 2:11-CV-229, on Jun. 16, 2011, 11 pages.
Notice of Appearance filed in the United States District Court, Eastern District of Texas Marshall Division, Case No. 2:11-CV-229, on Jun. 17, 2011, 2 pages.
Defendant Amazon.com, Inc.'s Answer and Counterclaims to First Amended Complaint filed in the United States District Court, Eastern District of Texas Marshall Division, Case No. 2:11-CV-229, on Jun. 17, 2011, 15 pages.
Defendant Expedia, Inc.'s Answer and Counterclaims to First Amended Complaint filed in the United States District Court, Eastern District of Texas Marshall Division, Case No. 2:11-CV-229, on Jun. 17, 2011, 15 pages.
Defendant Scripps Networks, LLC's Answer and Counterclaims to First Amended Complaint filed in the United States District Court, Eastern District of Texas Marshall Division, Case No. 2:11-CV-229, on Jun. 17, 2011, 15 pages.
Defendant Viacom Inc.'s Answer and Counterclaims to First Amended Complaint filed in the United States District Court, Eastern District of Texas Marshall Division, Case No. 2:11-CV-229, on Jun. 17, 2011, 15 pages.
Defendant Viacom Inc.'s Corporate Disclosure Statement filed in the United States District Court, Eastern District of Texas Marshall Division, Case No. 2:11-CV-229, on Jun. 17, 2011, 3 pages.
Defendant Amazon.com, Inc.'s Corporate Disclosure Statement filed in the United States District Court, Eastern District of Texas Marshall Division, Case No. 2:11-CV-229, on Jun. 17, 2011, 3 pages.
Defendant Expedia, Inc.'s Corporate Disclosure Statement filed in the United States District Court, Eastern District of Texas Marshall Division, Case No. 2:11-CV-229, on Jun. 17, 2011, 3 pages.
Defendant Scripps Networks, LLC's Corporate Disclosure Statement filed in the United States District Court, Eastern District of Texas Marshall Division, Case No. 2:11-CV-229, on Jun. 17, 2011, 3 pages.
Rodale, Inc.'s Corporate Disclosure Statement Pursuant to Federal Rules of Civil Procedure 7.1 filed in the United States District Court, Eastern District of Texas Marshall Division, Case No. 2:11-CV-229, on Jun. 19, 2011, 3 pages.
Defendant Dell Inc.'s Answer and Counterclaims to Beneficial Innovations, Inc.'s First Amended Complaint for Patent Infringement filed in the United States District Court, Eastern District of Texas Marshall Division, Case No. 2:11-CV-229, on Jun. 20, 2011, 13 pages.

(56) References Cited

OTHER PUBLICATIONS

Defendant Dell Inc.'s Corporate Disclosure Statement Pursuant to F.R.C.P. 7.1 filed in the United States District Court, Eastern District of Texas Marshall Division, Case No. 2:11-CV-229, on Jun. 20, 2011, 2 pages.
Notice of Appearance of Roger Fulghum on Behalf of Defendant Dell Inc. filed in the United States District Court, Eastern District of Texas Marshall Division, Case No. 2:11-CV-229, on Jun. 20, 2011, 2 pages.
Notice of Appearance of Paula D. Heyman on Behalf of Defendant Dell Inc. filed in the United States District Court, Eastern District of Texas Marshall Division, Case No. 2:11-CV-229, on Jun. 20, 2011, 2 pages.
Notice of Appearance of Nicholas Schuneman on Behalf of Defendant Dell Inc. filed in the United States District Court, Eastern District of Texas Marshall Division, Case No. 2:11-CV-229, on Jun. 20, 2011, 2 pages.
Application to Appear Pro Hac Vice filed in the United States District Court, Eastern District of Texas Marshall Division, Case No. 2:11-CV-229, on Jun. 22, 2011, 3 pages.
Application to Appear Pro Hac Vice filed in the United States District Court, Eastern District of Texas Marshall Division, Case No. 2:11-CV-229, on Jun. 22, 2011, 4 pages.
Notice of Appearance of Counsel for Defendant Demand Media filed in the United States District Court, Eastern District of Texas Marshall Division, Case No. 2:11-CV-229, on Jun. 23, 2011, 2 pages.
Plaintiff and Counterdefendant Beneficial Innovations, Inc's Reply to Counterclaims of Rodale, Inc. filed in the United States District Court, Eastern District of Texas Marshall Division, Case No. 2:11-CV-229, on Jul. 11, 2011, 6 pages.
Plaintiff and Counterdefendant Beneficial Innovations, Inc's Reply to Counterclaims of Amazon.com, Inc. filed in the United States District Court, Eastern District of Texas Marshall Division, Case No. 2:11-CV-229, on Jul. 11, 2011, 6 pages.
Plaintiff and Counterdefendant Beneficial Innovations, Inc's Reply to Counterclaims of Expedia, Inc. filed in the United States District Court, Eastern District of Texas Marshall Division, Case No. 2:11-CV-229, on Jul. 11, 2011, 6 pages.
Plaintiff and Counterdefendant Beneficial Innovations, Inc's Reply to Counterclaims of Scripps Networks, LLC filed in the United States District Court, Eastern District of Texas Marshall Division, Case No. 2:11-CV-229, on Jul. 11, 2011, 6 pages.
Plaintiff and Counterdefendant Beneficial Innovations, Inc's Reply to Counterclaims of Viacom Inc. filed in the United States District Court, Eastern District of Texas Marshall Division, Case No. 2:11-CV-229, on Jul. 11, 2011, 6 pages.
Plaintiff and Counterdefendant Beneficial Innovations, Inc's Reply to Counterclaims of Dell Inc. filed in the United States District Court, Eastern District of Texas Marshall Division, Case No. 2:11-CV-229, on Jul. 11, 2011, 5 pages.
Notice of Attorney Appearance filed in the United States District Court, Eastern District of Texas Marshall Division, Case No. 2:11-CV-229, on Jul. 12, 2011, 2 pages.
Advance Publications, Inc.'s Answer and Counterclaims to Beneficial Innovations, Inc.'s Amended Complaint filed in the United States District Court, Eastern District of Texas Marshall Division, Case No. 2:11-CV-229, on Jul. 13, 2011, 12 pages.
Autotrader.com, Inc.'s Answer and Counterclaims to Beneficial Innovations, Inc.'s Amended Complaint filed in the United States District Court, Eastern District of Texas Marshall Division, Case No. 2:11-CV-229, on Jul. 13, 2011, 13 pages.
ALM Media Properties, LLC's Answer and Counterclaims to Beneficial Innovations, Inc.'s Amended Complaint filed in the United States District Court, Eastern District of Texas Marshall Division, Case No. 2:11-CV-229, on Jul. 13, 2011, 12 pages.
Motion of Defendants Advance Publications, Inc., ALM Media Properties, LLC, American Media, Inc., and Autotrader.com, Inc. to Dismiss the Willfulness Infringement Claim for Failure to State a Claim filed in the United States District Court, Eastern District of Texas Marshall Division, Case No. 2:11-CV-229, on Jul. 13, 2011, 7 pages.
Order Granting Motion of Defendants Advance Publications, Inc., ALM Media Properties, LLC, American Media, Inc., and Autotrader.com, Inc. to Dismiss the Willfulness Infringement Claim for Failure to State a Claim filed in the United States District Court, Eastern District of Texas Marshall Division, Case No. 2:11-CV-229, on Jul. 13, 2011, 1 page.
American Media, Inc.'s Answer and Counterclaims to Beneficial Innovations, Inc.'s Amended Complaint filed in the United States District Court, Eastern District of Texas Marshall Division, Case No. 2:11-CV-229, on Jul. 13, 2011, 12 pages.
Notice of Appearance filed in the United States District Court, Eastern District of Texas Marshall Division, Case No. 2:11-CV-229, on Jul. 15, 2011, 2 pages.
Defendant Village Voice Media Holdings, LLC's Notice of Joinder in Motion to Dismiss the Willfulness Infringement Claim for Failure to State a Claim filed in the United States District Court, Eastern District of Texas Marshall Division, Case No. 2:11-CV-229, on Jul. 15, 2011, 2 pages.
Defendant Village Voice Media Holdings, LLC's Answer and Counterclaims to First Amended Complaint filed in the United States District Court, Eastern District of Texas Marshall Division, Case No. 2:11-CV-229, on Jul. 15, 2011, 12 pages.
Defendant Village Voice Media Holdings, LLC's Corporate Disclosure Statement filed in the United States District Court, Eastern District of Texas Marshall Division, Case No. 2:11-CV-229, on Jul. 15, 2011, 2 pages.
Defendant Dell Inc.'s Notice of Joinder in Motion to Dismiss the Willfulness Infringement Claim for Failure to State a Claim filed in the United States District Court, Eastern District of Texas Marshall Division, Case No. 2:11-CV-229, on Jul. 18, 2011, 3 pages.
Plaintiff Beneficial Innovations, Inc.'s Unopposed Motion for Extension of Time to Respond to the Motion to Dismiss the Willfulness Infringement Claim for Failure to State a Claim Filed by Defendants Advance Publications, Inc., ALM Media Properties, LLC, American Media, Inc., Autotrader.com, Inc., Village Voice Media Holdings, LLC, and Dell Inc. filed in the United States District Court, Eastern District of Texas Marshall Division, Case No. 2:11-CV-229, on Jul. 25, 2011, 6 pages.
Defendant Amazon.com Inc., Expedia, Inc., Scripps Networks, LLC, and Viacom Inc.'s Notice of Joinder in Motion to Dismiss the Willfulness Infringement Claim for Failure to State a Claim filed in the United States District Court, Eastern District of Texas Marshall Division, Case No. 2:11-CV-229, on Jul. 26, 2011, 3 pages.
Order Granting Plaintiff Beneficial Innovations, Inc.'s Unopposed Motion for Extension of Time to Respond to the Motion to Dismiss the Willfulness Infringement Claim for Failure to State a Claim filed in the United States District Court, Eastern District of Texas Marshall Division, Case No. 2:11-CV-229, on Jul. 26, 2011, 2 pages.
Plaintiff and Counterdefendant Beneficial Innovations, Inc's Reply to Counterclaims of Advance Publications, Inc. filed in the United States District Court, Eastern District of Texas Marshall Division, Case No. 2:11-CV-229, on Aug. 5, 2011, 6 pages.
Plaintiff and Counterdefendant Beneficial Innovations, Inc's Reply to Counterclaims of Autotrader.com, Inc. filed in the United States District Court, Eastern District of Texas Marshall Division, Case No. 2:11-CV-229, on Aug. 5, 2011, 6 pages.
Plaintiff and Counterdefendant Beneficial Innovations, Inc's Reply to Counterclaims of ALM Media Properties, LLC filed in the United States District Court, Eastern District of Texas Marshall Division, Case No. 2:11-CV-229, on Aug. 5, 2011, 6 pages.
Plaintiff and Counterdefendant Beneficial Innovations, Inc's Reply to Counterclaims of American Media, Inc. filed in the United States District Court, Eastern District of Texas Marshall Division, Case No. 2:11-CV-229, on Aug. 5, 2011, 6 pages.
Plaintiff and Counterdefendant Beneficial Innovations, Inc's Reply to Counterclaims of Village Voice Media Holdings, LLC filed in the United States District Court, Eastern District of Texas Marshall Division, Case No. 2:11-CV-229, on Aug. 5, 2011, 5 pages.

(56) References Cited

OTHER PUBLICATIONS

Stipulation to Dismiss Willfulness Claims, Without Prejudice, and to Amend Complaint filed in the United States District Court, Eastern District of Texas Marshall Division, Case No. 2:11-CV-229, on Aug. 8, 2011, 20 pages.
Order on Stipulation to Dismiss Willfulness Claims, Without Prejudice, and to Amend Complaint filed in the United States District Court, Eastern District of Texas Marshall Division, Case No. 2:11-CV-229, on Aug. 11, 2011, 2 pages.
Second Amended Complaint for Infringement filed in the United States District Court, Eastern District of Texas Marshall Division, Case No. 2:11-CV-229, Aug. 11, 2011, 12 pages.
Unopposed Motion to Withdraw as Counsel of Record filed in the United States District Court, Eastern District of Texas Marshall Division, Case No. 2:11-CV-229, on Sep. 9, 2011, 3 pages.
Order filed in the United States District Court, Eastern District of Texas Marshall Division, Case No. 2:11-CV-229, on Oct. 5, 2011, 1 page.
Notice of Appearance of Counsel for Defendant/Counterclaimant Demand Media, Inc. filed in the United States District Court, Eastern District of Texas Marshall Division, Case No. 2:11-CV-229, on Nov. 9, 2011, 3 pages.
Notice of Appearance of Counsel filed in the United States District Court, Eastern District of Texas Marshall Division, Case No. 2:11-CV-229, on Nov. 14, 2011, 2 pages.
Defendants' Joint Motion to Transfer under 28 U.S.C. § 1404(a) to the Southern District of New York filed in the United States District Court, Eastern District of Texas Marshall Division, Case No. 2:11-CV-229, on Nov. 17, 2012, 21 pages.
Declaration of Sharon L. Davis, Esq. in Support of Defendants' Motion to Transfer Venue filed in the United States District Court, Eastern District of Texas Marshall Division, Case No. 2:11-CV-229, on Nov. 17, 2011, 23 pages.
Declaration of Bobby Chowdhury in Support of Defendants' Motion to Transfer Venue filed in the United States District Court, Eastern District of Texas Marshall Division, Case No. 2:11-CV-229, on Nov. 17, 2011, 3 pages.
Declaration of Angela M. Niemann in Support of Defendants' Motion to Transfer Venue filed in the United States District Court, Eastern District of Texas Marshall Division, Case No. 2:11-CV-229, on Nov. 17, 2011, 2 pages.
Declaration of Robert Madden, Jr. in Support of Defendants' Motion to Transfer Venue filed in the United States District Court, Eastern District of Texas Marshall Division, Case No. 2:11-CV-229, on Nov. 17, 2011, 3 pages.
Declaration of Autotrader.com in Support of Defendants' Motion to Transfer Venue filed in the United States District Court, Eastern District of Texas Marshall Division, Case No. 2:11-CV-229, on Nov. 17, 2011, 2 pages.
Declaration of Jed Brunst in Support of Defendants' Joint Motion to Transfer under 28 U.S.C. § 1404(a) to the Southern District of New York filed in the United States District Court, Eastern District of Texas Marshall Division, Case No. 2:11-CV-229, on Nov. 17, 2011, 2 pages.
Declaration of Jill Windwer in Support of Defendants' Motion to Transfer Venue filed in the United States District Court, Eastern District of Texas Marshall Division, Case No. 2:11-CV-229, on Nov. 17, 2011, 3 pages.
Declaration of Paul McGinley in Support of Defendants' Motion to Transfer Venue filed in the United States District Court, Eastern District of Texas Marshall Division, Case No. 2:11-CV-229, on Nov. 17, 2011, 3 pages.
Declaration of Robin Keller in Support of Defendants' Motion to Transfer Venue filed in the United States District Court, Eastern District of Texas Marshall Division, Case No. 2:11-CV-229, on Nov. 17, 2011, 2 pages.
Declaration of Stephen Westenhiser in Support of Defendants' Motion to Transfer Venue filed in the United States District Court, Eastern District of Texas Marshall Division, Case No. 2:11-CV-229, on Nov. 17, 2011, 3 pages.
Declaration of Warren Solow in Support of Defendants' Motion to Transfer Venue filed in the United States District Court, Eastern District of Texas Marshall Division, Case No. 2:11-CV-229, on Nov. 17, 2011, 3 pages.
Declaration of Wedge Abels in Support of Defendants' Motion to Transfer Venue filed in the United States District Court, Eastern District of Texas Marshall Division, Case No. 2:11-CV-229, on Nov. 17, 2011, 2 pages.
Declaration of Dell Inc. in Support of Defendants' Motion to Transfer Venue filed in the United States District Court, Eastern District of Texas Marshall Division, Case No. 2:11-CV-229, on Nov. 23, 2011, 4 pages.
Stipulation re Discovery and Briefing Schedule for Defendants' Joint Motion to Transfer under 28 U.S.C. § 1404(a) filed in the United States District Court, Eastern District of Texas Marshall Division, Case No. 2:11-CV-229, on Dec. 2, 2011, 9 pages.
Order on Stipulation re Discovery and Briefing Schedule for Defendants' Joint Motion to Transfer under 28 U.S.C. § 1404(a) filed in the United States District Court, Eastern District of Texas Marshall Division, Case No. 2:11-CV-229, on Dec. 6, 2011, 3 pages.
Order of Recusal filed in the United States District Court, Eastern District of Texas Marshall Division, Case No. 2:11-CV-229, on Jan. 4, 2012, 1 page.
Amended Declaration of Paul McGinley in Support of Defendants' Motion to Transfer Venue filed in the United States District Court, Eastern District of Texas Marshall Division, Case No. 2:11-CV-229, on Jan. 19, 2012, 4 pages.
Amended Declaration of Paul McGinley in Support of Defendants' Motion to Transfer Venue filed in the United States District Court, Eastern District of Texas Marshall Division, Case No. 2:11-CV-229, on Jan. 20, 2012, 4 pages.
Order Denying Defendants' Motion to Dismiss the Willful Infringement Claim as Moot filed in the United States District Court, Eastern District of Texas Marshall Division, Case No. 2:11-CV-229, on Feb. 1, 2012, 1 page.
Notice of Change of Address filed in the United States District Court, Eastern District of Texas Marshall Division, Case No. 2:11-CV-229, on Feb. 3, 2012, 2 pages.
Plaintiff Beneficial Innovations, Inc.'s Opposition to Defendants' Joint Motion to Transfer under 28 U.S.C. § 1404(a) to the Southern District of New York filed in the United States District Court, Eastern District of Texas Marshall Division, Case No. 2:11-CV-229, on Feb. 3, 2012, 21 pages.
Declaration of David E. Rosen in Support of Plaintiff's Opposition to Defendants' Joint Motion to Transfer under 28 U.S.C. § 1404(a) to the Southern District of New York filed in the United States District Court, Eastern District of Texas Marshall Division, Case No. 2:11-CV-229, on Feb. 3, 2012, 126 pages.
Unopposed Motion of Defendants to Extend Its Time to File Reply Brief in Support of Defendants' Motion to Transfer filed in the United States District Court, Eastern District of Texas Marshall Division, Case No. 2:11-CV-229, on Feb. 15, 2012, 5 pages.
Order Granting Unopposed Motion of Defendants to Extend Its Time to File Reply Brief in Support of Defendants' Motion to Transfer filed in the United States District Court, Eastern District of Texas Marshall Division, Case No. 2:11-CV-229, on Feb. 16, 2012, 2 pages.
Notice of Appearance of Counsel for Defendant/Counterclaimant Demand Media filed in the United States District Court, Eastern District of Texas Marshall Division, Case No. 2:11-CV-229, on Feb. 22, 2012, 3 pages.
Defendants' Reply in Support of their Joint Motion to Transfer under 28 U.S.C. § 1404(a) to the Southern District of New York filed in the United States District Court, Eastern District of Texas Marshall Division, Case No. 2:11-CV-229, on Feb. 29, 2012, 9 pages.
Supplemental Declaration of Sharon L. Davis, Esq. in Support of Defendants' Joint Motion to Transfer filed in the United States District Court, Eastern District of Texas Marshall Division, Case No. 2:11-CV-229, on Feb. 29, 2012, 68 pages.
Plaintiff Beneficial Innovations, Inc.'s Sur-reply to Defendants' Joint Motion to Transfer under 28 U.S.C. § 1404(a) to the Southern

(56) References Cited

OTHER PUBLICATIONS

District of New York filed in the United States District Court, Eastern District of Texas Marshall Division, Case No. 2:11-CV-229, on Mar. 12, 2012, 5 pages.

Notice of Change of Address of Counsel for Defendant/ Counterclaimant Demand Media filed in the United States District Court, Eastern District of Texas Marshall Division, Case No. 2:11-CV-229, on Mar. 27, 2012, 3 pages.

Order to Meet, Report, and Appear at Scheduling Conference filed in the United States District Court, Eastern District of Texas Marshall Division, Case No. 2:11-CV-229, on Apr. 11, 2012, 9 pages.

Standard Protective Order filed in the United States District Court, Eastern District of Texas Marshall Division, Case No. 2:11-CV-229, on Apr. 11, 2012, 4 pages.

Order Regarding E-Discovery in Patent Cases filed in the United States District Court, Eastern District of Texas Marshall Division, Case No. 2:11-CV-229, on Apr. 11, 2012, 5 pages.

Motion Practice Order filed in the United States District Court, Eastern District of Texas Marshall Division, Case No. 2:11-CV-229, on Apr. 11, 2012, 3 pages.

Plaintiff Beneficial Innovations, Inc.'s Supplemental Corporate Disclosure Statement filed in the United States District Court, Eastern District of Texas Marshall Division, Case No. 2:11-CV-229, on Apr. 25, 2012, 3 pages.

Defendant/Counterclaimant Demand Media, Inc.'s Corporate Disclosure Statement filed in the United States District Court, Eastern District of Texas Marshall Division, Case No. 2:11-CV-229, on Apr. 26, 2012, 3 pages.

Defendant Amazon.com, Inc.'s Certificate of Financially Interested Persons filed in the United States District Court, Eastern District of Texas Marshall Division, Case No. 2:11-CV-229, on Apr. 26, 2012, 3 pages.

Defendant Expedia, Inc.'s Certificate of Financially Interested Persons filed in the United States District Court, Eastern District of Texas Marshall Division, Case No. 2:11-CV-229, on Apr. 26, 2012, 3 pages.

Defendant Scripps Network, LLC's Certificate of Financially Interested Persons filed in the United States District Court, Eastern District of Texas Marshall Division, Case No. 2:11-CV-229, on Apr. 26, 2012, 3 pages.

Defendant Viacom Inc.'s Certificate of Interested Parties filed in the United States District Court, Eastern District of Texas Marshall Division, Case No. 2:11-CV-229, on Apr. 26, 2012, 3 pages.

Rodale, Inc.'s Certificate of Interested Parties filed in the United States District Court, Eastern District of Texas Marshall Division, Case No. 2:11-CV-229, on Apr. 26, 2012, 3 pages.

Defendant Amazon.com, Inc.'s Amended Certificate of Financially Interested Persons filed in the United States District Court, Eastern District of Texas Marshall Division, Case No. 2:11-CV-229, on Apr. 26, 2012, 3 pages.

Defendant Expedia, Inc.'s Amended Certificate of Financially Interested Persons filed in the United States District Court, Eastern District of Texas Marshall Division, Case No. 2:11-CV-229, on Apr. 26, 2012, 3 pages.

Defendant Viacom Inc.'s Amended Certificate of Financially Interested Persons filed in the United States District Court, Eastern District of Texas Marshall Division, Case No. 2:11-CV-229, on Apr. 26, 2012, 3 pages.

Defendant Scripps Network, LLC's Amended Certificate of Financially Interested Persons filed in the United States District Court, Eastern District of Texas Marshall Division, Case No. 2:11-CV-229, on Apr. 26, 2012, 3 pages.

Rodale, Inc.'s Certificate of Interested Parties filed in the United States District Court, Eastern District of Texas Marshall Division, Case No. 2:11-CV-229, on Apr. 27, 2012, 3 pages.

Defendant/Counterclaimant Advance Publications, Inc. Certificate of Financially Interested Persons filed in the United States District Court, Eastern District of Texas Marshall Division, Case No. 2:11-CV-229, on Apr. 27, 2012, 3 pages.

Notice of Appearance filed in the United States District Court, Eastern District of Texas Marshall Division, Case No. 2:11-CV-229, on Apr. 27, 2012, 2 pages.

Defendant Village Voice Media Holdings, LLC's Certificate of Financially Interested Persons filed in the United States District Court, Eastern District of Texas Marshall Division, Case No. 2:11-CV-229, on Apr. 30, 2012, 3 pages.

Defendant/Counterclaimant ALM Medial Properties, LLC Certificate of Financially Interested Persons filed in the United States District Court, Eastern District of Texas Marshall Division, Case No. 2:11-CV-229, on Apr. 30, 2012, 3 pages.

Defendant/Counterclaimant American Media, Inc.'s Certificate of Financially Interested Persons filed in the United States District Court, Eastern District of Texas Marshall Division, Case No. 2:11-CV-229, on May 1, 2012, 3 pages.

Joinder by Defendant/Counterclaimant Demand Media, Inc. in Defendants' Joint Motion to Transfer under 28 U.S.C. § 1404(a) to the Southern District of New York filed in the United States District Court, Eastern District of Texas Marshall Division, Case No. 2:11-CV-229, on May 1, 2012, 3 pages.

Defendant/Counterclaimant Autotrader.com, Inc.'s Certificate of Financially Interested Persons filed in the United States District Court, Eastern District of Texas Marshall Division, Case No. 2:11-CV-229, on May 3, 2012, 3 pages.

Joint Discovery/Case Management Plan filed in the United States District Court, Eastern District of Texas Marshall Division, Case No. 2:11-CV-229, on May 8, 2012, 22 pages.

Google Inc.'s Unopposed Motion for Leave to File Under Seal Its Motion to Intervene filed in the United States District Court, Eastern District of Texas Marshall Division, Case No. 2:11-CV-229, on May 18, 2012, 5 pages.

Order Granting Google Inc.'s Unopposed Motion for Leave to File Under Seal Its Motion to Intervene filed in the United States District Court, Eastern District of Texas Marshall Division, Case No. 2:11-CV-229, on May 21, 2012, 1 page.

Application to Appear Pro Hac Vice filed in the United States District Court, Eastern District of Texas Marshall Division, Case No. 2:11-CV-229, on May 21, 2012, 2 pages.

Plaintiff's Notice of P.R. 3-1 and P.R. 3-2 Disclosures filed in the United States District Court, Eastern District of Texas Marshall Division, Case No. 2:11-CV-229, on May 29, 2012, 3 pages.

Motion for Leave to File Supplemental Brief of Amazon.Com, Inc. and Expedia, Inc. Regarding Defendants' Motion to Transfer Venue filed in the United States District Court, Eastern District of Texas Marshall Division, Case No. 2:11-CV-229, on May 31, 2012, 4 pages.

Supplemental Brief of Amazon.Com, Inc. and Expedia, Inc. Regarding Defendants' Motion to Transfer Venue filed in the United States District Court, Eastern District of Texas Marshall Division, Case No. 2:11-CV-229, on May 31, 2012, 6 pages.

Intervenor Google Inc.'s Notice of Appearance as Counsel filed in the United States District Court, Eastern District of Texas Marshall Division, Case No. 2:11-CV-229, on Jun. 1, 2012, 2 pages.

Beneficial Innovations, Inc.'s Unopposed Motion for Leave to File Under Seal Its Opposition to Motion to Intervene filed in the United States District Court, Eastern District of Texas Marshall Division, Case No. 2:11-CV-229, on Jun. 4, 2012, 4 pages.

Order Granting Motion for Leave to File Supplemental Brief of Amazon.com, Inc. and Expedita, Inc. Regarding Defendants' Motion to Transfer Venue filed in the United States District Court, Eastern District of Texas Marshall Division, Case No. 2:11-CV-229, on Jun. 4, 2012, 1 page.

Dell's Motion for Leave to File Supplemental Brief of Dell Inc. Regarding Defendants' Motion to Transfer Venue filed in the United States District Court, Eastern District of Texas Marshall Division, Case No. 2:11-CV-229, on Jun. 4, 2012, 4 pages.

Supplemental Brief of Dell Inc. Regarding Defendants' Motion to Transfer Venue filed in the United States District Court, Eastern District of Texas Marshall Division, Case No. 2:11-CV-229, on Jun. 4, 2012, 14 pages.

Order Granting Dell's Motion for Leave to File Supplemental Brief of Dell Inc. Regarding Defendants' Motion to Transfer Venue filed

(56) References Cited

OTHER PUBLICATIONS in the United States District Court, Eastern District of Texas Marshall Division, Case No. 2:11-CV-229, on Jun. 5, 2012, 1 page.
Order Granting Beneficial Innovations, Inc.'s Unopposed Motion for leave to File Under Seal Its Opposition to Google's Motion to Intervene filed in the United States District Court, Eastern District of Texas Marshall Division, Case No. 2:11-CV-229, on Jun. 5, 2012, 1 page.
Notice of Appearance of Counsel filed in the United States District Court, Eastern District of Texas Marshall Division, Case No. 2:11-CV-229, on Jun. 5, 2012, 2 pages.
Plaintiff Beneficial Innovations, Inc.'s Expedited Response to Supplemental Briefs of Amazon.com, Inc., Expedia, Inc. and Dell Inc. Regarding Defendants' Joint Motion to Transfer Venue filed in the United States District Court, Eastern District of Texas Marshall Division, Case No. 2:11-CV-229, on Jun. 6, 2012, 10 pages.
Minute Order filed in the United States District Court, Eastern District of Texas Marshall Division, Case No. 2:11-CV-229, on Jun. 7, 2012, 3 pages.
Notice of Appearance of Counsel filed in the United States District Court, Eastern District of Texas Marshall Division, Case No. 2:11-CV-229, on Jun. 12, 2012, 3 pages.
Google Inc.'s Reply in Support of Its Motion to Intervene filed in the United States District Court, Eastern District of Texas Marshall Division, Case No. 2:11-CV-229, on Jun. 14, 2012, 7 pages.
Order Denying Motion to Transfer filed in the United States District Court, Eastern District of Texas Marshall Division, Case No. 2:11-CV-229, on Jun. 19, 2012, 14 pages.
Plaintiff Beneficial Innovations, Inc.'s Sur-reply Brief in Opposition to Google, Inc.'s Motion to Intervene filed in the United States District Court, Eastern District of Texas Marshall Division, Case No. 2:11-CV-229, on Jun. 25, 2012, 8 pages.
Joint Motion to Dismiss filed in the United States District Court, Eastern District of Texas Marshall Division, Case No. 2:11-CV-229, on Jun. 25, 2012, 5 pages.
Order of Dismissal filed in the United States District Court, Eastern District of Texas Marshall Division, Case No. 2:11-CV-229, on Jul. 2, 2012, 1 pages.
Proposed Scheduling and Discovery Order filed in the United States District Court, Eastern District of Texas Marshall Division, Case No. 2:11-CV-229, on Jul. 3, 2012, 18 pages.
Agreed to Protective Order filed in the United States District Court, Eastern District of Texas Marshall Division, Case No. 2:11-CV-229, on Jul. 3, 2012, 23 pages.
Order Regarding Electronic Discovery filed in the United States District Court, Eastern District of Texas Marshall Division, Case No. 2:11-CV-229, on Jul. 3, 2012, 18 pages.
Scheduling and Discovery Order filed in the United States District Court, Eastern District of Texas Marshall Division, Case No. 2:11-CV-229, on Jul. 5, 2012, 18 pages.
Order Regarding Electronic Discovery filed in the United States District Court, Eastern District of Texas Marshall Division, Case No. 2:11-CV-229, on Jul. 5, 2012, 8 pages.
Agreed to Protective Order filed in the United States District Court, Eastern District of Texas Marshall Division, Case No. 2:11-CV-229, on Jul. 5, 2012, 23 pages.
Defendant Amazon.com, Inc.'s First Amended Answer and Counterclaims to Plaintiff's Second Amended Complaint filed in the United States District Court, Eastern District of Texas Marshall Division, Case No. 2:11-CV-229, on Jul. 5, 2012, 14 pages.
Defendant Viacom Inc.'s First Amended Answer and Counterclaims to Plaintiff's Second Amended Complaint filed in the United States District Court, Eastern District of Texas Marshall Division, Case No. 2:11-CV-229, on Jul. 5, 2012, 14 pages.
Defendant Scripps Networks, LLC's First Amended Answer and Counterclaims to Plaintiff's Second Amended Complaint filed in the United States District Court, Eastern District of Texas Marshall Division, Case No. 2:11-CV-229, on Jul. 5, 2012, 14 pages.
Defendant Expedia, Inc.'s First Amended Answer and Counter-claims to Plaintiff's Second Amended Complaint filed in the United States District Court, Eastern District of Texas Marshall Division, Case No. 2:11-CV-229, on Jul. 5, 2012, 14 pages.
Defendant Dell Inc.'s First Amended Answer and Counterclaims to Beneficial Innovations, Inc.'s Second Amended Complaint for Patent Infringement filed in the United States District Court, Eastern District of Texas Marshall Division, Case No. 2:11-CV-229, on Jul. 5, 2012, 13 pages.
Agreed Motion for Extension of Time to Identify E-Mail Custodians filed in the United States District Court, Eastern District of Texas Marshall Division, Case No. 2:11-CV-229, on Jul. 13, 2012, 4 pages.
Order Granting Agreed Motion for Extension of Time to Identify E-Mail Custodians filed in the United States District Court, Eastern District of Texas Marshall Division, Case No. 2:11-CV-229, on Jul. 16, 2012, 1 pages.
Agreed Motion for Extension of Time to Identify E-Mail Custodians filed in the United States District Court, Eastern District of Texas Marshall Division, Case No. 2:11-CV-229, on Jul. 18, 2012, 5 pages.
Agreed Motion for Extension of Time to Identify E-Mail Custodians filed in the United States District Court, Eastern District of Texas Marshall Division, Case No. 2:11-CV-229, on Jul. 18, 2012, 4 pages.
Plaintiff Beneficial Innovations, Inc.'s Notice of Disclosure filed in the United States District Court, Eastern District of Texas Marshall Division, Case No. 2:11-CV-229, on Jul. 19, 2012, 3 pages.
Order Granting Defendant Dell Inc.'s Agreed Motion for Extension of Time to Identify E-Mail Custodians filed in the United States District Court, Eastern District of Texas Marshall Division, Case No. 2:11-CV-229, on Jul. 19, 2012, 1 pages.
Order Granting Defendant Village Voice Media Holdings, LLC's Agreed Motion for Extension of Time to Identify E-Mail Custodians filed in the United States District Court, Eastern District of Texas Marshall Division, Case No. 2:11-CV-229, on Jul. 19, 2012, 1 pages.
Demand Media, Inc.'s Notice of Compliance filed in the United States District Court, Eastern District of Texas Marshall Division, Case No. 2:11-CV-229, on Jul. 19, 2012, 3 pages.
Plaintiff and Counterdefendant Beneficial Innovations, Inc's Reply to Amended Counterclaims of Amazon.com, Inc. filed in the United States District Court, Eastern District of Texas Marshall Division, Case No. 2:11-CV-229, on Jul. 23, 2012, 6 pages.
Plaintiff and Counterdefendant Beneficial Innovations, Inc's Reply to Amended Counterclaims of Viacom, Inc. filed in the United States District Court, Eastern District of Texas Marshall Division, Case No. 2:11-CV-229, on Jul. 23, 2012, 6 pages.
Plaintiff and Counterdefendant Beneficial Innovations, Inc's Reply to Counterclaims of Scripps Networks, LLC filed in the United States District Court, Eastern District of Texas Marshall Division, Case No. 2:11-CV-229, on Jul. 23, 2012, 6 pages.
Plaintiff and Counterdefendant Beneficial Innovations, Inc's Reply to Amended Counterclaims of Expedia, Inc. filed in the United States District Court, Eastern District of Texas Marshall Division, Case No. 2:11-CV-229, on Jul. 23, 2012, 6 pages.
Plaintiff and Counterdefendant Beneficial Innovations, Inc's Reply to Amended Counterclaims of Dell Inc. filed in the United States District Court, Eastern District of Texas Marshall Division, Case No. 2:11-CV-229, on Jul. 23, 2012, 5 pages.
Defendant Village Voice Media Holdings, LLC's Notice of Compliance filed in the United States District Court, Eastern District of Texas Marshall Division, Case No. 2:11-CV-229, on Jul. 23, 2012, 2 pages.
Intervening Plaintiff Google Inc.'s Complaint for Intervention filed in the United States District Court, Eastern District of Texas Marshall Division, Case No. 2:11-CV-229, on Jul. 23, 2012, 32 pages.
Dell Inc.'s Notice of Compliance filed in the United States District Court, Eastern District of Texas Marshall Division, Case No. 2:11-CV-229, on Jul. 23, 2012, 3 pages.
Notice of Compliance filed in the United States District Court, Eastern District of Texas Marshall Division, Case No. 2:11-Cv-229, on Jul. 23, 2012, 2 pages.

(56) References Cited

OTHER PUBLICATIONS

Plaintiff's Notice of Supplemental P.R. 3-1 Disclosures filed in the United States District Court, Eastern District of Texas Marshall Division, Case No. 2:11-CV-229, on Aug. 9, 2012, 3 pages.

Notice of Disclosure filed in the United States District Court, Eastern District of Texas Marshall Division, Case No. 2:11-CV-229, on Aug. 10, 2012, 3 pages.

Plaintiff's Notice of Initial Disclosure Statement filed in the United States District Court, Eastern District of Texas Marshall Division, Case No. 2:11-CV-229, on Aug. 10, 2012, 3 pages.

Defendant Village Voice Media Holdings, LLC's Notice of Disclosure filed in the United States District Court, Eastern District of Texas Marshall Division, Case No. 2:11-CV-229, on Aug. 13, 2012, 2 pages.

Demand Media, Inc.'s Notice of Disclosure filed in the United States District Court, Eastern District of Texas Marshall Division, Case No. 2:11-CV-229, on Aug. 13, 2012, 3 pages.

Defendant Village Voice Media Holdings, LLC's Answer and Counterclaims to Second Amended Complaint filed in the United States District Court, Eastern District of Texas Marshall Division, Case No. 2:11-CV-229, on Aug. 15, 2012, 12 pages.

Agreed Motion for Extension of Time to Serve Invalidity Contentions filed in the United States District Court, Eastern District of Texas Marshall Division, Case No. 2:11-CV-229, on Aug. 16, 2012, 6 pages.

Beneficial Innovations, Inc's Answer to Google, Inc.'s Complaint for Intervention filed in the United States District Court, Eastern District of Texas Marshall Division, Case No. 2:11-CV-229, on Aug. 16, 2012, 9 pages.

Order Granting Agreed Motion for Extension of Time to Serve Invalidity Contentions filed in the United States District Court, Eastern District of Texas Marshall Division, Case No. 2:11-CV-229, on Aug. 17, 2012, 1 pages.

Notice of Compliance filed in the United States District Court, Eastern District of Texas Marshall Division, Case No. 2:11-CV-229, on Aug. 24, 2012, 4 pages.

Defendants' Invalidity Contentions filed in the United States District Court, Eastern District of Texas Marshall Division, Case No. 2:11-CV-229, Aug. 31, 2012, 66 pages.

Defendant Dell Inc.'s Motion to Sever and Transfer filed in the United States District Court, Eastern District of Texas Marshall Division, Case No. 2:11-CV-229, on Sep. 4, 2012, 24 pages.

Declaration of Nicholas A. Schuneman in Support of Dell's Motion to Sever and Transfer Venue filed in the United States District Court, Eastern District of Texas Marshall Division, Case No. 2:11-CV-229, on Sep. 4, 2012, 369 pages.

Plaintiff and Counterdefendant Beneficial Innovations, Inc's Reply to Counterclaims of Village Voice Media Holdings, LLC filed in the United States District Court, Eastern District of Texas Marshall Division, Case No. 2:11-CV-229, on Sep. 10, 2012, 5 pages.

Plaintiff Beneficial Innovations, Inc.'s Opposition to Defendant Dell's Motion to Sever and Transfer filed in the United States District Court, Eastern District of Texas Marshall Division, Case No. 2:11-CV-229, on Sep. 21, 2012, 21 pages.

Declaration of David E. Rosen in Opposition to Dell, Inc.'s Motion to Sever and Transfer filed in the United States District Court, Eastern District of Texas Marshall Division, Case No. 2:11-CV-229, on Sep. 21, 2012, 6 pages.

Plaintiff's Notice of Proposed Terms and Claim Elements for Construction Pursuant to P.R. 4-1 filed in the United States District Court, Eastern District of Texas Marshall Division, Case No. 2:11-CV-229, on Sep. 25, 2012, 3 pages.

Defendant Dell Inc.'s Reply in Support of its Motion to Sever and Transfer filed in the United States District Court, Eastern District of Texas Marshall Division, Case No. 2:11-CV-229, on Oct. 1, 2012, 8 pages.

Declaration of Nicholas A. Schuneman in Support of Dell's Reply in Support of its Motion to Sever and Transfer Venue filed in the United States District Court, Eastern District of Texas Marshall Division, Case No. 2:11-CV-229, on Oct. 1, 2012, 44 pages.

Plaintiff's Notice of Preliminary Claim Constructions and Identification of Extrinsic Evidence Pursuant to P.R. 4-2 filed in the United States District Court, Eastern District of Texas Marshall Division, Case No. 2:11-CV-229, on Oct. 3, 2012, 3 pages.

Defendant Village Voice Media Holdings, LLC's Notice of Disclosure filed in the United States District Court, Eastern District of Texas Marshall Division, Case No. 2:11-CV-229, on Oct. 3, 2012, 2 pages.

Defendants Advance Publications, Inc.; ALM Media Properties, LLC; American Media, Inc. and Autotrader.com Notice of Disclosure filed in the United States District Court, Eastern District of Texas Marshall Division, Case No. 2:11-CV-229, on Oct. 5, 2012, 3 pages.

Joint Claim Construction and Prehearing Statement filed in the United States District Court, Eastern District of Texas Marshall Division, Case No. 2:11-CV-229, on Oct. 10, 2012, 41 pages.

Agreed Motion for Extension of Time to File Letter Brief Requesting Permission to File Defendants' Motion for Summary Judgment of Indefiniteness File Defendants' Motion for Summary Judgment of Indefiniteness filed in the United States District Court, Eastern District of Texas Marshall Division, Case No. 2:11-CV-229, on Oct. 10, 2012, 6 pages.

Order Granting Agreed Motion for Extension of Time to File Letter Brief Requesting Permission to File Defendants' Motion for Summary Jjudgment of Indefiniteness filed in the United States District Court, Eastern District of Texas Marshall Division, Case No. 2:11-CV-229, on Oct. 11, 2012, 1 page.

Defendants Amazon.com, Inc., Expedia, Inc., Scripps Networks, LLC, and Viacom Inc. Agreed Motion to Extend Document Production Due Date filed in the United States District Court, Eastern District of Texas Marshall Division, Case No. 2:11-CV-229, on Oct. 11, 2012, 4 pages.

Defendants Advance Publications, Inc.; ALM Media Properties, LLC; American Media, Inc.; and Autotrader.com, Inc. Agreed Motion to Extend Document Production Due Date filed in the United States District Court, Eastern District of Texas Marshall Division, Case No. 2:11-CV-229, on Oct. 11, 2012, 4 pages.

Plaintiff Beneficial Innovations, Inc.'s Sur-reply to Defendant Dell's Motion to Sever and Transfer filed in the United States District Court, Eastern District of Texas Marshall Division, Case No. 2:11-CV-229, on Oct. 11, 2012, 8 pages.

Motion for Judgment on the Pleadings or in the Alternative Summary Adjudication That Beneficial Innovations, Inc. Is in Breach of Its Settlement Agreement With Google Inc. and Memorandum in Support Thereof filed in the United States District Court, Eastern District of Texas Marshall Division, Case No. 2:11-CV-229, on Oct. 11, 2012, 308 pages.

Order Granting Agreed Motion to Extend Document Production Due Date filed in the United States District Court, Eastern District of Texas Marshall Division, Case No. 2:11-CV-229, on Oct. 12, 2012, 1 page.

Notice of Compliance with the Court's Motion Practice Order filed in the United States District Court, Eastern District of Texas Marshall Division, Case No. 2:11-CV-229, on Oct. 17, 2012, 10 pages.

Emergency Motion of Plaintiff Beneficial Innovations, Inc. (1) to Strike Google's Motion for Judgment on the Pleadings and Summary Adjudication for Failure to Comply With the Court's Motion Practice Order, and (2) Alternatively, for a 45-Day Extension of Time to Oppose the Motion filed in the United States District Court, Eastern District of Texas Marshall Division, Case No. 2:11-CV-229, on Oct. 17, 2012, 40 pages.

Order Granting Request for Expedited Response filed in the United States District Court, Eastern District of Texas Marshall Division, Case No. 2:11-CV-229, on Oct. 18, 2012, 2 pages.

Notice of Appearance of Additional Counsel for Third-Party Plaintiff Google Inc. filed in the United States District Court, Eastern District of Texas Marshall Division, Case No. 2:11-CV-229, on Oct. 19, 2012, 2 pages.

Opposition of Google Inc. to Plaintiff's Motion to Strike filed in the United States District Court, Eastern District of Texas Marshall Division, Case No. 2:11-CV-229, on Oct. 19, 2012, 12 pages.

(56) References Cited

OTHER PUBLICATIONS

Reply Brief in Support of Emergency Motion (1) to Strike Google's Motion for Judgment on the Pleadings and Summary Adjudication for Failure to Comply with the Court's Motion Practice Order, and (2) Alternatively, for a 45-Day Extension of Time to Oppose the Motion filed in the United States District Court, Eastern District of Texas Marshall Division, Case No. 2:11-CV-229, on Oct. 22, 2012, 8 pages.
Order Granting Motion to Strike filed in the United States District Court, Eastern District of Texas Marshall Division, Case No. 2:11-CV-229, on Oct. 23, 2012, 3 pages.
Notice of Compliance with the Court's Motion Practice Order filed in the United States District Court, Eastern District of Texas Marshall Division, Case No. 2:11-CV-229, on Nov. 1, 2012, 9 pages.
Order Granting Agreed Motion to Extend Privilege Log Deadline filed in the United States District Court, Eastern District of Texas Marshall Division, Case No. 2:11-CV-229, on Nov. 2, 2012, 1 page.
Plaintiff's Notice of Privilege Log filed in the United States District Court, Eastern District of Texas Marshall Division, Case No. 2:11-CV-229, on Nov. 5, 2012, 3 pages.
Notice of Compliance with the Court's Motion Practice Order filed in the United States District Court, Eastern District of Texas Marshall Division, Case No. 2:11-CV-229, on Nov. 6, 2012, 10 pages.
Notice of Compliance with the Court's Motion Practice Order filed in the United States District Court, Eastern District of Texas Marshall Division, Case No. 2:11-CV-229, on Nov. 7, 2012, 10 pages.
Notice of Compliance with the Court's Motion Practice Order filed in the United States District Court, Eastern District of Texas Marshall Division, Case No. 2:11-CV-229, on Nov. 9, 2012, 9 pages.
Application to Appear Pro Hac Vice filed in the United States District Court, Eastern District of Texas Marshall Division, Case No. 2:11-CV-229, on Nov. 9, 2012, 2 pages.
Plaintiff Beneficial Innovations, Inc.'s Claim Construction Brief filed in the United States District Court, Eastern District of Texas Marshall Division, Case No. 2:11-CV-229, on Nov. 10, 2012, 247 pages.
Affidavit of Kevin Almeroth Regarding Claim Construction of U.S. Pat. No. 7,496,943 and U.S. Pat. No. 6,712,702 filed in the United States District Court, Eastern District of Texas Marshall Division, Case No. 2:11-CV-229, on Nov. 10, 2012, 54 pages.
Notice of Compliance with the Court's Motion Practice Order filed in the United States District Court, Eastern District of Texas Marshall Division, Case No. 2:11-CV-229, on Nov. 12, 2012, 8 pages.
Defendants' Responsive Claim Construction, filed in the United States District Court, Eastern District of Texas, Marshall Division, Case Nos. 2:11-CV-299 (MHS/CMC), on Dec. 10, 2012, 38 pages.
Defendant Dell Inc.'s Certificate of Financially Interested Entities filed in the United States District Court, Eastern District of Texas Marshall Division, Case No. 2:11-CV-229, on Apr. 27, 2012, 2 pages.
Declaration of Nicholas A. Schuneman Regarding Travel in Support of Dell's Motion to Sever and Transfer Venue filed in the United States District Court, Eastern District of Texas Marshall Division, Case No. 2:11-CV-229, on Sep. 4, 2012, 38 pages.
Notice of Appearance of Counsel for Defendant Demand Media filed in the Eastern District of Texas Marshall Division, Case No. 2:11-CV-229, on Nov. 13, 2012, 3 pages.
Defendants' Motion to Strike Plaintiff's Initial and Supplemental Disclosures of Asserted Claims and Infringement Contentions Under Local Rule 3-1 filed in the Eastern District of Texas Marshall Division, Case No. 2:11-CV-229, on Nov. 16, 2012, 23 pages.
Declaration of Stuart M. Rosenberg in Support of Defendants' Motion to Strike Plaintiff's Initial and Supplemental Disclosures of Asserted Claims and Infringement Contentions Under Local Rule 3-1, Eastern District of Texas Marshall Division, Case No. 2:11-CV-229, on Nov. 16, 2012, 589 pages.
Notice of Compliance with the Court's Motion Practice Order filed in the Eastern District of Texas Marshall Division, Case No. 2:11-CV-229, on Nov. 26, 2012, 9 pages.
Order Proposing Technical Advisor entered in the Eastern District of Texas Marshall Division, Case No. 2:11-CV-229, on Nov. 28, 2012, 1 page.
Notice of Letter in Support of Google's Request for Permission to File a Motion for Summary Adjudication filed in the Eastern District of Texas Marshall Division, Case No. 2:11-CV-229, on Nov. 28, 2012, 5 pages.
Plaintiff Beneficial Innovations, Inc.'s Agreed Motion to Modify Briefing Scheduel re: Defendants' Motion to Strike Plaintiff's Initial and Supplemental Disclosures of Asserted Claims and Infringement Contentions Under Location Patent Rule 3-1 filed in the Eastern District of Texas Marshall Division, Case No. 2:11-CV-229, on Nov. 28, 2012, 5 pages.
Plaintiff Beneficial Innovations, Inc.'s Agreed Motion to Modify Briefing Scheduel re: Defendants' Motion to Strike Plaintiff's Initial and Supplemental Disclosures of Asserted Claims and Infringement Contentions Under Location Patent Rule 3-1 filed in the Eastern District of Texas Marshall Division, Case No. 2:11-CV-229, on Nov. 29, 2012, 5 pages.
Unopposed Motion for Extension of Time to File a Reply Letter Brief filed in the Eastern District of Texas Marshall Division, Case No. 2:11-CV-229, on Dec. 3, 2012, 4 pages.
Order Granting Unopposed Motion for Extension of Time to File a Reply Letter Brief entered in the United States District Court, Eastern District of Texas Marshall Division, Case No. 2:11-CV-229, on Dec. 4, 2012, 1 page.
Notice of Compliance with Court's Motion Practice Order filed in the Eastern District of Texas Marshall Division, Case No. 2:11-CV-229, on Dec. 7, 2012, 8 pages.
Order Appointing Technical Advisor entered in the Eastern District of Texas Marshall Division, Case No. 2:11-CV-229, on Dec. 10, 2012, 2 pages.
Plaintiff Beneficial Innovations, Inc.'s Opposition to Defendants' Motion to Strike Plaintiff's Initial and Supplemental Disclosures of Asserted Claims and Infringement Contentions under Local Rule 3-1 filed in the Eastern District of Texas Marshall Division, Case No. 2:11-CV-229, on Dec. 10, 2012, 21 pages.
Declaration of David E. Rosen in Opposition to Defendants' Motion to Strike Plaintiff's Initial and Supplemental Disclosures of Asserted Claims and Infringement Contentions under Local Rule 3-1 filed in the Eastern District of Texas Marshall Division, Case No. 2:11-CV-229, on Dec. 10, 2012, 58 pages.
Amended Order Appointing Technical Advisor entered in the Eastern District of Texas Marshall Division, Case No. 2:11-CV-229, on Dec. 10, 2012, 2 pages.
Notice of Compliance with the Court's Motion Practice Order filed in the Eastern District of Texas Marshall Division, Case No. 2:11-CV-229, on Dec. 10, 2012, 8 pages.
Defendants' Responsive Claim Construction filed in the United States District Court, Eastern District of Texas, Marshall Division, Case Nos. 2:11-CV-299 (MHS/CMC), on Dec. 10, 2012, 311 pages.
Affidavit of Engagement filed in the United States District Court, Eastern District of Texas Marshall Division, Case No. 2:11-CV-229, on Dec. 11, 2012, 2 pages.
Plaintiff's Notice of Compliance with the Court's Motion Practice Order filed in the United States District Court, Eastern District of Texas Marshall Division, Case No. 2:11-CV-229, on Dec. 12, 2012, 7 pages.
Google Inc.'s Notice of Compliance with the Court's Motion Practice Order filed in the United States District Court, Eastern District of Texas Marshall Division, Case No. 2:11-CV-229, on Dec. 17, 2012, 7 pages.
Defendants' Reply in Support of Motion to Strike Plaintiff's Initial and Supplemental Disclosures of Asserted Claims and Infringement Contentions under Local Patent Rule 3-1 filed in the United States District Court, Eastern District of Texas Marshall Division, Case No. 2:11-CV-229, on Dec. 21, 2012, 11 pages.

(56) References Cited

OTHER PUBLICATIONS

Plaintiff Beneficial Innovations, Inc.'s Reply to Defendant's Claim Construction Brief filed in the United States District Court, Eastern District of Texas Marshall Division, Case No. 2:11-CV-229, on Dec. 21, 2012, 19 pages.

Plaintiff's Notice of Compliance with the Court's Motion Practice Order filed in the United States District Court, Eastern District of Texas Marshall Division, Case No. 2:11-CV-229, on Dec. 21, 2012, 6 pages.

Plaintiff Beneficial Innovations, Inc.'s Sur-Reply in Response to Defendants' Motion to Strike Plaintiff's Initial and Supplemental Disclosures of Asserted Claims and Infringement Contentions Under Local Rule 3-1 filed in the United States District Court, Eastern District of Texas Marshall Division, Case No. 2:11-CV-229, on Dec. 31, 2012, 7 pages.

Order entered in the Eastern District of Texas Marshall Division, Case No. 2:11-CV-229, on Jan. 2, 2013, 1 page.

Joint Claim Construction Chart filed in the United States District Court, Eastern District of Texas Marshall Division, Case No. 2:11-CV-229, on Jan. 7, 2013, 38 pages.

Joint Motion to Dismiss Dell Inc. filed in the United States District Court, Eastern District of Texas Marshall Division, Case No. 2:11-CV-229, on Jan. 10, 2013, 5 pages.

Order of Dismissal entered in the Eastern District of Texas Marshall Division, Case No. 2:11-CV-229, on Jan. 11, 2013, 1 page.

General Order Regarding Pending Case Transfers entered in the Eastern District of Texas Marshall Division, Case No. 2:11-CV-229, on Jan. 14, 2013, 20 pages.

Joint and Unopposed Motion for a New Trial in a Reassigned Case filed in the United States District Court, Eastern District of Texas Marshall Division, Case No. 2:11-CV-229, on Jan. 28, 2013, 9 pages.

Joint and Unopposed Motion for Entry of a Discovery Order filed in the United States District Court, Eastern District of Texas Marshall Division, Case No. 2:11-CV-229, on Jan. 28, 2013, 16 pages.

Agreed to Motion to Set Briefing Schedule on Cross-Motions for Summary Judgment on Google Inc.'s Complaint for Intervention filed in the United States District Court, Eastern District of Texas Marshall Division, Case No. 2:11-CV-229, on Mar. 1, 2013, 6 pages.

Motion for Summary Judgment that Beneficial Innovations, Inc. is in Breach of its Settlement Agreement with Google Inc. and Memorandum in Support Thereof filed in the United States District Court, Eastern District of Texas Marshall Division, Case No. 2:11-CV-229, on Mar. 1, 2013, 361 pages.

Order Granting Agreed to Motion to Set Briefing Schedule on Cross-Motions for Summary Judgment on Google Inc.'s Complaint for Intervention entered in the Eastern District of Texas Marshall Division, Case No. 2:11-CV-229, on Mar. 5, 2013, 2 pages.

Order re Scheduling Conference entered in the Eastern District of Texas Marshall Division, Case No. 2:11-CV-229, on Mar. 15, 2013, 2 pages.

Order granting Joint Motion for a New Trial Date entered in the Eastern District of Texas Marshall Division, Case No. 2:11-CV-229, on Mar. 15, 2013, 1 page.

Motion to Strike Declaration of Dr. Almeroth and Memorandum in Support Thereof by Google Inc. filed in the United States District Court, Eastern District of Texas Marshall Division, Case No. 2:11-CV-229, on Mar. 21, 2013, 18 pages.

Declaration of D. Clay Holloway filed in the United States District Court, Eastern District of Texas Marshall Division, Case No. 2:11-CV-229, on Mar. 21, 2013, 58 pages.

Notice of Firm Name Change filed in the United States District Court, Eastern District of Texas Marshall Division, Case No. 2:11-CV-229, on Mar. 22, 2013, 3 pages.

Response and Opposition of Google Inc. to the Motion for Summary Judgment filed by Beneficial Innovations Inc. (Dkt. 273) filed in the United States District Court, Eastern District of Texas Marshall Division, Case No. 2:11-CV-229, on Mar. 22, 2013, 309 pages.

Defendants Amazon.com Inc., Expedia, Inc., Scripps Networks, LLC, and Viacom Inc.'s Notice Regarding Cross-Motions for Summary Judgment by Google and Beneficial Innovations filed in the United States District Court, Eastern District of Texas Marshall Division, Case No. 2:11-CV-229, on Mar. 25, 2013, 4 pages.

Agreed Submission of Docket Control Order filed in the United States District Court, Eastern District of Texas Marshall Division, Case No. 2:11-CV-229, on Mar. 29, 2013, 8 pages.

Notice of Firm Name Change filed in the United States District Court, Eastern District of Texas Marshall Division, Case No. 2:11-CV-229, on Mar. 29, 2013, 2 pages.

Amended Joint and Unopposed Motion for Entry of a Discovery Order filed in the United States District Court, Eastern District of Texas Marshall Division, Case No. 2:11-CV-229, on Mar. 29, 2013, 14 pages.

Notice re: Mediator filed in the United States District Court, Eastern District of Texas Marshall Division, Case No. 2:11-CV-229, on Mar. 29, 2013, 3 pages.

Discovery Order entered in the United States District Court, Eastern District of Texas Marshall Division, Case No. 2:11-CV-229, on Apr. 2, 2013, 8 pages.

Docket Control Order entered in the United States District Court, Eastern District of Texas Marshall Division, Case No. 2:11-CV-229, on Apr. 2, 2013, 5 pages.

Amended Notice re: Mediator filed in the United States District Court, Eastern District of Texas Marshall Division, Case No. 2:11-CV-229, on Apr. 2, 2013, 3 pages.

Order Appointing Mediator entered in the United States District Court, Eastern District of Texas Marshall Division, Case No. 2:11-CV-229, on Apr. 3, 2013, 1 page.

Sur-Reply of Google Inc. in Opposition to Beneficial Innovations Inc.'s Motion for Summary Judgment (Dkt. 273) filed in the United States District Court, Eastern District of Texas Marshall Division, Case No. 2:11-CV-229, on Apr. 15, 2013, 8 pages.

Reply of Google Inc. in Support of its Motion to Strike Declaration (Dkt. 279) filed in the United States District Court, Eastern District of Texas Marshall Division, Case No. 2:11-CV-229, on Apr. 18, 2013, 8 pages.

Joint Motion to Dismiss Demand Media, Inc. filed in the United States District Court, Eastern District of Texas Marshall Division, Case No. 2:11-CV-229, on Apr. 24, 2013, 5 pages.

Order of Dismissal entered in the United States District Court, Eastern District of Texas Marshall Division, Case No. 2:11-CV-229, on Apr. 26, 2013, 1 page.

Beneficial Innovations, Inc.'s Sur-Reply to Google's Motion to Strike the Declaration of Dr. Almeroth filed in the United States District Court, Eastern District of Texas Marshall Division, Case No. 2:11-CV-229, on Apr. 29, 2013, 10 pages.

Declaration of David Rosen in Opposition to Google's Motion to Strike the Declaration of Dr. Almeroth filed in the United States District Court, Eastern District of Texas Marshall Division, Case No, 2:11-CV-229, on Apr. 29, 2013, 4 pages.

Notice of Technology Tutorial filed in the United States District Court, Eastern District of Texas Marshall Division, Case No. 2:11-CV-229, on May 14, 2013, 24 pages.

Jury Demand of Third-Party Plaintiff Google Inc. filed in the United States District Court, Eastern District of Texas Marshall Division, Case No. 2:11-CV-229, on May 16, 2013, 2 pages.

Plaintiff Beneficial Innovations, Inc.'s Jury Demand filed in the United States District Court, Eastern District of Texas Marshall Division, Case No. 2:11-CV-229, on May 16, 2013, 2 pages.

Order re: Markman hearing entered in the United States District Court, Eastern District of Texas Marshall Division, Case No. 2:11-CV-229, on May 21, 2013, 2 pages.

Order on Letter Briefs entered in the United States District Court, Eastern District of Texas Marshall Division, Case No. 2:11-CV-229, on May 21, 2013, 1 page.

Joint Statement Regarding Claim Terms for Argment at Markman Hearing Pursuant to Court's May 21, 2013 Order [Dkt. 304] filed in

(56) References Cited

OTHER PUBLICATIONS the United States District Court, Eastern District of Texas Marshall Division, Case No. 2:11-CV-229, on May 29, 2013, 10 pages.
Defendants' Motion for Summary Judgment of Indefiniteness filed in the United States District Court, Eastern District of Texas Marshall Division, Case No. 2:11-CV-229, on May 30, 2013, 17 pages.
Declaration of Stuart M. Rosenberg in Support of Defendants' Motion for Summary Judgment of Indefiniteness filed in the United States District Court, Eastern District of Texas Marshall Division, Case No. 2:11-CV-229, on May 30, 2013, 147 pages.
Unopposed Motion for Oral Argument on Pending Motions Regarding Alleged Breach of Settlement Agreement [Dkt. Nos. 273 and 275] filed in the United States District Court, Eastern District of Texas Marshall Division, Case No. 2:11-CV-229, on Jun. 5, 2013, 17 pages.
Official Action for U.S. Appl. No. 12/754,573 and U.S. Appl. No. 90/011,117, mailed May 24, 2013.
Notice of Allowance for U.S. Appl. No. 12/138,357 and U.S. Appl. No. 90/010,093, mailed Sep. 6, 2011.
Official Action for U.S. Appl. No. 12/167,244, mailed Mar. 7, 2012.
Official Action for U.S. Appl. No. 13/310,572, mailed Jun. 6, 2012.
Official Action for U.S. Appl. No. 12/754,573 and U.S. Appl. No. 90/011,117, mailed Jul. 31, 2012.
Notice of Allowance for U.S. Appl. No. 12/138,357 and U.S. Appl. No. 90/010,093, mailed Aug. 16, 2012.
Deposition of Sheldon F. Goldberg, Feb. 6, 2013, 96 pages.
Official Action for U.S. Appl. No. 13/707,561, mailed Mar. 19, 2013.
"Command & Conquer the First Decade for PC Review," available at http://www.gamespot.com/pc/strategy/commandconquerthefirstdecade/review.html, 1995, 2 pages.
Black, K., "Chapter 32: A Graphical Web Page Counter," in HTML & CGI Unleashed, Sams.net Publishing, 1st Edition 1995, pp. 725-749.
Day, W., "Unofficial Mechwarrier II FAQ—Part 1 (of 2): What is the game like???" Oct. 7, 1996, 37 pages.
December, J., "Chapter 11: Design and Implementation Style and Techniques," in HTML & CGI Unleashed, Sams.net Publishing, 1st Edition 1995, pp. 221-250.
December, J., "Chapter 12: Basic HTML," in HTML & CGI Unleashed, Sams.net Publishing, 1st Edition 1995, pp. 251-278.
December, J., "Chapter 13: Advanced HTML," in HTML & CGI Unleashed, Sams.net Publishing, 1st Edition 1995, pp. 279-302.
December, J., "Chapter 17: Implementation Tools," in HTML & CGI Unleashed, Sams.net Publishing, 1st Edition 1995, pp. 341-359.
Ginsburg, M. "Chapter 19: Principles of Gateway Programming," in HTML & CGI Unleashed, Sams.net Publishing, 1st Edition 1995, pp. 373-390.
Graham, I., A Complete Guide to HTML (Chapters 1, 5, 9), John Wiley & Sons, Inc. (Paul Farrell, ed., 1995), pp. 1-70, 231-278, 349-382.
Newsletter, The Intelligent Gambler, May 1993, No. 3, pp. 1-7.
Oskoboiny, G., "Chapter 31: A Hypertext News Interface," in HTML & CGI Unleashed, Sams.net Publishing, 1st Edition 1995, pp. 711-724.
Pero, C. "Chapter 29: A Web Coloring Book," in HTML & CGI Unleashed, Sams.net Publishing, 1st Edition 1995, pp. 680-690.
Rafter, M., "The Web Is Becoming the Place to Advertise," The Washington Times, Dec. 17, 1995, 4 pages.
Scharf, D., HTML Visual Quick Reference, Que Corporation, 1995, pp. 1-41.
Sherwood, K. Chapter 30: A Campus-Wide Information System, in HTML & CGI Unleashed, Sams.net Publishing, 1st Edition 1995, pp. 691-710.
Ward, T., "Monopoly (1995) for PC Review," GameSpot, available at http://www.gamespot.com/pc/puzzle/monopoly95/review.html, 1995, 1 page.
Wilson, S., World Wide Web Design Guide (Chapters 1, 3, 4, 7, 10), Hayden Books, 1995, pp. 9-28, 81-106, 107-152, 201-246, 297-316.
Notice of Allowance for U.S. Appl. No. 12/754,573 and U.S. Appl. No. 90/011,117, mailed Jul. 23, 2013.
U.S. Appl. No. 12/016,123, filed Jan. 17, 2008 Goldberg.
U.S. Appl. No. 12/167,244, filed Jul. 2, 2008 Goldberg, et al.
Abate; "Advertising Sponsorship Is Growing on the Internet"; Bacon's; Jul. 1, 1995, News clipping.
Abate; "Major Deal to Map Internet Future"; San Francisco Examiner; Dec. 12, 1996; 1 pg.
Abstracts from files in info-mac/comm/inet/web Aug. 18, 1996, pp. 1-45.
Information sheet for "Action Tracker Electronic Voucher System". ADMedium Newsletter, Dec. 1, 1996, pp. 1-19.
"Web News With a Personal Touch: Individual, Inc. Offers Ad-Backed, Customized Information Source"; Advertising Age; Apr. 3, 1995; 66(14); p. 25.
Alsop; "PointCast and Its Wannabes"; Fortune; Nov. 25, 1996; 2 pgs.
Andrews; "User Friendly: PointCast's 'Push' Method Could Be the Next Wave"; Personal Technology; Dec. 1, 1996; 1 pg.
"Archive of Previous Versions of My Home Page"; Free Software Humor & Jokes Personal; Version 3. mid, Oct. 1996 to present; 2 pgs.
Askey; "News You've Asked to Use"; Mediaweek; Jun. 12, 1995; 5(24); p. 20.
"America Online Acquires ImagiNation Network from AT&T"; AT&T New Release; Aug. 6, 1996, pp. 1-2.
O'Connor, "Free E-mail Service Launched by FreeMark"; Bacon's; Oct. 1995; News clipping.
"Their E-mail Could Become Free Mail"; Bacon's; Jul. 7, 1995; News clipping.
Bailey, Steve et al., "A Cautionary Tale in the News", Boston Globe, Aug. 13, 1996, p. D1.
Bank; "Inverted Web: How Net is Becoming More Like Television to Draw Advertisers"; Wall Street Journal; Dec. 13, 1996; 3 pgs.
Bank; "Microsoft Picks On-Line News From PointCast"; Wall Street Journal; Dec. 12, 1996; 1 pg.
Barna, Ed., "Make Money on the Internet, Maybe", Vermont Business Magazine, vol. 24, No. 7, Jul. 1996, p. 50.
Barrie et al.; "The World Wide Web as an Instructional Tool"; Science; Oct. 18, 1996; 274; pp. 371-372.
Basch; "Interchange Online Network—The Elements for Its Success Are Already in Place"; Link-Up; May 1, 1995, 12(3), pp. 8-9; Dialog File 233: Microcomputer Abstracts; 0385575.
Bates; "Electronic Clipping Service. A New Life for SDIs"; Online, Jul. 3, 1994, 18(4); pp. 43-47, 49-5; Dialog File 202: Information Science Abs.; 00184574.
Bell; "NETstuff: Free Personalized Internet news"; PointCast; Feb. 14, 1996; http://www.monitor.ca/monitor/issues/vol3iss7/netstuff.html; 1 p.
Bell; "The Electronic Scholar's Assistant"; Computer in Libraries; Oct. 1990; pp. 15-16; Dialog File 61:LISA; 02087937.
Berst; "'Push' Products Redefine Internet"; PC Week; Nov. 25, 1996; p. 63.
Birman et al., "Exploiting Virtual Synchrony in Distributed Systems" pp. 123-138 1987.
Birman et al., Sun Technology, pp. 90-104 1989.
Borenstein; "Multimedia Electronic Mail: Will the Dream Become a Reality?"; Communications of the ACM; Apr. 1991, 34(4), pp. 117-119.
Brian; "Cookies (Client-Side Persistent Information) and Their Use"; Netscape; 1995; 2 pp.
Brisbin; "AppleSearch: The Latest Version of Apple's Information-Retrieval Tool Makes a Great Internet Clipping Service"; MacUser; Jun. 1, 1995, 11(6), p. 46, Dialog File 233: Microcomputer Abstracts; 0387029.
Brown; "LapLink Keeps in Touch"; PC Magazine; Jan. 7, 1997; p. 60.
Bulterman et al., A Structure for Transportable, Dynamic Multimedia Documents, USENIX, pp. 137-154, 1991.
"Marketing: Ads Delivered in Real Time"; Business Communications Company, Inc.; Jan. 1996; 2 pgs.

(56) References Cited

OTHER PUBLICATIONS

"The Hook Is the Look of the Journal"; Business Week; Aug. 16, 1993; No. 3332; p. 102A.
Carrig et al.; "Ziff-Davis Electronic Information Acquires SandPoint"; PR Newswire San Francisco; Mar. 1, 1994; 3 pgs.
"Cash is the Riddler's Draw"; Jun. 8, 1995; 1 pg.
"The World Wide Web as a Universal Interface to Government Services"; Center for Technology in Government, University at Albany/SUNY; 1996; 136 pgs.
Clarke; "Cookies"; Xamax Consultancy Pty Ltd.; 1996-2001; pp. 1-10.
Cleland; "A Gaggle of Web Guides Vies for Ads"; Advertising Age; Apr. 17, 1995; News clipping.
Conhaim; "The Year in Review"; Link-Up; Nov./Dec. 1996; 13(6); pp. 5, 34+.
Continua Reports—Sep. 1995, pp. 1-27.
Cooperstock et al.; "Why Use a Fishing Line When You Have a Net? An Adaptive Multicast Data Distribution Protocol"; USENIX Technical Conference; Jan. 22-26, 1996; pp. 343-352.
"Journalist: A New Prodigy Add-On"; DB Svcs.; 1994; 1 pg.
Derringer; "Freemark Delays Release of Free E-Mail Until April"; Bacon's; Feb. 19, 1996; pp. 1, 20.
Marketing Plan for Manifest Destiny, Inc., 1994.
"N.Y. Times Mon. unveiled World Wide Web site, The New York Times on the Web. (Comm Daily Notebook)" Communications Daily, Jan. 23, 1996, v.16, n.15, p. 6(2), Dialog Accession No. 08418048 in Dialog® File 148.
E-mail and voicemail systems. (Evolution of the Paperless Office: Legal Issues Arising out of Technology in the Workplace, part 1), Employee Relations Law Journal, Winter 1995, 21, n.3, 5-36, Dialog Accession No. 08361735 in Dialog® File 148.
"Individual, Inc. elects Michael E. Kolowich as new CEO" News Release, Sep. 3, 1996, Dialog Accession No. 06570702 in Dialog® File 16.
Individual, Inc., announces agreement to acquire FreeLoader, Inc., News Release Jun. 2, 1996, Dialog Accession No. 06306172 in Dialog® File 16.
"Individual, Inc.—company report" Investext, May 1, 1996, pp. 1-16, Dialog Accession No. 06289588 in Dialog® File 16.
"Media tracking service watches cyberspace: RTV offers ewatch to monitor internet" PR Newswire Feb. 20, 1996, Dialog Accession No. 005811154 in Dialog® File 621.
"Individual Inc. named breakout company of the year by the Information Industry Association" Business Wire Oct. 23, 1995, p. 10231026, Dialog Accession No. 05782514 in Dialog® File 16.
"Online data push" InformationWEEK n. 619, pp. 61-62, 66, 68, Feb. 24, 1997, Dialog Accession No. 5529660 in Dialog® File 2.
"Ad-Free" Information Week, n.614, pp. 68, 70, Jan. 20, 1997, Dialog Accession No. 5498711 in Dialog® File 2.
"The Reuters Business Report" Asia-Pacific Business Report Mar. 4, 1996, Dialog Accession No. 2819020 in Dialog® File 611.
"MCI acquires Equifax's stake in FYI Online" Electronic Information Report, Oct. 21, 1994 v.15, n.38, Dialog Accession No. 02592239 in Dialog® File 636.
"Patterns of use, exposure in paper's audiotex system" Newspaper Research Journal (INRS), 16(1):48-59 1995, Dialog Accession No. 02586508, in Dialog® File 484.
"Despite summer doldrums, online audience claims 5.6% to 5.52 million" Information & Interactive Services Report, Oct. 7, 1994 v.15, Dialog Accession No. 02541536 in Dialog® File 636.
"Dial-up electronic media director® at low cost introduced by PR Data Systems" News Release Feb. 10, 1989, p. 1, Dialog Accession No. 02140932 in Dialog® File 16.
"Paley opens communications consulting firm" PR Newswire Sep. 30, 1983, Dialog Accession No. 01906440 in Dialog® File 148.
"Suddenly, Videotex is finding an audience: Boston CitiNet . . . free videotex svcs & charging for advertising" Business Week, Oct. 19, 1987, pp. 92, 94 Dialog Accession No. 01784027 in Dialog® File 16.

"Newsnet offers an electronic news clipping service called NewsFlash" Marketing News, Nov. 25, 1983, p. 23, Dialog Accession No. 00969003.
"PC World Online chooses Lanacom to deliver next generation "push" software to more than half a million monthly online users" Business Wire, Apr. 9, 1997, Dialog Accession No. 00758089 in Dialog® File 621.
"Diamond Multimedia ships the first K56FLEX modems for Macintosh computers" Business Wire Apr. 8, 1997, Dialog Accession No. 00757610 in Dialog® File 621.
"Internet study shows push technology takes up significant bandwidth . . . Sixth International World Wide Web Conference" Business Wire Apr. 7, 1997, Dialog Accession No. 00757278 in Dialog® File 621.
"Diamond Multimedia ships its first 56,000 . . . now available at retail" Business Wire Mar. 24, 1997, Dialog Accession No. 00755527 in Dialog® File 621.
"Florida business news service named among "World's Best" internet newspaper publishers by editor & publisher" Business Wire Apr. 1, 1997, Dialog Accession No. 00753847 in Dialog® File 621.
"ForeFront launches WebWhacker 3.0—. . . just got better" PR Newswire Mar. 24, 1997, Dialog Accession No. 00750722 in Dialog® File 621.
"IFN announces instant news service; . . . ILX to become first distributor" Business Wire Mar. 18, 1997, Dialog Accession No. 00749159 in Dialog® File 621.
"Scala's new CEO brings Madison Avenue and Hollywood perspective to multimedia computer television" PR Newswire Mar. 17, 1997, Dialog Accession No. 00748917 in Dialog® File 621.
"Simware announces alliance with Intermind to push enterprise data to users' desktops" Business Wire Mar. 12, 1997, Dialog Accession No. 00748045 in Dialog® File 621.
"McAfee announces PC Medic 97 and NetMedic 97; . . . by proactively preventing common Windows 95 problems" Business Wire Mar. 18, 1997, Dialog Accession No. 00747856 in Dialog® File 621.
"FirstFloor software brings 'push' technology to both businesses and consumers through deals with Microsoft and America Online" PR Newswire Mar. 13, 1997, Dialog Accession No. 00746694 in Dialog® File 621.
"BackWeb to provide push technology for Microsoft Internet Explorer 4.0" PR Newswire Mar. 12, 1997, Dialog Accession No. 00746003 in Dialog® File 621.
"Aurum Software delivers next phase in internet push technology for sales forces" PR Newswire Mar. 11, 1997, Dialog Accession No. 00744816 in Dialog® File 621.
"CNET and inCommon announce delivery of news.com . . . for desktop deliver of CNET's popular news.com content" Business Wire Mar. 10, 1997, Dialog Accession No. 00744544 in Dialog® File 621.
"Macromedia's Shockwave brings animation and entertainment to Internet push technology" PR Newswire Feb. 25, 1997, Dialog Accession No. 00744301 in Dialog® File 621.
"ClariNet & Interest!ALERT announce push technology . . . to ClariNet's 200 ISPs and 1.5 million users" Business Wire Mar. 10, 1997, Dialog Accession No. 00744113 in Dialog® File 621.
"NETdelivery announces release of 1.1—a unique push product for the Internet" PR Newswire Mar. 1997, Dialog Accession No. 00744055 in Dialog® File 621.
"StarBurst Communications to bring true "push" technology to the Internet" Business Wire Mar. 3, 1997, Dialog Accession No. 00743147 in Dialog® File 621.
"McAfee launches VirusScan 3.0; . . . detects 100% of viruses in latest secure computing magazine review" Business Wire Mar. 3, 1997, Dialog Accession No. 00741540 in Dialog® File 621.
"McAfee launches enterprise SecureCast; first to deliver . . . ; McAfee and BackWeb pioneer new software distribution channel" Business Wire Feb. 28, 1997, Dialog Accession No. 00740253 in Dialog® File 62.
"Technology industry & corporate customers push Marimba to the top" PR Newswire Feb. 24, 1997, Dialog Accession No. 00737499 in Dialog® File 621.

(56) References Cited

OTHER PUBLICATIONS

"Ariel Resources first quarter results, revenue increases 109 percent of comparable period last year," Business Wire, Feb. 13, 1997, Dialog Accession No. 00736050, in Dialog® File 621.
"Game TV dedicated to the game player in all of us . . . new half-hour show," PR Newswire, Feb. 19, 1997, Dialog Accession No. 00735308, in Dialog® File 621.
"Interest!ALERT provides push technology to Island's web site visitors" Business Wire Feb. 4, 1997, Dialog Accession No. 00733654 in Dialog® File 621.
"NETdelivery and iCat announce strategic partnership" PR Newswire Feb. 11, 1997, Dialog Accession No. 00733524 in Dialog® File 621.
"Infoseek delivers personalized, current news via e-mail" PR Newswire Feb. 13, 1997, Dialog Accession No. 00731890 in Dialog® File 621.
"TechWeb's breaking news and information now "pushed" . . . techWeb channel keeps . . . " Business Wire Feb. 12, 1997, Dialog Accession No. 00730658 in Dialog® File 621.
"IRG acquires Intertect," PR Newswire, Dec. 2, 1996, Dialog Accession No. 00703704, in Diailog® File 621.
"Home information videotex services will cost subscribers $78/mo by 1990, according to Intnl Resource Development" VideoPrint, Aug. 10, 1981, p. 7, Dialog Accession No. 00679106 in Dialog® File 16.
"Home information videotex services are expected to be widely available . . . for the use of the new services" News Release Jul. 27, 1981, pp. 1-61, Dialog Accession No. 00659126 in Dialog® File 16.
"eWorks! Inc. announces eWatch WebAlert—powerful, comprehensive, efficient web site monitoring designed for the corporate user" PR Newswire Aug. 20, 1996, Dialog Accession No. 00655743 in Dialog® File 621.
"TMS and Mercury mail to develop personalized internet e-mail products" PR Newswire Jun. 14, 1996, Dialog Accession No. 00628917 in Dialog® File 621.
"ZD Net celebrates first year of web advertising program as top-grossing content provider with 63 April advertisers," PR Newswire, Apr. 15, 1996, Dialog Accession No. 00602035, in Dialog® File 621.
"Time Warner's Pathfinder, Compuserve Inc. and Open Market Inc. Announce a Breakthrough for the Internet," PR Newswire, Apr. 11, 1996, Dialog Accession No. 00601438 in Dialog® File 621.
"Sun-Sentinel Launches Interactive Real Estate Service on the Internet," PR Newswire, Apr. 11, 1996, Dialog Accession No. 00600800 in Dialog® File 621.
"Harbinger Corporation Announces TrustedLink INP; The most comprehensive solution for easily building and maintaining a corporate Web site," Business Wire, Mar. 25, 1996, Dialog Accession No. 00594210 in Dialog® File 621.
"HP Internet Advisor Enhanced to Make Internetwork Testing Quicker and Easier; Windows 95 Interface Helps to Isolate Network Problems," Business Wire, Mar. 15, 1996, Dialog Accession No. 00590687, in Dialog® File 621.
"HFS and Century 21 announce major initiatives . . . in providing one-stop shopping for consumers," Business Wire, Mar. 12, 1996, Dialog Accession No. 00589418, in Dialog® File 621.
"Starfish Software ships Earthtime 2.0; The essential world clock . . . as a Netscape Navigator 2.0 plug-in," Business Wire, Mar. 12, 1996, Dialog Accession No. 00589215, in Dialog® File 621.
"Boeing projects continued airline profitability, traffic growth, rational airline orders," PR Newswire, Mar. 6, 1996, Dialog Accession No. 00586684, in Dialog® File 621.
"UCA&L announces new Internet division . . . to help clients reach, communicate with, and market to customers online," Business Wire, Mar. 5, 1996, Dialog Accession No. 00586617, in Dialog® File 621.
"IDG to launch Javaworld on World Wide Web," PR Newswire, Feb. 2, 1996, Dialog Accession No. 00576930, in Dialog® File 621.

"Online Interactive's FreeShop Online achieves one million electronic orders . . . ," Business Wire, Feb. 7, 1996, Dialog Accession No. 00575091, in Dialog® File 621.
"Starfish Software announces corporate 10-user paks . . . now available in new money-saving 10-packs" Business Wire Feb. 6, 1996, Dialog Accession No. 00574412 in Dialog® File 621.
"Starfish Software Inc. introduces "EarthTime"; . . . for online preview and download" Business Wire Jan. 23, 1996, Dialog Accession No. 00569318 in Dialog® File 621.
"Starfish Software Inc. introduces "EarthTime"; . . . for online preview and download" Business Wire Jan. 22, 1996, Dialog No. 01338030 in Dialog® File 621, (full text) pp. 1-4.
"Starfish Software Inc. introduces "EarthTime"; . . . for online preview and download" Business Wire Jan. 23, 1996, Dialog No. 01338428 in Dialog® File 621, (full text) pp. 1-4.
"New classified Central Bank houses rates for over 5,000 U.S. publications" PR Newswire Jan. 17, 1996, Dialog No. 01336756 in Dialog® File 621, (full text) pp. 1-2.
"Microsoft products now available through online interactive's atOnce software" Business Wire Jan. 15, 1996, Dialog Accession No. 00565507 in Dialog® File 621.
"HFS Incorporated, CENTURY 21 Real Estate Corporation . . . consumer real-estate information service" Business Wire Jan. 10, 1996, Dialog Accession No. 00564626 in Dialog® File 621.
"Gartner Group announces internet-based ovantage service" Business Wire Jan. 2, 1996, Dialog Accession No. 00563106 in Dialog® File 621.
"Adobe Systems and PicturWeb form alliance . . . provide consumers with unique digital photo offering" Business Wire Jan. 4, 1996, Dialog Accession No. 00561903 in Dialog® File 621.
"CompasSearch web server search . . . add-on search server adds value to WWW sites" Business Wire Jan. 3, 1996, Dialog Accession No. 00560996 in Dialog® File 621.
"Starfish Software first to leverage Sun's Java . . . Sun's HotJava and Netscape's Navigator 2.0 . . . " Business Wire Nov. 13, 1995, Dialog Accession No. 00545472 in Dialog® File 621.
"'Clickshare' one-bill, universal-password access . . . early next year" PR Newswire Sep. 15, 1995, Dialog Accession No. 00544269 in Dialog® File 621.
"The world's most useful online business library adds full-text archives of The New York Times" Business Wire Oct. 31, 1995, Dialog Accession No. 00543679 in Dialog® File 621.
"Newsday direct available to Prodigy subscribers at no additional fee" Business Wire Oct. 26, 1995, Dialog Accession No. 00543429 in Dialog® File 621.
"Virtual Dorm tops [sic] into real life of students; fully wired dorm suite puts students' live on the Web for all to see," PR Newswire, Oct. 31, 1995, Dialog Accession No. 00543165, in Dialog® File 61.
"Newsnet unveils major new enhancements" PR Newswire May 3, 1995, Dialog Accession No. 00516785 in Dialog® File 621.
"Tektronix brings embedded-software engineers more tools for decreasing time to market" News Release Apr. 7, 1995, Dialog Accession No. 00516600 in Dialog® File 621.
"IDG books Worldwide, Inc. and Mecklermedia Corporation sign agreement to publish ten new internet/virtual reality books" PR Newswire Apr. 17, 1995, Dialog Accession No. 00514153 in Dialog® File 621.
"Newsnet to convert online system to PLS search software" PR Newswire Nov. 15, 1994, Dialog Accession No. 00502206 in Dialog® File 621.
Online services growing fast; 32.5% increase in subscribers; Jupiter projects 5 million online by end of 1994 PR Newswire Mar. 9, 1994, Dialog Accession No. 00471819 in Dialog® File 621.
"News Alert to Introduce Real-Time Electronic Clipping Service"; Information Today; Jun. 1, 1995, 12(6); p. 14; Dialog File 233: Microcomputer Abstracts; 0387603.
"Dateline: Princeton, NJ: Financial Times and the Wall Street Journal Together on Dow Jones News/Retrieval"; Information Today; Apr. 1, 1995, 12(4); p. 1, Dialog File 233: Microcomputer Abstracts; 0382372.
"Newsnet and American Business Information present business America—online" News Release Mar. 18, 1993, Dialog Accession No. 00350155 in Dialog® File 621.

(56) References Cited

OTHER PUBLICATIONS

"Sky Computers chosen as compute processor for Broadcast Data Systems, Inc." News Release Aug. 24, 1992, Dialog Accession No. 00335658 in Dialog® File 621.
"Telebase launches electronic clipping services" PR Newswire May 7, 1991, Dialog Accession No. 00295190 in Dialog® File 621.
"On-line software maps DB2 direction" News Release Mar. 27, 1991, Dialog Accession No. 00294253 in Dialog® File 621.
"NewsNet Newly Enhanced NewsFlash"; Information Today; Apr. 1, 1990, 7(4); p. 4, Dialog File 233: Microcomputer Abstracts; 0254449.
"Search Services & Gateways"; Database Searcher, Jun. 1, 1991, 7(5); pp. 31-33; Dialog File 233: MicroComputer Abstracts; 0242553.
"DataTimes Announces Major New Search Features, Price Cuts, Search Services & Gateways"; Database Searcher, Jun. 1, 1990, 6(5), pp. 27-28; Dialog File 233: Microcomputer Abstracts; 0219825.
"GE Debuts GEnie in Europe, Introduces Corporate Clipping Service"; Link-Up; Jun. 1, 2990, 7(3); pp. 1, 12, Dialog File 233: Microcomputer Abstracts; 0219292.
"McGraw-Hill news available on Dialcom" News Release Jul. 27, 1988, Dialog Accession No. 00199385 in Dialog® File 621.
"ADR introduces electronic meeting scheduler—new ADR/email facility crosses time zones and data lines" News Release May 31, 1988, Dialog Accession No. 00192162 in Dialog® File 621.
"French firm unveils first Lotus add-in . . . and unattended electronic mail" News Release Nov. 19, 1987, Dialog Accession No. 00175902 in Dialog® File 621.
"Nexis® adds radio transcripts of Dougherty Daily ad broadcasts" Mar. 11, 1986, Dialog Accession No. 00126985 in Dialog® File 621.
"Mead Data Central adds Trinet databases to Exchange™" Jan. 17, 1986, Dialog Accession No. 00120619 in Dialog® File 621.
"Telecommunications information from Phillips Publishing available online through Newsnet" Jun. 12, 1985, Dialog Accession No. 00117476 in Dialog® File 621.
"New custom file capability for Nexis" May 1, 1985, Dialog Accession No. 0017314 in Dialog® File 621.
"Information Access Company's 10 online databases to be offered through Mead Data Central services" May 1, 1985, Dialog Accession No. 00117313 in Dialog® File 621.
"New subject group files, pricing for Nexis®" May 1, 1985, Dialog Accession No. 00117288 in Dialog® File 621.
"Federal Reserve Board and Consumer Credit Intelligence from Business Publishers, Inc. enhances Newsnet database" Jun. 10, 1985, Dialog Accession No. 00116869 in Dialog® File 621.
"Comprehensive software directory now available on Newsnet" Aug. 29, 1985, Dialog Accession No. 00115864 in Dialog® File 621.
"Internet Current Awareness Service" Searcher: Magazine/Database Prof., v.3 n.10 p. 8(1) Nov./Dec. 1995, Dialog Accession No. 00086120 in Dialog® File 256.
"News Alert to Introduce Real-Time" Information Today, v.12 n.6 p. 14(1), Jun. 1995, Dialog Accession No. 00078844 in Dialog® File 256.
"Online clipping services deliver" PC Today, v.9 n.3 p. 20(4), Mar. 1995, Dialog Accession No. 00075350 in Dialog® File 256.
Dieberger; "Browsing the WWW by Interacting With a Textual Virtual Environment—A Framework for Experimenting With Navigational Metaphors"; Hypertext '96; 1996; pp. 170-179.
Digital Espresso for Aug. 27, 1996, http://www.mentorsoft.com/DE/jn960827.html.
"A Newspaper with a Difference on the Internet"; Direct Marketing Magazine; Mar. 1995; 57(11); p. 11.
"Brave New Medium"; Economist; Jun. 29, 1996; 339(7972); pp. 15-16; UK 17-18.
Egan; "Online Clipping Services Deliver: Electronic Tools Retrieve News You Can Use"; PC Today; Mar. 1, 1995, 9(3), pp. 20-24, Dialog File 233: Microcomputer Abstracts; 0379524.
"Individual, Inc. Sees Strong Sales, Subscriber Growth"; Electronic Information Report; Feb. 24, 1994; 16(8).
"Leading Newspapers Ramp Up Interactive Advertising Developments," Electronic Marketplace Reports, vol. 9, No. 4, Feb. 21, 1995, p. 4.
Eng; "Bits & Bytes"; Business Week; Jul. 29, 1996; No. 3486; p. 68A(1).
Hauswirth et al. "A component and communication model for push systems1", presented at ESEC/FSE 00—Joint 7th European Software Engineering Conference 7th ACM SIGSOFT International Symposium on the Foundations of So, Sep. 6-10, 1999, Toulouse, France, pp. 1-20.
Estavanick, "Designing On-Line, Multiplayer Games", in Game Developer, pp. 14-21-, Premeir 1994.
Farrow; "A Route to the Internet" Open Computing, Jun. 1, 1994, 11(6), pp. 105-107, Dialog File 233: Microcomputer Abstracts; 0351749.
Finnie; "Free News You Can Use"; pccomputing.com; 1 pg.
Finnie; "Look, Ma! No Brower"; PC Magazine; Jan. 7, 1997; p. 60.
Flaherty, Francis, "Cyberspace Swindles: Old Scams, New Twists," The New York Times, Jul. 16, 1994, p. 25.
Flynn et al.; "The Daily Me: Laying Out Tomorrow's (Electronic) News"; PC Magazine; Sep. 14, 1993; 12(15); p. 29(1).
Forsdick et al., "Initial Experience with Multimedia Documents in Diamond" pp. 99-113 (ed. H.T. Smith) 1984.
Frank, Howard, "Telcos and Newspapers Must Cooperate to Win," Networking Management, vol. 10, No. 7, Jun. 1992, p. 46.
"Free Software & Tips"; Free Software Humor & Jokes Personal; date unknown; 4 pgs.
Frook, CommunicationsWeek, Interactive Age, News to the desktop: Vendors deliver personalized news to users via the Net, 3 pgs. 1996.
Frook; "PointCast Gets Personal"; PointCast; Feb. 22, 1996; 1 p.
Fryxell; "NewsNet Stands Alone—If This Service's 800-Pluss Full-Text Industry Newsletters Can't Fill Your Research Needs, Then Nothing Can"; Link-Up; Nov. 1, 1994, 11(6), pp. 8-9; Dialog File 233: Microcomputer Abstracts; 0366803.
"Game Credits: Published Games"; International hobo; (date unknown); 7 pp.
Gibson; Skills Count At Network Startup—INS Features Design, Operations Specialists for Hire; PC Week; Jan. 23, 1995, 12(3); p. 100; Dialog File 233: Microcomputer Abstract; 0373166.
Gifford et al.; "Boston Community Information System 1987-1988"; Massachusetts Inst. of Tech., Cambridge. Lab for Computer Science; May 1989, p. 250; Dialog File 6: NTIS; 1415753.
Gifford et al.; "Clipping Service User's Manual (Version 1.2)"; Massachusetts Inst. of Tech., Cambridge. Lab. for Computer Science; Sep. 1987, p. 28, Dialog File 6: NTIS; 1326877.
Goff, Leslie, "Wash Away Those Job-Hunting Jitters. The Opportunities Are Endless on the Web," .Computerworld, Oct. 31, 1996, p. 12.
Goldberg; "The History of Computer Gaming Part 5—PLATO Ain't Just Greek"; (date unknown); 3 pp.
Gomes; "Cookies"; Feb. 13, 1996; 8 pp.
Graetz; "The Origin of Spacewar"; Creative Computing, 39 E> Hanover Avenue, Morris Plains, NJ 07950; 1981; 15 pp.
Gutman, "News You Need to Succeed: Electronic Newspapers' Boost Your Effectiveness"; Success, Mar. 1991, 38(2), p. 12; Dialog File 2: INSPEC; 03905093.
Haar; "Young Turks Point the Way Offline"; CyberMedia; Oct. 14, 1996; 2 pgs.
Harler; "Distribute Coupons via E-mail" Bacon's; Jan. 1996; News clipping.
Hassett et al.; "Technical Excellence Online Winner: The PointCast Network"; PC Magazine Online; 1996; 1 pg.
Hauss; "Technology Gives Early Warning of News Breaks"; Public Relations Journal, May 1995; pp. 18-22.
Hawkins, "Electronic Advertising on Online Information Systems"; Online; Mar. 1994, 18(2); pp. 26-39; Dialog File 15: ABI/Inform; 00836506.
Heckhart, Christine et al., "Your High-Speed Data Services Buy Comes Down to Deciding If One Service Can Do It All or If You'll Need the Best of Breed," Network World, Jun. 12, 1995, p. 47.

(56) References Cited

OTHER PUBLICATIONS

Heywood, "Users Get a Closer Look at Virtual Private Networks—The Lates Monitoring Tools From Service Providers Make Sure Customers Are in the Know About Their Virtual Private Networks"; Data Communications; Jun. 1, 1994, 23(9), pp. 85-90, Dialog File 233: Microcomputer Abstracts; 0351803.
Hollis et al.; "Addressing Customers' Wireless Data Service Needs"; Telesis; Oct. 1995; No. 100; pp. 56-57.
Horton, "The Power of ImaginNation", in Advertising Age, Mar. 7 1994.
"ICC Help: FIDErating"; http://www.chessclub.com/help/FIDErating, 3 pgs., (printed on Mar. 2, 2005).
"ICC Help: Ratings"; http://www.chessclub.com/help/ratings, 2 pgs., (printed on Mar. 2, 2005).
Bibliografia Utilizzata per la stesura della tesi, http://digilander.iol.it/lmassaron/biblio.html, date unknown, pp. 1-9.
"ELO Rating System"; http://en.wikipedia.org/wiki/ELO_rating_system, 5 pgs., (printed on Mar. 2, 2005).
"Internet Chess Club"; http://en.wikipedia.org/wiki/Internet_Chess_Club, 2 pgs., (printed on Mar. 2, 2005).
"Case's Ladder: The World's Largest Gaming League!"; http://www.igl.net, 1 pg., (printed on Mar. 2, 2005).
"New Site Design & Features"; http://www.igl.net/wwwstaff/messages/66.shtml, 4 pgs., (printed on Mar. 2, 2005).
"Mech Warrior 2: 31st Century Combat"; http://www.mechreg.com, 1 pg., (printed on Mar. 2, 2005).
"The History of the Mech warrior 2: Registry"; http://www.mechreg.com/history.htm, 2 pgs., (printed on Mar. 2, 2005).
"The Mech Warrior: Registry, Level 2 Ladder, Top 25"; http://www.mechreg.com/ladder2.htm, 2 pgs., (printed on Mar. 2, 2005).
"For People New to IGS PANDANET"; http://www.pandanet.co.jp/English/guide/intro.htm, 2 pgs., (printed on Mar. 2, 2005).
Huang et al., Software-Practice and Experience, 24(9):785-800 1994.
Hyland, IAB Advertising ABC's, "Why Internet Advertising?", http://www.iab.net/advertise/content/adcontent.htm.
"Journalist Delivers Your Own Personalized Newspaper"; IAC News; 1997; 1 pg.
"PED Delivers Personalized Newspapers to Users Desktops"; IAC News; 1997; 2 pgs.
EC2@USC—Digital Commerce Center—Internet Advertising, 1997-2001, EC2@USC, pp. 1-7.
Internet Marketing Discussion list archive: Re: Fees for Web pages etc, Nov. 29, 1995, pp. 1-2.
Internet Marketing Discussion list archive: Rotating sponsor banners?, Nov. 30, 1995, pp. 1-2.
Internet Marketing Discussion list archive: Rotating sponsor banners?, Dec. 2, 1995, pp. 1-2.
Internet Marketing Discussion list archive: Re: Rotating sponsor banners?, Dec. 5, 1995, pp. 1-2.
The Journal of American Underground Computer, ISSN 1074-3111, vol. 1, issue 8, Apr. 21, 1995, 44 pages.
Jackson et al.; "InterMail: A Prototype Hypermedia Mail System"; Hypertext '91 Proceedings; Dec. 1991, pp. 405-409.
"Journalist User Guide" PED Software Corportation,1994, 150 pp.
Kirkpatrick; "What's Selling on the Internet"; Kirkpatrick Enterprises; Inc.; 1996-2000; pp. 1-36.
Koster; "Ralph's Page: Online World Timeline"; Ralph's Website, gaming section; created Mar. 4, 2000, last updated Feb. 20, 2002; 37 pp.
Kramer; "Remote Possibilities: Gateways Let Remote Users Exchange Mail via Web Browsers"; PC Week; Apr. 15, 1996, 13(15); 3 pages; Dialog File 233: Microcomputer Abstracts; 0420777.
LaRosa, "Marketing Slays the Downsizing Dragon"; Information Today; Mar. 1, 1992, 9(3), pp. 58-59, Dialog File 233: Microcomputer Abstracts; 0271126.
"LaserCard™ enables quiet, high quality printing on IBM system/ 36 and system/38 midrange computers" News Release, Mar. 6, 1988.
Ledbetter et al. "Gambling Online? You Bet!", May 3, 1999, pp. 1-9.
Levine; "Knowing Where You Browse?"; comp.society.privacy; Sep. 21, 1995; pp. 1-6.
Levitz; "Tallahassee Free-Net: The Keystone of a Florida Network of Community Information Systems"; Journal of Educational Media and Library Science; Summer 1994; 31(4); pp. 364-373.
Lewis, Peter H., "The New York Times Introduces a Web Site", The New York Times, Jan. 22, 1996, p. C7.
Lexis database, "FreeMark Communications and SportsTicker enter online sports information distribution agreemen; Popular sports content first of a series of innovative content offerings to be delivered free to email users" Business Wire 1996, 1 page.
Lexis database, "W3.com Introduces first visitor-tracking software for web sites; software increases interactivity, provides powerful tracking and customization features while simplifying web site development" Business Wire 1995.
Lexis database, "Firm to offer free net mail" Computerworld 1995, 1 page.
Lexis database, "No shortage of online choices" Mill Hollow Corporation, DM News, 1995, 3 pages.
Lexis database, "Pressing E-mail's Mass-Market Advantage; Printable coupons attached to elec. messages make 1-1 marketing a possibility" Mill Hollow Corporation, DM News 1995.
Lexis database, "Cover Story: free mail, part two; two companies announce free internet e-mail services" IAC (SM) Newsletter Database (TM), Future Systems, Inc, Multimedia & Videodisc Monitor 1995.
Lexis database, "Productview interactive to launch free email service this year" IAC (SM) Newsletter Database (TM) M2 Communications, M2 Presswire 1995, 2 pages.
Lexis database; "On-Line Mortgage Service Will Operate Over Internet"; National Thrift News, Inc.; Oct. 31, 1994; 3 pgs.
Lexis database; "FreeLoader, Inc. Announces the First Service to Deliver the Internet Offline"; PR Newswire Association, Inc.; Jan. 19, 1996; 3 pgs.
Lexis database, "Individual Launches Newspage Direct" PR Newswire 1996, pp. 1-2.
Lexis database, "Getting Wired With ST"; Times Newspapers Limited; Jan. 22, 1995; 1 pg.
Lexis database, "The marketers are on-lining up for you; interaction ads, other gimmicks kick off the internet's new era" The Washington Post 1995.
"List of Some of Rajiv's Technology Related Work"; Home Free Software Humor & Jokes Personal; date unknown; 5 pgs.
Lockwood, "All the News That's Fit to Telecommunicate"; A+: The Independent Guide for Apple Computing; Jun. 1986, 4(6), pp. 93-96; Dialog File 233: Microcomputer Abstracts; 0123714.
Lu; "Computers Making Inroads in Crossword Market"; Crossword Tournatment: New York Times; Aug. 19, 1996.
Maddox; "More Hits for Your Web Sites"; Net Acess; Feb. 26, 1996; News clipping.
"Madison Avenue's OnLine Leaps" Newpaper Article, 1 page.
Geocrawler, the Knowledge Archive, from Tim Maffett Sep. 4, 1996, re: Chime script—[and other Chime news], pp. 1-3.
Markowitz; "War Decwar Mega Wars: Multiplayer Online Tactical Combat"; Sep. 1, 2000; 6 pp.
Makulowich; "A Net Explorer's Log"; Online; Nov. 1, 1996, 20(6), pp. 40-42; Dialog file 233: Microcomputer Abstracts; 0441925.
Matyjewicz; "The E-Tailer's Digest: Discussing Retailing Online"; Gifts & Dec; 1997; pp. 1-5.
Memon; "Free E-mail Is Here, But With Ads Aplenty"; Bacon's; Jul. 27, 1995; News clipping.
"Implementing On-Line Couponing"; Merchandising/Marketing; 1996 News clipping.
Miller; "News On-Demand for Multimedia Networks"; ACM Multimedia; 1993; pp. 383-392.
Millison, "Games People Play"; Daily Spectrum, Jun. 9, 1995; 7 pgs.
Mitchell, PC World, "Two Free Programs Deliver News to Your PC" 1996, 1 page.
Mohan, "Free mail on the net forces users to trade off privacy," Computerworld, Inc., Nov. 27, 1995.
Microsoft Explorer Web page, 1995 Microsoft Corporation.

(56) References Cited

OTHER PUBLICATIONS

Nieuwenhuysen et al.; "Document+program Hybrids in the Internet, and Their Impact on Information Transfer in Science and Technology"; University Library, Vrije Universiteit Brussel, Pleinlaan 2, B-1050 Brussels—Belgium; http://educatet1.lib.chalmers.se/iaul/proceedcontents/fullpaper/nieuw.html; 2 pp.
Nelson; "Information Distribution System: PointCast I-Server Pleases All"; Info World; Nov. 18, 1996; p. IW/3 and IW/8.
"PED Software Introduced Journalist, Software That Allows Users to Retrieve and Print Data From the Prodigy Online Service"; Newsbytes News Network; Apr. 5, 1994; Dialog 01014310.
"Mercury Center Intros NewsHound Clipping Service"; Newsbytes Ness Network; p. N/A.
"Marketing: Ads Delivered in Real Time"; Northern Light Technology, LLC; 1997-2002; 2 pgs.
O'Connell; "Turning on to Screen Savers"; IAC News; 1997; 2 pgs.
O'Connor; "Ads to Pay for Free E-Mail Service"; Bacon's; Jun. 29, 1995; News clipping.
Ojala, "Staying Alert via Online Clipping Services"; Online; Sep. 1991; 15(5), pp. 80-82.
Online Interactive, Inc., miscellaneous advertising, Seattle, WA.
"NewsHound Sniffs Out Stories"; Open Systems Today; Nov. 28, 1994; No. 164; p. 36.
Overton, PC World, "PointCast 1.1: More Content for News Junkies" 1997.
"PAPA 5"; Feb. 1995; Feb. 1, 1995; http://www.ece.umd.edu/~dstewart/pinball/PAPA5/guide.txt.
"PAPA 6, 1998 World Pinball Championships"; Feb. 1998; http://www.glue.umd.edu/~dstewart/pinball/Papa 6/.
PCN, PointCast, Inc., PointCast 1.0, "We created a splash screen explaining the software," Feb. 1996.
Phillips, Communications of the ACM, 34(7):75-83 1991.
Phillips; "An Interpersonal Multimedia Visualization System"; IEEE Computer Graphics & Applications;1991, pp. 20-27.
Pinella et al.; "Individual, Inc. Announced Today Shipment of a New Release of Its Flagship"; Businesswire; Sep. 18, 1995; 2 pgs.
Postel et al., Information Sciences Institute, ISI Research Report, "The ISI Experimental Multimedia Mail System" pp. 1-27 1986.
"License for Ronald A. Katz Technology Licensing L.P. Patents Obtained by HP"; PR News; Mar. 18, 2002; 4 pgs.
"Individual, Inc. Files for U.S. Patent"; PR Newswire; Jul. 9, 1992.
Prodigy promotion, Read all about the Prodigy interactive personal service, the only service of its kind that lets each member of your family personalize it to his or her interests and priorities, 6 pgs.
Advertising pp. 15-16 (and Order Form) for QQP games, in eStrategy Plus, believed to be from 1994.
Ramanathan et al., Computer Networks and ISDN Systems, 26:1305-1322 1994 ("Towards Personalized Multimedia Dial-Up Services").
Ramanathan et al.; "Architectures for Personalized Multimedia"; IEEE; 1994; pp. 37-46.
Rapoza; "I-Server: Gotta Have It"; PC Week; Oct. 28, 1996; 12(43); 1 pg.
Raymond; "Newsflash: Or One Cybrarian's Quest for Electronic News Delivery"; Special Libraries; Fall 1994; vol. 85; Issue 4; pp. 270-273.
Reinheimer; "Information on Demand's Multi-File Electronic Clipping Service"; National Online Meeting; New York, NY; May 5-7, 1987.
"Online—Time, Inc." Report on Electronic Commerce; Nov. 12, 1996; 3(23).
Resnick; "WWW> Rotating Sponsorship Banner on WWW Pages"; Net-Happenings Moderator; Oct. 28, 1995; 2 pgs.
"UK: Home Computer From Your Own Correspondent"; Reuters Info Svcs.; 1996; 2 pgs.
Rodriquez; "Real-Time Group Conferencing to Ship"; News/Networking; Oct. 10, 1994; p. 49.
Roybal et al.; "Large-Scale Demonstration Test Plan for Digface Data Acquisition System"; Lockhead Idaho Technologies, Co.; Nov. 1994, p. 40; Dialog File 6: NTIS; 1852842.
Rudich, "How Customizable News Services Can Help You Reduce Clutter (and Guilt)"; Link-Up; Sep. 1, 1996, 13(5); pp. 8-9; Dialog File 233: Microcomputer Abstract; 0435810.
Russell et al.; "Spacewar"; Maury Markowitz; 2000; 12 pp.
Web Programming Unleashed, Copyright 1996 by Sams.net Publishing, First Edition.
Sanders, Business Week, PC Meets the TV: The Plot Thickens, pp. 94-95, 1996.
Schoenfeld; "Developers Plan Free E-mail"; Online Marketplace; Jun. 1995; 2 pgs.
Schroeder et al., ACM Transactions on Computer Systems, 2(1):3-23 1984.
"Intermind 'pushes' 140 New Web Channels, Thre Times That of Marimba, Backweb and Ifusion Combined"; SchwabOnline; Feb. 6, 1997; 2 pgs.
The Scout Report—Apr. 5, 1996, A Publication of Internet Scout Computer Science Department, University of Wisconsin, http://scout.cs.wisc.edu/reoprt/sr/1996/scout-960405.html, 8 pages.
The Scout Report—May 3, 1996, A Publication of Internet Scout Computer Science Department, University of Wisconsin, 8 pages.
Seidman's Online Insider for the Week Ending May 3, 1996, vol. 3, No. 18, http:/www.onlineinsider.com/html/archives/ 050396.html, pp. 1-8.
Seno; "MultiMedia Information Broadcasting Service "Present""; IEEE, 1994, pp. 117-120.
Shel@blackjacktime.com, e-mail re: Advertising article about CNET, Jan. 17, 2002, pp. 1-3.
Sherman, "The Executive's NewsStand NewsNet Can Help Track Your Company's Image Your Company, Your Clients and Your Industry"; Link-Up, Mar. 1, 1990, 7(2), pp. 20-21; Dialog File 233: Microcomputer Abstracts; 0256018.
Skov; "An Electronic SDI Service for the Danish Chemical Industry and Research"; Libri; 1968; 18(3-4), pp. 204-215; Dialog File 61: LISA; 02017349.
Slaby; "SandPoint Unveils Hoover NewsAlert for Windows: Powerful Intelligent-Agent Based Software Monitor Provides Real-Time News for Critical Decision Making"; Businesswire; Oct. 30, 1995; 2 pgs.
"News for Nerds. Stuff that Matters"; Slashdot; 1997-2002, pp. 1-115.
Smith, The World-Wide-Web, Dec. 11, 1995, pp. 1-9.
Sponsor of the Day Newsletter, Nov. 1995, http://www.cris.com/~raydaly/spon11nw.html, pp. 1-4.
Soltes; "Catch the Wave"; Bacon's; Aug. 16, 1995, News clipping.
Still; "An Agency's View of Electronic Monitoring"; Journal of the Society of Motion Picture and Television Engineers; Mar. 1975; 84(3); p. 172-173; Dialog File 2: INSPEC; 00782712.
Story et al.; "The RightPages Image-Based Electronic Library for Alerting and Browsing"; IEEE, Sep. 1992; pp. 17-25.
Tannenbaum; "Patent Approved, Patent Pending"; Wall Street Journal Interactive Edition; 1999, pp. 1-8.
PointCast unveils free news service—Tech News—CNET.com, Feb. 13, 1996, pp. 1-2.
Targeted ads soon to pop up—Tech News—CNET.com, Feb. 19, 1997, pp. 1-3.
Thimm; "A Multimedia Enhanced CSCW Teleservice for Wide Area Cooperative Authoring of Multimedia Documents"; SIGOIS Bulletin; Dec. 1994, 15(2); pp. 49-57.
Advertising brochhure for "Trak-21", by Digital Biometics, Inc., Gaming Division, 5600 Rowland Road, Minnetonka MN 55343.
TreasureHunt.com—Related Websites, Copyright 1995-2001, Bruce Bates Enterprises, pp. 1-10.
Ubois; "New Shades of Blue: IBM's John Patrick Sees Opportunity for Big Blue All Over the Internet"; internet World; Mar. 1, 1995, 6(3); pp. 62-66, Dialog File 233: Microcomputer Abstracts; 0378521.
Van Kirk; "Lotus Notes Tied to Internet"; News/Networking; Oct. 10, 1994, p. 49.
Vblue International—Web Projects, file:///J|/3367/-2/references/reference . . . International—Web Projects(96-98).htm; 6 pages.
Volokh; "Cheap Speech and What It Will Do"; Yale Law Journal; May 1995; 104(7); pp. 1805-1850.

(56) References Cited

OTHER PUBLICATIONS

"Patent Office May Hinder Hopping of Bunny Across Computerscreens"; Washington Times; 1997; 2 pgs.
Waxweb v.2.0, Apr. 3, 1995, file:///J|/3367/-2/references/references(general)/WAXWEB v2_0.htm.
Net Results: Web Marketing That Works—. . . Media: The Many Faces of Web Advertising, pp. 1-31, printed Mar. 31, 2003.
Webb; "Telebase Launches Clipping Service ECS May Now Be Accessed by Users Directly Through Telebase"; Link-Up, May 1, 1991, 8(3); pp. 1 and 39, Dialog File No. 233: Microcomputer Abstracts; 0240805.
Wilder; "Free E-mail—For a Price"; Bacon's; Nov. 27, 1995; News clipping.
Wilder; "Get News While Your PC Sleeps"; Net Access; Feb. 26, 1996: p. 77; http://techweb.amp.com.
Williamson; "This E-mail Message is Brought to You by . . . "; Advertising Age; Apr. 17, 1995, newsclipping.
Winer; "DaveNet"; 1994-2000; pp. 1-5.
Wingfield; "Juno offers Free E-mail Service to End-Users"; Bacon's' Jul. 10, 1995; News clipping.
Wireless: Wireless Advertising Gets Support From Consumers, file:///J|/3367/-2/references/references(general)/advertising.html.
E-Tailer's Digest in Gifts & Decorative Accessories, www.etailersdigest.com Aug. 1998.
"Yahoo! BackWeb Channel Guide!"; Yahoo Channel Guide: What's Going on?; 2 pgs.
Yan et al.; "SIFT: A Tool for Wide-Area Information Dissemination"; USENIX Technical Conference; Jan. 16-20, 1995; pp. 177-186.
Yoshida; "Group Formed to Oversee 1394 Patent Licensing"; Systems & Software News; Nov. 23, 1999; pp. 1-3.
Zuckerman; "Microsoft and Pointcast in Broadcast Alliance"; New York Times; Dec. 12, 1996; 1 pg.
Zuckermann; "Pushing the Envelope on Delivery of Customized Internet"; New York Times; Dec. 9, 1996; 2 pgs.
O'Connor; "Free E-mail Service Slated for the Fall; Limited Urban Areas to Try Out Advertiser-Supported Messaging Service"; Jul. 1, 1995; The Austin-American-Statesman; 2 pages.
"AOL Virtual Museum Other Online Services"; Aug. 17, 2001; 5 pages.
"AOL Virtual Museum 10,000 Free Hours"; Dec. 19, 2001; 4 pages.
Rowland; "Internet at a crossroads"; originally published in the Toronto Star newspaper on Jun. 13, 1996; 7 pages.
"Free Internet Access From AT&T—Have They Lost Their Minds?!!?"; Discount Long Distance Digest News; Feb. 27, 1996; 2 pages.
Smith, David; "Re: More on AT&T Internet"; Nov. 8, 1995; 1 page.
"Internet Access Pricing in the OECD"; 45 pages; date unknown.
von Klitzing; "Seven Mile-Boots"; Internet News; From OEM 6 OneEurope Magazine No. 6 available at http://www.karl.aegee.org/oem-pub.nsf/0871f09451d3ee53c1256322004f795b/44473cd7408db6224125659f0040908a?OpenDocument ; Feb. 24, 1995; 3 pages.
Dedrick "A Consumption Model for Targeted Electronic Advertising"; Intel Architecture Labs; IEEE MultiMedia; 1995; pp. 41-49.
Adams; "Game Credits"; available at http://www.designersnotebook.com/Game_Credits/game_credits.htm; undated; 8 pages.
"World's First Banner Ad"; undated; 2 pages.
White; "Hand-held gambling devices may be in a casino near you"; Las Vegas Sun; May 26, 2005; 3 pages.
Chan; "Globalization of Internet Access"; Proceedings of the IEEE International Conference on Industrial Technology, 1996; pp. 485-488.
"Internet Chess Club" From Wikipedia, the free encyclopedia.; Jun. 29, 2005; 2 pages.
"Washington, DC History"; Last modified Mar. 12, 2003; Copyright 1995-2005 Hagen Software; 5 pages.
"ManifestDestiny Marketing, Inc. Business Plan"; ManifestDestiny Marketing Inc.; date unknown; 35 pages.
"HotWired Goes Live", available at http://www.hotwired.com/, Oct. 1994, 4 pages.
"New Newsletter: TRADEWINDS—Trade magazine coverage of the Net", Tradewinds, Kenneth Liss (Editor), vol. 1, No. 2, Nov. 1994, 9 pages.
"San Jose Mercury News Now Publishing on the World Wide Web", All Mega News, Jan. 18, 1995, 2 pages.
Adams, "Beneficial Innovation's Response to Electronic Arts' and Pogo Corporation's First Set of Interrogatories", Case No. CV 05-5803 JFW (JWJx), Nov. 2005, 37 pages.
Klecker email "Subject: Re: Cookies?", Jul. 12, 1996, 2 pages.
Koch "Maxim Sponsors blackjack on 'Net", Las Vegas Sun, Oct. 2, 1996, 1 page.
QuickTrack Brochure, Jun. 1995, 6 pages.
Rosenbloom, "Letter to Julien A. Adams", Dec. 6, 2007, 43 pages.
Schatz "Validity Study of U.S. Pat. No. 6,712,702", dated Mar. 14, 2006, 61 pages.
Steinwascher "Expert Report of Dr. Kurt Steinwascher", dated Jun. 6, 2006, 555 pages.
Nathan, "Trintex Completive Analysis", Robert R. Nathan Associates, Inc., Doc. Page Identifier(s):PRGY 0002-0166,Winter 87/88.
Papes, memo subject: "Shopping Application", Doc. Page Identifier(s):PRGY 0168, Nov. 16, 1988.
Bellar, "TPF Driver System", Doc. Page Identifier(s):PRGY 0169-0178, Apr. 17, 1985.
Merritt, "Trintex Keyword Architecture", Doc. Page Identifier(s):PRGY 0180-0226, Aug. 11, 1986.
Ragusa, "Commercial Analysis Report", Doc. Page Identifier(s):PRGY 0227-0239, Dec. 1988.
Author unknown, "Reception System Functional Objectives", Doc. Page Identifier(s):PRGY 0240-0310, Jan. 15, 1986.
Author unknown, "Reception Systems Functional Specifications", Doc. Page Identifier(s):PRGY 0311-0356, Feb. 20, 1986.
Beattie, memo subject: "PODB Definitions", Doc. Page Identifier(s):PRGY 0358-0381, Sep. 26, 1986.
Ashkennas et al., memo subject: "Producer System", Doc. Page Identifier(s):PRGY 0382-0394, Sep. 17, 1986.
Author unknown, memo subject: "Heading ID's", Doc. Page Identifier(s):PRGY 0395, date unknown.
Author unknown, memo subject: "Network Naming Standards", Doc. Page Identifier(s):PRGY 0396-0398, date unknown.
Ashkennas, memo subject: "Interface Task Force Minutes", Doc. Page Identifier(s):PRGY 0399-0401, May 29, 1986.
Ashkennas, memo subject: "Producer 2 Batch Code", Doc. Page Identifier(s):PRGY 0402-0431, May 15, 1986.
Ashkennas, memo subject: "Interface Task Force Minutes", Doc. Page Identifier(s):PRGY 0432-0435, Jun. 2, 1986.
Author unknown, memo subject: "Producer Tools", Doc. Page Identifier(s):PRGY 0436-0437, Sep. 22, 1986.
Author unknown, memo subject: "Producer System", Doc. Page Identifier(s):PRGY 0438-0439, date unknown.
Ashkennas, et al., memo subject: "Producer System Interim Plan", Doc. Page Identifier(s):PRGY 0440-0478, Sep. 17, 1986.
Ashkennas, et al., memo subject: "Producer Systems/Applications Development Interim Transition Plan", Doc. Page Identifier(s):PRGY 0479-0502, Aug. 21, 1986.
Bracken, memo subject: "Producer Host Envir. Spec.", Doc. Page Identifier(s):PRGY 0503-0589, Aug. 27, 1986.
Author unknown, memo subject: "The Producer—App. Interface", Doc. Page Identifier(s):PRGY 0590-0592, date unknown.
Ragusa, memo subject: "Commercial Analysis Report", Doc. Page Identifier(s):PRGY 0593-0605, Dec. 1988.
Pooth, memo subject: "TPF Driver Demo Project", Doc. Page Identifier(s):PRGY 0606-0658, Jul. 9, 1985.
Author unknown, memo subject: "Trintex Application Model Dev. Proposal", Doc. Page Identifier(s):PRGY 0655-0690, Aug. 1985.
Author unknown, memo subject: "Question and Answer Models", Doc. Page Identifier(s):PRGY 0691-0709, Nov. 1, 1985.
Author unknown, memo subject: "Objectives of the Task Force", Doc. Page Identifier(s):PRGY 0710-0728, date unknown.
Dawley, memo subject: "Richard Merritt's Promotion", Doc. Page Identifier(s):PRGY 0729, Oct. 16, 1986.

(56) References Cited

OTHER PUBLICATIONS

Author unknown, memo subject: "Reception System/Api Team Reorganization", Doc. Page Identifier(s):PRGY 0730, date unknown.
Sederholm, memo subject: "Design Review", Doc. Page Identifier(s):PRGY 0731-0732, Feb. 21, 1986.
Author unknown, memo subject: "Publishing—Early Launch Work Plan", Doc. Page Identifier(s):PRGY 0733-0739, Nov. 20, 1985.
Dawley, memo subject: "App. Group Model (AGM)", Doc. Page Identifier(s):PRGY 0740, Feb. 6, 1986.
Dawley, memo subject: "Routing Slip", Doc. Page Identifier(s):PRGY 0741, Jan. 25, year unknown.
Author unknown, memo subject: "Chart", Doc. Page Identifier(s):PRGY 0742-0744, date unknown.
Author unknown, memo subject: "Reception System Issues", Doc. Page Identifier(s):PRGY 0745-0779, Aug. 8, 1986.
Author unknown, memo subject: "Retail Dependencies", Doc. Page Identifier(s):PRGY 0780, date unknown.
Appleman, memo subject: "Issues and Actions", Doc. Page Identifier(s):PRGY 0781-0782, Jan. 21, 1987.
Abrahams, memo subject: "Filter and Memory Problems", Doc. Page Identifier(s):PRGY 0783-0785, May 26, 1987.
Appleman, memo subject: "A Discussion of the State of the Trintex", Doc. Page Identifier(s):PRGY 0786-0791, May 28, 1987.
Dawley, memo subject: "Survey of keyword lengths", Doc. Page Identifier(s):PRGY 0792, Feb. 18, 1987.
Author unknown, memo subject: "API Planning Session", Doc. Page Identifier(s):PRGY 0793-0800, Aug. 27, 1986.
Dawley, memo subject: "Your memo of Feb. 3, 1986", Doc. Page Identifier(s):PRGY 0801-0805, Feb. 10, 1986.
Sederholm, memo subject: "TBOL Ref.", Doc. Page Identifier(s):PRGY 0806-0809, Feb. 3, 1986.
Macary, memo subject: "AVT Storyboard Issues", Doc. Page Identifier(s):PRGY 0810-0812, Feb. 17, 1986.
Langer, memo subject: "Client Development", Doc. Page Identifier(s):PRGY 0813, Mar. 5, 1986.
Bellar et al., memo subject: "TPF Driver System", Doc. Page Identifier(s):PRGY 0814-0822, Apr. 12, 1985.
Author unknown, memo subject: "Trintex System Architecture", Doc. Page Identifier(s):PRGY 0823-0847, May 15, 1985.
Author unknown, memo subject: "Initial Product Req.", Doc. Page Identifier(s):PRGY 0848-0849, Jan. 8, 1986.
Author unknown, memo subject: "Study Group Objectives", Doc. Page Identifier(s):PRGY 0850, date unknown.
Urbanski, memo subject: "Formalization of the development of Trintex", Doc. Page Identifier(s):PRGY 0851, Mar. 18, 1986.
Author unknown, memo subject: "Driver 1", Doc. Page Identifier(s):PRGY 0852, Jun. 30, 1985.
Bellar, memo subject: "Establishing a reliable and effective procedure", Doc. Page Identifier(s):PRGY 0853-0862, Aug. 28, 1985.
Appleman, "Appl Core", Doc. Page Identifier(s):PRGY 0863-0899, Mar. 18, 1988.
Author unknown, "Table of Contents", Doc. Page Identifier(s):PRGY 0901-0953, date unknown.
Author unknown, "Task Force Notes", Doc. Page Identifier(s):PRGY 0954-0955, Apr. 9, year unknown.
Author unknown, "Notes", Doc. Page Identifier(s):PRGY 0956, Mar. 29, 1985.
Author unknown, "Chart", Doc. Page Identifier(s):PRGY 0957, Apr. 12, 1985.
Author unknown, "Notes", Doc. Page Identifier(s):PRGY 0958-0960, Mar. 29, 1985.
Author unknown, "Task Force Notes", Doc. Page Identifier(s):PRGY 0961, Apr. 2, 1985.
Author unknown, "Task Force Notes", Doc. Page Identifier(s):PRGY 0962, Apr. 3, 1985.
Author unknown, "Task Force Notes", Doc. Page Identifier(s):PRGY 0963, Apr. 8, 1985.
Author unknown, "Task Force Notes", Doc. Page Identifier(s):PRGY 0964-0966, Apr. 3, 1985.
Author unknown, "Task Force Notes", Doc. Page Identifier(s):PRGY 0969, Apr. 8, 1985.
Author unknown, "Task Force Notes", Doc. Page Identifier(s):PRGY 0970, Apr. 3, 1985.
Author unknown, "Trintex Architecture", Doc. Page Identifier(s):PRGY 0971-0975, Mar. 31, 1985.
Author unknown, "General Ground Rules Notes", Doc. Page Identifier(s):PRGY 0976-0988, date unknown.
Memo subject: "Trintex System Proposal", Doc. Page Identifier(s):PRGY 0989, date unknown.
Author unknown, memo subject: "Data collection Requirements Notes", Doc. Page Identifier(s):PRGY 0990, date unknown.
Author unknown, memo subject: "Business System Interface Notes", Doc. Page Identifier(s):PRGY 0991, Mar. 15, 1985.
Author unknown, memo subject: "TPF2 Functions", Doc. Page Identifier(s):PRGY 0992-1000, Mar. 26, 1985.
Author unknown, memo subject: "Mission Notes", Doc. Page Identifier(s):PRGY 1001-1014, date unknown.
Schwartz, memo subject: "Delivery System Launch Obj.", Doc. Page Identifier(s):PRGY 1015-1038, Mar. 6, 1985.
Author unknown, memo subject: "Reception Subsystems Notes", Doc. Page Identifier(s):PRGY 1039, Apr. 2, 1985.
Author unknown, memo subject: "High Level Function Placement", Doc. Page Identifier(s):PRGY 1040-1047, Mar. 26, 1985.
Author unknown, memo subject: "Reception Subsystems Notes", Doc. Page Identifier(s):PRGY 1048, Apr. 2, 1985.
Author unknown, memo subject: "Keywords Notes", Doc. Page Identifier(s):PRGY 1049-1052, Mar. 22, 1985.
Author unknown, memo subject: "Matrix", Doc. Page Identifier(s):PRGY 1053-1067, date unknown.
Wolf, memo subject: "Notes", Doc. Page Identifier(s):PRGY 1068, Mar. 26, 1985.
Author unknown, memo subject: "High Level Function Placement", Doc. Page Identifier(s):PRGY 1069-1076, Mar. 26, 1985.
Author unknown, memo subject: "Arch Overview Notes", Doc. Page Identifier(s):PRGY 1077-1078, Mar. 19, 1985.
Sweeney, memo subject: "Notes", Doc. Page Identifier(s):PRGY 1079, Mar. 19, year unknown.
Author unknown, memo subject: "Arch Overview Notes", Doc. Page Identifier(s):PRGY 1080-1081, Mar. 19, 1985.
Author unknown, memo subject: "Meeting Today", Doc. Page Identifier(s):PRGY 1082, Mar. 25, 1985.
Author unknown, memo subject: "Arch Overview Notes", Doc. Page Identifier(s):PRGY 1083, Mar. 19, 1985.
Author unknown, memo subject: "Trintex Architecture Group Work Plan", Doc. Page Identifier(s):PRGY 1084-1085, date unknown.
Author unknown, memo subject: "Task Desc. Notes", Doc. Page Identifier(s):PRGY 1086, Mar. 22, year unknown.
Author unknown, memo subject: "Arch Overview Notes", Doc. Page Identifier(s):PRGY 1087, Mar. 15, 1985.
Author unknown, memo subject: "Arch Overview Notes", Doc. Page Identifier(s):PRGY 1088, Mar. 14, 1985.
Author unknown, memo subject: "Application Layer Notes", Doc. Page Identifier(s):PRGY 1089-1091, date unknown.
Author unknown, memo subject: "Arch Overview Notes", Doc. Page Identifier(s):PRGY 1092-1094, date unknown.
Author unknown, memo subject: "Function Placement Notes", Doc. Page Identifier(s):PRGY 1095, date unknown.
Author unknown, memo subject: "Arch. Group Notes", Doc. Page Identifier(s):PRGY 1096-1097, Mar. 20, 1985.
Author unknown, memo subject: "Arch Overview Notes", Doc. Page Identifier(s):PRGY 1098, Mar. 14, 1985.
Author unknown, memo subject: "Application Program Interface", Doc. Page Identifier(s):PRGY 1100, date unknown.
Author unknown, memo subject: "Object for TTS_MNU01", Doc. Page Identifier(s):PRGY 1101, Feb. 17, 1986.
Author unknown, memo subject: "Notes", Doc. Page Identifier(s):PRGY 1102, date unknown.
Author unknown, memo subject: "Trintex", Doc. Page Identifier(s):PRGY 1103-1113, date unknown.
Heilbrunn memo subject: "Production Description", Doc. Page Identifier(s):PRGY 1114-1169, Mar. 31, 1986.

(56) References Cited

OTHER PUBLICATIONS

Author unknown, memo subject: "Founding and Charter Member Satisfaction Survey", Doc. Page Identifier(s):PRGY 1171-1211, Sep. 1988.
Author unknown, memo subject: "Strategy Conference", Doc. Page Identifier(s):PRGY 1212-1217, 1993.
Edelhart "Ten Commandments, Revisited", PC Week, Doc. Page Identifier(s): PRGY 1218-1219, May 30, 1988.
Author unknown, memo subject: "Qualitative Analysis: Prodigy Interactive Personal Service: "The Market" Focus Groups", Elrick and Lavidge, inc., Doc. Page Identifier(s):PRGY 1220-1241, Oct. 1988.
Day, memo subject: "September Executive Measurements Package", Doc. Page Identifier(s):PRGY 1242-1244, Oct. 21, 1988.
"Targeting Consumer Influentials", The Public Pulse, Doc. Page Identifier(s): PRGY 1245-1248, Mar. 1988, 4 pages.
"Information Gateways—New Life for Videotex?", Institute for the Future, Doc. Page Identifier(s): PRGY 1249, May 1988, 1 page.
"E-Mail Vendors", O'Dwyer's PR Services Report, Doc. Page Identifier(s): PRGY 1250-1251, Jun. 1988.
Carroll "IBM Unveils Midrange Computer Line in Bid to Reverse Slide in Market Share", The Wall Street Journal, Doc. Page Identifier(s): PRGY 1252, Jun. 22, 1988.
"Captain lacks popularity", Japan Economic Journal, Doc. Page Identifier(s): PRGY 1253, Mar. 29, 1986.
Mochizuki et al., "Digital Videotex System", Review of the Electrical Communication Laboratories, vol. 32, No. 6, 1984, 1044-1050, Doc. Page Identifier(s): PRGY 1254-1260.
Nakano et al., "Digital Videotex Communication Processing Equipment", Review of the Electrical Communication Laboratories, vol. 32, No. 6, 1984, 1051-1057, Doc. Page Identifier(s): PRGY 1261-1267.
Ito "Captain Commercial Service Starts Now", JTR, Doc. Page Identifier(s): PRGY 1268-1276, Jan. 1985, pp. 17-25.
Kobayashi et al., "Videotex Terminals for the INS Model System", Review of the Electrical Communication Laboratories, vol. 33, No. 2, 1985, p. 277-283, Doc. Page Identifier(s): PRGY 1277-1283.
Hecht, "What You Can Get Online", Computers & Electronics, Doc. Page Identifier(s): PRGY 1284-1297, Feb. 1985.
Leichtman, "Making Online Databases Useful", Computers & Electronics, Doc. Page Identifier(s): PRGY 1289-1291, Feb. 1985.
"Guide to Online Information Services", Computers & Electronics, Doc. Page Identifier(s): PRGY 1292-1294, Feb. 1985.
"Database Aids", Computers & Electronics, Doc. Page Identifier(s): PRGY 1295, Feb. 1985.
Weis, memo subject: "Prodigy Services Company Jun. 6 comments", Doc. Page Identifier(s):PRGY 1298-1326, Jun. 7, 1988.
Author unknown, "The Prodigy Service Background", Doc. Page Identifier(s):PRGY 1327-1329, date unknown.
Author unknown, memo subject: "Prodigy Services Company", Doc. Page Identifier(s):PRGY 1330, date unknown.
"Final Report Prodigy Kroger Grocery Shopping Service", Elrick and Lavidge, inc., Doc. Page Identifier(s): PRGY 1331-1356, Sep. 1988.
Author unknown, memo subject: "Trintex Questions and Answers", Doc. Page Identifier(s):PRGY 1357-1371, date unknown.
Author unkown, memo subject: "Reception System Technical Review", Doc. Page Identifier(s):PRGY 1372-1427, date unknown.
Horowitz, "TLPEO4010", Doc. Page Identifier(s):PRGY 1428, Jun. 9, 1986.
Horowitz, "TLCR0000.DEF", Doc. Page Identifier(s):PRGY 1429, Apr. 16, 1986.
Horowitz, "TLPH4010", Doc. Page Identifier(s):PRGY 1430, Jun. 17, 1986.
Horowitz, "TLCP0040", Doc. Page Identifier(s):PRGY 1431, Apr. 16, 1986.
Horowitz, "TLCR0040", Doc. Page Identifier(s):PRGY 1432, Jun. 17, 1986.
Author unknown, "Reception System Technical Review", Doc. Page Identifier(s):PRGY 1433-1441, date unknown.
Author unknown, "Reception System", Doc. Page Identifier(s):PRGY 1442-1466, Jun. 18, 1986.
Author unknown, "Membership Marketing Agenda", Doc. Page Identifier(s):PRGY 1468-1516, 1988.
Mandel "Interactive Consumer Information Services", SRI International, Doc. Page Identifier(s):PRGY 1517-1554, 1988.
Aumente "The New Wave of Computer Information Services", Washington Journalism Review, Doc. Page Identifier(s):PRGY 1555-1558, Nov. 1988.
Barmash "No Major Cuts Expected in Advertising by Sears", New York Times, Doc. Page Identifier(s): PRGY 1559, Nov. 10, 1988.
"Virus fears stalk companies" USA Today, Doc. Page Identifier(s): PRGY 1560-1561, Nov. 10, 1988.
"The Prodigy Approach to the Mass Market", The Seelinger Letter, Doc. Page Identifier(s): PRGY 1562-1574, Aug. 25, 1988.
Amparano et al., "Phone Firms Battle Cable-TV Operators Over Providing Fiber-Optic Home Links", The Wall Street Journal, Doc. Page Identifier(s): PRGY 1575-1576, Sep. 9, 1988.
"Joe Anonini Shakes Up Kmart", Gallagher Report, Doc. Page Identifier(s): PRGY 1577, Aug. 8, 1988.
Mangum "Business cable to launch show on PCs", Gannett Westchester Newspapers, Doc. Page Identifier(s): PRGY 1578, Sep. 5, 1988.
Miller et al., "New Big Blue Akers's Drive to Mend IBM Is Shaking Up Its Vaunted Traditions", The Wall Street Journal, Doc. Page Identifier(s): PRGY 1579-1581, Nov. 11, 1988.
Author unknown, "Retail Sales Training Kit", Doc. Page Identifier(s):PRGY 1582-1599, date unknown.
Author unknown, "Trintex Assistant Design Document", Doc. Page Identifier(s):PRGY 1602-1604, date unknown.
Galambos, memo subject: "Human Factors Driver 7.1 Report", Doc. Page Identifier(s):PRGY 1605-1630, Jun. 26, 1987.
Merritt, memo subject: "Your Memo dated Feb. 26", Doc. Page Identifier(s):PRGY 1631-1632, date unknown.
Author unknown ,"Charts", Doc. Page Identifier(s):PRGY 1633-1637, Apr. 4, 1986.
Tummolo, memo subject: "Leave zip Phase I Implementation Design", Doc. Page Identifier(s):PRGY 1638-1640, Feb. 23, 1987.
Tummolo, memo subject: "Leave zip Phase I Implementation Design", Doc. Page Identifier(s):PRGY 1641-1643, Feb. 23, 1987.
Tummolo, memo subject: "Leave/zip Phase I Detail Design", Doc. Page Identifier(s):PRGY 1645-1646, Feb. 23, 1987.
Author unknown, "Look/Zip Design Considerations", Doc. Page Identifier(s):PRGY 1647-1654, Feb. 3, 1987.
Gitlitz, memo subject: "Content Architecture", Doc. Page Identifier(s):PRGY 1655-1659, Mar. 9, 1987.
Author unknown, "Notes", Doc. Page Identifier(s):PRGY 1660-1662, Feb. 10, 1987.
Briney, memo subject: "Trintex Assistant Feedback", Doc. Page Identifier(s):PRGY 1663, Feb. 22, 1987.
Author unknown, "Viewpath, PS Development", Doc. Page Identifier(s):PRGY 1664-1682, date unknown.
Merritt, memo subject: "Trintex assistant Project Plan", Doc. Page Identifier(s):PRGY 1683-1686, Feb. 18, 1987.
Galambos, memo subject: "Guide", Doc. Page Identifier(s):PRGY 1687-1689, Feb. 19, 1987.
Author unknown, "Memo", Doc. Page Identifier(s):PRGY 1690, date unknown.
Goldes, memo subject: "Single Key Help Access", Doc. Page Identifier(s):PRGY 1691-1692, Feb. 3, 1987.
Macary, memo subject: "Perf. Plan for Richard Merritt", Doc. Page Identifier(s):PRGY 1693-1694, Jan. 28, 1987.
Rothman, memo subject: "Zip", Doc. Page Identifier(s):PRGY 1695-1696, Jan. 29, 1987.
Author unknown, "Where Questions", Doc. Page Identifier(s):PRGY 1697-1699, date unknown.
Heilbrunn, memo subject: "Image Capture", Doc. Page Identifier(s): PRGY 1700-1702, Mar. 5, 1987.
Mueller, memo subject: "Trintex Assistant Harford", Doc. Page Identifier(s):PRGY 1703, Feb. 9, 1987.
Merritt, memo subject: "Trintex Assistant Project Plan", Doc. Page Identifier(s):PRGY 1704-1707, Feb. 18, 1987.

(56) References Cited

OTHER PUBLICATIONS

Galambos, memo subject:, "Trintex Assistant Application Coding", Doc. Page Identifier(s): PRGY 1708,Jan. 20, 1987.
Author Unknown, memo subject: "Trintex Assistant Capabilities", Doc. Page Identifier(s):PRGY 1709-1711, Aug. 15, 1987.
Merritt, memo subject: "Trintex Assistant Functions", Doc. Page Identifier(s):PRGY 1712-1713, Aug. 15, 1987.
Galambos, memo subject: "File for Hartford", Doc. Page Identifier(s):PRGY 1714-1715, Jan. 26, 1987.
Starr Software Inc., "Invoice to Computer City", Doc. Page Identifier(s):PRGY 1716-1717, Jan. 30, 1987.
Author unknown, "Trintex Assistant Status", Doc. Page Identifier(s):PRGY 1718-1727, Jan. 13, 1987.
Matyckas, "Trintex Assistant Reception System Implementation Issues", Doc. Page Identifier(s):PRGY 1728-1731, Mar. 20, 1987.
Matyckas, "Simplified Process Flow of the Keyboard Mgr.", Doc. Page Identifier(s):PRGY 1732-1741, Mar. 20, 1987.
Author unknown, "Menu", Doc. Page Identifier(s):PRGY 1742, date unknown.
Heilbrunn, memo subject: "Trintex Assistant Versioning", Doc. Page Identifier(s):PRGY 1743, Nov. 23, 1987.
Galambos, memo subject: "Decoder Macros for Physical Key Names", Doc. Page Identifier(s):PRGY 1744-1745, May 6, 1987.
Heilbrunn, memo subject: "Comments", Doc. Page Identifier(s):PRGY 1746, Oct. 28, 1987.
Author unknown, "TTX Assistant", Doc. Page Identifier(s):PRGY 1747, Oct. 10, 1987.
Author unknown, "Out of Plan in Order of Priority", Doc. Page Identifier(s):PRGY 1748, Oct. 7, 1987.
Galambos, memo subject: "Your Trintex Assistant Memo of Feb. 2, 1987", Doc. Page Identifier(s):PRGY 1749-1750, Feb. 19, 1987.
Author unknown, "Viewpath Programs(Driver 5)", Doc. Page Identifier(s):PRGY 1754, Jul. 16, 1986.
Tummolo, "Viewcopy", Doc. Page Identifier(s):PRGY 1755, Jul. 16, 1986.
Tummolo, "ViewP1", Doc. Page Identifier(s):PRGY 1756, Jul. 15, 1986.
Tummolo, "ViewP2", Doc. Page Identifier(s):PRGY 1757-1759, Jul. 14, 1986.
Tummolo, "ViewP3", Doc. Page Identifier(s):PRGY 1760, Jul. 14, 1986.
Tummolo, "ViewP4", Doc. Page Identifier(s):PRGY 1761, Jul. 15, 1986.
Tummolo, "ViewP5", Doc. Page Identifier(s):PRGY 1762-1763, Jul. 16, 1986.
Tummolo, "ViewP6", Doc. Page Identifier(s):PRGY 1764-1765, Jul. 16, 1986.
Tummolo, "ViewP8", Doc. Page Identifier(s):PRGY 1766, Jul. 16, 1986.
Merritt, memo subject: "Enhancements", Doc. Page Identifier(s):PRGY 1767-1768, Sep. 9, 1987.
Merritt, memo subject: "Trintex Assistant Project Plan", Doc. Page Identifier(s):PRGY 1769-1773, Feb. 18, 1987.
Leibman, memo subject: "memo (title unknown)", Doc. Page Identifier(s):PRGY 1774, date unknown.
Author unknown, memo subject "Jumpwords", Doc. Page Identifier(s): PRGY 1775-1779, date unknown.
Goldes, memo subject: "Design Spec: Help Hub", Doc. Page Identifier(s):PRGY 1780-1791, Apr. 22, 9187.
Author unknown, memo subject: "Trintex Code Promotion", Doc. Page Identifier(s):PRGY 1792-1793, Apr. 15, 1987.
Author unknown, memo subject: "Browse-D7.Hold.Tbolo", Doc. Page Identifier(s):PRGY 1794, Jun. 5, 1987.
Galambos, memo subject: "Copy/File for Hartford", Doc. Page Identifier(s):PRGY 1795-1796, Jan. 26, 1987.
Briney, memo subject: "Generic Copy Approach", Doc. Page Identifier(s):PRGY 1797-1799, Feb. 22, 1987.
Galambos, memo subject: "13 byte jumpwords", Doc. Page Identifier(s):PRGY 1800, Feb. 25, 1987.
Heyman, memo subject: "Keywords, Jumpwords", Doc. Page Identifier(s):PRGY 1801-1805, Mar. 5, 1987.
Galambos, memo subject: "User Profiles", Doc. Page Identifier(s):PRGY 1806-1812, Feb. 6, 1987.
Goldes, memo subject: "Help Guidelines", Doc. Page Identifier(s):PRGY 1813-1841, Apr. 7, 1987.
Galambos, memo subject: "Decoder Macros for Phys. Key names", Doc. Page Identifier(s):PRGY 1842-1843, May 6, 1987.
Author unknown, "Trintex Assist.", Doc. Page Identifier(s):PRGY 1844-1851, Apr. 27, 1987.
Author unknown, memo subject: "Guide", Doc. Page Identifier(s):PRGY 1852-1893, Feb. 19, 1987.
Tummolo, memo subject: "Leave/zip external dependencies", Doc. Page Identifier(s):PRGY 1894-1895, Apr. 2, 1987.
Galambos, memo subject: "Your Trinex Assit memo of Feb. 2, 1987", Doc. Page Identifier(s):PRGY 1896-1897, Feb. 19, 1987.
Beall, memo subject: "Trintex Assist", Doc. Page Identifier(s):PRGY 1898-1899 Feb. 2, 1987.
Author unknown, memo subject: "Harford Development Plan", Doc. Page Identifier(s):PRGY 1900-1902, Date unknown.
Gitlitz, memo subject: Content Architecture, Doc. Page Identifier(s):PRGY 1903-1905, Feb. 27, 1987.
Tummolo, memo subject: "Menu Issues", Doc. Page Identifier(s):PRGY 1906, Oct. 16, 1986.
Briney, memo subject: "Generic Copy Approach", Doc. Page Identifier(s):PRGY 1907-1909, Feb. 22, 1987.
Author unknown, memo subject: "Notes", Doc. Page Identifier(s):PRGY 1910, Date unknown.
Carney, memo subject: "Guide Maps", Doc. Page Identifier(s):PRGY 1911, Feb. 26, 1987.
Gitlitz, memo subject: Holding Frame, Doc. Page Identifier(s):PRGY 1912, Feb. 20, 1987.
Galambos, memo subject: "File", Doc. Page Identifier(s):PRGY 1913, Feb. 23, 1987.
Galambos, memo subject: "Copy/File for Hartford", Doc. Page Identifier(s):PRGY 1914, Feb. 23, 1987.
Galambos, memo subject: "Jumpwords and Architecture", Doc. Page Identifier(s):PRGY 1915, Feb. 5, 1987.
Tummolo, memo subject: "TTX Assist.", Doc. Page Identifier(s): PRGY 1916, Feb. 17, 1987.
Tummolo, memo subject: "TTX Assist", Doc. Page Identifier(s):PRGY 1917, Feb. 17, 1987.
Author unknown, memo subject: "Screen Description", Doc. Page Identifier(s):PRGY 1918-1926, Date unknown.
Dorst, memo subject: "Service Date", Doc. Page Identifier(s):PRGY 1927, Dec. 8, 1988.
Author unknown, memo subject: "Proposal for Richard Merritt", Doc. Page Identifier(s):PRGY 1928-1929, Date unknown.
Author unknown, memo subject: "Notes", Doc. Page Identifier(s):PRGY 1930, Date unknown.
Merritt, "Quick Quotes", Doc. Page Identifier(s):PRGY 1931-1934, Mar. 30, 1988.
Author unknown, memo subject: "Quick Quotes", Doc. Page Identifier(s):PRGY 1935 Mar. 22, 1988.
Author unknown, memo subject: "PCS2—Network Simulator", Doc. Page Identifier(s):PRGY 1936, Mar. 29, 1988.
Author unknown memo subject: "Quick Quotes", Doc. Page Identifier(s):PRGY 1937-1941, Mar. 30, 1988.
Author unknown memo subject: "Quick Quotes", Doc. Page Identifier(s):PRGY 1942-1945, Mar. 22, 1988.
Author unknown, memo subject: "Current Stocks", Doc. Page Identifier(s):PRGY 1946-1952 Mar. 30, 1988.
Author unknown, memo subject: "Notes on Dow Jones", Doc. Page Identifier(s):PRGY 1953 Mar. 15, 1988.
Author unknown, API Support Group Weekly Bulletin, Doc. Page Identifier(s):PRGY 1954, Apr. 10, 1987.
Author unknown, memo subject: "API Support Group Notes", Doc. Page Identifier(s):PRGY 1955-1964, Apr. 7, 1987.
Author unknown, memo subject: "API Planning Session", Doc. Page Identifier(s):PRGY 1965-1980, Aug. 26, 1987.
Author unknown, memo subject: "API Planning Session", Doc. Page Identifier(s):PRGY 1981-1985, Aug. 27, 1987.

(56) References Cited

OTHER PUBLICATIONS

Merritt, memo subject: "Application Development", Doc. Page Identifier(s):PRGY 1986-1987, Mar. 14, 1986.
Author unknown, "Dialogue with Hewitt", Doc. Page Identifier(s):PRGY 1988, Nov. 1985.
Stewart, "Notes", Doc. Page Identifier(s):PRGY 1989-1990 Apr. 19, 1985.
Author unknown, memo subject: "Assumptions about objects + traffic", Doc. Page Identifier(s):PRGY 1991-1997 Apr. 18?
Author unknown, memo subject: "Incompletely determined objects", Doc. Page Identifier(s):PRGY 1998-1999 Apr. 19?
Author unknown, memo subject: "Unique Keys", Doc. Page Identifier(s):PRGY 2000-2001, Apr. 19?
Author unknown, memo subject: "Applications", Doc. Page Identifier(s):PRGY 2002-2005, Apr. 18?
Merritt, memo subject: "Notes on TPF Classes", Doc. Page Identifier(s):PRGY 2006-2008, May 10, 1985.
Author unknown, memo subject: "Notes to Norm", Doc. Page Identifier(s):PRGY 2009-2010, Sep. 18?
Esposito, memo subject: "TPF Task Force Results", Doc. Page Identifier(s):PRGY 2011-2012, Mar. 27, 1985.
Maggie, memo subject: "System Dev. Training Program", Doc. Page Identifier(s):PRGY 2013-2014, Mar. 11, 1986.
Merritt, memo subject: "UAL Next Week", Doc. Page Identifier(s):PRGY 2015-2016, Mar. 26, 1986.
Hewitt, "Letter to United Airlines (Kotar)", Doc. Page Identifier(s):PRGY 2017-2018, Dec. 18, 1985.
Merritt, memo subject: "Achievement Ward", Doc. Page Identifier(s):PRGY 2019-2025, Feb. 27, 1986.
Merritt, memo subject: "Application Development", Doc. Page Identifier(s):PRGY 2026-2027, Mar. 14, 1986.
Merritt (Notes from Richard), memo subject: "For the API Support Group", Doc. Page Identifier(s):PRGY 2028-2029, date unknown.
Author unknown, memo subject: "3 Topics", Doc. Page Identifier(s):PRGY 2030-2033, Mar. 4?
Merritt, memo subject: "Application programmers reference manual", Doc. Page Identifier(s):PRGY 2034-2037, Jul. 23, 1986.
Merritt, memo subject: "API Support Group Status", Doc. Page Identifier(s):PRGY 2038-2044, Jul. 23, 1986.
Author unknown, memo subject: "Notes for the Month of August", Doc. Page Identifier(s):PRGY 2045-2046, date unknown.
Author unknown, memo subject: "API Planning Session", Doc. Page Identifier(s):PRGY 2047-2048, Mar. 19, 1986.
Merritt, memo subject: "Tasks for the API coordination Group", Doc. Page Identifier(s):PRGY 2049-2054, Mar. 25, 1986.
Author unknown, "API Coordination/support Group", Doc. Page Identifier(s):PRGY 2055-2060, date unknown.
Author unknown; "Standard Form application Documentation", Doc. Page Identifier(s):PRGY 2061-2083, date unknown.
Author unknown, "Product Design System Flow", Doc. Page Identifier(s):PRGY 2084-2086,date unknown.
Author unknown, "Product Design Panels", Doc. Page Identifier(s):PRGY 2087-2097, Jun. 16, 1986.
Author unknown, "Discussion Draft/Notes", Doc. Page Identifier(s):PRGY 2098-2099, May 29, 1986.
Urbanski, memo subject: "Nonprogramming environment for application development", Doc. Page Identifier(s):PRGY 2100-2102, Jun. 27, 1986.
Dawley, "GDA/ADW Dawley Presentation", Doc. Page Identifier(s):PRGY 2103-2116, Jun. 27, 1986.
Harmse, memo subject: "PS Development", Doc. Page Identifier(s):PRGY 2117-2118, Feb. 2, 1986.
Author unknown, memo subject: "Delivery Plan Highlights", Doc. Page Identifier(s):PRGY 2119-2120, Jan. 17, 1985.
Author unknown, memo subject: "Trintex Launch Level", Doc. Page Identifier(s):PRGY 2121-2150, Jan. 27, 1986.
Author unknown, memo subject: "Trintex Launch Level", Doc. Page Identifier(s):PRGY 2153-2312, Jan. 27, 1986.
Author unknown, "4.0 Functional Additions", Doc. Page Identifier(s):PRGY 2200-2299, date unknown.
Author unknown, "Prodigy We're Bringing the Future Home", Doc. Page Identifier(s):PRGY 2313-2322, date unknown.
Author unknown, memo subject: "Trintex Background", Doc. Page Identifier(s):PRGY 2323-2326, date unknown.
Author unknown, memo subject: "Prod. System-Host Design", Doc. Page Identifier(s):PRGY 2328-2349, Jan. 12, 1987.
Author unknown, memo subject: "Producer Object assembly", Doc. Page Identifier(s):PRGY 2350-2380, Jan. 29, 1987.
Author unknown, memo subject: "Producer Workstation", Doc. Page Identifier(s):PRGY 2381-2390, Feb. 17, 1987.
Author unknown, "TPW System overview", Doc. Page Identifier(s):PRGY 2391-2395, Feb. 19, 1987.
Author unknown, "Producer a Object ID Assignment", Doc. Page Identifier(s):PRGY 2396-2401, Apr. 8, 1987.
Author unknown, "Consolidated Functional Requirements", Doc. Page Identifier(s):PRGY 2402-2459, Apr. 5, 1985.
Author unknown, memo subject: "TPW—Producer A", Doc. Page Identifier(s):PRGY 2460-2462, Mar. 4, 1987.
Author unknown, memo subject: "QC Requirements (Linkage)", Doc. Page Identifier(s):PRGY 2463-2471, Mar. 6, 1987.
Author unknown, memo subject: "ParmScript Specification", Doc. Page Identifier(s):PRGY 2472-2480, May 1, 1987.
Whited et al., "Up/Download Supporting New Naming Conventions", Doc. Page Identifier(s):PRGY 2481-2491, May 12, 1987.
Author unknown, memo subject: "Producer System Data Flow", Doc. Page Identifier(s):PRGY 2492, Jan. 27, 1987.
Dawley, memo subject: "Producer System Format", Doc. Page Identifier(s):PRGY 2493-2499, Apr. 24, 1987.
Author unknown, memo subject: "Notes", Doc. Page Identifier(s):PRGY 2500-2508, date unknown.
Dedrick, memo subject: "A Language for Describing TBOL", Doc. Page Identifier(s):PRGY 2509-2513, Feb. 24, 1987.
Author unknown, memo subject: "The Trintex Producer Workstation", Doc. Page Identifier(s):PRGY 2514-2516, Jan. 21, 1987.
Author unknown, "The Bulletin", Doc. Page Identifier(s):PRGY 2517, date unknown.
Lyons, memo subject: "API Support Group Notes", Doc. Page Identifier(s):PRGY 2518-2519, date unknown.
Author unknown, memo subject: "Trintex External Provider Activities", Doc. Page Identifier(s):PRGY 2520-2526, Feb. 8, 1988.
Author unknown, memo subject: "External Provider Environment", Doc. Page Identifier(s):PRGY 2527, May 1988.
Author unknown, "EPAPO Project Status Update", Doc. Page Identifier(s):PRGY 2528-2530, May 18, 1988.
Author unknown, "Prodigy Services Company", Doc. Page Identifier(s):PRGY 2531-2567, Jun. 15, 1989.
Heilbrunn, memo subject: "Trintex Product Descriptor", Doc. Page Identifier(s):PRGY 2568-2614, Feb. 23, 1987.
Author unknown, "CPEP looking to Prodigy for the Latest Information", Science Museum of Connecticut, Doc. Page Identifier(s):PRGY 2616, Nov./Dec. 1988.
Markham, "From fantasy to fact at the end of a fingertip", Times, London, England, Doc. Page Identifier(s):PRGY 2617, Nov. 22, 1988.
Haglund, "Detroiters will get new buying power in their PCs next year", Sunday Chronicle, Muskegon, Michigan, Doc. Page Identifier(s):PRGY 2618, Nov. 27, 1988.
Author unknown, "Prodigy making another attempt at videotext services", Knight-Ridder Newspaper Service, Doc. Page Identifier(s):PRGY 2619-2620, Nov. 20. 1988.
Sims, "New Atlantic Cable Makes More Calls Possible", The New York Times, Doc. Page Identifier(s):PRGY 2620-2621, Dec. 14, 1988.
Markoff, "IBM to Sell Rolm to Siemens", The New York Times, Doc. Page Identifier(s):PRGY 2622-2623, Dec. 14, 1988.
Author unknown, "Banking from signup to sign on", Sunday Capital, Annapolis, Mo, Doc. Page Identifier(s):PRGY 2624, Nov. 20, 1988.
Author unknown, "GTE Corp. Makes Waves in Videotext Market", Gallagher Report, NY, NY, Doc. Page Identifier(s):PRGY 2624, Nov. 21, 1988.
Killette, "French Minitel Services Coming to America", Communications Week, Doc. Page Identifier(s):PRGY 2625, Nov. 7, 1988.

(56) References Cited

OTHER PUBLICATIONS

Horwitt, "Freed Bells ready network services", Computerworld, Doc. Page Identifier(s):PRGY 2626, Dec. 12, 1988.
Author unknown, "Bell Atlantic, IBM Get Directory System Pact for New Zealand", Wall Street Journal, Doc. Page Identifier(s):PRGY 2627, Dec. 15, 1988.
Author unknown, "Fewer Tots Expected by the Year 2000", Wall Street Journal, Doc. Page Identifier(s):PRGY 2627, Dec. 15, 1988.
Fisher, "Deeper Into the Well", Microtimes, Doc. Page Identifier(s):PRGY 2628-2630, Mid-Dec. 1988.
Hudson et al., "IBM to extend antitrust accord with EC commission Beyond '90", The Wall Street Journal, Doc. Page Identifier(s):PRGY 2631, Dec. 15, 1988.
Andrews, "Uses Grow for Video Alterations", The New York Times, Doc. Page Identifier(s):PRGY 2632-2633, Dec. 15, 1988.
Author unknown, "The CPC Newsletter", Doc. Page Identifier(s):PRGY 2634-2641, Dec. 1988.
Author unknown, "Prodigy Services Company", Doc. Page Identifier(s):PRGY 2642, date unknown.
Klelner, "Prodigy: The Future on Line?", The San Francisco Guardian Doc. Page Identifier(s):PRGY 2643-2647, Nov. 30, 1988.
Author unknown, "Vanguard draws investors", USA Today, Doc. Page Identifier(s):PRGY 2648, Dec. 6, 1988.
Henderson, "Funds offer strong, safe asset growth", USA Today, Doc. Page Identifier(s):PRGY 2649, Dec. 6, 1988.
Miller, "IBM's PC Chief, William Low, Moves to Xerox", The Wall Street Journal, Doc. Page Identifier(s):PRGY 2650, Dec. 6, 1988.
Feinberg, "Bust or Boom?", Adweek's Marketing Week\, Doc. Page Identifier(s):PRGY 2651-2656, Dec. 5, 1988.
Essex, "Prodigy: An On-Line Service for the Masses", PC Resource, Doc. Page Identifier(s):PRGY 2657-2658, Jan. 1989.
Rebello, "Super chip puts mainframe on desktop", USA Today, Doc. Page Identifier(s):PRGY 2659, Dec. 9, 1988.
Author unknown, "U.S. computer firms counting on Europe", USA Today, Doc. Page Identifier(s):PRGY 2660, Dec. 9, 1988.
Miller et al., "IBM to Sell Part of Rolm's Line, Investors Told", The Wall street Journal, Doc. Page Identifier(s):PRGY 2660, Dec. 9, 1988.
Author unknown, "Prodigy Advertisement", Women's Wear Daily, Doc. Page Identifier(s):PRGY 2661-2662, Dec. 5, 1988.
Author unknown, "Industry firms join computer listing service", Photo Marketing, Jackson, MI, Doc. Page Identifier(s):PRGY 2663, Nov. 1988.
Haglund, "IBM, Sears gamble on videotex system", Nationally Syndicated Article, Doc. Page Identifier(s):PRGY 2663, Nov. 30, 1988.
Author unknown, "Groceries Delivered by Computer", The Alpharetta Revue, Doc. Page Identifier(s):PRGY 2664, Dec. 1, 1988.
Author unknown, "BellSouth a New Service for Cable TV", The Wall Street Journal, Doc. Page Identifier(s):PRGY 2664, Dec. 7, 1988.
Miller, "IBM Signals New PC-Mainframe Strategy", The Wall Street Journal, Doc. Page Identifier(s):PRGY 2665, Dec. 7, 1988.
Menninger, "Pioneering on-line service hangs on", Greater Sacramento Business Journal, Sacramento, CA, Doc. Page Identifier(s):PRGY 2666, Nov. 14, 1988.
Bailey, "Sears Offers Added Credit to Boost Holiday Volume", The Wall Street Journal, Doc. Page Identifier(s):PRGY 2667, Dec. 7, 1988.
Kantrow et al., "Chemical's Exit Not Fatal Blow to Home Banking", American Banker, Doc. Page Identifier(s):PRGY 2668-2669, Dec. 7, 1988.
Author unknown, "Who's Who in Video Banking Nationwide", Doc. Page Identifier(s):PRGY 2670, Dec. 7, 1988.
Carroll, "IBM'S Telecommunications Effort With Rolm Unit Has Turned Sour", The Wall Street Journal, Doc. Page Identifier(s):PRGY 2671, Dec. 12, 1988.
Author unknown, "Prodigy", Doc. Page Identifier(s):PRGY 2672-2744, Jan. 1988.
Author unknown, "Appl. Dev. Reference Manual", Doc. Page Identifier(s):PRGY 2745-3027, Dec. 2, 1987 to Mar. 28, 1988.
Dultz "Even Generals QQP's "Quality Over Quantity" Production", Computer Games Strategy Plus, Issue 37, Dec. 1993, p. 14.
"Getting a Connection", Online Access, Apr. 1994, pp. 66-68.
"MPG-NET Presents Star Cruiser", 1993, 2 pages.
"MPG-NET Presents Empire Builder", 1993, 2 pages.
U.S. Patent Application: Auxier et al., "Interactive Information Super Highway Prize Network", Sep. 2, 1994.
Lanier, "Jaron's World: Sex, Drugs and the internet", Discover Magazine, electronically published Mar. 14, 2007,available at http://discovermagazine.com/2007/mar/jarons-world-internet-and-the-war-on-drugs, pp. 1-5.
"Unlawful Internet Gambling Enforcement Act of 2006", 31 USC § 5361-5367, available at http://www.rules.house.gov/109_2nd/text/hr4954cr/hr49543_portscr.pdf, pp. 213-244.
Fried; "NewsNet: An Offering of Current and Specialized Information"; Online; Jul. 1985; 9(4); pp. 99-105.
Author unknown, "Notes", Doc. Page Identifier(s):PRGY 0967-0968, Apr. 4, 1985.
Waugh "Request for Ex Parte Reexamination of U.S. Pat. No. 6,264,560", dated Jan. 31, 2008, 2542 pages.
Maurer et al., "Frequently Asked Questions About Poker", rec. gambling Usenet Newsgroup, available at http://groups.google.com/group/rec.answers/msg/9f0812cdfdd732e8$^2$, posted Feb. 28, 1995, 40 pages.
Manual "Manny" Raposa, "BJ Tourney at the IP", rec.gambling Usenet Newsgroup, available at http://groups.google.com/group/rec.gambling/msg/eabdbc28789394b0, posted Feb. 24, 1992, 3 pages.
Eliezer, "Navigating Main Street: a user's experience with interactive TV; GTE Main Street", 9 The Seybold Report on Desktop Publishing No. 5, 3 (Jan. 15, 1995), 9 pages.
Netrek BRMH-1.7 Client Source Code, http://ftp.netrek.org/pub/netrek/mirrors/ftp.csua.berkely.edu.old/netrek/old/BRMH-1.7.tar.gz (last modified Oct. 16, 1993), 783 pages.
McFadden, "The History of Netrek, through Jan. 1, 1994", rec.games.netrek Usenet Newsgroup, available at http://groups.google.com/group/rec.games.netrek/msg/66264d6b5a4b1470, (posted May 1, 1994), 17 pages.
Rumsey Re: Beta testers for port of BRM 3.0 to Win 3.1/NT wanted, rec.games.netrek Usenet Newsgroup, available at http://groups.google.com/group/rec.games.netreek/browse_frm/thread/9400abb64afd9810/2ba31d76f61174d0, (posted Feb. 12, 1994), 11 pages.
Gray "Internet Growth Summary", available at http://www.mit.edu/people/mkgray/net/internet-growth-summary.html, last visited Dec. 17, 2007, 2 pages.
Lewis "Microsoft Seeks Internet Market; Netscape Slides", NY Times, Dec. 8, 1995, available at http://query.nytimes.com/gst/fullpage.html?res=9E00EEDE1F39F93BA35751C1A963958260&sec=&spon=&pagewanted=all, 4 pages.
Declaration of David Ahn (including Exhibit A-S), Dec. 14, 2007, 134 pages.
Holub "Netrek Server List", available at http://groups.google.com/group/rec.games.netrek/msg/8dbc01d4abee5ace, Last-Updated Dec. 21, 1993, 8 pages.
Google groups Rec.games.netrek, Search for dave ahn, available at http://groups.google.com/group/rec.games.netrek/earch?q=dave+ahn&start=0&scoring=d&, date unknown, 1 page.
Ahn "Help getting res-rsa working with server . . . " available at http://groups.google.com/group/rec.games.netrek/browse_frm/thread/4da4c5af59745a61/fde76eab98a25b8a, dated Nov. 15, 1994, 3 pages.
"How far back does Google's Usenet archive go?", available at http://groups.google.com/support/bin/answer.py?answer=46439&topic=9246, 2007, 3 pages.
Holub "Rec.games.netrek FAQ List", available at http://groups.google.com/group/rec.games.netrek/msg/9bbd5514020d51fa, last-updated Jul. 21, 1994, 9 pages.

(56) References Cited

OTHER PUBLICATIONS

Holub "Rec.games.netrek FAQ List", available at http://groups.google.com/group/rec.games.netrek/browse_frm/thread/35a84ea78ce38bdb/9bbd5514020d51fa, last-updated Jul. 21, 1994, 28 pages.
Holub "Netrek FTP list", available at http://groups.google.com/group/rec.games.netrek/msg/ac03262b6ac8c4c1, last-updated Jul. 21, 1994, 10 pages.
Murase "Re: Windows Client", available at http://groups.google.com/group/rec.games.netrek/browse_frm/thread/d6ecc5c095bf8a38, Sep. 30, 1994, 6 pages.
Murase "Re: Windows Client", available at http://groups.google.com/group/rec.games.netrek/msg/20da2a42b64333a8, Oct. 1, 1994, 2 pages.
Trown "New Server Release", available at http://groups.google.com/group/rec.games.netrek/msg/d7fb4451975e6fb2, Aug. 9, 1994, 1 page.
Hadley "BRMH-1.7 available", available at http://groups.google.com/group/rec.games.netrek/msg/00b0aa5dfdb1ba99, Oct. 15, 1993, 2 pages.
Ivey "Re: AGRI poppage (was Re: Bombing a planet—is it an art?)", available at http://groups.google.com/group/rec.games.netrek/msg/df66eac4e839bc59, Aug. 17, 1994, 3 pages.
Trown "Re: Netrek server help !", available at http://groups.google.com/group/rec.games.netrek/browe_frm/thread/e728557051dc0c13/4f1af10b05d68ac8, Nov. 19, 1994, 4 pages.
Ahn "Re: www.netrek.org—no longer the game?", available at http://groups.google.com/group/rec.games.netrek/msg/ee9a7af9f7a39305, Oct. 23, 1998, 2 pages.
Holub "Netrek FTP list", available at http://groups.google.com/group/rec.answers/msg/ebcb9a14c0d4de78, last-updated Dec. 14, 1994, 11 pages.
"Netrek Software Archive", available at http://ftp.netrek.org/pub/netrek/mirrors/ftp.csua.berkely.edu.old/netrek/old, Apr. 16, 1999, 3 pages.
"Netrek Software Archive", available at http://ftp.netrek.org/pub/netrek/mirrors/ftp.solace.mh.se/netrek/servers/vanilla, Jan. 5, 2000, 1 page.
"List of files in BRMH-1.7.tar.gz", Oct. 15, 1993, 3 pages.
"List of files in Server2.5p14.tar.gz", Aug. 9, 1994, 5 pages.
Declaration of Kevin Smith, Dec. 17, 2007, 6 pages.
Kuester "Web Ad Revenue Climbed 42.6 Percent in Third Quarter", Jupiter Communications, Nov. 20, 1996, available at http://web.archive.org/web/19961228211028/http://www.jup.com/jupiter/release/nov96/adspend/adspend.shtml, 6 pages.
O'Connell, "Advertisers Get Benched", Promo, The International Magazine for Promotion Marketing, p. 96, Mar. 1994.
Netrek Server2.5p14 Server Source Code, http://ftp.netrek.org/pub/netrek/mirrors/ftp.solace.mh.se/netrek/servers/vanilla/Server2.5p14.tar.gz (last Modified Dec. 15, 1994), 1300 pages.

* cited by examiner

COMPENSATION MODEL FOR NETWORK SERVICES

RELATED APPLICATIONS

The present application is a continuation-in-part of U.S. patent application Ser. No. 12/167,244 filed Jul. 2, 2008, which claims the benefit of U.S. Provisional Patent Application Ser. No. 60/947,598 filed Jul. 2, 2007; the present application is also a continuation-in-part of U.S. patent application Ser. No. 09/502,285 filed on Feb. 11, 2000 (now U.S. Pat. No. 7,496,943), which is a continuation of U.S. patent application Ser. No. 09/105,401 filed Jun. 26, 1998 (now U.S. Pat. No. 6,183,366), which is a continuation of U.S. patent application Ser. No. 08/759,895 filed Dec. 3, 1996 (now U.S. Pat. No. 5,823,879), which claims the benefit of both U.S. Provisional Patent Application Ser. No. 60/010,361 filed Jan. 19, 1996 and U.S. Provisional Patent Application Ser. No. 60/010,703 filed Jan. 26, 1996; the entire disclosure of each of the above-identified applications is hereby fully incorporated by reference as part of the present application.

RELATED FIELD OF THE INVENTION

The present invention relates to method and system for providing compensation to a network service provider via advertising and user fees for services.

BACKGROUND

There are various techniques and strategies for providing services/products to users via a network such as the Internet, wherein the network nodes (e.g., websites) providing such services/products receive compensation by a combination of revenue streams, including:
   (a) advertising, and offering free/reduced cost services/products as enticement for visiting the network node (i.e., and wherein such offerings are, e.g., subsidized by third parties such as advertisers), and/or
   (b) the sale of services/products for a profit by the entity operating the network node.
However, in many cases, it is difficult to consistently entice network users to repeatedly visit the network node and spend sufficient time at the node so that the volume of user traffic at the network node, and the demographics of the users trafficking the network node are sufficient to attract a substantial number of advertisers to advertise on the network node. Accordingly, the revenue streams from (a) above may contribute only marginally to the profitability of the entity operating the network node.

The primary techniques or business models for enticing a large number of repeated user visitations to a network node (e.g., website) is to provide an interactive informational service that large numbers of users find repeatedly desirable and/or necessary. Examples of such successful business models are Internet search engine sites such as Google, social networking websites (e.g., www.facebook.com and www.myspace.com), various game websites, video website (e.g., www.youtube.com), and music websites. However, due to the competitiveness of network nodes for enticing users virtually all entities operating commercial network nodes need all the advantages and/or user enticements that are commercially feasible to maintain profitable revenue streams. Thus, in addition to providing free Internet searches, Google (as well as many other Internet sites) provide other free services/products such as browser toolbars, desktop search engines, notepads, pictures for computer monitor background screens, free games, instructional presentations (e.g., www.digg.com) and news reports. However, it would be advantageous to provide users with additional incentives for repeatedly visiting and expending additional time at a particular network node, such as an Internet website, by providing the capability to win cash prizes, free products or services, and/or access to products or services that are restricted from use by other users.

For at least some entities operating network (Internet) nodes, their business models also may include receiving compensation from users, wherein such compensation can be viewed as: (i) an activation fee, (ii) a license or subscription fee to use a service for, e.g., a predetermined amount of time, (iii) a membership fee, and/or (iv) a predetermined payment from which funds are withdrawn as the service is used such as in certain Internet wagering games. Such entities and/or the nodes they operate will be referred to hereinbelow as "user funded" nodes, sites, websites, services, entities, etc. User funded sites typically do not provide unrequested advertising to the users funding the website, or will present advertisements that are deemed very beneficial to a likely large number of the users funding the site. Accordingly, advertising revenues from such sites can be somewhat diminished. Some network site operators have developed a hybrid business model wherein some of the services at their network site are free to users, and the users are presented various types of advertising which may or may not be demographically targeted to the users, whereas other portions of the network site that are user funded and have little if any advertising. Thus, advertising revenue is derived from only the free services portion of the network site. However, it would be advantageous for a network site operator to be able to present more advertising and/or addition user enticements such as coupons, or reduced cost services/products to users funding the site to thereby generate, e.g., greater advertising revenue.

In some contexts, user compensation, where the users fund the site, may be considered illegal under the U.S. Federal Wire Act and/or other U.S. Federal Acts such as the "Unlawful Internet Gambling Enforcement Act of 2006," ("UIGEA"). In particular, if the service provided by the network site includes betting, wagering, or other activity wherein there is a staking or risking of something of value upon the outcome of a contest of others, a sporting event, or a game subject to chance, upon an agreement or understanding that the person or another person will receive something of value in the event of a certain output occurring, then such U.S. laws may prohibit such services and/or user compensation therefor. Although such U.S. laws do not appear to be currently strictly enforced, the potential threat of enforcement is problematic. Basically, in the U.S. any service offered may be considered illegal to offer on a network such as the Internet if a user:
   (1) provides consideration (e.g., funding, a bet or wager) for the service,
   (2) the service can be considered to involve risk to the consideration provided by the user, and in particular, more risk than user skill, and
   (3) something of benefit can be obtained such as a prize (cash or otherwise).
Note that for such services to which UIGEA may be problematic (e.g., games of chance such as poker, blackjack, bingo, lotteries, roulette, etc.), a distinguishing characteristic that is different from games such as chess and checkers is that in games of chance there are events in an instance of the game wherein: (a) such events include risk for the player winning or losing something of value (e.g., a bet or wager) with another, and (b) the outcome of the event is not dependent solely on objective information common to all players. For example, a wager by a player in an online Internet chess game may not be considered a game of chance since all events in a game of chess are dependent solely on the objective common configuration of the chess board at any point in the game. On the other hand, for games such as poker, there is in any given game instance a substantial amount of information that is not common to all players (e.g., the unplayed cards in the card deck, and the cards in other players' hands) which substantially impact events during the game instance, and thereby substantially impact whether a player wins or loses something of value. However, many so called games of chance also include skill, and many individuals would assert a good deal of skill. For example, there are champion poker and blackjack players who will consistently win substantially more credits more times than other players, and more than mere random chance would indicate. Thus, such champions are prime anecdotal evidence that pure chance does not dictate outcomes of such games. In particular, it is believed that poker and blackjack (e.g., tournament blackjack which requires a careful analysis of each contestant's bet as well as an analysis of the cards each contestant is most likely to receive) require substantial skill. Alternatively, games such as purchasing lottery tickets and bingo are believed to require virtually no skill, and are indeed dominated by random chance outcomes.

To avoid violating the UIGEA, network sites offering games of chance have been forced to: (a) locate outside of the U.S., (b) wager points or tokens that have no intrinsic value, (c) play such games without the possibility of winning a prize of monetary value, and/or (d) play such games without the ability to wager at all. However, each of these options are undesirable, and in the case of (a) needlessly cause U.S. funds to be diverted to other countries. Moreover, none of these appropriately address the fact that many games of chance are substantially games of skill and should be treated as such.

Accordingly, it would be advantageous to be able to provide services (e.g., games), wherein a user skill aspect of the service is capable of being measured separately from random chance events related to the service. More particularly, when the service includes playing games of chance that include, e.g., generally recognized aspects of skill, it is desirable to play such games legally in the U.S., wherein prizes of monetary value can be won. For example, it is desirable for the skill portion of such games to be separately measured and used to award prizes to players having demonstrated a predetermined skill level.

Although Internet gaming in the U.S. is substantially done by Internet sites that are located in foreign countries (since such sites are then less subject to U.S. Federal laws), other games and services may also be subject to such U.S. laws such as UIGEA. For example, many "pay for play" games may be illegal under U.S. Federal law if there is an enticement to win a prize, wherein, e.g., a player pays a fixed amount upfront to play a game and wherein there is the possibility for the player to win a prize, e.g., a prize that is worth substantially more than the player's pay for play entry fee. It is believed that such U.S. laws may be enforced against any service having: (a) paying users and where there is some degree of risk (as may be determined by a U.S. court) is involved, and (b) where there is a prize that can be won wherein the prize is worth more than the user paid upfront. Accordingly, it would be advantageous to provide enticements to network (Internet) users when playing games having upfront payments and that involve prizes without violating such U.S. laws.

Referring particularly to Internet sites having free games wherein game tournaments are provided, there can be a significant problem with a user/player entering the same tournament multiple times by entering under a multitude of different user names and thereby significantly increasing his/her chances of winning the tournament (and any corresponding prize). For example, even if distinct email addresses are required for each tournament player, it is relatively easy for a single user to obtain a plurality of email accounts. Accordingly, since a person's email address is the method usually used by a network site to determine whether an entrant has previously registered, multiple entries by the same person can significantly increase his/her odds of winning the tournament. Accordingly, it would be advantageous to inhibit tournament players of, e.g., free tournaments, from easily entering such tournaments under multiple user names, and thereby inherently reducing the attractiveness of the tournament to other users. Moreover, since the revenue that the network site operator obtains from the tournament is likely to be from offering advertising and/or advertiser services/products that are based upon the number of "distinct" users, it is problematic for the operator to assert with any certainty to his/her advertisers that the advertisers' ads are being presented to a sufficient number of distinct users. That is, the ability of a game site operator to assure that the number of players it represents to its advertisers is accurate and that few, if any, entrants are duplicates has been problematic.

If and when there is a change in the law that allows on-line gambling in the U.S., there remains the need to provide unique methods of recruiting users to both free as well as pay for play type games. Since a "free" game is one of the ways to attract users, a combination of free and pay for play style games is believed to be attractive to users and commercially viable for network site operators. Thus, the problems addressed in this disclosure will remain issues to be resolved, whatever the state of the law.

The cost effective automation of playing certain games, like blackjack, has been difficult due to the fact that these games typically require a dealer and only a relatively small number of players may play the game with a single dealer. However, with the popularity of local and wide-area data communication networks, it is desirable to have an automated gaming system for games such as blackjack wherein large numbers of players may cost-effectively and efficiently play such games.

Furthermore, it has been difficult to cost-effectively provide a network gaming system on such networks as the Internet in that gaming restrictions prohibit wagering and ante fees in most contexts except such situations as local area networks within a casino. However, since many players have an interest in playing casino-type games, it would also be desirable to have a way to benefit from interests in such games. Accordingly, it would be desirable to have a system that utilized a gaming context as a vehicle for delivering product and/or service information to users of a network such as the Internet. In particular, it would be desirable to have a data processing system that provided a large number of players with the ability to substantially asynchronously play casino-style games on the Internet for prizes at a reduced risk or at substantially no risk, wherein the data processing system coordinated the presentation of products and/or services from sponsors of the games so that there is a coordinated, interactive exchange of information between players and sponsors regarding advertisements, samples, prizes and questionnaires related to sponsor products and/or services.

Accordingly, since the present invention, as described in the sections hereinbelow, addresses the above-discussed problems within the context of playing blackjack, an overview of this particular game is provided so that the novelty and various related aspects of the present invention may be more fully appreciated.

Description of Blackjack:

The card game of blackjack is a game of chance played between a designated player known as a "dealer" and one or more other players. Basically, each player plays against the dealer in the sense that each player attempts to achieve a collection or hand of cards having a total score for the hand closer to the value 21 than the score of the hand of the dealer. However, if a player's card hand goes over 21, the player may lose any wagers bet on the hand regardless of the value of the card hand of the dealer.

In further detail, blackjack is typically played with one or more standard playing card decks wherein each card has a value. In particular, each of the face cards has the value of 10, and non-face card has a value identical to the numerical value as indicated on the card, except for aces. That is, for aces a value may be assigned of either 1 or 11, depending on which value a player deems most beneficial to his/her hand.

In one conventional method for playing blackjack, at the commencement of a blackjack hand, each player initially is provided with two cards and the dealer also receives two cards. Typically, one of the dealer's cards is dealt with the value of the card showing whereas the other card is dealt with the value of the card hidden. However, variations on when the dealer receives his/her cards may depend on the blackjack gaming rules where blackjack is being played but, in any case, one of the dealer's cards must be face-up before the players exercise various wagering options beyond an initial ante.

After a player has reviewed his/her cards, the player may request one or more additional cards in an attempt to get: (a) a value for a card hand that will be greater than the hand the dealer will have, and (b) a value for the card hand that is less than or equal to 21. Further, a player may under certain circumstances, as will be described below, simultaneously play more than one hand of cards against the dealer's cards. However, in requesting such additional cards, a player runs the risk of "busting" each hand played wherein the player loses his/her wager(s) on a card hand by adding cards to the hand until a value exceeding 21 occurs. Further note that such busting of a hand occurs regardless of whether or not the dealer has a card hand value of less than or equal to 21.

Note that after each player has ceased to request further cards (i.e., each player "stands" on his cards), the dealer either takes one or more further cards (i.e., "hits") according to predetermined blackjack rules as established, for example, by the gaming establishment where the blackjack game is being conducted. In general, the dealer must take additional cards if his/her current card count total is less than 17 and the dealer must decline further cards if the dealer's hand has a value of 17 or more. However, there are various rules regarding whether a dealer may stand or hit when the card count total is a "soft 17." That is, one of the dealer's cards is an ace (and therefore may have a value of 1 or 11) and one of the values for the dealer's hand is 17. For example, the dealer may be required to take a hit on a soft 17.

Since a hit(s) taken by the dealer is performed after all players have exercised their wagering options, the final numerical value of the dealer's hand is then compared to the final numerical value of each of the player's hand(s) to determine the winning and losing wagers. Note that if the dealer's hand exceeds the value of 21, then any player that has not busted wins the wagers for their hand(s) regardless of the hand's total value. Alternatively, if the dealer's card hand is less or equal to 21, then it is compared with each of the player's card hand(s) and in each comparison the card hand with the closest total value to 21 without exceeding 21 wins. Of course, ties are possible. In such cases (called a "push"), the player's wager(s) on his/her card hand are returned.

It is typical in blackjack to have at least three additional player options depending on the circumstances of play. A first such option is known as "doubling down" wherein if the player's first two cards have a value within a predetermined range (e.g., 10 or 11), then the player may double his or her wager and once dealt a single additional card, the total of the three card hand becomes the value for the player's hand. Alternatively, another option is that of "splitting pairs" wherein if the player's first two cards are identical with the exception of suit (i.e., a pair), then the pair may be split so that two card hands are created with one card of the pair in each hand. Thus, the player must wager on each of the hands at least the initial wagering or ante amount. Subsequently, a second card and any subsequent successive cards are dealt to each of the separate hands as the player requests and the results of both hands are compared to the dealer's hand, assuming neither the dealer nor either of the player's two hands busts.

In a third option, played immediately after each player has been dealt their first two cards and the dealer has been dealt at least a first card, a player may request "insurance" under the circumstances where the dealer's single face-up card is an ace. In this circumstance, the player is betting that the dealer has blackjack (i.e., a card value total of 21). If the dealer does not have blackjack, then the insurance bet is forfeited and the player plays his/her blackjack hand as if the insurance bet were never made. Note that the player can typically wager an insurance bet of one-half of the amount of his/her initial blackjack wager or ante and if the dealer has blackjack, then the dealer (or the gaming establishment) pays the player double or triple his/her insurance bet.

Further note that options for splitting pairs and doubling down may interact with one another according to certain pre-established gaming establishment rules wherein, for example, a player may double down on one or more of his/her split hands.

Additionally, there are blackjack tournaments having tournament entrants that compete against each other for tournament prizes. In such tournaments each entrant has a fixed initial number of points that can be wagered in a pre-established number of tournament blackjack games to be played. Accordingly, the player having the highest number of points at the end of the tournament wins the tournament. Note that in such tournaments, there may be specific guidelines established at the beginning of the tournament for varying the blackjack gaming rules between tournament games. For example, rules may vary on when a player may split pairs repeatedly during the same blackjack game. Also, double down rules may vary so that, for example, after a splitting of pairs, a player may be allowed to double down on any two cards or, alternatively, an additional wager of less than the initial wager may be acceptable when a player requests to double down.

However, in all known variations of blackjack, players are only allowed to enter a blackjack game at the completion of a previous game and, further, there is a relatively small number of players that can play blackjack at a dealer's station simultaneously. Accordingly, it is desirable to provide a system for playing blackjack wherein potentially a very larger number of players can play blackjack simultaneously from a single dealer station and wherein players can commence playing blackjack at their own discretion without waiting for a previous blackjack game to complete.

The advantages identified hereinabove are provided by the disclosure hereinbelow.

SUMMARY

The present disclosure is directed to a novel collection of business techniques or business models (also referred to as a "compensation model" herein) for addressing the problems, and attaining the advantages, outlined in the Background section hereinabove. In particular, the present disclosure describes a method and system for receiving compensation for network (e.g., Internet) services, wherein such services may require users to pay or fund a first service (e.g., a "user funded" service as described in Background section hereinabove), and regardless of what elements of risk (if any) are involved in performing or participating in the user-funded service, such users may become eligible to legally win a prize of, e.g., monetary value associated with an instance of a service (this service referred to herein as a "prize-winning service") once one or more proficiency criteria in the user-funded service is demonstrated. Moreover, the present disclosure directed to utilizing the user-funded service whether or not the prize-winning service is available. In particular, the user-funded service may be configured so that a user's funds are only retained (or charged to the user) by the user-funded service when the user fails to satisfy a predetermined criteria related to the service. For example, if the service includes the playing of games, then the user-funded service may only retain/charge the user when the user does not play a minimum number of games, a minimum amount of time, demonstrate a minimum indication of game proficiency (e.g., accumulate a minimum number of game points, beat one or more other players—possibly robot players, place sufficiently high in a game tournament, etc.). However, it is within the scope of the present disclosure that other services, instead of games, may be provided for the user-funded service and/or a related prize-winning service. For example, such a service may be an Internet search engine, or an instructional video site wherein a user is only charged for using the service if, e.g., the user does not access the service sufficiently frequently during a particular time period, or does not interact with the service in a particular by the end of a particular time period (e.g., the user does not contribute to an appropriate product evaluation, does not contribute an appropriate instructional video, does not contribute appropriate assistance to other users, and/or does not contribute appropriate music recommendations, etc.), then the user is charged a fee for accessing the service, and/or a previously paid user fee is refunded.

Regarding, the prize-winning service, such a service may be operated by the same service as the user-funded service, or each such service may be operated by separate operators, wherein user participation in an instance of the prize-winning service may be free to the user having established a proficiency/eligibility in the user-funded service. Additionally, since the users competing for prizes (in instances of the prize-winning service) are known, e.g., via credit/debit card network transactions when paying for the user-funded service, the present compensation model introduces a greater measure of integrity or fairness into user competition in that restrictions on a user participating, e.g., under aliases, to thereby favorably skew odds in his/her favor of winning can be enforced.

In a first collection of embodiments of the present compensation model for receiving an opportunity to win prizes, each of a plurality of users are required to provide an initial activation fee or deposit to access a service (a user-funded service herein, and which may be, e.g., a game or contest). Subsequently, each of the users can obtain a refund of his/her activation fee or deposit if and when the user, e.g., achieves a certain or predetermined level of proficiency (i.e., skill) related to the user-funded service. That is, after reaching such a level of proficiency, the user's activation fee or deposit is returned to the user. In one embodiment, exactly the user's activation fee or deposit is returned, no more and no less. Note that if more than the user's activation fee or deposit were returned, then the excess amount might be legally considered as a prize in certain circumstances, and thus problematic in the context of, e.g., U.S. gaming laws. Moreover, the repaying of an amount that is less than the user activation fee or deposit may also be problematic in that the ability for the user to activate additional services (e.g., a "prize-winning service"), wherein prizes of monetary value can be won, may be considered as a service that the user has also paid for as well.

In this first collection of embodiments, once the user has attained a certain level of proficiency or skill in a particular user-funded service, and the user's fee or deposit has been returned, the user may be then eligible to win one or more prizes of monetary value related to subsequent instance of the prize-winning service without paying any further fees or deposits. Accordingly, claims that there has been compensation (consideration) paid to the network site operator for winning a prize of monetary are believed (at least in some instances) to be avoided. Thus, the initial activation fee or deposit may be properly considered as a fee or deposit for the user gaining expertise with the user-funded service (or, e.g., similar services), and such consideration from the user to the site operator is not at risk for winning a prize since such consideration was used for a service for which no prizes of a monetary value were offered, and user's fee or deposit is entirely refunded when the user reaches an appropriate level of proficiency or skill.

In another embodiment of the present compensation model, users provide nothing of value initially to participate in the user-funded service. Instead, a user(s) enters into an agreement with the operator of the user-funded service, wherein the user(s) agrees that, e.g., after a given amount of time (such as a week, six weeks, or six months), if the user does not satisfy certain service related criteria (e.g., one or more proficiency criteria), then (and only then) will the user be charged for using the service. Accordingly, the user may be required to provide credit card information when registering to access the user-funded service. However, no expense is incurred by the user unless the agreed to one or more service related criteria are not satisfied. Note that such service related criteria may be that the user agrees, e.g., to access the service at a given frequency (e.g., once a day), to access the service for a given number of hours per week, to sponsor at least one new service user per month, etc.

In some embodiments of the compensation model (including some of the first collection described above), users having reached a predetermined proficiency level (or satisfies certain service related criteria) may pick and choose which from among a plurality of instances of a prize-winning service (which may be an instance of the user-funded service or another service) that are provided at different times, or at different geographical (or network) locations. Alternatively/additionally, such users may be able to select from among additional instances of the prize-winning services, wherein such instances are offered at substantially the same time. Thus, a user having reached a particular proficiency level (or satisfied certain service related criteria) in a user-funded service may enter an instance of a free prize-winning service for winning prizes immediately after demonstrating his/her proficiency (or satisfying certain service related criteria), or the user may elect to participate in such a prize-winning service for winning prizes at a later date.

In some embodiments of the compensation model (including some of the first collection described above), users may activate or use the user-funded service as much as they desire (e.g., play as many games as they desire), and/or take as long as they desire (e.g., within a reasonable amount of time, e.g., six months or a year) to demonstrate that they have reached an appropriate skill or proficiency level for qualifying to participate in a corresponding instance of a prize-winning service wherein there is an opportunity to win prizes without the users risking anything of value (e.g., money). In some embodiments, users may be required to demonstrate their proficiency (or satisfying certain service related criteria) within, e.g., a predetermined time, and at the end of the predetermined time all users will have their activation fees or deposits refunded. However, only those users satisfying the predetermined proficiency levels will be eligible to enter the additional instances of the prize-winning service(s) for winning prizes.

In some embodiments of the compensation model (including some of the first collection described above), a user may circumvent activating the user-funded service for demonstrating his/her proficiency or skill by providing alternative evidence that the user has the desired proficiency or skill to participate in the free prize-winning service(s) that can result in the user winning a prize(s) of monetary value. In particular, a user may show his/her proficiency or skill by presenting evidence of such proficiency in ways other than providing the activation fee or deposit and participating in the user-funded service. In particular, in a gaming context (e.g., game of chance also having an element of skill), a user may provide evidence that he/she is proficient by identifying, e.g., a casino or other establishment (or network site) along with date that the user demonstrated an appropriate level of proficiency in the user-funded service. For example, if the user-funded service is the game of scrabble, and a user is able to verify that he/she has won a well known scrabble contest, and/or has a National Scrabble Association rating above a particular value, then the user may be considered sufficiently proficient for participating in a corresponding free prize-winning service such as a scrabble contest or, e.g., another word related competition. In one embodiment, such a user may be required to provide a deposit for participating in the prize-winning service, and if the user wins a prize then the user may have to provide his/her evidence of proficiency before receiving the prize. Accordingly, if the evidence cannot be verified, then his/her deposit is forfeited. In one embodiment, when the user-funded service is a game of chance, a user may assert that he/she has won, e.g., certain amount of money, a tournament for the game of chance, or won a certain number of games at a particular casino or during a particular time period as a way of demonstrating his/her proficiency at the user-funded service. Moreover, the network site operator may contract with one or more casinos (online or otherwise) so that both the casino and the operator's site each advertise one another's gaming services so that players considered proficient at such a casino may be automatically considered proficient on the operator's network site. In addition, when the user-funded service is (or includes) a game, a user may attain the predetermined level of proficiency by playing against a software program (e.g., a robot) that is programmed to play at at least a desired predetermined proficiency level.

In a second collection of embodiments, the present compensation model requests users to provide an activation fee or deposit for using a user-funded service, and once all users have used the user-funded service as intended (e.g., played the required number of games within a predetermined time period), all users have their activation fees or deposits returned them, and additionally those users demonstrating the most skill (e.g., by winning the most games) are also provided with prizes in addition to receiving their refunds. Note that a fundamental difference between the first and second collections of embodiments is that in the first collection of embodiments, the site operator has the opportunity to at least recover some of his/her expenses for enhancing the skills or proficiency of the users since it is likely that not all user's will reach the predetermined proficiency level. However, in either the first or second collection of embodiments, the upfront funding (and/or providing credit card information for potentially charging) for accessing the user-funded service is likely to deter a user from duplicatively registering a large number of times and thereby skewing the odds in the user's favor of winning a prize. In particular, since each such registration may be by credit/debit card, duplicate registrations in a user-funded service (for eventually participating in an instance of a prize-winning service) may be inhibited to a great extent by preventing registration (and payment of the activation fee or deposit) from each user whose name is identical (or substantially so) to another registered user at, e.g., a same geographical (or network) address as provided by the credit card information.

In one embodiment, the user-funded service and/or the prize-winning service referred to hereinabove may be an online Internet game service wherein the game(s) may be poker, chess, checkers, monopoly, hearts, spades, euchre, canasta, blackjack, scrabble, video games (e.g., war games), racing games (e.g., auto racing games), trivia games, Internet search games and/or investment games (e.g., stock market investment competitions). More generally, such Internet games and/or contests may be single player games (e.g., where a user plays against a network site or house), multi-player games (e.g., multi-player Internet video/simulation games, or games based on geographical locations of players), games that include an element of chance (e.g., casino card games), board games, and/or mystery solving games.

In one embodiment, the level of proficiency may be one or more of: obtaining a predetermined number of points (e.g., chips in one or more poker games), winning a certain number of game instances (e.g., winning a predetermined number of scrabble games), winning more games than another user (e.g., winning the most hearts games in a hearts tournament), obtaining a predetermined number of points from winning games against other players of a particular skill level (e.g., winning chess games against chess players having an Elo rating system above a particular rating), and/or beating a predetermined number of players having a particular proficiency or skill level.

In another embodiment, the user-funded service and/or the prize-winning service referred to hereinabove may allow users to compete in the creation of designs such as: landscape designs, auto designs, house designs, etc. In another embodiment, the user-funded service and/or the prize-winning service may allow users to compete in the creation of musical compositions, user produced videos, etc., wherein the level of proficiency is determined by, e.g., a predetermined group of judges for judging user entries. In one embodiment, the predetermined group of judges may be the users themselves who have paid the activation fee or deposit. For example, if the user-funded service includes a design or art competition, then each user may register by agreeing to provide credit card information which may be charged in the event that the user's design/art is eliminated from the competition, and not charged in the event that the user's design/art is not eliminated. Moreover, user's whose design/art is not eliminated may then be eligible to enter a free contest (design, art, or otherwise) wherein one or more contestants may win prizes of substantial value.

In one embodiment, the user-funded service may be provided by a third party network site. For example, if a third party website provides a service for which a proficiency level can be determined, then once the users pay a fee (or agree to potentially paying a fee) to the operator of the site providing the present compensation model (for determining, monitoring and/or verifying that users performed the service to a particular proficiency level on the third party network site), the users reaching the particular proficiency level (on the third party network site) then would be allowed to win prizes in free instances of a prize-winning service. Moreover, the prize-winning service may also be provided by a third party site or a site owned or controlled by the operator of the site providing the present compensation model. Thus, an operator for a network site providing an embodiment of the compensation model need not actually provide the user-funded service or the prize-winning service. Accordingly, the operator of the compensation model provides a brokering service for the user-funded services and the prize-winning services.

In one embodiment, the activation fee referred to hereinabove may be considered as a deposit, wherein such a user's deposit is forfeited if the user does not reach the predetermined level of proficiency (or satisfies certain service related criteria), e.g., within a predetermined time limit, within a predetermined amount of service activation (e.g., a number of games played, or a number musical compositions submitted), or the like.

In one embodiment, the determination of proficiency (or satisfaction of certain service related criteria) for the user-funded service may be assessed by the amount of time a user has spent interacting with the user-funded service. For example, regardless of whether a user has met a proficiency level (or satisfaction of certain service related criteria) according to any other measurement, the user may be assumed to have a sufficient proficiency if the user has interacted with the user-funded service, e.g., a predetermined amount of time, a predetermined number service sessions, and/or a predetermined number instances of the service (e.g., games played). Where the user-funded service includes a game, a user may be deemed to have reached the predetermined proficiency level if the user has won a predetermined number of instances of the game, or placed above a certain portion of the users in a ranking of the users, or won a predetermined percentage of the games played once at least a certain number of game instances have been played, or played a predetermined (likely much larger) number of games, or played a predetermined amount of time. Moreover, for each different level of proficiency demonstrated (assuming, e.g., there are multiple levels of proficiency monitored), the user may be allowed to activate a prize-winning service for winning prizes associated with the level of proficiency demonstrated.

In one embodiment, there may be more than one proficiency level for users to attain. Thus, when a first proficiency level is obtained, a user may opt to receive his/her activation fee or deposit, and then participate in a corresponding instance of a prize-winning service. Alternatively, the user may instead opt to proceed to a second level of proficiency, and upon reaching such a second level, opt for receiving his/her activation fee or deposit (or at least the equivalent in products or services), and then participate in a corresponding instance of a prize-winning service for winning a more substantial prize. In one embodiment, a first portion of a user's activation fee or deposit may be refunded at a first proficiency level, and an additional portion may be refunded at an additional proficiency level. Thus, users may be paid to enhance their skills (or satisfy certain service related criteria).

In one embodiment, the present compensation model may be used in providing a network service (user-funded service and/or the prize-winning service), wherein the users registering for the service may become voting members for determining the proficiency level for other registered users. For example, the user-funded service (or instance thereof) may be a graphic design contest, wherein each registered user can enter up to three designs, and each member is allowed to vote once for no more than 10 designs not submitted by the member. Accordingly, the members whose graphic designs are voted to have obtained the predetermined proficiency level, would have their activation fee or deposit returned, and then be eligible to participate in, e.g., a free contest for winning a prize (the free contest may be another graphic design contest). Note that the proficiency level for the present embodiment may be, e.g., receiving a predetermined percentage of the votes (e.g., 5%), or receiving at least a predetermined number of votes, or receiving enough votes to be one of a predetermined number of top vote obtainers (e.g., the designs gathering the 100 highest numbers of votes).

Moreover, as discussed further hereinbelow, an important aspect of at least some embodiments of the compensation model is the fairness of a contest associated with the user-funded service and/or the prize-winning service. For example, assuming names and addresses of users paying the activation fee or deposit is checked against other users that previously paid the activation fee or deposit for duplicates, such a procedure can be used to prevent a user from registering a large number of times and thereby distort the user's chances of attaining a particular proficiency level and/or subsequently winning a prize. In particular, requiring an activation fee or deposit can substantially reduce a user receiving an unfair advantage since when each user pays for each registration, and the mechanism for such payment via a network (Internet) transaction requires the user to identify him/herself via, e.g., a credit card or a debit card. Additional/alternative, identification may be by a cell phone or other phone number that is acquired by the network site, wherein such additional information may used to verify a user's identity.

In another embodiment, the user's activation fee or deposit may be designated as a gift to a charity. Thus, the site operator may not receive any compensation from the user-funded service.

In at least some embodiments of the compensation model, network site operators may receive compensation for either or both of the user-funded service and/or the prize-winning service from advertisers whose advertisements are presented to users during their participation in an instance(s) of the user-funded service and/or the prize-winning service. In one embodiment, advertisers for the user funded and/or prize-winning service instances may sponsor one or more users to participate in the user funded and/or prize-winning service. For example, a well known poker player, or an especially proficient poker player, may be sponsored by an advertiser to play in a free poker tournament for winning prizes, and each poker hand won by a user from the well known poker player (wherein, e.g., the well known player does not fold) may contribute to the user winning a prize that is above and beyond merely winning the poker hand. Additionally/alternatively, an advertiser may sponsor a user, e.g., based on proficiency information of the users, wherein the user's potential charges in the user-funded service are paid (if necessary) by an advertiser selected by the user. In one embodiment, instead of (or in addition to) paying an activation fee or deposit, a user may select one or more advertisers from which to receive advertising and/or from which not to receive advertising. In the case where a user does not pay the activation fee or deposit, e.g., when it is paid by an advertiser or sponsor, the user may win prizes in the so called user-funded service, and there need not be a separate prize-winning service instance. For example, a beverage company might sponsor a prize of free beverages for a year in an instance of a prize-winning service, and the beverage company may provide the majority of the ads presented during one or both of the user-funded service and/or the prize-winning service instances. However, note that it may still be advantageous for users to pay an activation fee or deposit (or at least providing card/debit card information) in order to reduce the possibility of a user receiving unfair advantage in winning prizes as discussed hereinabove. Advertisers may provide prizes throughout the game as well as provide a prize to the ultimate winner(s).

In one embodiment, a game of skill is combined with a game of risk so that the combination creates a new game requiring an entrant to use skill to be recognized as a winner.

In one embodiment the users may choose the advertiser(s) or the advertising area of interest that they desire to view. The ability of a player to recall information in the advertising presented during the contest may be used to determine the winner.

In one embodiment, there may be a combination of a charitable contribution and a deposit or payment that is for a predetermined purpose e.g., paying for an item of information or the ability to cast a vote.

In one embodiment, an organization for which the user is a member may provide a deposit for a user-funded service to assist the user in attaining a higher proficiency level e.g., a dating service organization may provide its members with the opportunity to learn and exhibit their proficiency in email etiquette via an instance of a user-funded service.

In one embodiment, the present compensation model can be used for providing more integrity to Internet chat rooms since users would be required to pay an activation fee or deposit which may be returned to the user after, e.g., there are fewer than a predetermined number of complaints about the user.

The present disclosure further includes a computerized interactive advertising system (i.e., method and apparatus) for exchanging information regarding goods and/or services between a first population of users (hereinafter also known as "players" or "users") and a second population of users (hereinafter also known as "sponsors" or "advertisers"). In particular, the sponsors or advertisers may present information related to goods and/or services to the players using the present invention and the players may view this information while, for example, interacting with the present invention for playing a game such as blackjack, craps, roulette, poker, pai gow or the like. Moreover, a player may also interact with the present invention so that the player has the capability for responding to sponsor or advertiser presented questionnaires, as well as for purchasing or viewing sponsor goods and/or services. Thus, the present invention provides an information exchange service within a gaming context for enticing players to view and/or interact with sponsor presentations such as interactive advertisements.

It is also an aspect of the present disclosure that each player or user is presented with advertisements for products and/or services, wherein it is believed the player will be receptive to the advertisement. That is, the present interactive advertising system selectively presents advertisements to each player, according to stored characteristics and preferences of the player that the present interactive advertising system has determined from, for example, player supplied personal information, player responses to questions, and/or analysis of player interactions such as player requests for additional information related an advertisement. Thus, such a selective presentation of advertisements allows a sponsor or advertiser to provide information related to relatively extensive or expensive promotionals (e.g., demonstrations, samples, discounts, trial subscriptions, prizes, bonuses) to players most likely to subsequently purchase the advertised product or service. Consequently, such selectivity can greatly increase the cost effectiveness of advertising, wherein the term, advertising (or advertising presentation), as used herein is understood to include not only product or service presentations that are merely informational, but also more interactive advertising presentations such as promotionals wherein discounts, free samples or a trial usage may be offered.

Moreover, it is an aspect of the present interactive advertising system that each player may interact with and play a game at a time and pace (i.e., tempo) substantially of the player's choosing. In particular, the player is not bound by a required order or sequence of play involving other players, even though the player may be in competition with other players. In fact, a player may cease play for an extended time while in the midst of a game and subsequently continue the game at the point where the player ceased to play. Thus, if the present interactive advertising system is easily accessible, then players may interact with the present interactive advertising system at their leisure.

Accordingly, in a related aspect of the present disclosure, it is intended that players (more generally, users) are able to interact with the present invention remotely, as for example, via the Internet and/or an interactive cable television network. Thus, using an Internet embodiment as an exemplary embodiment of the present invention, a gaming web site may be provided wherein players may access the interactive gaming capabilities of the present invention and substantially simultaneously also be presented with sponsor or advertiser provided information related to goods and/or services of the sponsor or advertiser (those two terms being used substantially interchangeably to denote e.g., those who provide advertising to users and/or subsidize game playing, product promotionals or network access). Moreover, the sponsor provided information may include, for example, hypertext links (also denoted hyperlinks) that allow players to activate, for example, network transfers for obtaining additional information regarding a sponsor's goods and/or services regardless of the status of any game in which a player may be currently involved at the gaming web site.

It is a further aspect in one embodiment of the present invention that a player is able to commence play of a game at substantially any time the player accesses the present invention. That is, it is not necessary for any previous game being played by other players to be completed for the player to commence play. In other words, games provided by the present invention may be continuously and asynchronously commenced or entered by players.

It is a further aspect of the present invention to require each player to use a distinct identification provided when the player "registers" with the present invention before playing any games so that a network site for the invention may be able to identify each player. Accordingly, it is an aspect of the present invention during registration, that each player provides personal information about him/herself both for gaming identification and for use as selection criteria by sponsors or advertisers for presenting particular presentations. For example, in the case of an Internet embodiment of the present invention, such registering can be performed via the Internet prior to play of any games at a gaming/advertising web site. Thus, players may be required to provide the present invention with information about themselves such as name, address, E-mail address, age, sex, and/or other player characteristics deemed pertinent to one or more sponsors or advertisers. Accordingly, the present invention provides a sponsor or advertiser with the capability to target its presentations substantially only to players or users having selected characteristics as, for example, determined from player information provided when registering with a network site for the present invention.

It is a further aspect of the present invention to have players compete against one another for prizes in one or more gaming tournaments. Using the Internet embodiment of the present invention as illustrative, a gaming/advertising web site for the present invention may partition the population of players into competitive groups wherein each group includes the players for a distinct tournament. Moreover, the present invention may determine a competitive group according to criteria such as: (a) the game(s) to be played in the tournament; (b) a skill level for the players (e.g., as determined by play in a previous tournament(s)); (c) particular player characteristics such as age, area of residence, home ownership, etc.; (d) particular player lifestyle traits such as traits exhibited by exercise enthusiasts or cruise ship enthusiasts; and (e) particular player preferences such as preferences related to jewelry, personal care products or particular sports.

It is a further aspect of the present invention to allow players to play games offered by the present invention without incurring financial risk or charges beyond those that are typical for the network being used in accessing the present invention.

It is a particular aspect of the present invention to provide blackjack and other casino-style games such as craps, roulette, poker, pai gow, or variations thereof, wherein such games may be played by a plurality of players continuously and asynchronously, and wherein each game is likely to be unique from all other games being played concurrently. Furthermore, in a related aspect of the present invention, such games may be automated so as to not require a manual dealer. Also, the present invention may be played, in one embodiment, in a gaming establishment (e.g., casino) using low cost gaming stations at which players may play such games entirely electronically. Alternatively, in another embodiment, the present invention may be used to play such casino style games as blackjack on the Internet. In this later embodiment, a blackjack game controller for the present invention communicates with blackjack players at Internet client nodes via a web site from which the blackjack game controller is accessed. Thus, blackjack players may play blackjack in the privacy of their own homes and at their leisure since the present invention does not require that a particular tempo of a blackjack game be maintained.

Additionally, the present invention utilizes novel varieties in such games, as blackjack, that make the games more enjoyable for users. For example, using variations of blackjack as illustrative, in one novel embodiment wherein the dealer functions are automated by a dealer module, this module can play blackjack with a plurality of players concurrently such that each player appears to be playing exclusively with the dealer module (e.g., "head-to-head"). Moreover, in one blackjack embodiment, each blackjack game is played asynchronously from other concurrent blackjack games with the dealer module. Furthermore, the dealer module may play a different dealer card hand with each player. In particular, the initial one (or two) cards (or card representations) dealt to the dealer for each game are unlikely to be the same for any two blackjack games being player with the dealer module; i.e., the probability of any two concurrently played blackjack games being identical is substantially equal to chance. Accordingly, this variation is particularly worthwhile when players are playing remotely through a network such as the Internet. Alternatively, in a different blackjack variation, the dealer module and each player concurrently playing blackjack with the dealer module may be provided with cards (or card representations) from the beginning of an identical sequence of card representations. Thus, each concurrently playing player receives an identical initial card hand and the dealer is also dealt an identical initial card hand. Subsequently, the card hands within each concurrent game will vary only if players request further cards differently. Accordingly, this variation of blackjack is particularly useful in tournament blackjack played within the confines of a casino, wherein the play of each player in the tournament is synchronized to start and stop within a predetermined interval. Note that this variation of blackjack is enjoyed by tournament players in that the tournament players may consider it a better or fairer way for demonstrating blackjack playing skill.

Additional features and benefits of the present disclosure are provided hereinbelow. The present SUMMARY section is not intended to provide a comprehensive description of the novel aspects provided herein. The claims provided hereinbelow are intended to define the novel features for patent protection. Moreover, to the extent that one of ordinary skill in the art can modify and/or combine various aspects of the present disclosure, such modifications and/or combinations are within the scope of the present disclosure from which patent protection can be sought. Accordingly, any operable novel combination of the embodiments of the user-funded service (and its operation), the prize-winning service (and its operation), and the compensation model (and its operation) disclosed herein may be recited in the claims hereinbelow.

Other features and benefits of the present invention will become apparent from the detailed description with the accompanying figures contained hereinafter.

BRIEF DESCRIPTION OF THE DRAWINGS

FIGS. 8A and 8B is a block diagram of an alternative embodiment of the present invention wherein an advertisement sending daemon (i.e., TCP/IP daemon ad sender on the host computer 308) and an advertisement receiving daemon 806 (on the client end user machine 318) communicate for periodically displaying advertisements and other announcements to a user on the end user machine 318.

DETAILED DESCRIPTION

Figure 1:
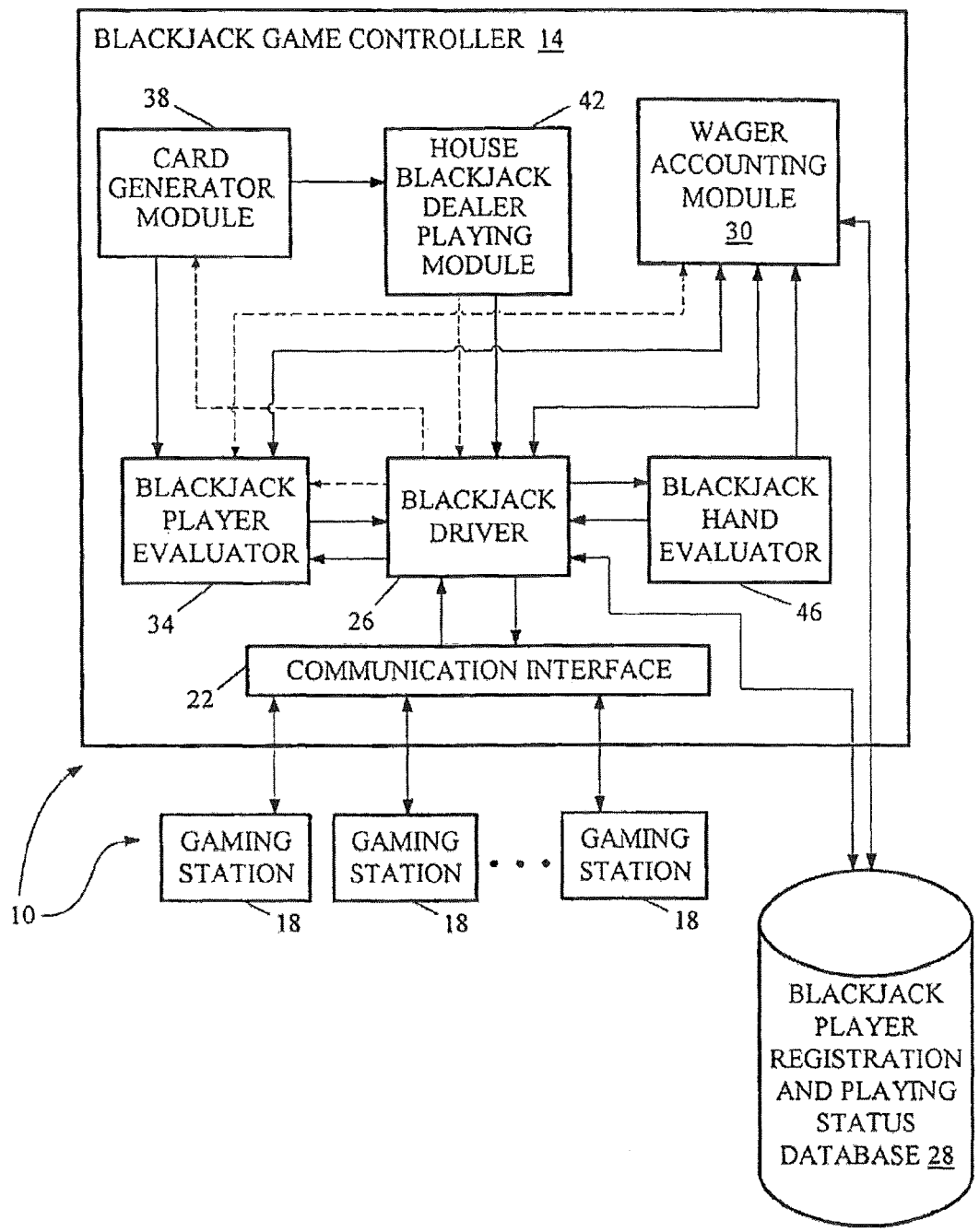
FIG. 1 is a block diagram of an embodiment of the present invention wherein this embodiment may be used within a blackjack gaming establishment such as a casino.

In FIG. 1, a block diagram is presented of a first embodiment of an electronic system 10 for the present invention for playing blackjack, wherein data flows are represented by solid arrows and control flows are represented by dashed arrows. In particular, the embodiment of FIG. 1 presents an architecture for the present invention for use on, for example, a local network within a casino, wherein low cost gaming stations may be utilized. Accordingly, the blackjack gaming system 10 includes a blackjack game controller 14 electronically connected to one or more potentially remote gaming stations 18 so that for each gaming station a player may play blackjack. In the blackjack gaming system 10, the blackjack game controller 14 functions substantially as a dealer would in a manually operated blackjack game and each gaming station 18 provides a blackjack player with an electronic representation of a blackjack game wherein it may appear that the player (i.e., user) at the gaming station 18 is the only player playing against the dealer (i.e., "head-to-head" against the blackjack game controller 14). Accordingly, each gaming station 18, as will be discussed with reference to FIG. 2 below, includes a display for displaying both the dealer's cards and the player's cards. Each gaming station 18 also includes player interaction capabilities for requesting additional cards, activating various blackjack player options at appropriate times, and potentially increasing various wagers at predetermined phases of a blackjack game. Further note that each gaming station 18, when in operation, may request a security code be provided by a player for identifying himself/herself or, alternatively, the gaming station may request the player to insert an electronic card (not shown) into the gaming station 18 so that information electronically encoded upon the card is read at the gaming station and transferred to the blackjack controller 14.

Referring now to the internal structure of the blackjack game controller 14, a gaming station interface 22 is provided for interfacing with each of the gaming stations 18. In particular, the gaming station interface 22 buffers data signals between the other components included within the blackjack game controller 14 and the gaming stations 18. For example, the gaming station interface 22 may have speed matching buffers in order to adjust for differences in speed between the blackjack game controller 14 and the gaming stations 18. A blackjack driver 26 exchanges data with the gaming station interface 22. The blackjack driver 26 substantially coordinates the operation of the blackjack game controller 14. In particular, the following capabilities are substantially provided by the blackjack driver 26:

(1.1) identifies each player requesting to play blackjack at one of the gaming stations 18;

(1.2) creates internal data structures for communication with other modules of the blackjack game controller 14 regarding each blackjack game being played; in particular, blackjack gaming data objects or records are (re)instantiated with each player request, such data objects providing sufficient information for the blackjack game controller 14 to properly respond to each received player request;

(1.3) determines the output of the blackjack game controller 14 to each of the active gaming stations 18;

(1.4) distributes blackjack gaming data between other modules of the blackjack game controller 14; and (1.5) provides card representations to gaming stations 18.

In performing the above tasks, the blackjack driver 26 communicates with a blackjack player registration and playing status database 28. The database system 28 maintains in persistent storage information regarding each blackjack player. In particular, the database system 28 maintains:

(2.1) information identifying each player; e.g., a unique player identification code;

(2.2) information regarding, for example, each blackjack player's financial status; in particular, a credit limit and a current amount of funds (either to be paid or received from the player);

(2.3) for each person registered to play blackjack, information regarding the status or context of any game the player is presently playing; that is, sufficient information is stored so that the blackjack game controller 14 can retrieve this information and continue a blackjack game in response to receiving a player's request;

(2.4) for each person registered to play blackjack, information regarding any blackjack tournament that the player is playing; in particular, since such a tournament typically requires a tournament player to complete a specified number of blackjack games in a predetermined amount of time and/or to complete a specified number of blackjack games out of a total number of blackjack games, the following types of information may be stored: (a) information relating to the number of blackjack games completed by the player; (b) information related to the time and/or the number of games remaining in the tournament; and (c) information related to the amount of funds or points in the player's account for the tournament.

The blackjack driver 26 communicates with a wager accounting module 30 wherein the wager accounting module provides the following capabilities:

(3.1) determines various wagering limit parameters for the next one or more blackjack games to be played (e.g., the wagering limit per game and the total wagering limit per player); and (3.2) performs wagering accounting for each player's wins and losses.

Thus, the wager accounting module 30 is instrumental in initializing a new blackjack game in that this module receives and maintains financial information related to each currently active player at a gaming station 18. Thus, the wager accounting module 30 has a communication data channel with the blackjack player registration and playing status database 28 so that the wager accounting module 30 may retrieve information for determining whether the player has, for example, sufficient financial resources to cover potential wagering losses. Of course, to provide waging evaluation information to other controller 14 modules, the wager accounting module 30 receives identifying information from each such module requesting an evaluation.

The blackjack driver 26 also communicates with a blackjack player evaluator 34. The blackjack player evaluator 34 receives, from each player (via instantiations of blackjack gaming data objects from the blackjack driver 26), all blackjack player requests except the data from each player indicating an amount to be wagered. Thus, the blackjack player evaluator 34:

(4.1) determines each player's options during blackjack games; and (4.2) responds to player requests for hits or to, for example, split pairs.

Thus, the blackjack player evaluator 34 enforces the gaming establishment rules related to player options during a blackjack game. Note, however, that in responding to certain player requests, the blackjack player evaluator 34 communicates with the wager accounting module 30 to confirm that a proper wager accompanies the requested option and that the wager is acceptable to the wager accounting module 30.

The blackjack player evaluator 34 is supplied with data corresponding to blackjack card representations from a card generator module 38. The card generator module 38 generates for example, an ordered collection or sequence of substantially random card representations and each such card representation is provided to the blackjack player evaluator 34, wherein the blackjack player evaluator responds to each player's valid hit request by outputting the most recent card representation received from the card generator module 38. That is, each player at a gaming station 18 receives a card representation according to when the player's request is received by the blackjack player evaluator 34.

Further, note that the card generator module 38 also supplies the same card representations as supplied to the blackjack player evaluator 34 to a house blackjack playing module 42, wherein this latter module plays the dealer's hand in each blackjack game. Thus, the house blackjack playing module 42 enforces the blackjack gaming rules on behalf of the gaming establishment. In particular, this module determines when and how insurance bets can be made related to the dealer's cards. Note, as with the blackjack player evaluator 34, the house blackjack playing module 42 outputs, when required to provide the dealer's hand with another card representation at a gaming station 18, the most recent card representation received from the card generator module 38. Further note that the house blackjack playing module 42 provides control information to the blackjack driver 26, particularly regarding activation of the blackjack insurance option. This information, in turn, is conveyed to the blackjack player evaluator 34 so that this latter evaluator may activate the insurance option for each player at an active gaming station 18.

A blackjack hand evaluator 46 is also in communication with the blackjack driver 26. The blackjack hand evaluator 46 evaluates each player's hand(s) in comparison to the dealer's blackjack hand for determining the win/loss/tie for each player's hand. Thus, the dealer's hand and the one or more hands played by each player at a gaming station 18 is supplied to the blackjack hand evaluator 46. Subsequently, this evaluator outputs win/loss/tie results to the gaming stations 18 via the blackjack driver 26 and the gaming station interface 22. Further, the blackjack hand evaluator 46 also outputs win/loss/tie results along with the identity of the player playing each hand to the wager accounting module 30 so that wager credits and debits for each player's account may be updated according to the last or most recent blackjack game results.

Figure 2:
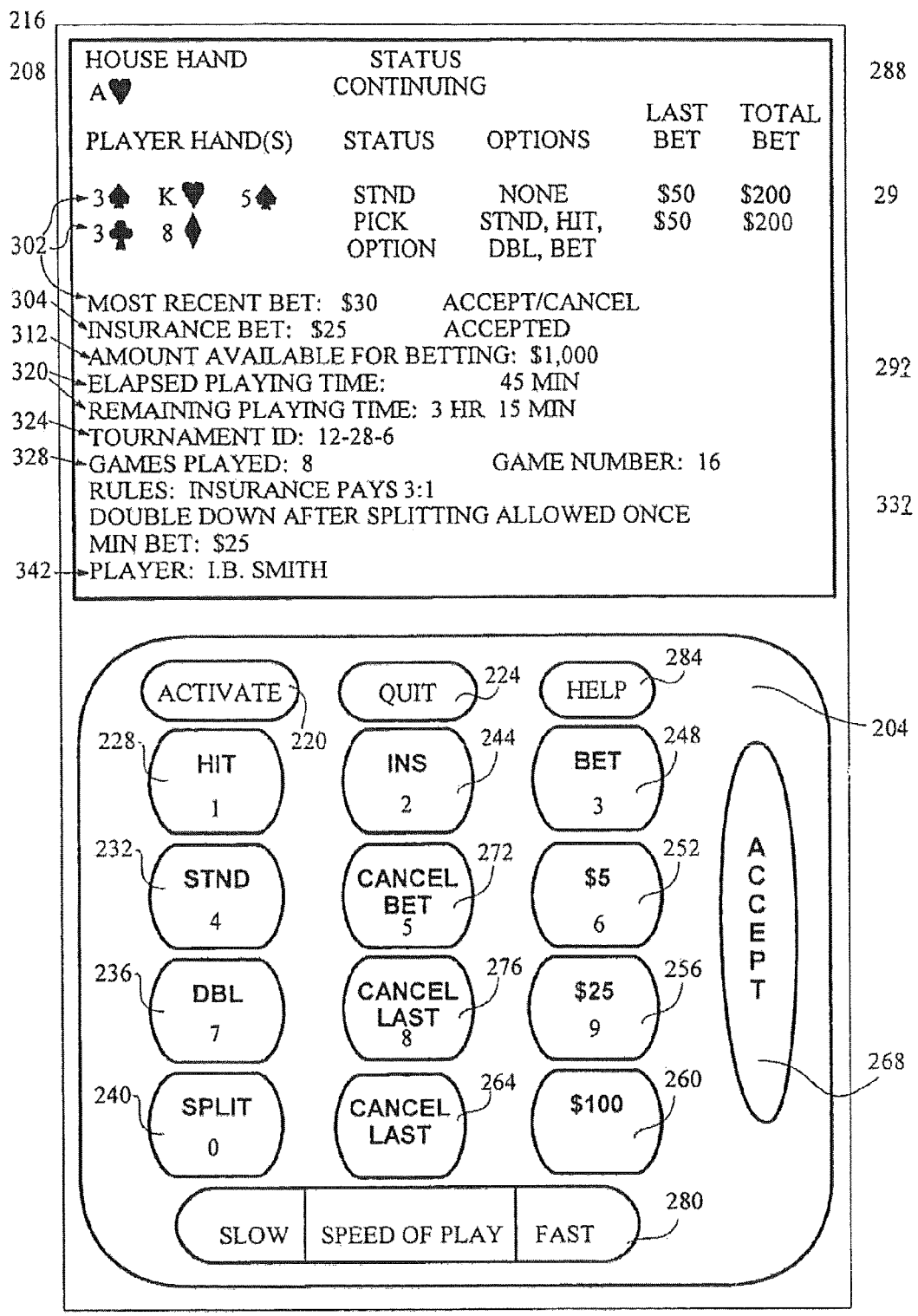
FIG. 2 provides a representation of the gaming stations 18 of FIG. 1 wherein these gaming stations are used in gaming establishments for playing blackjack.

In FIG. 2, an embodiment of a gaming station 18 is illustrated. The gaming station 18 includes a player input area 204 wherein a player may press touch-sensitive portions of a thin film laminated with blackjack player operations and requests. Immediately above the player input area is a player output display area 208 for displaying blackjack gaming information related to the player. Optionally, each gaming station 18 may include a player identification card reader 216 so that a blackjack player may identify him/herself at a gaming station 18 by swiping a magnetic identification portion of a player identification card (not shown) through the card slot 220 thereby allowing the card reader 216 to transmit the player's encoded identification upon his/her card to the blackjack game controller 14. However, it should be noted that other configurations of the gaming station 18 are also contemplated by the present invention. In particular, gaming station 18 may not have a card reader 216. Instead, a blackjack player may be required to register either manually or automatically at a site remote from the gaming station 18, or, alternatively personal identification numbers may be provided to players for identifying themselves via the player input area 204 wherein, for example, a numeric digit provided in the lower bottom portion of some of the touch-sensitive areas may be used by the player to input a personal identification number. Further, the arrangement of the touch-sensitive portions of the player input area 204 and the format of the display area 208 (both being discussed in detail below) may have other arrangements and still be within the scope of the present invention.

Describing in detail now the touch-sensitive portions of the player input area 204, an activate/enter next game button 220 is provided. This button is used to initially activate the gaming station 18 so that a "request to play" signal is transmitted to the blackjack driver 26. That is, assuming a player activates this button at a gaming station 18, the blackjack driver 26 responds by requesting that the player input his/her identification via, for example, placing an identification card in the card reader 216 and/or a personal identification number via the player input area 204. Additionally, note that the button 220 may be pressed at the end of a blackjack game for indicating that the player wishes to play another blackjack game. Note that in one embodiment of the present invention when consecutive games are played by a player, the player need only press the button 220 to commence a new game. That is, the player's identification need not be entered for each consecutive game played (assuming the button 220 is activated within a predetermined time after the last game has terminated).

The player input area 204 also includes a quit button 224 that a player may press to explicitly indicate the player's desire to terminate any further gaming at the gaming station 18.

Additionally, buttons 228 through 248 provide the player with the capabilities to request the following blackjack gaming requests:

(5.1) The "HIT" button 228 allows the player to request another card to be dealt to him/her.

(5.2) The "STND" button 232 allows the player to stand on a current blackjack hand.

(5.3) The "DBL" button 236 allows the player to double down under appropriate circumstances as determined by the blackjack player evaluator 34.

(5.4) The "SPLIT" button 240 allows the player to split the player's first two cards into two separate blackjack hands when these first two cards are identical.

(5.5) The "INS" button 244 allows the player to request insurance under the circumstances where the dealer's single face-up card is an ace.

(5.6) The "BET" button 248 allows the player to request that a bet or wager be entered during a blackjack game.

Note that subsequent to requesting a bet via the "BET" button 248, the buttons 252 through 264 are activated so that the player may input various betting amounts. In particular, buttons 252 through 264 provide the player with the option to bet $5.00 (button 252), $25.00 (button 256), $100.00 (button 260) and $500.00 (button 264). Moreover, a sequence of the buttons 252 through 264 may be pressed for obtaining a bet not provided by a single button. For example, to bet $130.00, the player presses consecutively each of the buttons 252, 256 and 260 (in any order) exactly once.

The player input area 204 also includes various confirm and cancel buttons 268 through 276. The accept button 268 allows the user to accept a last input. For example, it is an aspect in the present embodiment of the invention that after each user input, the input is accepted either by the player explicitly pressing the accept button 268 or by allowing a predetermined amount of time to expire after the last player input. The "CANCEL BET" button 272 allows the user to cancel an immediately preceding bet that was input. However, note that if a time limit is exceeded for placing a bet due to, for example, the player pressing the "CANCEL" button 272, then any minimum bet required will be automatically wagered on the player's behalf by the wager accounting module 30. Further, the "CANCEL LAST" button 276 may be used by the player to cancel the immediately preceding wager of one of the dollar amount buttons 252 through 264. Thus, if a player intended to bet $125.00 by pressing first the button 260 followed by the button 256 but instead pressed the button sequence 260 and 264, then the player may press the button 276 for cancelling the $500.00 bet associated with button 264 and subsequently the player presses the button 256 to obtain the desired bet of $125.00. Note further that pressing the "CANCEL LAST" button twice in succession also cancels the entire bet.

A "SPEED OF PLAY" button 280 may be optionally provided on the player input area 204. This button allows the player to specify to the blackjack driver 26, for example, the predetermined amount of time after a player input to wait before each subsequent input is automatically accepted. In one embodiment of the present invention, the "SPEED OF PLAY" button 280 includes active areas at each end of the button, wherein if the user presses the "slower" end of the button 280, then the predetermined time(s) for automatically accepting a player input is lengthened. Alternatively, if the player presses the "faster" end of the button 280, then the predetermined default acceptance time(s) becomes shorter. However, it is important to note that the tempo of the blackjack game is, using the present invention, no longer as important as in typical blackjack gaming situations. That is, since each blackjack player using the present invention is not playing in sequence with other players, there is less concern about speedily playing so as not to delay other players.

Lastly, the player input area 204 includes a "HELP" button 284 for allowing the player to request assistance from, for example, the personnel of the gaming establishment providing the gaming station 18.

Referring now to display area 208, the screen display provided here is but one of a number of contemplated screen layouts for the present invention. In particular, the screen layout illustrated in display area 208 is a representative layout for use in playing tournament blackjack. Thus, when other modes of blackjack are played other than tournament blackjack, then it is within the scope of the present invention to modify the fields represented in the display area 208 according to the player needs for the type of blackjack being played. Further, it is important to note that in one embodiment, the display 208 is in color so that, for example, diamonds and hearts are in red and spades and clubs are in black, and various fields of the display area 208 may be highlighted for focusing a player's attention on the portion of the display providing information most relevant to the player's currently permissible options.

Describing now the fields currently presented in display 208, at the top of the display is the house hand area 288: (a) for providing a representation of the cards that have been dealt to the house; (b) for providing a status of the house hand (i.e. one of: "STND" for standing, "BUSTED", when the value of the house hand exceeds 21, and "CONTINUING" when the house may take additional hits. That is, this field provides an annotation "house hand:" followed by a representation for at least one card that has been dealt to the house; i.e., an ace of hearts. In the player's hand area 292 of the display area 208, there are five columns providing information related to each blackjack hand the player is currently playing in the blackjack game. The columns provide the following information:

(6.1) The "PLAYER HAND(S)" column provides, in each row of this column, a different blackjack hand that is being played simultaneously by the player in the current blackjack game. Thus, two blackjack hands are presently represented as being played simultaneously by the player on the display area 208. That is, an upper or first hand having a three of spades, king of hearts, and a five of spades, and, a lower or second blackjack hand having a three of clubs and an eight of diamonds. (Note, when a player chooses to double down, card representations in common between two blackjack hands may be displayed in a row between the remaining card representations for both hands. Alternatively, card representations in common between blackjack hands may be duplicated in the blackjack hands to which the common cards representations apply.)

(6.2) A "STATUS" column for indicating the current status of each blackjack hand the player is playing. That is, for the first or upper hand that the player currently is playing the status is "STND" thereby indicating that the player has elected to stand on this hand. Alternatively, for the second or lower hand a status of "PICK OPTION" is provided thereby indicating that it is the player's turn to pick a blackjack playing option for this hand. Note that there are at least three possible values for the status field of each blackjack hand being played. That is, in addition to the two represented in FIG. 2, a "BUSTED" status value is output for indicating that the value of the related blackjack hand has exceeded 21.

(6.3) The "OPTIONS" column provides, for each blackjack hand being played, an indication of the permissible blackjack plays that the player currently may select from for the related blackjack hand in the same row. Thus, for the first hand illustrated in area 292, there are no options remaining for the player to play related to this hand. However, on the second hand, four permissible player inputs are displayed as options to the player. That is, the player may stand on the related hand (STND) by pressing button 232, the player may request a hit (HIT) by pressing button 228, the player may double down (DBL) by pressing button 236 and the player may bet an additional wager by pressing button 248 and subsequently putting a bet amount using buttons 252 through 264.

(6.4) The "LAST BET" column displays to the player his/her last bet for each blackjack hand the player is currently playing. In particular, for both the upper and lower hands shown in area 292, the player's last bet was $50.00. (6.5) The "TOTAL BET" column displays to the player the total bet the player has wagered on the blackjack hand to which it relates. For example, in FIG. 2, in both the upper and lower player's blackjack hands displayed, the player has bet al. total of $200.00.

Below the player hand area 292 is the player information area 296 wherein additional blackjack gaming information relating to the player is displayed. In particular, labeled line 300 displays the most recent bet amount that the player has requested along with a tag indicating the status (e.g., "ACCEPT/CANCEL") of the most recent bet. Note that the status may be: (a) "ACCEPTED" for explicitly or implicitly indicating the acceptance of a displayed wager (via the player pressing the accept button 268 or by default due to a time limit expiring); (b) "CANCELLED" for explicitly indicating the cancellation of the last entered wager (via the player pressing either of the cancel buttons 272 or 276); (c) "REJECTED", this status being displayed due to the wager accounting module 30 rejecting the player's most recent bet; and (d) "ACCEPT/CANCEL" for indicating that the present invention is waiting a predetermined amount of time for the player to explicitly accept or cancel the most recent bet. Thus, in the example of line 300 in FIG. 2, the player has indicated a most recent bet of $30.00 and the blackjack driver 26 has output a status of "ACCEPT/CANCEL" as in (d) above. Further note that the blackjack hand(s) to which this most recent bet applies may be designated in any of a number of ways such as, for example, highlighting the row(s) in the player hand area 292 of the blackjack hand(s) to which the most recent bet of line 300 applies. Alternately, an indicator such as arrows 302 may be used as in FIG. 2 to indicate to the player that the most recent bet is to be applied to both the upper and lower blackjack hand(s).

Additionally, note that line 304 displays the annotation "INSURANCE BET:" together with any insurance amount that has been bet by the player. Accordingly, the dollar amount on line 304 and the notation at the right end of the line pertain, respectively, to the amount that has been bet as insurance, and the status of this bet (i.e., one of "ACCEPTED", "CANCELLED", "REJECTED" or "ACCEPT/CANCEL" as in line 300).

In line 312 of the player information area 296, the total amount of funds available by the player for betting is displayed. For example, line 312 of FIG. 2 indicates that the player has a total amount for betting of $1,000.00. Note that the wager accounting module 30 maintains this total amount available for betting and updates it after each blackjack game.

The lower three lines 320, 324 and 328 of the player information area 296 provide blackjack player information that is particularly useful when playing in a blackjack tournament. Thus, the information in these three lines may not be displayed when the present invention is used by players not in a tournament. In line 320, two fields are provided for displaying playing time information. The leftmost field, annotated by the label "ELAPSED PLAYING TIME:", displays the total amount of time the player has played blackjack (which in this case is 45 minutes). Alternatively, the rightmost field, annotated by the label "REMAINING PLAYING TIME:", displays the time remaining in the tournament.

In line 324 an identifier for any tournament associated with the present blackjack game is displayed.

In line 328, up to two additional fields are provided that are useful in tournament blackjack. The leftmost field having an annotation of "GAMES PLAYED:" displays to the player the number of blackjack games he/she has completed within a tournament. Note that in some blackjack tournaments each player is required to complete a certain predetermined number of games within a predetermined allotted time period. For example, a blackjack tournament may require each player to play 50 games within a predetermined interval (such as four days). Relatedly, but optionally, in blackjack gaming contexts where the total number of blackjack games in the tournament is meaningful, the rightmost field of line 328, having the annotation "GAME NUMBER:", displays to the player the total number of tournament games that have been completed thus far in the tournament. Accordingly, using at least the leftmost annotated field in line 328 and "REMAINING PLAYING TIME:" annotated field of line 320, the player is able to determine the number of remaining games in the tournament that he/she must play.

Further note that other blackjack game values are contemplated by the present invention. For example, a field providing the number of games remaining that a player must play in the tournament may be added (or substituted for) in addition to the current values in the player information area 296.

In a next display 208 lower area, denoted the rules area 336, blackjack house rules are displayed. In particular, the house rules displayed in area 336 allow variations upon the typical blackjack rules that a player is likely to assume if not presented with information to the contrary. Note that by providing these additional rules on the display of gaming stations 18, successive blackjack games may be provided with different house blackjack rules thereby creating an increased interest in each game by the players and requiring additional blackjack playing skills from the players. Note that three house rules are provided in the present display area 336. That is, (a) insurance for the present blackjack game pays 3 to 1 odds (instead of the typical 2 to 1 odds); (b) the player may double down after splitting only once; and (c) the minimum bet is $25.00 for the current game.

Lastly, the display 208 includes a player identification area 342 for identifying the player currently playing blackjack at the gaming station 18. The present player area 342, includes a field having the current player's name (e.g., I. R. SMITH). However, other fields identifying the player are also contemplated by the present invention including, for example, a player identification number such as the number that may be encoded upon a player identification card used in conjunction with the card reader 216 for identifying the player.

Figure 3:
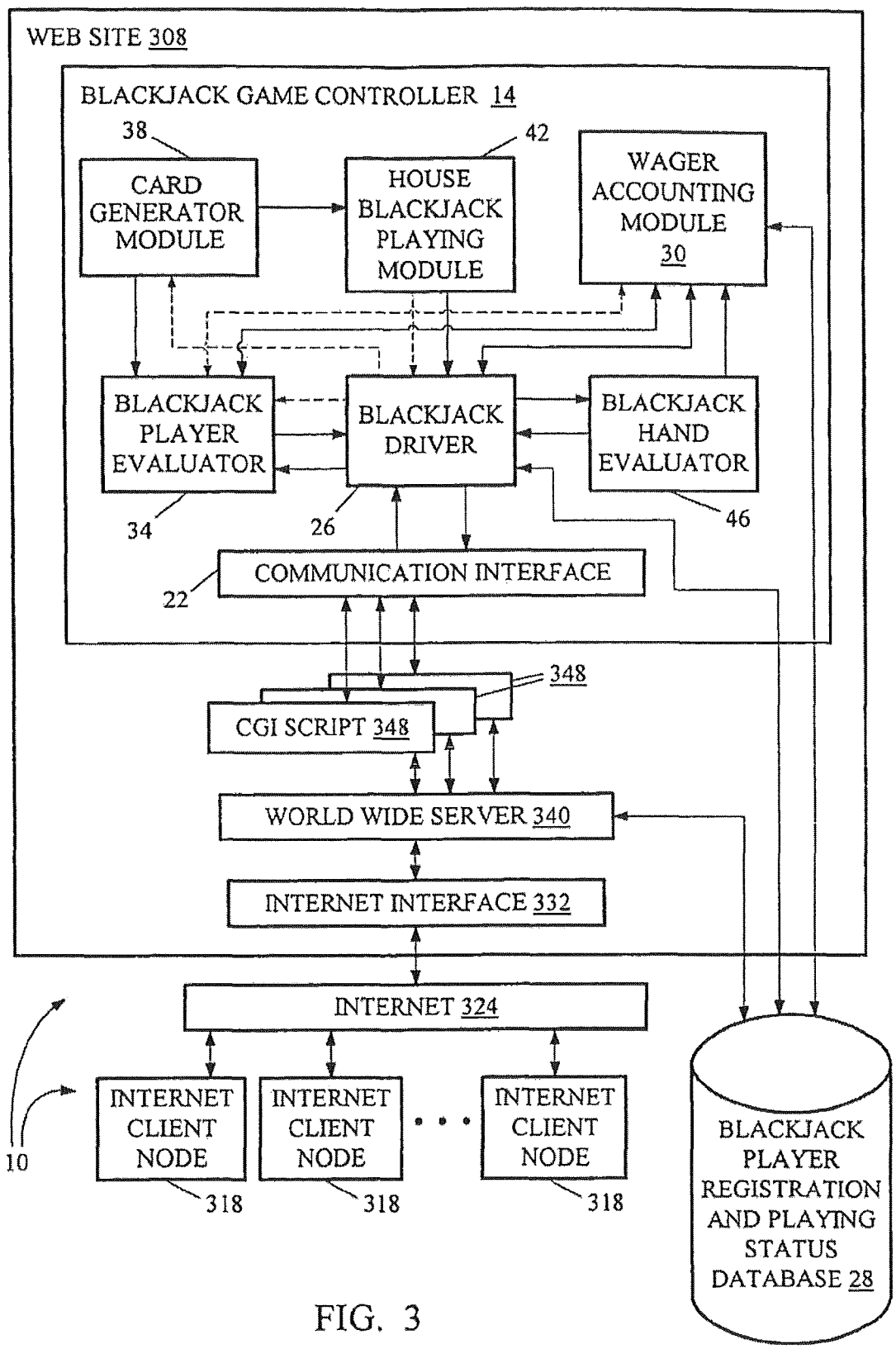
FIG. 3 is a block diagram of an alternative embodiment of the present invention wherein the present invention is used to play blackjack on the Internet.
Figure 4A:
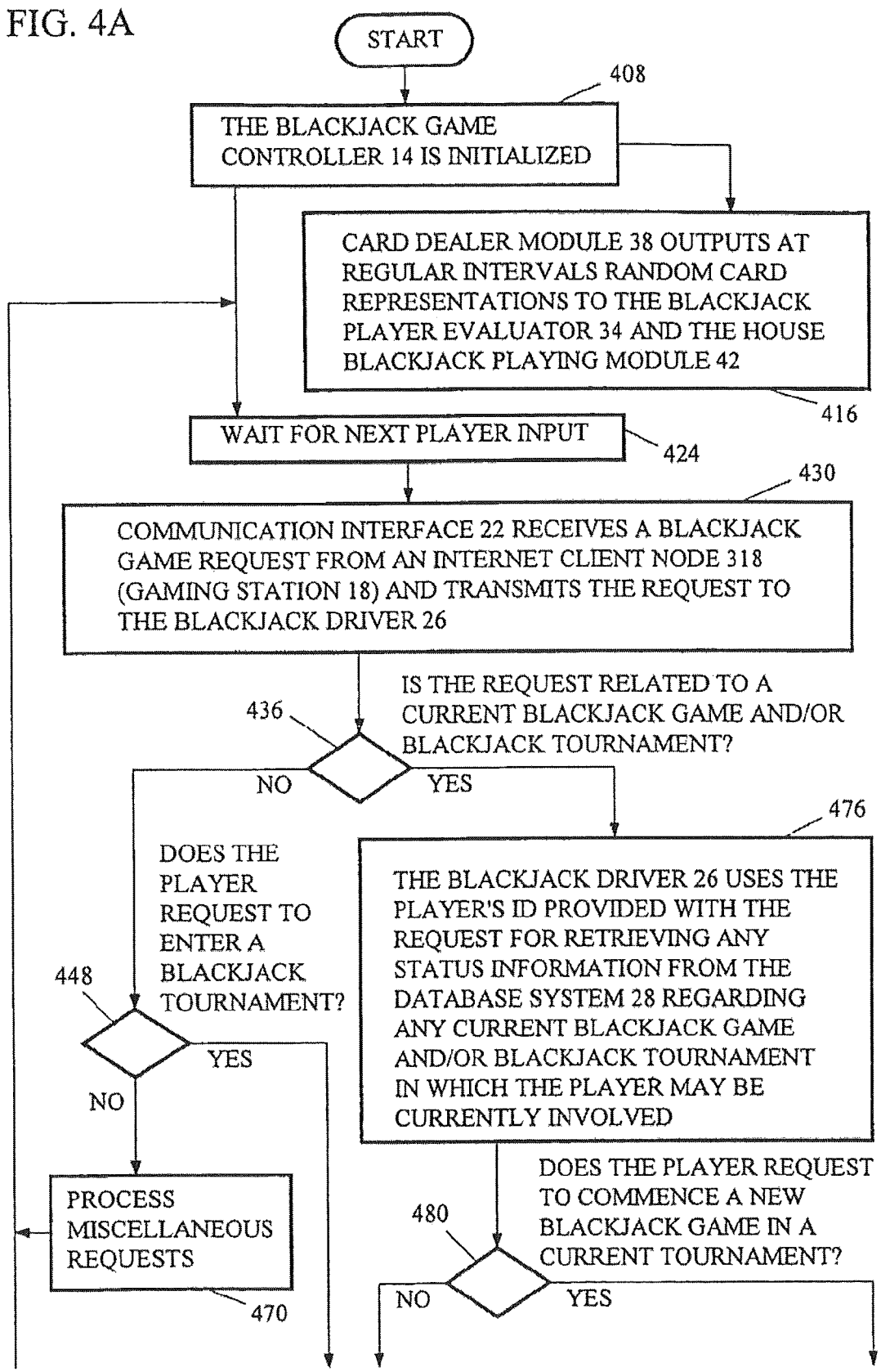
FIGS. 4A-4E represent a flowchart for the processing performed by the blackjack game controller 14 when processing blackjack requests from players in either of the embodiments of FIG. 1 or FIG. 3.
Figure 4B:
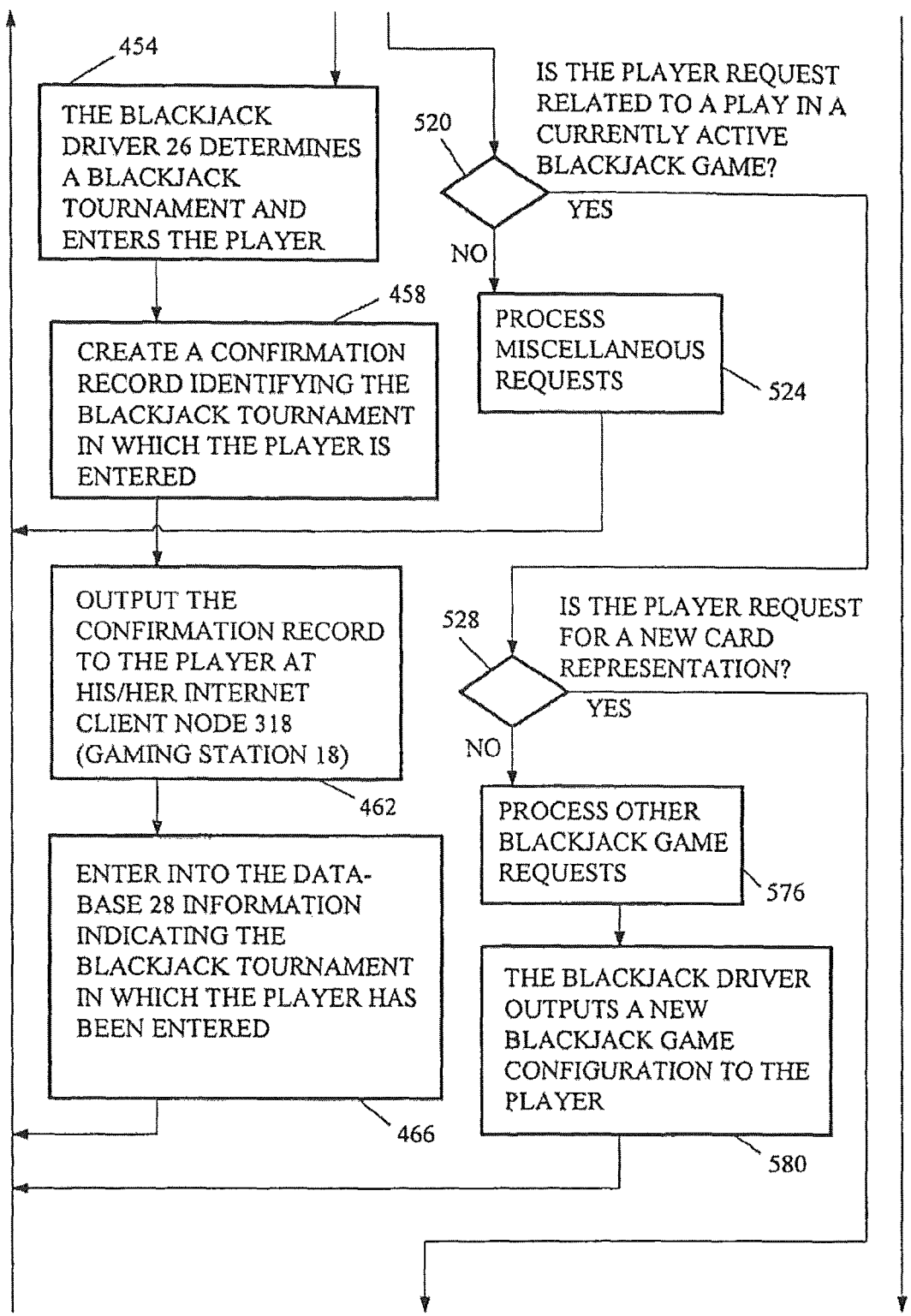
Figure 4C:
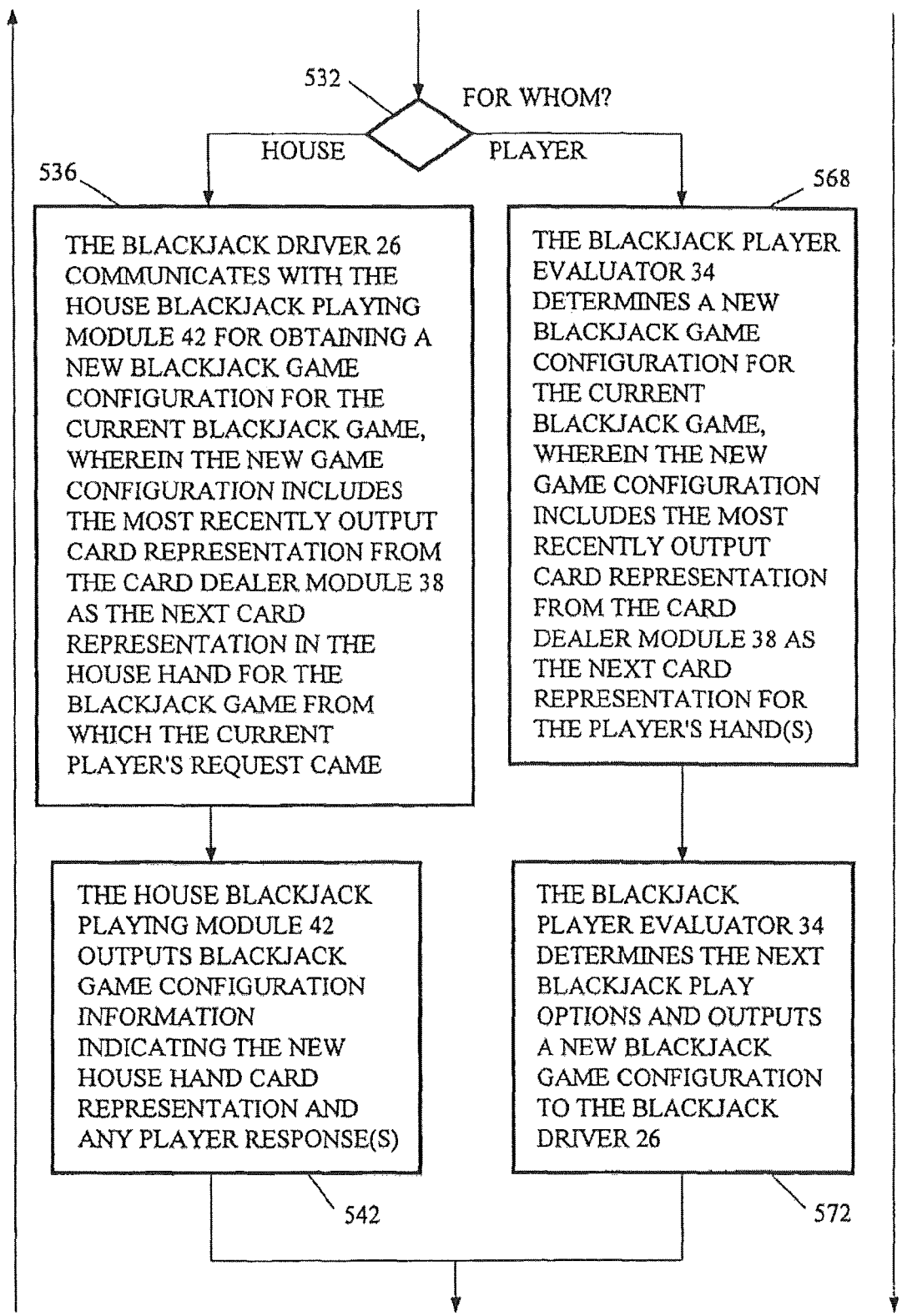
Figure 4D:
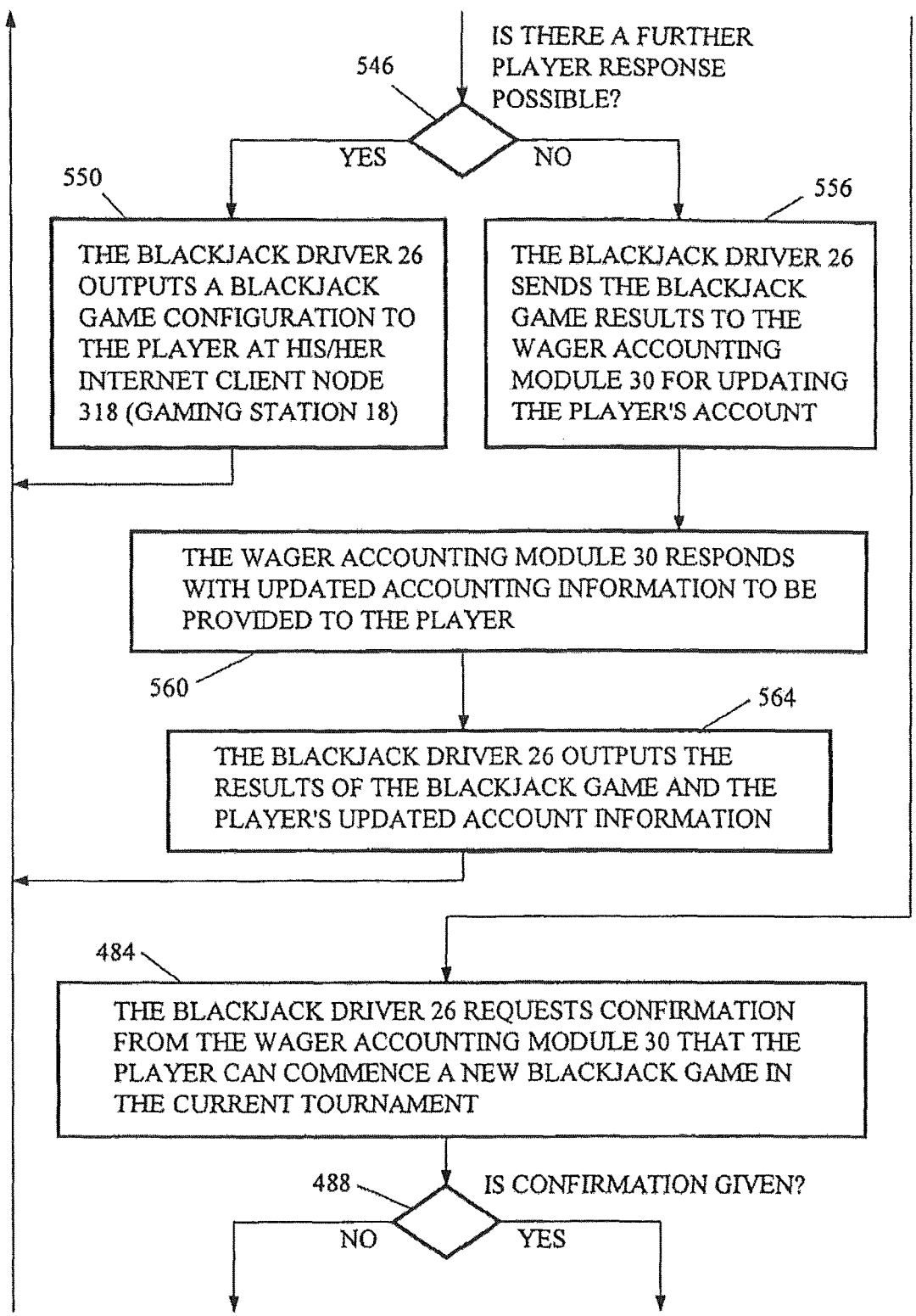
Figure 4E:
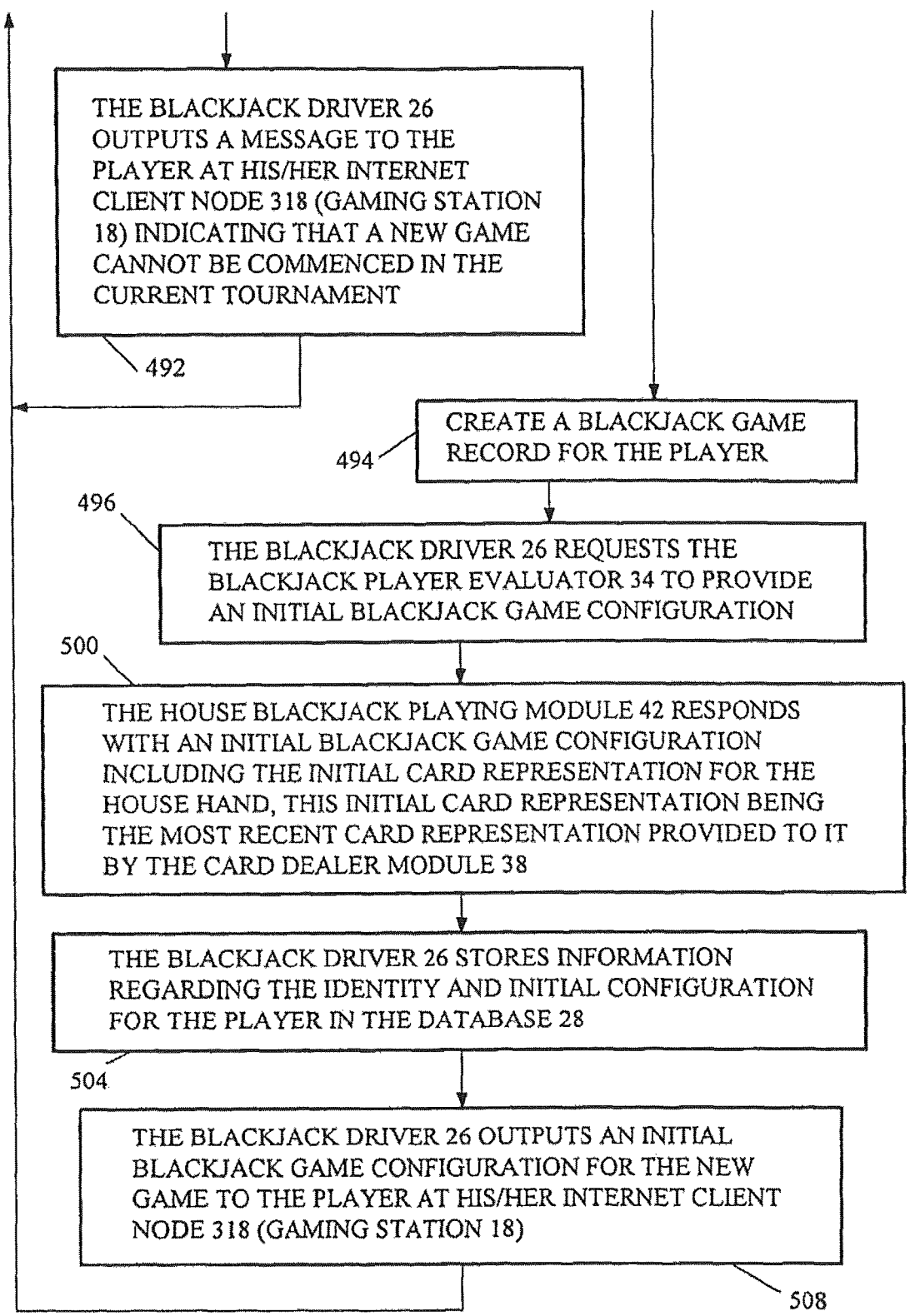

FIG. 3 presents a second embodiment of the blackjack gaming system of the present invention. In this embodiment, the blackjack game controller 14 is substantially the same as described hereinabove. However, this controller 14 is now accessible through an Internet web site 308 so that blackjack players at Internet client nodes 318 can play blackjack on the blackjack game controller 14 via the Internet 324 (or more particularly, via the World Wide Web).

Accordingly, describing the web site 308 in more detail, it includes an Internet interface 332 for receiving and supplying communications between the Internet 324 and the remainder of the web site 308. The Internet interface 332, in turn, communicates with World Wide Web server 340: (a) for validating and/or initiating registration of web site users (e.g., blackjack players) at web site 308; and (b) for interpreting Internet requests for routing and/or activating web site 308 modules that can fulfill such requests. Thus, the World Wide Web server 340 may access the database system 28 for determining the registration identity of, for example, a blackjack player. Additionally, upon receiving user registration confirmation regarding an Internet (e.g., World Wide Web) request, the World Wide Web server 340 activates instantiations of modules known as common gateway interface (CGI) scripts, each CGI script 348 instantiation (or, for simplicity, each such instantiation also being referred to as a CGI script 348) being: (a) for interpreting and processing Internet requests according to the semantics of a web site 308 application associated with the CGI script; and (b) for constructing Internet responses from output from the associated application. Thus, there are one or more common gateway interface modules provided wherein each CGI script 348 (instantiation) invokes the blackjack game controller 14 to process a single Internet blackjack request from an Internet client node 318 where a player is playing blackjack, and subsequently the CGI script 348 constructs an appropriate Internet response from the output received from the blackjack game controller 14.

Since the embodiment of the blackjack game controller 14 of FIG. 3 is substantially identical to that of FIG. 1, a description of its internal structure is not repeated here. However, it is worthwhile to note that the embodiment of FIG. 3 is particularly appropriate when the blackjack game controller 14 executes on a different or remote processor from that of, for instance, the processor performing the CGI script(s) 348. Further, note that if the blackjack game controller 14 executes on the same processor as the other web site 308 modules of FIG. 3, then the communication interface 22 may be unnecessary, and additionally, much of the functionality of the other components of the blackjack game controller 14 may be incorporated into one or more CGI scripts 348. Thus, for example, the blackjack player evaluator 34 functionality may be incorporated into one CGI script 348 while house blackjack playing module 42 functionality may be incorporated into another CGI script.

There are also noteworthy distinctions between the gaming stations 18 of FIGS. 1 and 2 and the Internet client nodes 318 of FIG. 3 as well as distinctions in blackjack play interactions. For example, the following distinctions may be provided:

(7.1) Due to the potentially lengthy delays that occur on the Internet, the embodiment of FIG. 3 does not provide for automatic acceptance of a blackjack play (e.g., acceptance of an input bet or a default to a minimum ante) due to a time period expiring. Thus, the speed of play is determined by the responsiveness of each player and the responsiveness of the Internet.

(7.2) Players may play blackjack in tournaments against one another on the Internet wherein, for each tournament entered by a player, he/she receives, without cost, a predetermined number of points to use for playing in the tournament. Note that prizes may be awarded to tournament winners as incentive to play in such blackjack tournaments. Further note that the time period to complete a tournament may be substantially more lengthy than the time periods for typical blackjack tournament play. For example, a tournament may extend for 90 days since players can play at their leisure.

(7.3) The input keys of gaming station 18 of FIG. 1 may be also presented on the display screens of Internet client nodes 318 wherein the input buttons of gaming station 18 now become active buttons on a blackjack web page generated by the web site 308 and presented to a player at an Internet client node 318. However, note that at least the speed of play key 280 is not necessary, as mentioned in reference to the embodiment of FIGS. 1 and 2 since the speed of play is of diminished importance.

(7.4) There may be other types of information output to an Internet client node 318 in addition to the information displayed in FIG. 3. In particular, advertising information may be provided with each web site 308 response to a player regarding, for example, blackjack tournament sponsors and prizes.

In FIGS. 4A-4E, a flowchart is presented of the high level steps performed by the blackjack game controller 14 when processing player requests in either of the embodiments of FIG. 1 or 3 for playing a novel blackjack variation wherein new eligible card representations are generated periodically regardless of whether they are dealt in a blackjack game or not and wherein the blackjack players may play the game asynchronously from one another. In step 408, the blackjack game controller 14 is initialized so that it may process blackjack player requests and output appropriate responses to each player's request. Subsequently, in step 416, the card generator module 38 commences to output at regular intervals (e.g., less than two seconds such as every 0.5 seconds) random card representations to both the blackjack player evaluator 34 and the house blackjack playing module 42. Thus, for as long as the blackjack game controller 14 is properly responding to blackjack player requests, the card generator module 38 continuously and regularly outputs card representations. Concomitantly with the actions in step 416, the remaining steps of FIGS. 4A-4E are performed. Thus, in step 424, the controller 14 waits for a (next) blackjack player input, such inputs being, for example, requests to enter a new blackjack tournament, requests to commence a new blackjack game within a tournament, requests to process a blackjack game play request, a request for information regarding the players account, and a request for help information (such as how to play blackjack).

Upon receiving a blackjack player request, in step 430 the communication interface 22 queues the request and subsequently transmits the request to the blackjack driver 26. In step 436, a determination is made as to whether the players request is related to a current blackjack game and/or current blackjack tournament. If not, then step 448 is encountered wherein an additional determination is made as to whether the player's request is to enter a new blackjack tournament.

If so, then in step 454 the blackjack driver 26 determines a blackjack tournament and enters the player into the tournament. Note that in providing this function, the blackjack player 26 communicates with the wager accounting module 30 to confirm that the player is eligible to enter a new tournament. Thus, the blackjack driver 26 supplies the wager accounting module 30 with at least the player's identification and a specification of the tournament in which the player may be entered. Note that the tournament selection may be provided by the player in some embodiments of the present invention. Alternatively, the blackjack driver 26 may select a tournament for the player using tournament information stored in the database system 28. Assuming that the wager accounting module 30 responds with a confirmation that the player may be entered into the selected tournament, in step 458, the blackjack driver 26 creates a confirmation record identifying the blackjack tournament in which the player is entered. Subsequently, in step 462 the blackjack driver 26 outputs information in the confirmation record to the player at his/her Internet client node 318 (gaming station 18). Thus, in the embodiment of FIG. 3 of the present invention, the output of step 462 (and all subsequent such outputs to a blackjack player) are output from the blackjack driver 26 to the communication interface 22 for queuing until the output can be transmitted to the CGI script 348 that initiated the player request to which this output is a response. Subsequently, the output is transmitted to the World Wide Web server 340 and to the Internet interface 332 for transmitting on the Internet 324 and thereby being routed to the Internet client node 318 where the player is playing blackjack.

Following step 462, in step 466, the blackjack driver 26 enters, into the database system 28, information indicating the blackjack tournament in which the player has been entered. Note that the information entered here into the database system 28 is subsequently accessible both by the blackjack driver 26 and the wager accounting module 30 for determining the tournament(s) in which the player has been entered. Following this step, since the player's request has been processed, the flow of control loops back to step 424 to wait for the next player input from a player at an Internet client node 318 or alternatively a gaming station 18.

Returning now to step 448, if the player has not requested to enter a blackjack tournament then step 470 is encountered to process any miscellaneous blackjack player requests not related to a current blackjack game and/or blackjack tournament. For example, a player may request accounting information related to his/her blackjack gaming account. Assuming such requests are processed and responded to in this step, the flow of control again returns to step 424 to wait for a next player input.

Returning now to step 436, if the player request is related to a current blackjack and/or blackjack tournament, then step 476 is encountered wherein the blackjack driver 426 uses the player's identification (ID) provided with the request for retrieving any status information from the database system 28 regarding any current blackjack game and/or blackjack tournament in which the player may be currently involved. Subsequently, in step 480, a determination is made as to whether the player request is to commence a new blackjack game in a current tournament. If so, then in step 484 the blackjack driver 26 requests confirmation from the wager accounting module 30 that the player can commence with a new blackjack game in the current tournament. That is, the wager accounting module 30 determines whether the player has sufficient tournament credits to continue in the tournament. Following this, in step 488, the blackjack driver 26 determines whether a confirmation has been received from the wager accounting module 30. If no such confirmation is provided, then in step 492, the blackjack driver 26 outputs a message to the player at his/her Internet client node 318 (gaming station 18) indicating that no further blackjack games in the current tournament may be played by the player.

Alternatively, if in step 488 the blackjack driver 26 receives confirmation from the wager accounting module 30, then in step 494 the blackjack driver 26 creates a blackjack game record for fulfilling the player's request. Note that in creating the new blackjack game data record, the blackjack driver 26 communicates with the wager accounting module 30 to both debit the player's account for any initial ante corresponding to commencing the new blackjack game and also to output to the blackjack driver 26 data of this transaction for subsequently outputting to the player. Following this step, in step 496, the blackjack driver 26 requests the blackjack player evaluator 34 to provide an initial blackjack game configuration for the new blackjack game. Subsequently, in step 500, the blackjack player evaluator 34 responds with an initial blackjack game configuration, wherein this configuration includes the initial card representation for the player's hand (as shown, for example, in area 292 of FIG. 2). Note that this initial card representation is the most recent card representation provided to the blackjack player evaluator 34 by the card generator module 38. Thus, note that if two player requests to commence a new blackjack game were transmitted to the blackjack driver 26 in rapid succession, then step 500 may be performed for each of the requests before the dealer module 38 outputs a new random card representation to the blackjack player evaluator 34. Consequently, in such a case both players will be presented with an identical initial card representation for the player's hand. Subsequently, in step 504, the blackjack driver 26 stores information regarding the identity and initial configuration of the new blackjack game for the player in the database system 28. In particular, a blackjack game identifier for the new game is stored and associated with the identity of the blackjack player and the tournament to which the game is associated. Following step 500, in step 504, the blackjack driver 26 stores information regarding the new blackjack game for the player in the database system 28. In particular, the following information is stored regarding the initial configuration of the new blackjack game: the player's identity, the identity of the tournament for which the new game corresponds, and identifier identifying the new game, and an initial configuration for the new blackjack game including card representations and any initial required bets. Further, note that throughout the course of each blackjack game played by a player, the blackjack driver 26 and the wager accounting module 30 update information in the database system 28 as the game configuration changes due to interactions between the player and the blackjack game controller 14. Thus, for a blackjack game underway, each request from a player for continuing the game with a next play, need not provide the entire game configuration to the blackjack game controller 14. Instead, only sufficient information is required in the request for the blackjack driver 26 and/or the wager accounting module 30 to retrieve information related to the blackjack game configuration corresponding to the player's request. Following step 504, in step 508, the blackjack driver 26 outputs an initial blackjack game configuration for the new game to the player at his/her Internet client node 318 (gaming station 18). Subsequently, the flow of control once again returns to step 424 to await a next player input to the controller 14.

Returning now to step 480, if it is determined here that the player request is not to commence a new blackjack game in a current tournament, then step 520 is encountered wherein a determination is made as to whether the player request is related to a play in a currently active blackjack game. If not, then in step 524 the blackjack game controller 14 processes miscellaneous requests such as, for example, a request for special blackjack rules relating to a current game and/or tournament, the number of players remaining in the current tournament, the player's ranking in the current tournament, and the prizes for winners of the current tournament. Subsequently, assuming such miscellaneous requests are responded to, in step 524, the flow of control for the present flowchart returns to 424 to await a next player input.

Alternatively, if in step 520 the player request is related to a play in a currently active blackjack game, then in step 528 a further determination is made as to whether the player request is for a new card representation. If so, then in step 532, a determination is made as to whether the card request is for the house or for the player. If the card request is from the house, then in step 536 the blackjack driver 26 communicates with the house blackjack playing module 42 for obtaining a new blackjack game configuration for the current blackjack game, wherein the new game configuration includes the most recently output card representation from the card generator module 38 as the next card representation in the house hand for the blackjack game from which the current player's request came. Subsequently, in step 542 the house blackjack playing module 42 outputs blackjack game configuration information indicating the new house hand card representation and any player response(s) that the player may exercise in responding to the new blackjack game configuration.

Upon receiving the house blackjack playing module 42 output, in step 546, the blackjack driver 26 determines whether there is a further player response in the present game by invoking one or both of the blackjack player evaluator 34 and the blackjack hand evaluator 46. If there are additional possible player responses, then in step 550 the blackjack driver 26 outputs a blackjack game configuration to the player at his/her Internet client node 318 (gaming station 18) so that the player may exercise one of his/her available game options. Subsequently, having processed the player's request the flow of control again loops back to step 424 to await a next player input. Alternatively, if in step 546 the blackjack driver 26 determines that there are no further possible player responses, then the current blackjack game is complete and the blackjack driver 26 in step 556 activates the blackjack hand evaluator 46 for evaluating the blackjack game hands so that the blackjack hand evaluator can activate the wager accounting module 30 to update the player's account (according to the results of the blackjack game) in the database system 28. Following this step, in step 560 the wager accounting module 30 outputs to the blackjack driver 26 updated accounting information to be provided to the player. In step 564, the blackjack driver 26 outputs the results of the blackjack game and the players updated account information to the player. Also, note that the blackjack driver 26 updates the database system 28 regarding the completion of the present blackjack game as well as any further status information related to the player and the tournament to which the present blackjack game is associated. Subsequently, having processed the player's request, the flow of control again loops back to step 424 to await a next player input.

Alternatively, if in step 532 it is determined that the player's request is for a new card representation for the player, then in step 568 the blackjack driver 26 activates the blackjack player evaluator 34 for obtaining a new blackjack game configuration for the current blackjack game, wherein the new game configuration includes the most recently output card representation from the card generator module 38 as the next card representation for the player's hand(s). Subsequently, in step 572 the blackjack player evaluator 34 determines the next blackjack play options the player may exercise for the present game and then outputs the new blackjack configuration with these options to the blackjack driver 26. Following this, the steps 546 and subsequent steps are performed as described above.

Returning now to step 528, if the player request is not for a new card representation then step 576 is encountered wherein the blackjack game controller 14 processes other blackjack player game requests such as requests for additional bets, cancellations of bets, a request to stand on a particular player hand, a request to split a pair of card representations, or a request for insurance. Assuming, that such requests as described above are processed, in step 580 the blackjack driver 26 subsequently outputs a new blackjack game configuration to the player according to the processing performed in step 576. Also, note that the blackjack driver 26 updates the database system 28 with information relating to the new blackjack game configuration so that it may be retrieved upon a subsequent player request relating to the present game. Following this step, the flow of control for the present flowchart loops back to step 424 to again wait for another player input.

Figure 5:
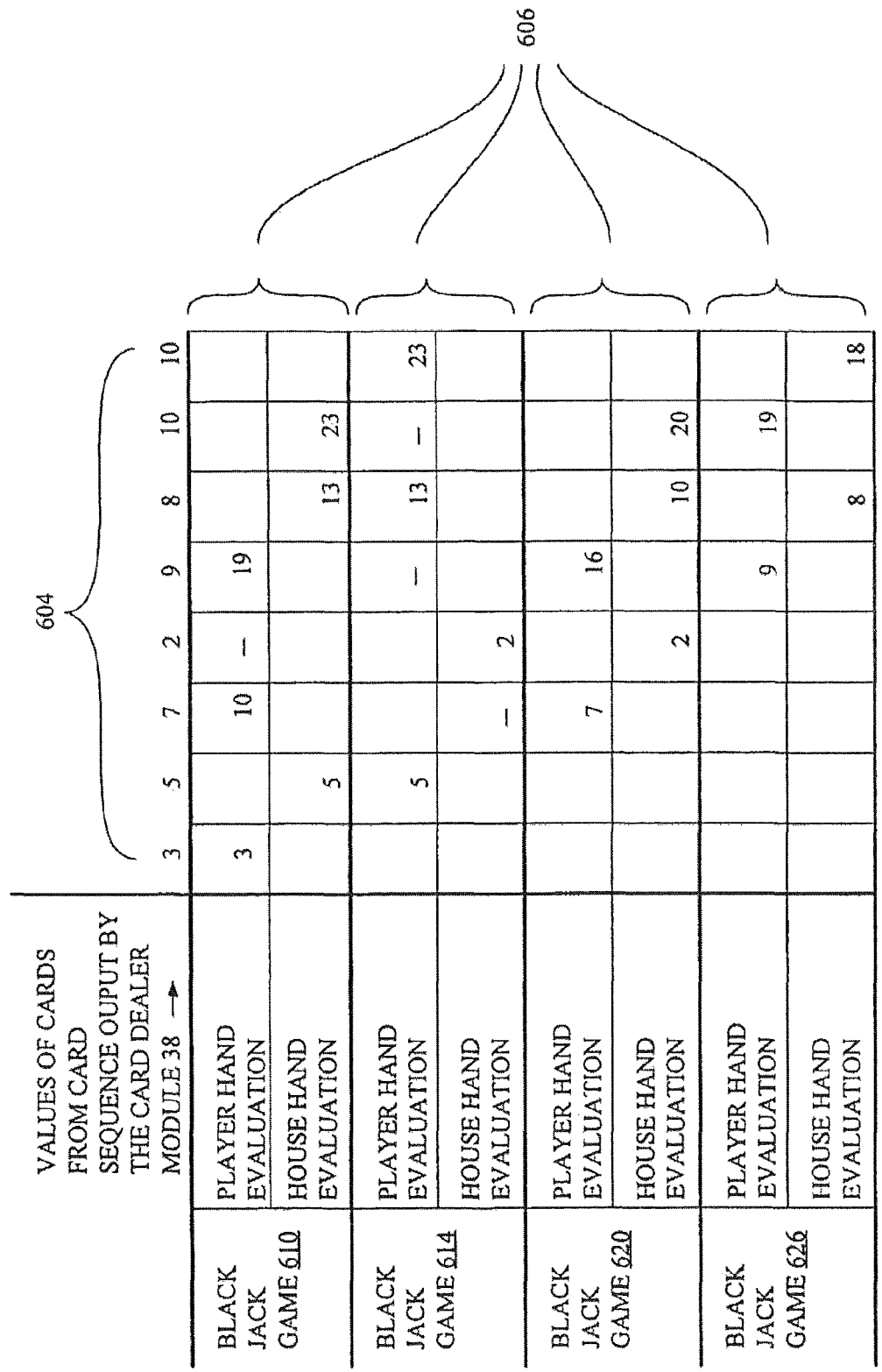
FIG. 5 provides a simple example of the operation of the present invention for playing a novel variation of blackjack wherein four blackjack games are shown being played asynchronously with the blackjack game controller.

FIG. 5 presents a simple example of the operation of the present invention for playing blackjack wherein four blackjack games are shown being played asynchronously with the blackjack game controller 14. To describe FIG. 5 in detail, note first that the row of numbers 604 across the top of the figure represents a sequence of values of successive card representations output by the card generator module 38. That is, in a first time interval a card representation having a value of three is output, in a second time interval a card representation having a value of five is output, in a third time interval a card representation having a value of seven is output and so on across the row. Below row 604 are blackjack game rows 606, wherein each blackjack game row 606 represents a series of events that occur in each blackjack game 610 through 626 over the course of time corresponding to the series of card values 604. In particular, the numerical entries within each blackjack game row 606 correspond to the values of the player and house card hands as additional cards are added to the player and house hands of each blackjack game. For example, referring to blackjack game row 610, assuming this blackjack game commences with the player's hand obtaining the card representation for the leftmost card value of the sequence 604 (i.e. the value three), the player's hand has a corresponding value of three. Subsequently, if the house blackjack playing module 42 is activated for this game to output (i.e. deal) an initial card representation to the house during the second time interval (i.e. the card generator module 38 has output a card representation of five), then the house hand initially has a value of five. Subsequently, if in the third interval the player for blackjack game 610 provides a request for another card, then the card representation corresponding to the value of seven in sequence 604 is provided to the player and therefore the player's hand has a total value of ten. Following the incorporation of the seven into the player's hand, this blackjack game is delayed so that the next time interval corresponding to the value of two in sequence 604 is not dealt to either the player or the house in blackjack game 610. Note that it is an important aspect of the present invention that card representations generated by the card generator module 38 are only incorporated into a particular blackjack game when a request for such a card representation is made during the time the card representation is the most recent output from the card generator module 38. Thus, one or more card representations output by the card generator module 38 during a blackjack game may not be used in the game. More precisely, it is typical (although not shown in the example of FIG. 5) that substantially any length or subsequence of consecutive card representations output by the card generator module 38 may be ignored within a given blackjack game due to time delays occurring in the game. Thus, in some circumstances such delays could be as long as a number of days if the player, for example, did not request another hit during such a time interval.

Continuing now with the remaining plays of blackjack game 610, note that in the fifth time interval the player requests a hit thereby obtaining a card representation having a value of nine and thus obtaining a player's hand value of nineteen. Subsequently, the house takes hits for the next two consecutive card representations having values eight and ten respectively. Thus, the house hand busted when the value of twenty-three was obtained for the house hand.

Blackjack game rows 606 for blackjack games 614 through 626 may be interpreted similarly to the description above for blackjack game 610. Note however that each of these games commence at a different time interval in that each game commences with a different card representation taken as the first hit for the player's hand. That is, the first card representation dealt in each of the blackjack games 610 through 626 is different and further each of the card representations requested corresponding to values of the sequence 604 is different for each blackjack game. Therefore, substantially every blackjack game, even if played concurrently with other blackjack games, will have unique player hands and house hands. Thus, not only can a large number of asynchronous blackjack games be played simultaneously head-to-head with the house, but also there may be a greater degree of confidence by the blackjack players that the house is not manipulating card representations in that blackjack players may substantially determine the timing for substantially all hits in a blackjack game (for both the player hand and the house hand) and thereby reduce any suspicions that the card representations are being manipulated. Moreover, in one embodiment, the players may request the sequence of card representations that were generated during the course of a game.

Note that the present invention also may include other blackjack variations as well. In particular, referring to step 416 (FIG. 4A) again, instead of generating card representations at regular intervals, this step may simply activate the card generator module 38 so that it generates a substantially random card representation on demand whenever a request for a new card representation is made (e.g., steps 536 and 568).

Additionally, in another blackjack variation, particularly suited for tournament blackjack where each player can be monitored, the players play each play for a blackjack game synchronously as blackjack is typically played with a human dealer in casinos. However, in the present variation, each player is provided with the identical card representations for their initial cards. Subsequently, each player hand and the house (i.e., dealer) hand varies between players only when players play their blackjack hands differently. That is, for each synchronously played blackjack game among a plurality of players, the same sequence of card representations is available to each player and the house blackjack playing module 42 so that, for example, the dealt card representations in each game between one of the players and the house blackjack playing module are identical for players playing the same sequence of plays throughout the game. Accordingly, as one skilled in the art will appreciate, for each blackjack game, it may be necessary for the card generator module 38 to maintain a predetermined sequence (or ordered collection) of card representations throughout the game so that layers playing differently may be dealt an appropriately sequenced card representation. Moreover, it may also be necessary for the house blackjack dealer playing module 42 to provide sufficient control information to the card generator module 38 so that the card generator module can respond with the appropriate card representation from the predetermined sequence.

Figure 6A:
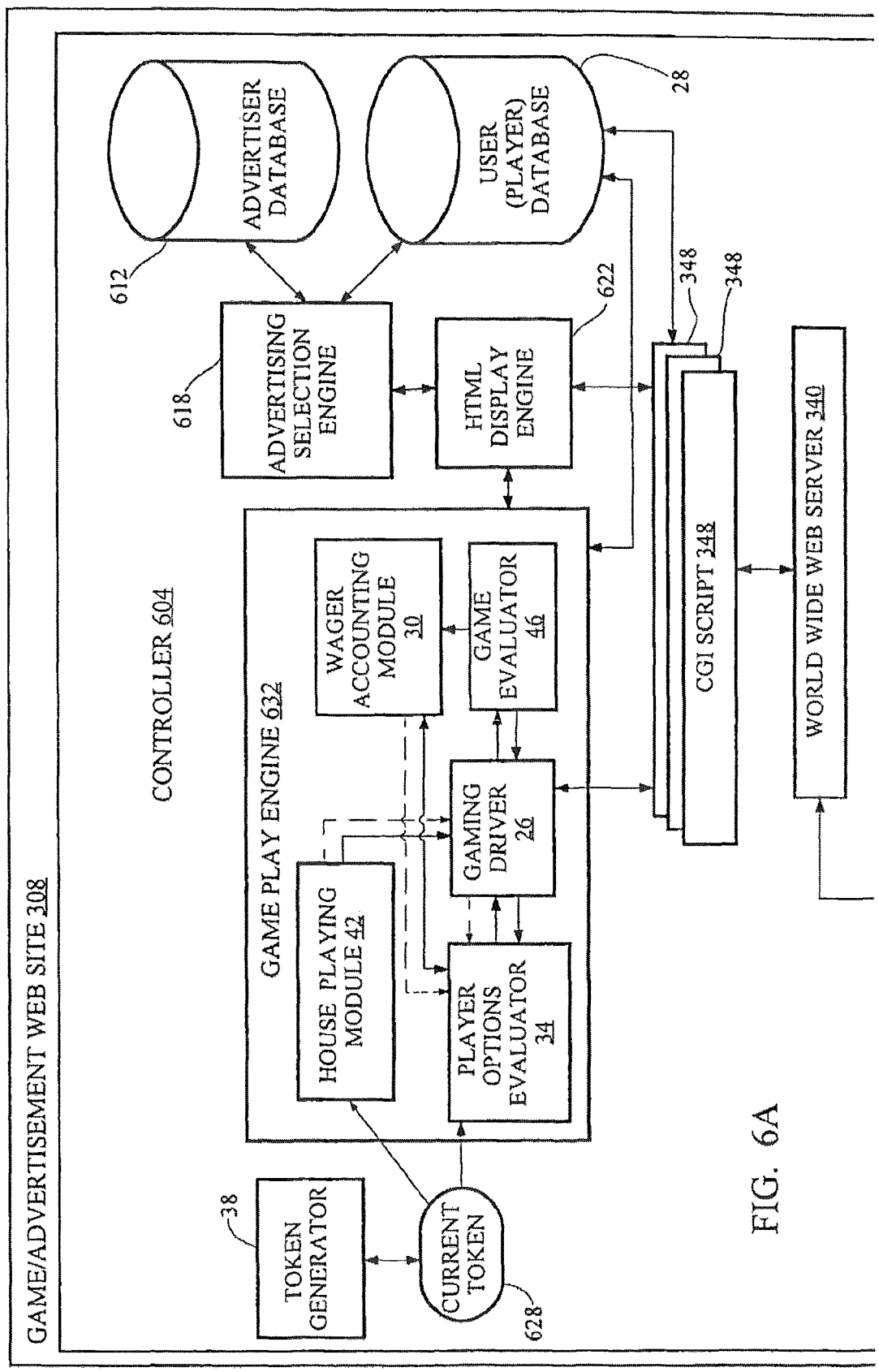
FIGS. 6A and 6B are a block diagram of an Internet embodiment of the present invention.
Figure 6B:
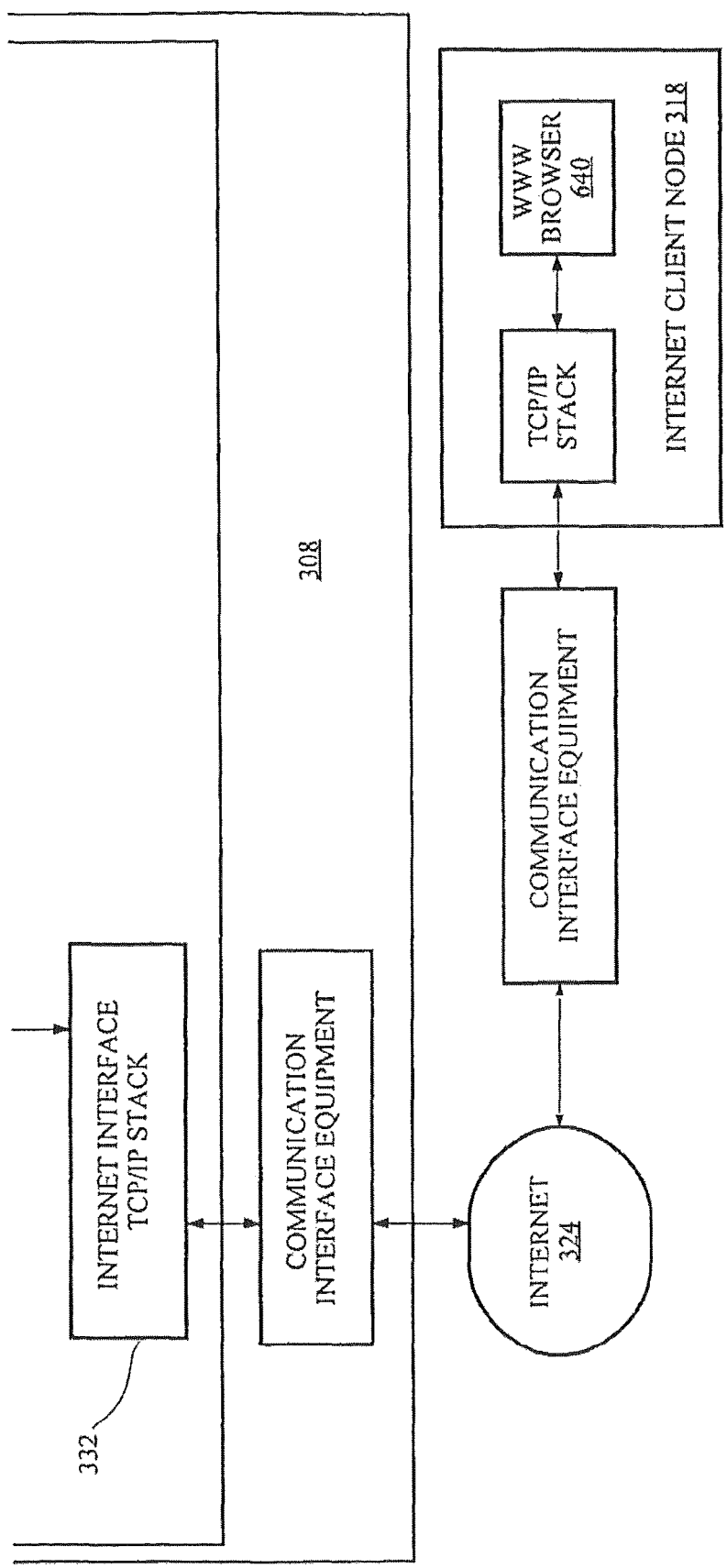

Another embodiment of the present invention is presented in FIGS. 6A and 6B, wherein this embodiment is enhanced for presenting sponsor or advertiser product and/or service advertising to qualified players that adequately match a predetermined player profile such as a demographic profile of a particular group of players. Accordingly, in FIGS. 6A and 6B, there is a game/advertisement controller 604 for providing substantially the same functionality as the blackjack game controller 14 (FIG. 3) except that games other than blackjack may also be played (such as poker, craps, pai gow and roulette). Additionally, the game/advertisement controller 604 also performs functions related to matching particular advertising with the users (i.e., players) playing the various games provided by the game/advertisement web site 308, wherein each user communicates with the web site 308 on a corresponding Internet client node 318 (alternatively interactive cable television node). That is, the present FIGS. 6A and 6B present the high level modules for matching players having desired user characteristics (e.g., profiles) with advertising from sponsors or advertisers requesting players with such user characteristics. In particular, only the players with such desired profiles qualify for receiving a particular advertisement and/or promotional (i.e., advertising) from a particular sponsor or advertiser. Accordingly, it is an aspect of the present invention that various criteria may be used to make such a determination as to which players (or, more generally, users) receive which advertising. For example, one or more of the following attributes may be used in matching users with advertising presentations:

(8.1) age,
(8.2) sex,
(8.3) financial status,
(8.4) location or residence,
(8.5) education,
(8.6) marital status,
(8.7) amount of recreational time,
(8.8) personal tastes and/or habits (e.g., smoker/non-smoker, preferences for sports, movies, liquor, foods, clothes, vacations, cars, etc.),
(8.9) size of household,
(8.10) number of children, and
(8.11) categorizations of users according to network interactions such as the type of web sites accessed, the type of advertising for which the user seeks additional information, the risk tolerance in playing games such as blackjack.

To provide (or, match) particular users with particular advertising, data (or user information items) on each user is maintained in the form of a user profile in the user (player) database 28 which is an enhanced version of the blackjack player registration and playing status database 28 of FIG. 3.

The user profiles are populated with such user related information as in (8.1) through (8.11). This information is obtained when users register at the web site 308 when users respond to explicit questions subsequently asked of them, or by monitoring the network activities of users. Note that user profiles may vary in length, depending on the amount of information obtained on each user. Moreover, different types of information may be obtained for different types of users. For example, for users having assets of more than one million dollars, these users may be requested to enter their favorite vacation destination location since this may be important for certain advertisers. However, for users whose assets are less than forty thousand dollars, no such information may be obtained since the information would be likely irrelevant to any advertiser. Thus, in one embodiment of the user profiles, each user profile has a variable length section for storing user information items not uniform across all users. Moreover, in such an embodiment, each user information item stored in the variable length section may be considered as a pair, wherein the first component of each pair indicates or references a question, user attribute, or user classification to which the second component provides an answer or value related to the first component. Thus, for example, for a particular user, an information item may provide the pair: (4, "Madrid"), wherein "4" identifies the attribute: "favorite vacation destination location," and "Madrid" is the value for this attribute, as one skilled in the art will understand.

Alternatively, data related to the advertisers or sponsors may reside in a different database, the advertiser database 612. Accordingly, this database stores demographic profiles which, in one embodiment, have a data structure substantially identical to the user profile data structure. Such demographic profiles may have a variable length section for specifying requested values for user information items that may be provided in (potentially only a relatively small number of) user profiles. In some embodiments, a demographic profile includes a reference to the advertiser's or sponsor's identity, a reference to the advertising to be presented and a variable length section of demographic item pairs, wherein the first component of each pair has the same interpretation as the first component of a user information item pair and the second component of the pair specifies a desired value or range of values that the advertiser or sponsor prefers. Further, note that, in some embodiments, each demographic item pair may have additional information associated with it such as a perceived importance of the demographic item pair to the advertiser or sponsor. Thus, such additional information may be in the form of a normalized scalar value wherein a value of one indicates that the demographic item pair is of highest importance whereas a value of zero indicates that the demographic item is substantially irrelevant to the advertiser or sponsor. Accordingly, regardless of the particular embodiment of the demographic profiles, the users' demographic profiles are used to match (i.e., select) one or more corresponding advertising presentations with a particular target group of users that, presumably, are likely to purchase the product and/or service portrayed in such advertising presentations. Thus, since such advertising presentations may be provided to only users who are likely to be subsequent customers, advertisers and/or sponsors may provide to these users specifically targeted advertising having relatively expensive promotionals such as product or service discounts, free samples, or a trial usage.

Accordingly, to perform the selecting or matching of users with such demographic profiles, for each user, the user profiles stored in the user database 28 are compared with the demographic profiles by the advertising selection engine 618. Note that there are numerous techniques for performing such a comparison for selecting a group of users. In particular, a precise match may be required between each demographic item pair and a corresponding user information item pair so that the second component of the user information item pair is (within) a desired range as specified in the corresponding demographic item pair. Alternatively, various weighting statistical techniques may be used for determining a "similarity" measurement when not all demographic pairs are required to precisely match a demographic profile. In one embodiment, the similarity measurement may be provided by a statistical analysis module that determines the users that most closely match the corresponding demographic profile for an advertising presentation. Thus, in order for a user to be selected, the similarity measurement between the user's profile and a corresponding demographic profile may be required to be above a predetermined threshold. Additionally, note that the advertising selection engine 618 may perform the matching of users with advertising presentations as a background or non-real time process so that, for example, for each user profile in the user database 28, there is a related table identifying the advertising presentations that are candidates for presentation to the corresponding user when, for instance, this user communicates with the game/advertisement web site 308.

Moreover, it is important to note that at least in one embodiment of the present invention, the advertising selection engine 618 may, for a particular demographic profile, periodically re-evaluate user profiles in the user database 28 for reselecting the group of users to which an advertising presentation is to be presented. Thus, users previously selected may be requalified or disqualified and users previously disqualified may be now qualified for selection due to, for example, an enhanced user profile.

Accordingly, the present invention may commence or cease transmitting a category of advertising to a user whose user profile is enhanced with additional information. For example, if a user indicates that he/she is currently considering the purchase of a new car, then advertising for purchasing a car may be transmitted to the user. Alternatively, once the present invention is notified that, for example, a car has been purchased or that no further car advertising is are desired, then a further enhancement of the user's profile may be performed so that no further advertising from the category of car advertising is transmitted to the user.

Note that the present invention provides for flexibly creating, deleting and modifying categories of advertisements by providing techniques for linking demographic item pairs that are similarly related to a category record or object. Thus, at least the following advertising categories may be provided by the present invention: sports categories (e.g., baseball, soccer, hockey, etc.), food related categories (e.g., restaurants, grocery stores, food items), exercise related advertising (e.g., bicycles, in-line skates, skiing), insurance related advertising (e.g., auto insurance, life insurance), political related advertising (e.g., for or against a particular political candidate), and geographical related advertising (e.g., for users living in a particular area such as the Denver metropolitan area). Thus, the advertising selection engine 618 supplies the selected advertising presentations to the HTML display engine 622 for translating this data so that it may subsequently be included in an HTML output to the user by the common gateway interface 348.

More precisely, the selected advertisement data is joined in the HTML display engine 622 (at least in one operation of the present invention) with a token 628 representing, for example, a gaming card (for a current user game) that has been issued by the token generator (module) 38, this generator being an enhanced version of the card generator module 38 of FIG. 3. The generated token is supplied initially to the game play engine 632 for processing user gaming requests according to the rules of the game being played. That is, the game play engine 632 determines, for each available game: (a) how each token may be "played"; (b) who receives the token, for example, the user or the house playing module 42; and (c) the result of playing the token. Note that in one embodiment, the token generator 38 generates tokens on request by, for example, the house playing module 42 and/or the player options evaluators 34, wherein the tokens generated are appropriate to the game being played. Alternatively, in another embodiment, the token generator 38 may generate random tokens and the game play engine 632 transforms the tokens into appropriate randomized values for the games offered, as one skilled in the art will appreciate. Furthermore, other embodiments for supplying randomized tokens to a plurality of different games are within the scope of the present invention. Additionally, the game play engine 632 contacts the player database 28 to maintain the status of the user in relation to the particular game being played as well as the user's relationship to all of the other users (if, for example, the user is involved in a tournament offered at the game/advertisement web site 308). Note that, as one skilled in the art will appreciate, in one embodiment of the game play engine 632, its internal modules provide a similar architecture and functionality to the correspondingly labeled modules of FIG. 3, albeit additionally, for games other than blackjack (e.g., "head-to-head" poker, craps, roulette, and pai gow).

The common gateway interface or CGI scripts 348 transfer data between the HTML display engine 622 and the World Wide Web server 340 which, as one skilled in the art will understand, may be a plurality of high level executable programs as discussed in the description of CGI scripts 348 for FIG. 3. The World Wide Web server 340, in turn, transfers the data to the Internet TCP/IP stack 332 that interfaces with the Internet 324 for transferring the data to an intended Internet client node 318 having an appropriate World Wide Web browser 640.

The present embodiment maintains information on the status of games being played and user responses to advertising in the user database 28. Moreover, additional advertiser specific information (e.g., desired demographic profiles, advertisements, promotionals, and information related to user responses) is provided in the advertiser database 612. Accordingly, as discussed above, the demographic profiles in the advertiser database 612 may include schemes or templates having fields for designating one or more of the attributes (8.1) through (8.11). Moreover, the databases 28 and 612 may maintain records of various types of pertinent statistics such as: (a) the advertising presentations presented to each user; (b) the time, date and number of presentations of a particular advertising presentation; and (c) the detected user responses to the advertising. Thus, this information may provide advertisers or sponsors with enhanced feedback as to the efficacy of their products, services and presentations thereof. Thus, by maintaining data regarding information on: (i) each game played, (ii) the users and (iii) the advertisers, the host computer 10 may maintain accurate records of every type of pertinent statistics such as: all advertisements seen by all users so that the time, date and number of views are available to the advertiser to confirm and verify e.g., (9.1) through (9.3) following, and additionally, an advertiser may be able to query the user and advertiser databases 28 and 612 to obtain such feedback as:

(9.1) who has seen a particular advertisement;
(9.2) when it was seen;
(9.3) the number of times the advertisement was accessed:
    (a) by any particular user;
    (b) by all users; and
(9.4) the number of favorable and/or unfavorable responses.

Figure 7:
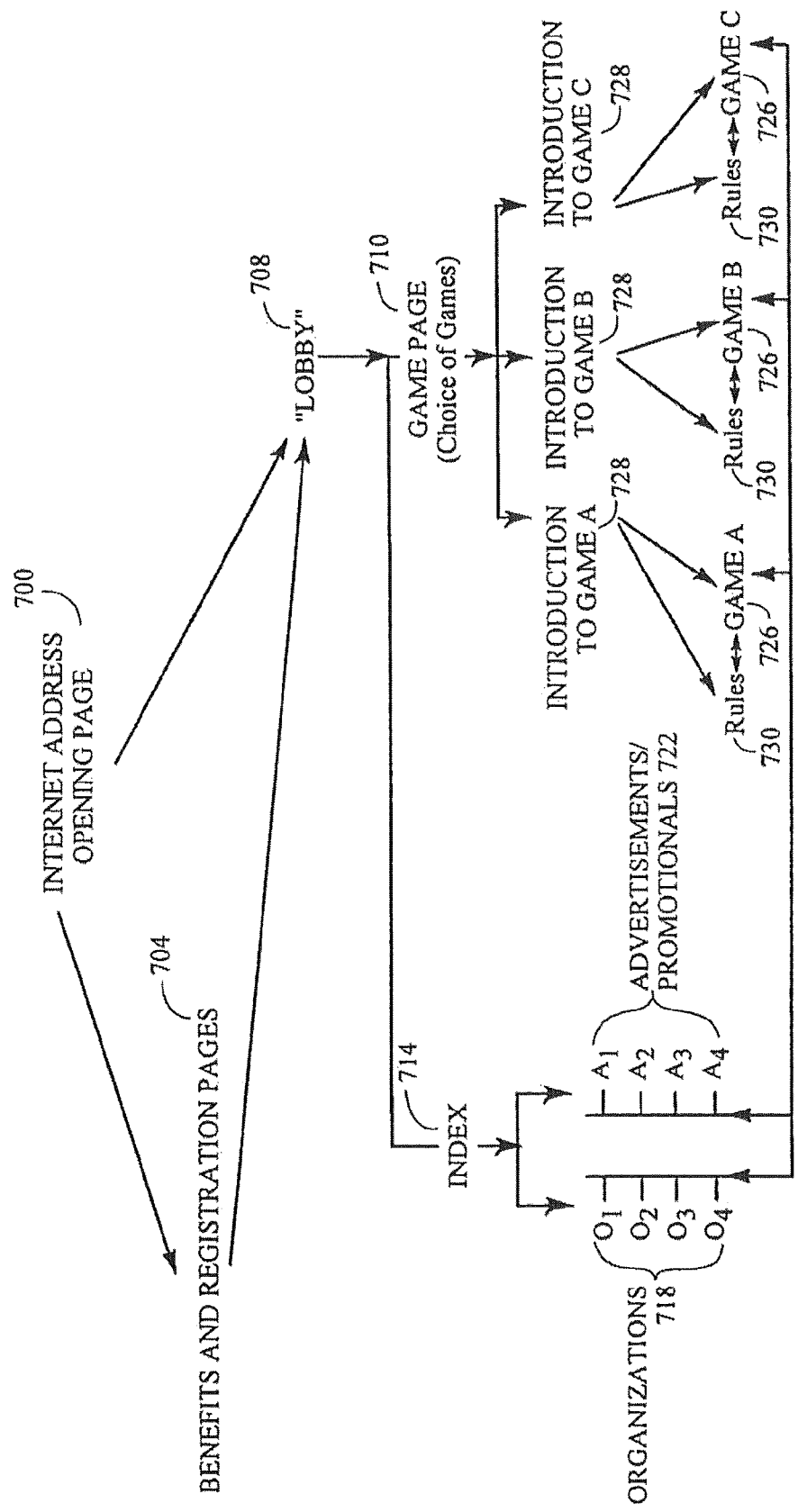
FIG. 7 is a diagram illustrating how a user navigates through web pages of the World Wide Web for accessing the game/advertisement web site 308 (FIG. 6) functionality.

Referring now to FIG. 7, a diagram is presented providing one embodiment of the access routes or paths users navigate in accessing the features of the game/advertisement web site 308. In particular, upon initiating Internet contact with the game/advertisement web site 308, a user is first presented with the opening page 700 identifying the web site 308. Subsequently, the user can access the benefits and registration pages 704 for viewing general information related to web site 308 and also for registering at the web site (as is discussed in further detail below). Alternatively, the user may access one or more "Lobby" pages 708 to view the gaming and information exchange capabilities as, for example, provided by advertisers. Assuming the user is registered at the game/advertisement web site 308, the user may proceed from the LOBBY 708 to the game page 710, wherein a game 726 or game rules 730 can be selected for playing, via the introduction to game pages 728. Alternatively, the user may instead access one or more index pages 714 having, for example, listings of organizations to which the user may be allowed to access depending on the affiliations of the user (e.g., a member of a particular membership discount store chain). Additionally, from the index page(s) 714 substantially any user may access an advertisement or promotional provided by an advertiser on an advertiser page(s) 722. However, it is an aspect of the present invention that information related to certain promotionals provided by advertisers or sponsors are restricted. That is, such promotionals may be only presented to users having a demographic profile that has been determined by the present invention to be sufficiently compatible with a desired user profile for the advertiser or sponsor to warrant providing such a promotional. Thus, the present invention provides access to certain advertiser promotionals only to "qualified" users who are, for example, considered likely subsequent purchasers of the advertiser's products and/or services. Additionally, such promotionals may also be presented to users who express an interest in a particular product or service advertised. For example, users who (a) request additional or supplemental information related to an advertised item, or (b) provide a favorable response to such advertising (by, for instance, indicating a preference for an advertised item), or (c) respond to a questionnaire related to personal information or marketing survey information may also be provided with information regarding promotionals. Thus, advertisers or sponsors may offer relatively substantial or expensive promotionals via the present invention to such users as well. Moreover, the present invention may also utilize such demographic profiles to prohibit a user not sufficiently matching such a demographic profile from gaining access to a corresponding promotional. Accordingly, in one embodiment of the present invention, when the user accesses an advertiser page 722, the user's profile (in the user database 28) is compared with the demographic profiles in the advertiser data base 612 for determining any promotionals that can be presented to the user.

Moreover, from the index page 714 the user may be provided with the ability to link into various web sites or web site pages. That is, the user may be provided with the ability to link into another web site or web page at any time a link is made available (typically a hypertext link). Additionally, note that similar links may be accessible by users while playing a game 726. However, these links may generally hyperlink the user to an advertiser page 722 within the game/advertisement web site 308 so that the user may be exposed to further information and/or presented with promotional options for an advertised item. For instance, certain advertising hyperlinks may be integrated into the presentation of plays of a game 726. Accordingly, since an aspect of the present invention is to repeatedly integrate different advertising presentations (and any related hyperlinks) into the play of a game 726, a user may repeatedly be enticed to seek out additional information about different products or services by activating the related hyperlinks. Moreover, it is also an aspect of the present invention that when such hyperlinks provide the user with access to a different web site, that at least a portion of the display of the user's Internet client node 318 maintains a graphical format associated with the game/advertisement web site 308, and that the user may leave and return to the web site 308 without the user being aware of accessing another web site. Moreover, by monitoring user input related to an advertising presentation, the present invention is able to provide feedback to an advertiser as to, for example, the number of times the advertising presentation is accessed by users for such additional information about products or services.

Also note that some advertisements (presented via advertiser pages 722 or as part of a game play presentation) may be interactive with the user wherein the user may perform a transaction such as making a reservation (e.g., an airline or hotel reservation). Further, a user may be given the opportunity to provide positive and negative opinions or responses on, for example, various advertisements, promotionals and other related matters by expressing such responses upon accessing advertisement related information. Thus, it is an aspect of the present invention to be able to conduct "test marketing" in that statistically representative groups of users may be selected for determining:

(10.1) the efficacy or appeal of one advertisement in comparison to another advertisement for a particular advertised item;

(10.2) the profile of the users that are responsive to a particular advertising presentation; and/or (10.3) whether a particular group of users, for example, having similar user profiles favorably respond to a particular advertising presentation. For example, the present invention may determine such a response: (a) by detecting an activation of a hyperlink, (b) by detecting a response to questions presented, and/or (c) by determining the length of time the advertising presentation is displayed or visible.

Accordingly, input response data may be transmitted to the game/advertisement web site 308 and retained for subsequent statistical evaluation. Thus, resulting aggregate statistics can be made available to, for example, advertisers or sponsors, thereby preserving the privacy of the users. In particular, statistics may be made available for:

(11.1) providing information about, for example, the efficacy of certain advertising presentations (e.g., the number of positive responses to such presentations and/or the number of advertised items sold directly through the advertisements at the game/advertisement web site 308);

(11.2) providing information related to the number and profile of users accessing certain advertising presentations;

(11.3) determining measurements related to the number of different (groups of) users to which an advertising presentation has been presented;

(11.4) determining the total number of presentations of a particular advertisement;

(11.5) determining the cost of advertising presentations to the advertisers and billing the advertisers for such costs according to, for example, at least one of: (a) the number of users to which an advertisement is presented, (b) the number of promotionals requested or (c) the number of network user communications (i.e., hits) with the web site 308;

(11.6) determining if an advertising presentation should be discontinued because the advertiser's cost limits have been reached, such limits being, for example, related to a total number of presentations of an advertising presentation. Note that, in one embodiment, it is an aspect of the present invention to charge an advertiser for each presentation to a user; or (11.7) determining which of an advertising presentation and a different second advertising presentation (from the same advertiser) is most effective when both are provided to various selected (groups of) users, so that the advertiser or sponsor may then have a basis for choosing the most appropriate of the two advertising presentations in future advertising.

Additionally, it is an aspect of the present invention that it may also maintain statistics (and/or related information) for:

(12.1) providing "real time" game rankings of users (players) involved in a gaming tournament provided by the game/advertisement web site 308. Note that such rankings may be provided to a user so that he/she may know his/her standing and the number of players remaining in the tournament; and (12.2) providing a "style of personality" of the game playing users so that, for example, a risk tolerance of such users may be estimated and used to determine if a particular user might be interested in a particular product or service. Thus, such "style of personality" statistics for a user may be stored in the user's profile. For example, the information captured here may include: average size of wager, average size of wager in comparison to the total amount that could be wagered, length of time playing in a single session, the ratio of the number of wagers on high risk plays presented, and the skill of the player.

Accordingly, the following aspects of the present invention are noteworthy:

(13.1) the user may be provided with free access or reduced cost access to other areas of the Internet 324 upon viewing the presentations of certain organizations and/or advertisers. Note that the ability to reduce the cost of accessing the Internet may act as a vehicle for attracting various users;

(13.2) the index page 714 gives a user the opportunity to access a particular organization (e.g., organizations 718) that the user may belong to or any particular advertiser (e.g., advertisers 722) without going through any games although the user may be required to go through the "LOBBY" page(s) 708 and thereby be exposed to advertising and/or the opportunity to join a game;

(13.3) a user may also be able to go from an initial organization page 718 to an introductory game page 728 (e.g., for a game 726) but, unless authorized, may not be provided with further access to the organization's web pages or the game;

(13.4) while playing a game 726, the user has the ability to access further information related to an advertisement or promotional being presented;

(13.5) during the playing of a game 726 (e.g., blackjack), the user may be allowed to review and/or stepwise replay a previous portion of a game 726 during a current gaming session;

(13.6) when in a particular organization page 718, the user may be required to return to the index page 714 before linking into an advertiser 722 unless a direct link has been provided for some reason on the particular organization web page. Moreover, the user may access the game page 710 from the index page 714 and vice versa;

(13.7) a user may either go directly into playing a particular game 726 (as authorized) or to a rules section 730 for reviewing the rules for the corresponding game 726. Note that a user may always access the rules section 730 during the corresponding game 726;

(13.8) there is a help feature for providing information such as: a) how to do some particular action or the reason for some action or the reason an action is blocked. For example, the reason for an inability to access a certain web page, the reason for an inability to make a particular game play, such as a bet, stand or hit in the game of blackjack and/or the reason for a particular result of a certain bet, hit, stand or other user play in a game such as blackjack; b) for contacting a gaming referee for resolving gaming conflicts.

Such a referee will be available to resolve any dispute. Note that the user can notify the management operating the present invention of a problem via, for example, notification forms displayed when a notification button is activated.

Referring now to an alternative embodiment of the present invention presented in FIG. 8, wherein the game/advertisement web site 308 coordinates with a third party Internet access service provider 810 (or interactive cable television provider) for providing Internet 324 (cable television) access to users on a reduced cost or free basis once a user has registered with the web server 340 (cable television provider). That is, the game/advertisement web site 308 contacts the user's Internet service provider 810 and arranges to subsidize the user's Internet service charges in return for the gaming advertisement web site 308 being able to repeatedly download to the user's Internet client node 318 (or alternatively, interactive cable television node), unrequested information such as advertising for presentation to the user.

Accordingly, a prospective user of the present invention can sign up or register with the game/advertisement web site 308 for reduced Internet service fees by dialing into an Internet service provider 810 with normal serial dialing and after gaining Internet access, subsequently log on to the web site 308 as a user identified by the generic user identifier "NEW." Each user identified by "NEW" is forced into a connection with an enrollment or registration program so he/she can provide information requested by the present invention that can subsequently be used in determining which advertising to present to this user according to, for example, advertiser preferences. Thus, when registration is completed, the present embodiment of the invention downloads, for example, an ad viewer program 812 and a communications daemon (e.g., ad receiver daemon 806) to the user's Internet client node 318, wherein this daemon allows the game/advertisement web site 308 to download to the user's Internet client node 318 unrequested information such as advertising repeatedly. Accordingly, assuming the daemon 806 is installed, the user may access not only the gaming and advertisement services of the web site 308, but also access substantially the entire Internet through the web site 308 at a reduced cost. Thus, whenever the end user processor 318 connects with the Internet service provider 810, the game/advertisement web site 308 is alerted by the Internet service provider 810 and the DISPLAY ENGINE 622 starts up the downloaded daemon 806 via Internet communications with the user's Internet client node 318. Subsequently, the DISPLAY ENGINE 622 periodically sends selected advertising to the daemon 806. Accordingly, the daemon 806 utilizes the ad viewer program 812 to coordinate the display of the advertising presentation.

Note that various alternative embodiments related to the architecture and functionality of FIG. 8 are also within the scope of the present invention. For example, instead of communicating with a plurality of third-party Internet service providers 806 for determining when users registered with the present invention are accessing the Internet via subsidized Internet connections, the game/advertisement web site 308 may include or be related to a dedicated Internet service provider 806 so that when a user registers with the present invention, the user is provided with a new Internet access code for the dedicated Internet service provider 806 and the user's Internet access fees may be subsidized.

However, regardless of how the present invention subsidizes Internet access, the game/advertisement controller 604 is notified whenever each subsidized user connects to the Internet or disconnects from the Internet. Additionally, certain reliability features are included in the daemon 806 and ad view program 812 for assuring that advertising is indeed presented to the user. For example, there may be periodic transmissions from each subsidized user's Internet client node 318 to the web site 308 verifying that both the daemon 806 and the ad view program 812 are active. Note that whenever any advertising is received at the user's Internet client node 318, the daemon 806 transfers the advertising to the ad viewer program 812 which, in turn, converts the transmitted information to a displayable format and forces the display of the user's Internet client node 318 to present the advertising unobscured to the user.

Additionally, note that in certain contexts the DISPLAY ENGINE 622 may transmit a message to an Internet Service Provider 806 indicating that no further Internet access will be subsidized due to a predetermined number of advertising presentation display failures.

Figure 8A:
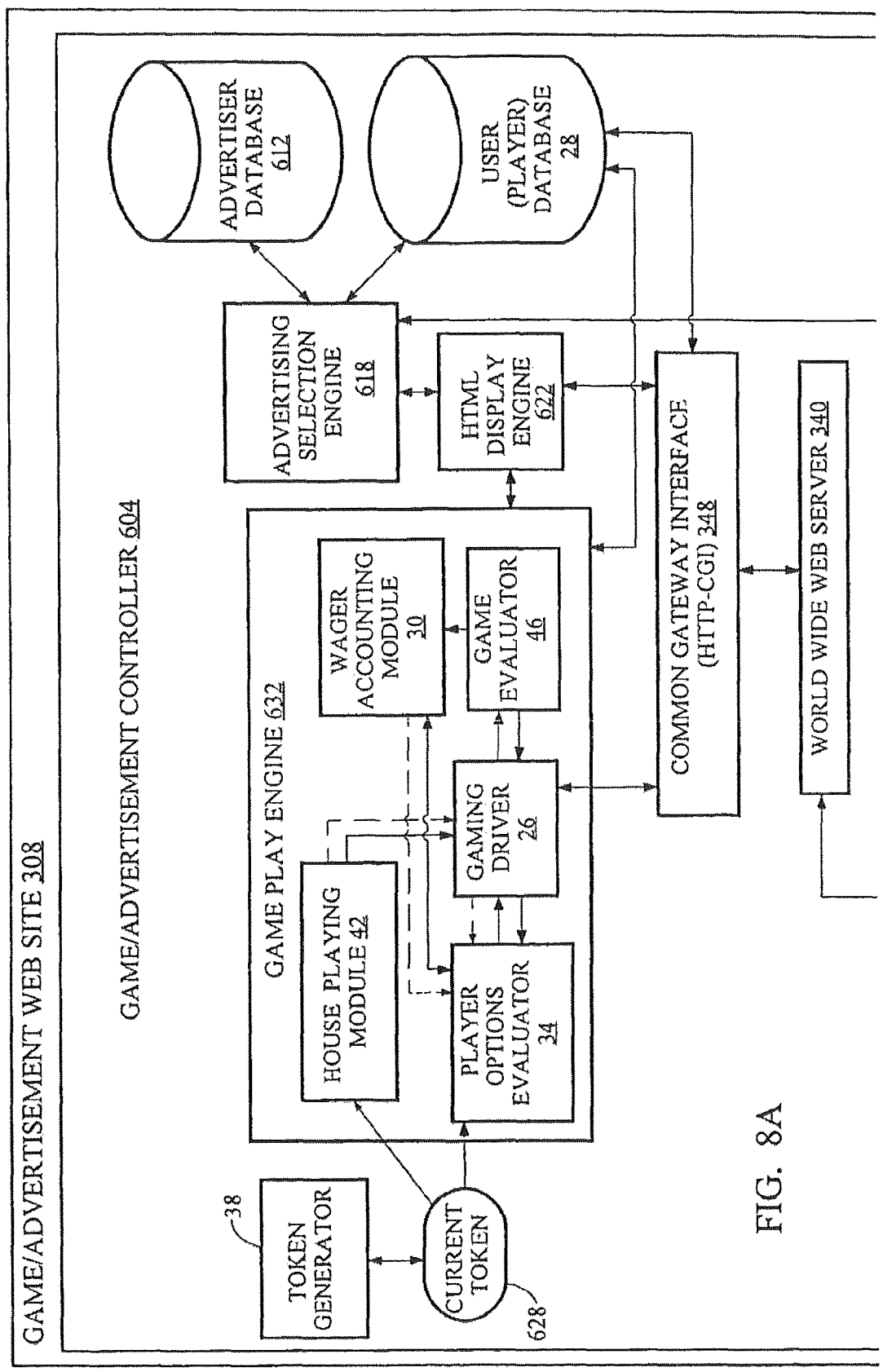
FIGS. 8A and 8B are an alternative embodiment of the game/advertisement web site 308. In particular.
Figure 8B:
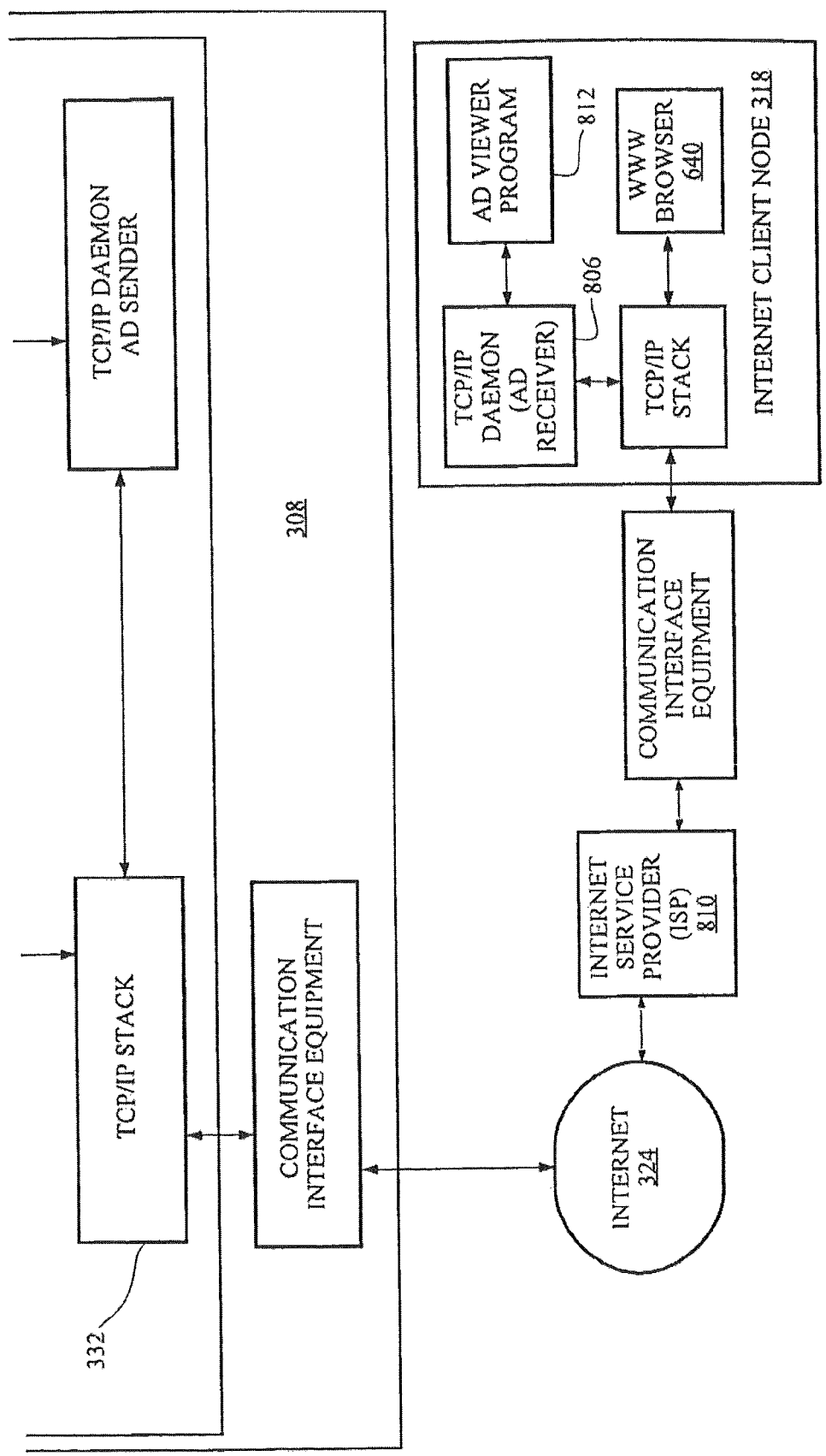

An additional and/or alternative description of the embodiment of the present invention shown in FIGS. 8A and 8B is as follows: users may use the present invention to access the INTERNET 324 on a reduced cost or free basis, by using whatever TCP/IP SLIP/PPP package they desire and registering with the web server 308. That is, a user can sign up or register by dialing into a terminal server with normal serial dialing and log on as a user identified by the identifier "NEW." User "NEW" is then forced into a connection to an enrollment or registration program so he/she can provide information requested by the present invention. When enrollment is completed, the present invention allows the user to download a communications daemon (e.g., ad receiver daemon 806) to the user's Internet client node 318. The user may then install the daemon on their machine (Internet client node 318) and dial-up with their favorite TCP/IP package.

However, upon accessing the host 308, the user accesses basic functionality of the DISPLAY ENGINE 622 that starts up the downloaded daemon 806. The network host 308 periodically queries each active port on the terminal servers (e.g., Internet client node 318) to get the IP addresses and then send a short message to the daemon 806 which is listening in on a specific port. The DISPLAY ENGINE 622 may also disable access by an end user machine 318 after a certain number of failures.

Note that the host 308 periodically sends an item to the downloaded daemon 806 to display. The daemon then displays the message (advertisement) in a window (of the WWW browser 640) on the user's screen.

Figure 9:
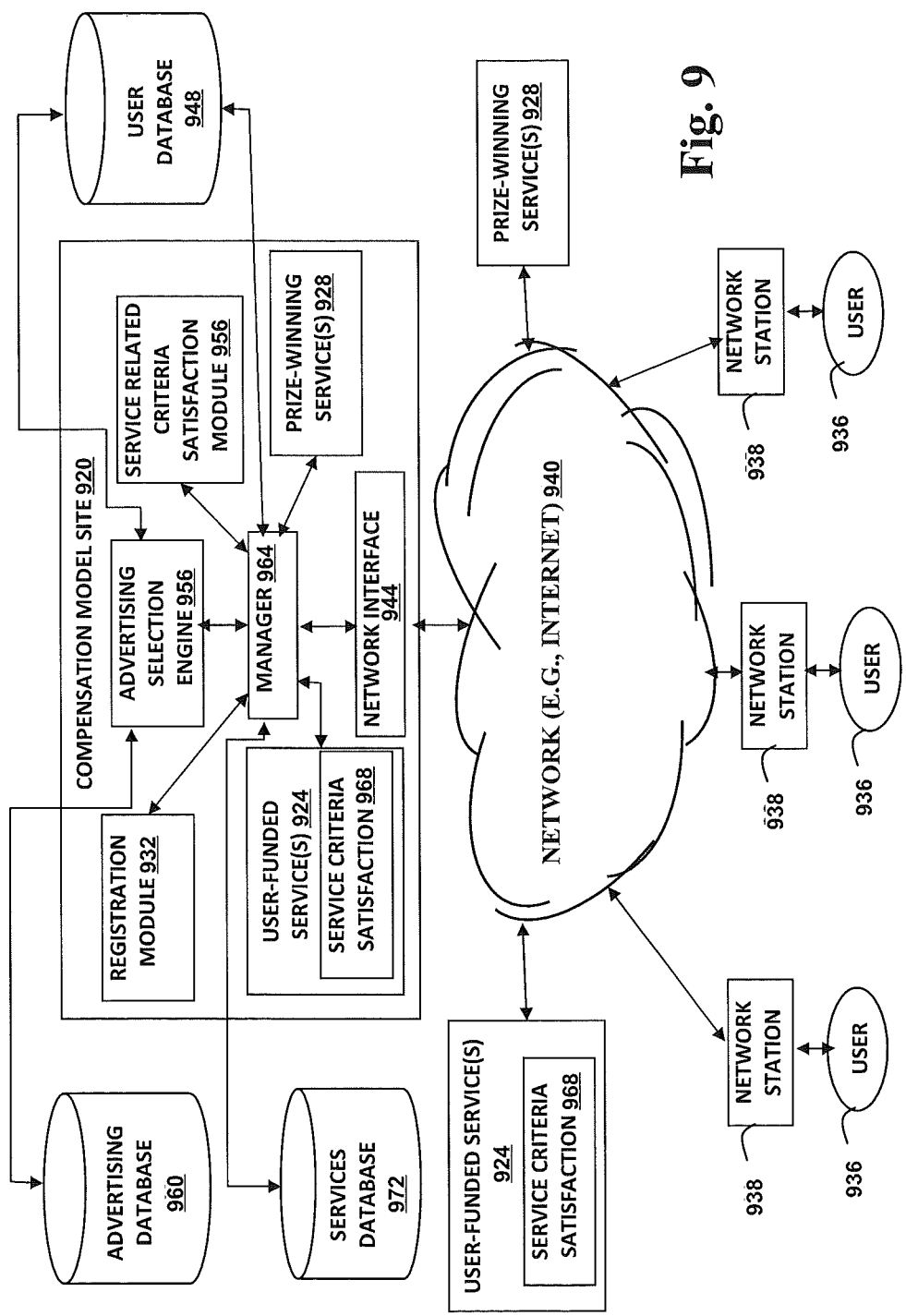
FIG. 9 shows a high level diagram of one embodiment of the compensation model which is accessible to users of the Internet.

Referring to FIG. 9, a compensation model network site 920 is provided for coordinating and/or controlling both the associated user-funded service(s) 924, and the associated prize-winning services 928. Note that the user-funded service(s) 924 and the prize-winning service(s) 928 may be incorporated into (more generally, accessible via) the compensation model site 920, or alternatively/additionally, such service(s) 924 and/or 928 may be substantially independent of the compensation model site 920. In particular, the service(s) 924 and/or 928 may be operated or controlled by a different entity than the one that operates or controls the compensation model site 920.

The compensation model site 920 further includes (or provides access to) a registration module 932 for registering users 936 for accessing both the user-funded service(s) 924 and the prize-winning service(s) 928. The registration module 932 is interactive with each user (via the corresponding user's network station 938) to be registered via network 940 communications with the network interface 944. The registration module 932 interacts with each user 936 for obtaining, e.g., user identification information, including name, address, email address, date of birth, and credit/debit card information. Additionally, the registration module 932 may request additional user information such as the types of network services in which a user 936 is interested in participating, e.g., games of skill, games of chance, judged contests, development of user expertise in some area, etc. The registration module 932 may use the obtained registration information obtained from a potential user 936 to access the user database 948 for determining if there is a user already registered that may identify the potential user 936. Note, that data may be provided in the user information stored in the user database 948 indicating whether there is the possibility that the user has registered more than once with the compensation model site 920. However, generally, such user information may be only used to prevent the dispensing of a prize or winnings if it is determined that a user 936 entered the same instance of a prize-winning service under multiple user registrations.

The compensation model site 920 further includes (or provides access to) a service related criteria satisfaction module 952 which collects information on how each user 936 is progressing toward satisfying constraints related to the one or more user-funded services which the user 936 has committed to fulfilling. Such service related criteria may be specific to the one or more user-funded services 924 for which a user 936 has contracted. Such user data regarding satisfaction of service related criteria may be provided to the module 952 from a user-funded service 924 that the user 936 is able to access. However, if such user-funded services 924 are incorporated into (or operated by the operator of the compensation model site 920), then at least some of the generic service related criteria (e.g., time interacting with a user-funded service 924) may be tabulated directly by the module 952.

The compensation model site 920 also includes (or provides access to) an advertising selection engine 956 for providing advertising to be displayed at network stations 938 when user-funded services and/or prize-winning services are being accessed by the users 936 of the network stations 938. For user-funded services 924 and/or prize-winning services 928 incorporated into (or operated by the operator of the compensation model site 920), such advertising may be directly joined with service presentations prior to transmission from the compensation model site 920 to a user network station 938. However, for user-funded services 924 and/or prize-winning services 928 incorporated into (or operated by the operator of the compensation model site 920), such advertising may be transmitted in a manner similar third party Internet advertising agencies such as DoubleClick®, wherein a service transmission received at a user network station 938 may include information for generating an additional request for advertising information from, e.g., the compensation model site 920. Note that the advertising selection engine 956 may select advertising from the advertising database 960 for presenting to users 936, and such advertising typically includes one or more hyperlinks that allow a user 936 viewing the advertising to activate the hyperlink and thereby receive additional advertising information from typically a corresponding advertiser's network site (e.g., Internet or website) as one skilled in the art will understand. However, such additional advertising information can also include alternative user interface techniques for presenting at least portions of the additional advertising information to the users 936. For example, such additional advertising may be transmitted (e.g., joined with service related information) so that when (if) a user 936 merely positions his/her pointing device ("mouses over" with e.g., a mouse or trackball) on or over a display of an advertisement, then additional information is presented, and such additional information may be particularly targeted to the user; e.g., a sale of merchandise in which the user's profile indicates the user is interested. In one embodiment, there may be a designated portion of the user's network station display in which such additional advertising information is presented when the user mouses over a displayed advertisement. Such a designated portion may be similar to a news stream across, e.g., top or bottom portion of the network station display. In one embodiment, the advertising selection engine 956 attempts to match advertisements in the advertising database 960 with user profiles stored in the user database 948. A description of such a matching operation is disclosed in U.S. Pat. No. 6,712,702 fully incorporated herein by reference. Thus, advertising may be targeted to selected users 936 according to their interests, needs, life styles, etc.

The compensation model site 920 also includes a manager 964 for controlling and/or coordinating the exchange of information between the users 936 and the modules 924, 928, 932, 952, and 956 of the compensation model site 920. Moreover, the manager 964 may join advertising to service presentations prior to transmission to a user(s) 936. Thus, since each of the user-funded services 924 and the prize-winning services 928 are likely to be interact with each of the users 936 (via their corresponding network stations 938), the manager 964 may use display frame data for determining how to join selected advertising for display at a user's network station 938.

Regarding the user-funded service(s) 924 in more detail, this module/network site may include a service related criteria satisfaction module 968 for determining and monitoring the progress of a user 936 toward satisfying the agreed to one or more criteria in order to use the user-funded service for free (e.g., have the user's service deposit refunded, or prevent the charging of a credit/debit card of the user's). Thus, such a module 968 may monitor a user's interactions with the user-funded service for, e.g., an increase in proficiency of the user, an amount of time the user interacts with the service, a frequency with which the user interacts with the service, a number of submissions to the service (such as art, music or informational submissions, etc.). Accordingly, the module 968 may periodically provide the service related criteria satisfaction module 952 with information on users' individual progress. In particular, each module 968 provides the service related criteria satisfaction module 952 with information for identifying a user 936 that satisfied his/her service related criteria, and information identifying a user 936 that did not satisfy his/her service related criteria (and for which the user should have to pay for accessing the user-funded service). Accordingly, the user-funded service 924 provides service related criteria satisfaction/dissatisfaction information to the manager 964 for storing in the user's data of the user database 948.

Regarding the prize-winning service(s) 928 in more detail, each such service 928 provides one or more contests that qualified users 936 may enter. Each such service 928 has at least one associated user-funded service 924 from which users 936 that satisfy the service related criteria for this associated service may elect to participate in a contest offered by the prize-winning service 928. Each contest preferably provides prizes to winners of the contest, and such prizes are of a sufficient value to motivate users 936 to both satisfy the service related criteria, and then win the contest. Each prize-winning service(s) 928 obtains its eligible users 936 from the service related criteria satisfaction module 952 (via the manager 964). Moreover, the results of each contest (at least identifications of the winners, but in some embodiments, also those that did not win) are also communicated to the module 952 via the manager.

Regarding the service related criteria satisfaction module 952, this module may determine whether a winner of a prize-winning contest is eligible to collect his/her prize. In particular, the module 952 may determine whether a winning user 936 has entered the contest more than a legitimate number of times.

Regarding the user database 948, the database may include the following fields for each user 936:
(a) User 936 identification, including user legal name, a display name, user address, email address, date of birth, credit/debit card information.
(b) Identification of each user-funded service agreement to which the user is obligated to satisfy certain criteria or pay for accessing the corresponding user-funded service 928, such identification including the amount that may be required to be paid for the service, and the amount (if any) already paid.
(c) For each user-funded service agreement to which the user is obligated, the amount (if any) paid/pledged by a sponsor (e.g., an advertiser) to allow the user 936 to access the user-funded service.
(d) For each user-funded service which the user is accessing, an indication of his/her progress toward satisfying the corresponding service related criteria.
(e) Information identifying the prizes that have been won by the user 936.

Regarding the services database 972, this database is accessed by the prize-winning service(s) 928 (via the manager 964) for adding information on prize-winning contests when they become available for participation by users 936, and for deleting information on prize-winning contests when such contests are no longer available to be entered by users 936. Moreover, this database may include information on the prizes of contests, e.g., how/who provided a prize for a contest, the value of the prize, the number of users 936 in the contest, the minimum and/or maximum number of users 936 for the contest etc.

Regarding the advertising database 960, this database may include advertiser information as disclosed in the U.S. Pat. No. 6,712,702 fully incorporated herein by reference for a corresponding advertiser database.

The following pseudo-code may be performed by an embodiment of the compensation model 920 (together with one or more corresponding user-funded service(s) 924 and/or one or more corresponding prize-winning service(s) 928):

Receive user registration information via a network (e.g., the Internet or an intranet) site for obtaining access to one or more services, wherein (i) each user agrees to be bound to the rules for the service(s) offered; (ii) the user provides identification information to certify his/her identity; (iii) the user provides financial information for compensating the operator of the site in the event that the user does not appropriately satisfy certain predetermined service related criteria.

If one or more advertisers contract to sponsor users by paying any potential fees, allow advertisers to select the users for which they can assume the obligation for paying any potential user fees.

If a user is selected by an advertiser for sponsoring, then present to the user the advertiser's willingness to sponsor the user, and let the user select from among one or more advertisers for being sponsored, wherein advertising by the selected advertiser sponsor(s) is also to be presented to the user when one of the one or more services is accessed by the user.

When the user accesses (interacts with) one of the services,
  Determine advertising to present to the user, wherein such advertising is determined based on: (i) whether the user was sponsored by an advertiser(s), (ii) other advertisers who have contracted to have advertising presented to users (e.g., via a third party advertising entity such as Doubleclick or Google). Note, user profiling can be performed for determining advertisements to be presented. In particular, the following user information may used for determining advertisements:
    (a) Since the user is accessing a particular service(s) and has gone to the trouble registering for the service(s), the user is likely interested in advertisements related to the service(s) that he/she can access via such registration;
    (b) The general geographical location of the user is available in many contexts, and in particular, for the Internet, wherein such geographical location information can locate the user to a resolution of approximately corresponding to zip code. One such service providing such location enabling information is available from Quova at www.quova.com, and the following U.S. Pat. Nos. 7,072,963 and 6,684,250 are fully incorporated herein by reference;
    (c) If authorized/permitted, e.g., by the user, read the user's Internet cookie file for identifying other network sites visited by the user, and in particular, comparing various versions of the user's cookie file for determining subject matter that may be frequently accessed by the user, and thus using a correspondence between subject matter of advertisements and the network sites visited by the user;
(d) Providing the user with, e.g., browser plug-in software providing a capability to: (i) manually terminate a currently presented advertisement, e.g., the user may provided with a graphical button that may be clicked on so that the user can activate the plug-in to terminate a particular advertisement from being presented (and/or re-presented), or (ii) "select an alternative" advertising category, wherein the user is allowed to select advertising categories from which advertising is to be received. Thus, if the user receives a beverage advertisement, the user may select alternative advertisement related to automobiles;
(e) Monitoring how the user interacts with the service(s) for which he/she registered.

```
Monitor the user's progress toward satisfying the agreed to service
related criteria; and
If the user satisfies the service related criteria then {
        Inform the user of such satisfaction;
        Identify the user as being eligible for entering one or more
                (if any) instances of prize-winning services;
        Store data identifying that the user has satisfied the service
                related criteria;
        If the user has paid upfront for any portion of the service then {
                Determine how to refund/reimburse the user for his
                        payment (e.g., credit card refund,
                        providing the payment for a different
                        service, etc.);
                Refund/reimburse the user;
        }
        Else { /* The user has not paid for any portion of the service */
                If a sponsor(s) paid for (is obligated to pay for) at
                        least a portion of the user's service fee then {
                                Inform each sponsoring advertiser of
                                        such satisfaction of the
                                        service related criteria;
                                Store data indicating that the sponsor
                                        does not have to pay for the
                                        service;
                }
                If the user is obligated to pay for the service then
                        Store data indicating that the user does not
                                have to pay for the service;
        }
        If the current service being accessed can be
                continued to be accessed by the user then {
                        If there is a next more advanced level of the
                                service then {
                                        Ask the user if he/she wishes to
                                                advance to the next level of the
                                                service;
                                        Advance the user if requested to do
                                                so, otherwise do not;
                        }
        }
}
Else /* the user has not satisfied the service related criteria */
        Periodically (e.g., every week) inform the user of
                his/her unsatisfied service related criteria;
```

```
Monitor any time constraints within which the service related
criteria must be satisfied; e.g.,
        If a time constraint has expired, then {
                Inform the user of such expiration, and that he/she has not
                        satisfied all the service related constraints;
                If the user has not satisfied the service related criteria then {
                        Identify the user as being ineligible for entering one
                                or more (if any) instances of prize-winning
                                services corresponding to the user-funded
                                service for which the service related criteria are
                                applicable;
```
```
                        Store data indicating that the user has not satisfied
                                the service related criteria;
                        If the user has paid upfront for any portion of the
                                service then
                                        Release the payment for use by the operator
                                                of the site;
                        Else { /* The user has not paid for any portion of
                                the service */
                                If a sponsor(s) paid for (is obligated to pay
                                        for) at least a portion of the user's
                                        service fee then {
                                                Inform each sponsoring
                                                        advertiser of such
                                                        non-satisfaction of the
                                                        service related
                                                        criteria;
                                                Store data indicating that the
                                                        sponsor must pay for
                                                        the user's access to
                                                        the user-funded
                                                        service;
                                }
                                If the user is obligated to pay for the
                                        service then
                                                Charge the user's credit card for any
                                                        remaining portion of the service
                                                        fee still remaining unpaid;
                        }
                }
}
```

```
For each prize-winning service instance available DO {
        Determine users that are eligible to access the prize-winning
                service instance, this step including:
                        For each user whose eligibility is known, e.g., due the user
                                satisfying the related criteria for an associated user-funded
                                service instance DO
                                        Notify the user that he/she can enter the prize-winning
                                                instance;
                        For each request from user's requesting entry into the prize-
                                winning instance DO {
                                        If the user is known to have satisfied the service related
                                                criteria for an associated instance of a user-funded
                                                service instance then
                                                        Enter the user into the prize-winning service
                                                                instance;
                                        Else {
                                                If other users can enter then
                                                        Determine and store the user's qualification
                                                                information for entering the prize-winning
                                                                instance;
                                        }
                                }
        Conduct the prize-winning service instance.
}
```

Email notification may be used to notify a user of where the user stands in satisfying service related criteria for an instance of a user-funded service (e.g., a game), and/or for an instance of a prize-winning service instance. Moreover, such notification may be transmitted to the user's phone or cell phone. Additionally, an Internet feed and/or instant message may be used to also allow a user to access the user-funded and/or prize-winning service (e.g., blackjack, poker, and/or chess). For example, a user might play a game while in a motor vehicle, and might even receive prizes or some type of "comps" for playing. Voice recognition may also be used to allow the playing of games in an efficient manner, e.g., in a motor vehicle or other environment where the user's communication device available for receiving speech/voice commands (e.g., a mobile phone). For instance, if a user is playing blackjack while in a motor vehicle, words and/or phrases such as "hit me" or "fire" may be used, since it is well within the state of voice recognition technology to readily recognize such simple phrases.

For a service (e.g., a game) being offered on a network, such as the Internet, wherein the interactions are essentially verbal by the user, the network site providing the service, in one embodiment, may user speech recognition processing and may also use text analysis processing. Text analysis processing is for recognizing a textual conversion of spoken dialogue for determining the actions requesting to be performed by a user. The text analysis functionality of the network site preferably includes identifying words and/or phrases and/or sentences that instruct the network site (e.g., a website) that then takes predetermined actions, and in performing such actions, the network site provides feedback to the user verifying the action(s) performed, either prior to or immediately after the action(s) is to be performed. For a user to play a game substantially verbally, game plays may be made by the user via spoken text or speech and such speech is translated into a stream of text transmitted to the network site, the network site then performs text analysis for determining a next game configuration requested by the user. Upon determining the likely user request, the network site then preferably acknowledges to the user the action(s) to be performed, and requests confirmation from the user to perform the action (e.g., the game play).

In one embodiment the network site may instruct the user regarding the words, phrases and or sentences which the network site recognizes for performing actions such as game plays (or other actions for other services). Alternatively/additionally, the user may be able to use conventional speech without the network site providing predetermined speech patterns that the user must provide for the network site to perform particular actions. Accordingly, the network site processes user input and attempts to determine standard actions that are typically spoken to perform the service. For example, in blackjack when playing a game substantially verbally, the user may use the following phrases without being taught or without these phrases being specified by a blackjack playing website: "hit, stand, stay, double down, split, surrender" whereas in poker, the words "raise, ante, fold, see you" may be standard.

The present method and system for receiving compensation for network services provides numerous benefits over prior art business models for receiving compensation, including the following benefits.
  (a) The present compensation model provides incentives for users to increase their skills at the service (e.g., playing a game, designing a landscape, teaching the user to fly an airplane, teaching the user how to invest in the stock market, etc.).
  (b) It is believed that even small fees will cause users to disproportionately increase their interest in using the service since users have a invested interest in the service, and can be get their investment back if they enhance their skills. Accordingly, the present compensation model pays users to become more skilled, and it is believed that users will recognize the benefits of the present compensation model for them, and thus develop greater loyalty to the network site using the present compensation model.
  (c) It is believed that users will tolerate advertising being presented even though they have paid for the service since there is the expectation that the service is ultimately free when they satisfy certain service related criteria (e.g., reach a particular proficiency level) for them to not be charged and/or their activation fee or deposit to be refunded. Thus, the operator of the network site can obtain advertising revenue and user revenues for the same service.
  (d) By requiring users to be responsible for paying an activation fee or deposit (which may be as low as, e.g., $1 or less), users must identify themselves, e.g., via a credit or debit card or some other financial transaction instrument. Accordingly, for a service such as a game tournament with the subsequent opportunity to win substantial prizes, duplicate entries by a user may be detected. That is, in using a credit or debit card, a user is required to input his/her name, address, and credit card number. Accordingly, a user having the same last name, and the same address as another user, may be asked for additional information for distinguishing the two users such as whether the user is male or female, and/or date of birth. Moreover, all users may be requested to declare that they have only entered such a tournament once, and when a user wins a prize, the present compensation model may perform additional checks for further assuring that the user has not entered multiple times. Accordingly, the use of such financial transaction information for providing greater integrity and fairness to the service (particularly, competitive services such as games or contests) is believed to be an important benefit of the present compensation model. Moreover, perceptions of integrity can be extremely important for network sites and the services they provide since the inherent lack of personal contact between communicating parties is not particularly conducive to assuming a service is impartially or fairly operated.

In an alternative embodiment, some services may not require rigidly monitoring or assuring a single entry per user to a particular service (or instance thereof). Accordingly, in such circumstances, the activation fee or deposit may be increased to a level that generally inhibits a user from activating the service under multiple identifications or aliases since both a separate activation fee or deposit would be required for such user identification or alias.
  (e) The use of proficiency levels can add integrity or fairness when users are in competition with one another. For example, before a user enters such a service multiple times for substantially increases his/her odds of winning (free) prizes, the user would have to demonstrate a particular proficiency level under each of the user's aliases. Thus, the demonstration of proficiency levels may be, by itself, a deterrent to a user entering such a service multiple times.
  (f) The present compensation model can provide additional revenue to the operator of a network site since at least some users, if not most of the users, may not satisfy certain service related criteria (e.g., reach the predetermined proficiency level), and accordingly, the operator retains the users' activation fees or deposits.
  (g) The service related criteria (e.g., proficiency level) can be adjusted and/or tailored to the needs of the operator of the network site. For example, an operator of a network site that derives (or intends to derive) its revenues from advertising may set the service related criteria (e.g., proficiency level) for the service, e.g., a game (or games), at a sufficiently high level so that users activating the service are exposed to a large number of ads while attempting to satisfy the service related criteria (e.g., reach the proficiency level). Moreover, if the service related criteria includes, e.g., a length of time the service must be activated/utilized, and/or a predetermined number of service instances activated (e.g., a number of game instances played), then the operator has greater assurance that the advertisement expectations of the operators advertisers will be satisfied. Furthermore, if the service related criteria is sufficiently high such that many of the users do not satisfy the service related criteria, then the site operator retains the users' activation fee or deposit.

Alternatively, if the operator wishes to derive revenue from offering coupons of advertisers, and/or inexpensive items of advertisers, then the service related criteria may be made low enough so that most users satisfy the service related criteria, and subsequently the users may be given the option of selecting one or more coupons and/or sponsor items in addition to, or in lieu of all or a portion of their activation fee or deposit. Moreover, since users satisfying the service related criteria will be provided with the opportunity to win additional, e.g., more substantial, prizes for free, users are likely to tolerate subsequent advertising during instances of the service for which such additional prizes may be won.

Additionally, user selection of particular coupons and/or items as part of their refund (and/or in addition to their refund) provides additional information about the users, and such information can be associated with the users' identities for presenting to such users additional advertising, coupons, and/or sponsor products/services that is likely to be of interest to the user.

If a fee is to be returned or refunded, instead of the fee being returned immediately, such fee may also be transferred by either the player or the site to another game, website, or another entity as agreed or as set forth in a predetermined agreement an operator of a network site providing (at least a portion) of the services for the compensation model.

In one embodiment, the user activation fee or deposit may be reduced if the user is identified by one or more other users as a user that motivated them to register for a user-funded service.

The advertising necessary to inform potential users of a network site that utilizes the present compensation model may be spread by word of mouth, and/or various social networking sites. However, to facilitate awareness of such network sites, ads for such network sites may be placed upon disposable mats. In particular, such mats may provided in dressing rooms and other locations where people are concerned about their feet touching a floor due to concerns for cleanliness or the fear of contracting a foot disease/infection. Such mats may have a water repelling surface on at least one of the sides and a germicide provided on the surface on the side that the user is to place his or her feet. Advertising may be placed upon at least one of the mat sides. The mats may be precut to a size large enough for a person's feet to avoid touching a floor's surface or the mat may be dispensed by using an "endless" roll—or a roll from which many mats may be dispensed with the aid of perforations at various locations in the roll so that advertising mats may be used in said dressing rooms. Alternatively, such foot mats may be available in a plurality of sizes (e.g., similar to shoe sizes). Moreover, such foot mats may be secured to a person's foot via straps that adhesively adhere to one another or to the mat. The mats may be provided at little or no cost. Embodiments of such mats may be also used for "place mats" upon which food may be placed. The advertising mats may also be made of a material and size that allows them to adhere to shirts or other material such as bed sheets. Additionally, such advertising may be provided in the form of stencils for placement upon bedding or wearing apparel, wherein such bedding or apparel may be provided at little or no cost to the public and/or a third party.

The foregoing discussion of the invention has been presented for purposes of illustration and description. Further, the description is not intended to limit the invention to the form disclosed herein. Consequently, variation and modification commiserate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention.

What is claimed is:

1. A method for providing an electronic machine service on an electronic communications network, comprising performing the following by computational equipment:

providing, the electronic machine service for a user to access, via a first network connection to the network in a first session of a plurality of network sessions of the service, wherein each of the sessions includes network transmissions, between a network user node for the user and at least one network site, for performing sessions of the service entirely by machine operations, wherein the service and the sessions thereof are for one or more of: (i) playing one or more user interactive games requiring the network transmissions, (ii) providing targeted advertising matched to the user by the at least one network site, (iii) providing access to the network or Internet for the network user node, and (iv) interactively communicating on the network with the network user node for performing the service;

providing the network user node with access to the first session of the service, wherein the user interacts with the service via the network transmissions, the network transmissions output by a machine network interface, the interface transmitting, on the first network connection, first information from the at least one network site for the service to the network user node from which the user communicates with the at least one network site;

wherein said first information is subsequently available for transmission in a subsequent network communication to the at least one network site from the network user node;

wherein said first information is electronically stored on the network user node so that it is available in a subsequent network session of the plurality of network sessions of the service by the network user node, wherein access to the service on the subsequent network session requires registering the user in order to allow the user to subsequently interactively communicate on the network for performing the service via the subsequent network session;

activating, in response to electronic transmissions from the network user node, an electronic controller to communicate with the network user node so that the user is provided with access to the first session;

transmitting one or more corresponding service display representations of the first session from the at least one network site to the network user node, wherein at least most of the service display representations are interactive with the user for providing corresponding responsive transmissions on the network to the at least one network site during the first session;

wherein a computational machine advertising selector determines a corresponding advertising presentation (P), from a plurality of advertising presentations, to present to the user at the network user node, the corresponding advertising presentation P selected as a result of machine advertising selector operations that identify a correspondence between information specific to the user and predetermined information associated with the corresponding advertising presentation;

wherein data for the corresponding advertising presentation P is transmitted, via the network, to the network user node without there being a corresponding network transmission (T), from the user, to which the transmitting of the data for the corresponding advertising presentation P to the network user node would be both: (i) an immediately next network response to the transmission T, and (ii) from the at least one network site;

wherein the data for the presentation P is used for presenting information about at least one of a purchasable product and a purchasable service;

wherein a corresponding user input for activating the first session is received prior to activation of the advertising selector for determining the corresponding advertising presentation P;

combining via the execution of computer software instructions: (1) advertising information, with (2) at least one of the service display representations for the first session to obtain a resulting combination for transmitting on the network by the at least one network site to the network user node;

wherein upon the network user node receiving the resulting combination, a display (D) of an advertising presentation corresponding to said advertising information is presented on said network user node, said display D occurring concurrently with a display of the at least one corresponding service display representation for the first session, said advertising presentation presenting interactive advertising: (i) related to a purchase of a product or service, and (ii) providing the network user node with network address data to access a network site for electronically communicating with the network site, wherein the network site provides further information related to the purchase of the product or service;

activating the subsequent network session after a termination of the first network connection;

wherein the activating includes receiving first responsive information from the network user node via a transmission for the subsequent network session;

determining, using the transmitted first responsive information, that the first information resides on the network user node;

wherein said first information is used for providing the user with a second access to the service, via the subsequent network session; and electronically transmitting, via the network and in the subsequent network session, service related information to the network user node in response to user inputs to the network user node for allowing the user to interact with the service.

2. The method as claimed in claim 1, wherein the service is free for the user.

3. The method of claim 1, wherein each of a plurality of users are each required to authorize an initial activation fee to access the electronic machine service.

4. The method of claim 1, further including:
applying predetermined criteria, from a computational component of the network, to user information indicative of the user interacting with the service via the network transmissions for the first session, for determining when the user satisfies the predetermined criteria;

wherein the criteria includes the user achieving a predetermined level of proficiency related to the service.

5. The method of claim 4, wherein if the user, after a given amount of time, does not achieve the level of proficiency, the user is charged a fee.

6. The method of claim 1, further including receiving a design from the user for the service, wherein the design is selected from the group consisting of landscape designs, auto designs, and house designs.

7. The method of claim 1, wherein the service is dependent upon a creation of a musical composition or a video provided by the user.

8. The method of claim 4, wherein the criteria includes a level of proficiency by the user, wherein the level is determined by a predetermined group of judges.

9. The method of claim 1, further including providing the user with a ranking of a second user that is participating in the service.

10. The method of claim 1, further including obtaining, by the at least one network site, information related to Internet interactions by the user, the information related to the Internet interactions including information related to a plurality of websites visited by the user.

11. The method of claim 1, wherein said service requires that a user's funds are only retained by the service when the user fails to satisfy a predetermined criteria related to the service.

12. The method of claim 1, wherein an advertiser provides a compensation for the user.

13. The method of claim 12, wherein the advertiser is selected by the user.

14. The method of claim 13, wherein the advertiser sponsors the service.

15. The method of claim 13, wherein the advertiser selects the user.

16. The method of claim 1, wherein the service and the sessions thereof are at least (i) playing one or more user interactive games requiring the network transmissions.

17. The method of claim 1, wherein the service and the sessions thereof are at least (ii) providing targeted advertising matched to the user by the at least one network site.

18. The method of claim 1, wherein the service and the sessions thereof are at least (iii) providing access to the network or Internet for the network user node.

19. The method of claim 1, wherein the service and the sessions thereof are at least (iv) interactively communicating on the network with the network user node for performing the service.

20. The method of claim 1, wherein the user network node comprises a touch-sensitive input area.

21. The method of claim 1, wherein the information specific to the user includes a location of the user.

22. A method for providing an electronic machine service on an electronic communications network, comprising performing the following by computational equipment:
providing, the electronic machine service for a user to access, via a first network connection to the network in a first session of a plurality of network sessions of the service, wherein each of the sessions includes network transmissions, between a network user node for the user and at least one network site, for performing sessions of the service entirely by machine operations, wherein the service and the sessions thereof are for one or more of: (i) playing one or more user interactive games requiring the network transmissions, (ii) providing targeted advertising matched to the user by the at least one network site, (iii) providing access to the network or Internet for the network user node, and (iv) interactively communicating on the network with the network user node for performing the service;

providing the network user node with access to the first session of the service, wherein the user interacts with the service via the network transmissions, the network transmissions output by a machine network interface, the interface transmitting, on the first network connection, first information from the at least one network site for the service to the network user node from which the user communicates with the at least one network site;

wherein said first information is subsequently available for transmission in a subsequent network communication to the at least one network site from the network user node;

wherein said first information is electronically stored on the network user node so that it is available in a subsequent network session of the plurality of network sessions of the service by the network user node, wherein access to the service on the subsequent network session requires registering the user in order to allow the user to subsequently interactively communicate on the network for performing the service via the subsequent network session;

in response to electronic transmissions from the network user node, electronically generating communications with the network user node so that the user is provided with access to the first session;

transmitting one or more corresponding service display representations of the first session from the at least one network site to the network user node, wherein at least most of the service display representations are interactive with the user for providing corresponding responsive transmissions on the network to the at least one network site during the first session;

electronically combining (1) advertising indicative information, with (2) at least one of the service display representations for the first session to obtain a resulting combination for transmitting on the network by the at least one network site to the network user node;

wherein upon the network user node receiving the resulting combination, a display (D) of an advertising presentation corresponding to said advertising indicative information is presented on said network user node, said display D occurring concurrently with a display of the at least one corresponding service display representation for the first session, said advertising presentation presenting interactive advertising: (i) related to a purchase of a particular product or service, and (ii) providing the network user node with network address data to access a network site for electronically communicating with the network site, wherein the network site provides further information related to the purchase of the particular product or service;

activating the subsequent network session, by the user, after a termination of the first network connection;

wherein the activating includes receiving first responsive information from the network user node via a transmission for the subsequent network session;

determining, using the transmitted first responsive information, that the first information resides on the network user node in order to provide the user with a second session with the service, via the subsequent network session;

electronically transmitting, via the network and in the subsequent network session, information for the second session to the network user node in response to user inputs to the network user node for allowing the user to interact with the service;

obtaining third party network site information for a third party network site specified by the user and accessed via the network user node to access the network;

electronically determining, using the third party network site information, data related to network information that is accessed by the user via the third party network site; and electronically determining an advertisement, to electronically transmit to the user, by using a correspondence between subject matter of the advertisement and the data related to the network information.

23. A method for providing a service on a communications network, comprising performing the following by computational equipment:

providing, for each of a plurality of sessions for the service for a user, via a connection to the network, wherein each of the sessions includes network transmissions, between a network user node for the user and at least one network site, for performing sessions of the service entirely by machine operations, wherein the service and the sessions thereof are one of: (i) playing one or more user interactive games requiring the network transmissions, (ii) providing targeted advertising matched to the user by the at least one network site, (iii) providing access to the network or Internet for the network user node, and (iv) interactively communicating on the network with the network user node for performing the service;

providing the network user node with access to a first session of the service with which the user interacts with the service via the network transmissions, the network transmissions provided by a network interface for transmitting, on the connection, first information from the at least one network site for the service to the network user node from which the user communicates with the at least one network site;

wherein said first information is stored on the network user node so that it is available in a subsequent connection by the network user node to the service, the subsequent connection performed via the network;

transmitting one or more corresponding service display representations of the first session from the at least one network site to the network user node, wherein at least most of the service display representations are interactive with the user for providing corresponding responsive transmissions on the network to the at least one network site during the first session;

wherein a activation of a machine advertising selector determines, electronic data for a corresponding advertising presentation, from data for a plurality of advertising presentations, to present to the user via the network user node, the data for the corresponding advertising presentation selected as a result of machine advertising selector operations that identify a correspondence between information specific to the user and predetermined information associated with the data for the corresponding advertising presentation;

wherein data for at least one presentation (P) of said advertising presentations is transmitted, via the network, to the network user node, without a corresponding network transmission (T), from the user, where the transmission T transmits the data for the at least one presentation P to the network user node as an immediately next response to a network user node input by the user for transmitting information to the at least one network site;

wherein the data for the at least one presentation P is used for presenting information about at least one of a purchasable product and a purchasable service;

wherein a corresponding user input for activating the first session is received prior to activation of the advertising selector for determining the data for the corresponding advertising presentation;

electronically combining (1) advertising related information for the corresponding advertising presentation, with (2) service related information for the first session to obtain a resulting combination for transmitting on the network by the at least one network site to the network user node;

electronically transmitting to the network user node the resulting combination, wherein a display of an advertising presentation corresponding to said corresponding advertising presentation is presented on said network user node, said display occurring concurrently with a display of one of the corresponding service display representations for the first session, said advertising presentation presenting advertising related to: (i) a purchase of at least one product or service, and (ii) providing the network user node with network address data to access a network site for electronically communicating with the network site, wherein the network site provides further information related to the purchase of the at least one product or service;

wherein upon the user activating the subsequent connection to the service (a) and (b) following are performed at a network site distinct from the network user node;

(a) receiving first responsive information from the network user node via a transmission on the subsequent connection when the user has reconnected the network user node to the network; and (b) determining, using the transmitted first responsive information, that the first information resides on the network user node in order to provide the user with a second session with the service, via the subsequent network session;

intermittently electronically transmitting, via the network and throughout the second session, service related information to the network user node in response to user inputs to the network user node, the service related information for allowing the user to continue to access and interact with the second session;

electronically obtaining third party network site information for a third party network site specified by the user and accessed by the user via the network user node;

electronically determining, using the third party network site information, data related to information accessed by the user via the third party network site; and electronically determining an advertisement, by the advertising selector, using a correspondence between subject matter of the advertisement and the data related to the information accessed by the user accessed by the user.

24. A system for providing a service on a communications network, comprising:

computational machinery providing a service accessible by a user via a connection to the network, wherein each of a plurality of sessions of the service includes network transmissions, between at least one network site, of the computational machinery, and a network user node for the user for performing sessions of the service entirely by machine operations, wherein the service and the sessions thereof are for one or more of: (i) playing one or more user interactive games requiring the network transmissions, (ii) providing targeted advertising matched to the user by the at least one network site, (iii) providing access to the network or Internet for the network user node, and (iv) interactively communicating on the network with the network user node for performing the service;

the computational machinery providing a first session of the service interactively accessible by the network user node via the network transmissions, the network transmissions provided by a network interface for transmitting, on the connection, first information from the at least one network site for the service to the network user node from which the user communicates with the at least one network site;

wherein said first information is stored on the network user node so that it is available in a subsequent connection by the network user node to the service, the subsequent connection performed via the network;

wherein one or more corresponding service display representations of the first session is transmitted from the at least one network site to the network user node, wherein at least most of the service display representations are interactive with the user for providing corresponding responsive transmissions on the network to the at least one network site during the first session;

the computational machinery providing an advertising selector which selects a corresponding advertising presentation, from a plurality of advertising presentations, to present to the user at the network user node, the corresponding advertising presentation selected as a result of machine advertising selector operations that identify a correspondence between information specific to the user and predetermined information associated with the corresponding advertising presentation;

wherein at least one presentation (P) of said advertising presentations is transmitted, on the network and to the network user node, without a corresponding network transmission (T), from the user, to which the transmission of the at least one presentation P is both an immediately next network response to the transmission T, and from the at least one network site, wherein the presentation P is for presenting information about at least one of a purchasable product and a purchasable service;

wherein a corresponding user input for activating the first session is received prior to activation of the advertising selector for determining the corresponding advertising presentation, wherein (1) advertising related information, obtained from the advertising selector and (2) service related information for the first session is combined to obtain a resulting combination for transmitting on the network by the at least one network site to the network user node;

wherein a display of an advertising presentation corresponding to said advertising information on said network user node is provided upon the network user node receiving the resulting combination, said display occurring concurrently with a display of one of the corresponding service display representations for the first session, said advertising presentation presenting advertising related to a purchase of a product or service;

wherein the subsequent connection to the service is activated by the user;

wherein first responsive information from the network user node is received via a transmission on the subsequent connection when the user has reconnected the network user node to the network;

wherein whether the first information resides on the network user node is determined using the transmitted first responsive information;

wherein said first information is used for providing the user with an access to a second one of the sessions;

wherein service related information to the network user node in response to user inputs for allowing the user to continue to access and interact with the second session is intermittently transmitted throughout the second session;

wherein third party network site information is obtained for a third party network site accessed by the user via the network user node;

wherein data related to network information accessed by the user is determined using the third party network site information; and wherein an advertisement is determined, by the advertising selector, using a correspondence between subject matter of the advertisement and the data.

25. The system of claim 24, wherein third party network site information is obtained from a communication station used by the user to access the network.

* * * * *